(12) United States Patent
Photowat

(10) Patent No.: US 10,262,301 B2
(45) Date of Patent: Apr. 16, 2019

(54) METHODS AND SYSTEMS FOR CALENDARING, SOCIAL NETWORKING AND PLANNING FOR USERS, INCLUDING, VENDORS, CONSUMERS AND ENTERPRISES

(71) Applicant: Sarah Photowat, Great Falls, VA (US)

(72) Inventor: Sarah Photowat, Great Falls, VA (US)

(73) Assignee: Sarah Photowat, Great Falls, VA (US)

( * ) Notice: Subject to any disclaimer, the term of this patent is extended or adjusted under 35 U.S.C. 154(b) by 340 days.

(21) Appl. No.: 14/214,361

(22) Filed: Mar. 14, 2014

(65) Prior Publication Data

US 2014/0343990 A1 Nov. 20, 2014

Related U.S. Application Data

(63) Continuation-in-part of application No. 12/705,850, filed on Feb. 15, 2010, now abandoned.

(60) Provisional application No. 61/852,016, filed on Mar. 15, 2013.

(51) Int. Cl.

| G06Q 30/00 | (2012.01) |
|---|---|
| G06Q 10/10 | (2012.01) |
| G06Q 10/06 | (2012.01) |
| G06Q 50/00 | (2012.01) |
| G06Q 30/02 | (2012.01) |

(52) U.S. Cl.
CPC . G06Q 10/1097 (2013.01); G06Q 10/063118 (2013.01); G06Q 30/0252 (2013.01); G06Q 50/01 (2013.01)

(58) Field of Classification Search
None
See application file for complete search history.

*Primary Examiner* — Meredith A Long

(57) ABSTRACT

A computerized system is provided for generating a visual presentation for visually organizing one or more activities of a user, including vendors. The methods and systems are directed to calendaring, social networking, and planning for users, including vendors, consumers and enterprises.

1 Claim, 107 Drawing Sheets

FIG. 2

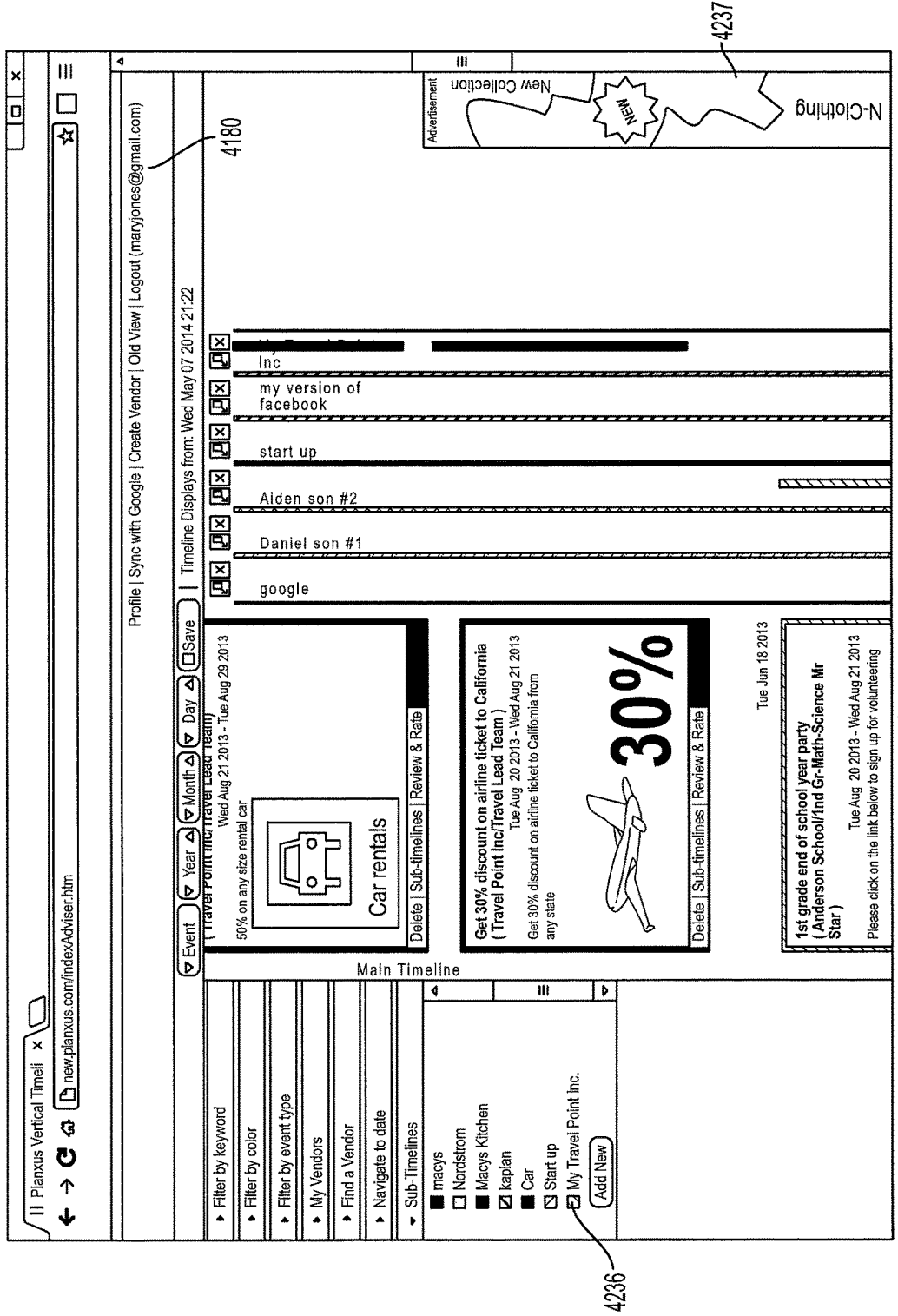

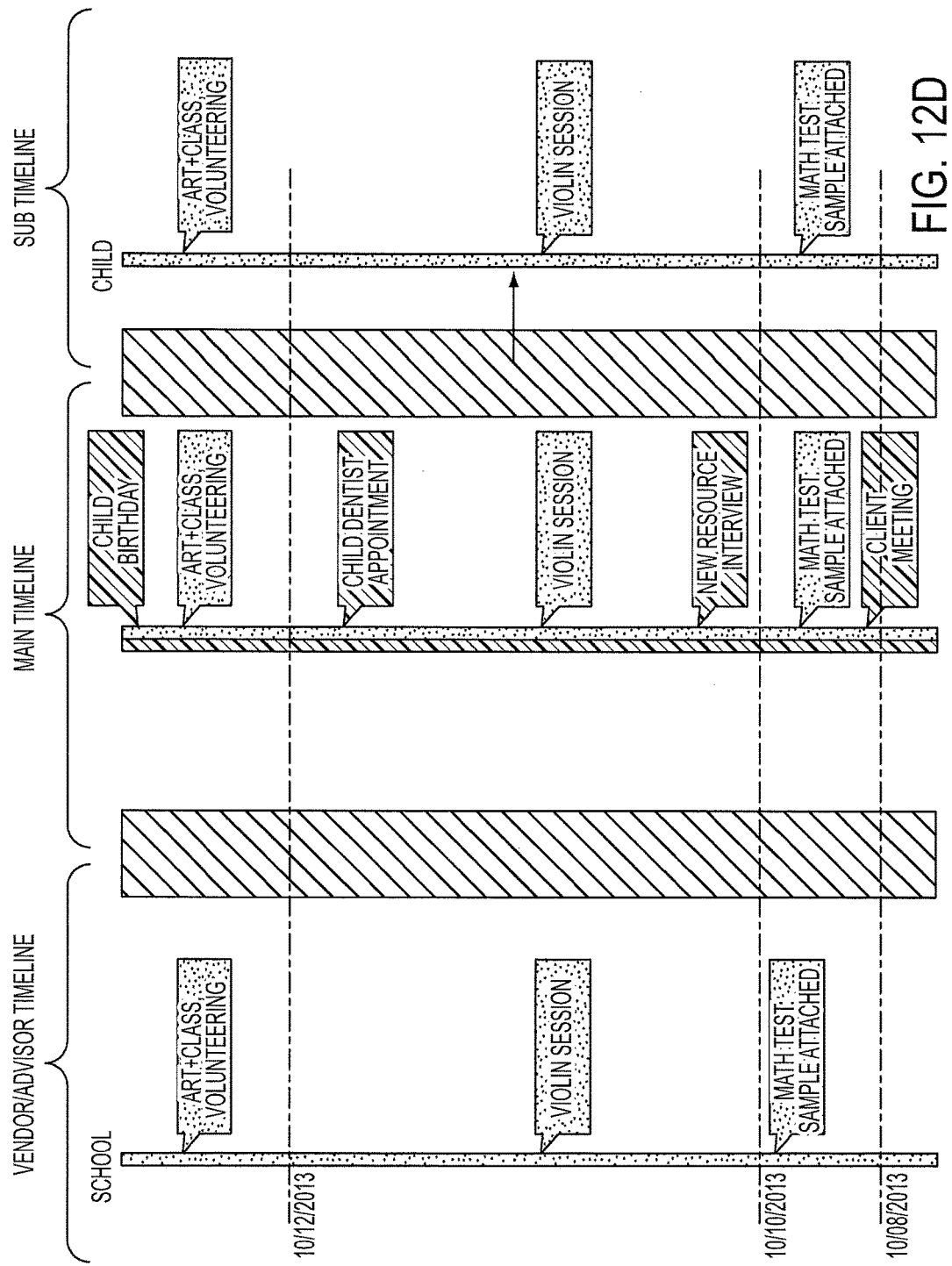

Select Events To Share                                                    ✕

My life with my husband
Please check events that you want to share with your friend:

☐ ▪ Work Happy hour  (1/2/2014 5:12:00 AM)
☐ ▨ Dinner with John in UN tower  (1/3/2014 5:15:00 AM)
☐ ▨ Backpacking trip  (1/6/2014 6:17:00 PM)
☐ ▦ Playing Basketball  (1/10/2014 6:18:00 PM)
☑ ▨ Engagement Party in Hilton Hotel  (1/17/2014 5:19:00 PM) ⟵ 7111
☑ ▨ Buy Gown from Queen Gown, located 3 main street, Reston, VA  (2/10/2014 5:21:00 PM) ⟵ 7112
☑ ▨ Selecting Wedding Flower from Wedding Flower Garden, 1 Jay Street, DC  (3/6/2014 5:24:00 PM) ⟵ 7113
☐ ▨ Meet wedding planner, located 5 Dan Street, Reston, VA  (3/6/2014 5:27:00 PM)
☐ ▨ Wedding day  (3/6/2014 5:28:00 PM)
☑ ▦ Reserve Hilton Hotel wedding package, located in 11 main street, Fairfax va Florida  (3/6/2014 5:28:00 PM)

[ Share ] ⟵ 7114

METHODS AND SYSTEMS FOR CALENDARING, SOCIAL NETWORKING AND PLANNING FOR USERS, INCLUDING, VENDORS, CONSUMERS AND ENTERPRISES

CROSS REFERENCE TO RELATED APPLICATIONS

This application is a continuation-in-part of U.S. patent application Ser. No. 12/705,850, filed Feb. 15, 2010, and this application claims priority to U.S. Provisional Patent Application Ser. No. 61/852,016, filed Mar. 15, 2013, each of which is hereby incorporated herein by reference in its entirety.

FIELD

The present invention relates generally to systems and methods for integrating and managing life events. Additionally, the present invention relates to systems and methods for a combined calendar and social network integrating multiple timeline in different categories of life on a single planning system for a variety of user types and including vendor teaming. The present invention further relates to computerized personal planning systems providing a graphical output format, and more particularly to a computerized personal planning system which displays prequalified vendors, including, professionals, businesses, teachers, or potential commercial sources of potential goods and services, and/or vendor teams or groupings, each displayed at an appropriate place in the graphical output format.

BACKGROUND

The complexity of modern life may be attenuated by the use of suitable planning systems to enable people to organize and plan future events. Both routine and extraordinary events may be assisted by a suitable planning system. Some people keep lists to serve as reminders. Others mark calendars to similar effect. However, being in fixed form, paper based planning and reminder systems are subject to inability to accommodate changes, additions, deletions, and similar modifications.

Planning systems are typically based on data entered by the user or operator of the system, and cannot accept inputs from outside sources or second parties. Sometimes, the second parties with whom the user will interact may have inputs to the interaction which are potentially of interest to the user of the system. The user must typically make an on-the-spot decision to include these inputs or to dismiss these second parties.

Many digital reminder systems cannot accept inputs, such as advertisements, from second parties. The numbers and identities of potential suppliers of goods and services for upcoming events may be limited to those known to the user, with more suitable suppliers being ignored.

Many digital planning systems cannot discriminate among or prequalify potential suppliers of goods and services so that those presented by the system are the most suitable.

Many planning systems cannot contribute to planning by the user.

Many planning systems cannot allow multiple users or suppliers to work as a team when presenting content to system users.

There exists a need for a dynamic planning system which can actively identify suitable suppliers of goods and services, which can assist in organizing or planning an upcoming event, and which most successfully links a person who may be overwhelmed with the details of planning one or more events with truly helpful suppliers.

SUMMARY

Various embodiments are generally directed to computerized personal planning systems providing a graphical output format to overcome the aforementioned problems.

The planning systems and methods are direct to a platform for the integration of all life events under one roof featuring a uniform user interface by combining a social network with a calendar that allows multiple parallel timeline in different categories of life (single sign on to a universal platform).

The planning system is ideal for a variety of real-time relationship and consumer-based interactions between:
Parent/teacher;
Vendor/consumer;
Doctor/patient;
Mechanic/driver;
Coach/player;
Software patch/server;
Election candidate/constituent;
Project manager/Team-member; and
Owner/Asset, etc.

The planning system and methods, may include, for example:
Uniform purchasing portal if accounting API is available or Semi uniform Purchasing portal to lead user to the external vendor purchasing portal;
Uniform Subscription/un-subscription to different vendors;
New Advertisement engine, Pulled advertisement instead of push advertisement, users only see the ads that belong to vendors they subscribed to;
Platform for saving coupons' history for both vendor and consumer;
Advisor platform and sharing portion of user timeline with another user or copy one portion of timeline to another;
Asset management, every asset in life can have a timeline, every aspect of life can have a timeline;
Project management;
Health care management;
Dynamic teaming between vendors (no more need for static website such as travelocity.com);
Access to big data in all aspects of life (family, work, kids, entertainment, shopping, etc.);
All standard functionality of a calendar will be offered, such event creation/deletion/update, reminders, re-occurring events, etc.;
All standard functionality of a social network, such as sharing pictures, events, friends connection will be offered;
Allow dragging events from one sub-timeline to another sub-timeline;
Auto population and mail grabber of vendor's events/offers/coupons/advises into a dedicated timeline;
Managing Business to business Ads (B2B) and Business to Consumer Ads (B2C);
Synchronization with well known Calendars and social media;

Access to historical vendor events/offers/coupons/advise for both B2B, C2B and B2C;

Central place for suggesting vendors to vendors, vendors to consumers and consumers to vendors; and Synchronization with well-known Calendars and social media.

The planning system can be implemented using a computer readable storage medium for presenting a the planning system, including user, vendor and/or team timelines based on information received users, advisors, vendor, etc. The computer readable storage medium can include instructions that if executed enables a computing system to implement the methods and actions of the planning system.

One or more embodiments may include generating a visual presentation which is functional to visually organize and present a plurality of activities of a user, to display at least one subordinate aspect of the plurality of activities, and to link at least one of a plurality of vendors of goods, services, or both goods and services for supporting at least one of the plurality of activities. The presentation generation includes the steps of: providing a data processor having a visual output, a human-machine interface, and an internet connection; providing management programming loaded into the data processor; displaying on the visual output a timeline comprising at least one element representing at least one timeline pertaining to the activity, the at least one timeline comprising a time interval with at least one timeline event disposed along the at least one timeline, wherein each at least one timeline event represents the at least one subordinate aspect pertaining to the activity and a location of the at least one timeline event along the respective timeline represents a time when the subordinate aspect of the at least one timeline event is to be addressed by the user; displaying on the visual output at least one advisor, wherein the at least one advisor displays an offer of at least one of a publicly available good or a publicly available service pertaining to the at least one subordinate aspect of the activity for the at least one timeline event, wherein the advisor contains data corresponding to advertising content; receiving input to link the at least one advisor to the timeline that pertains to the at least one subordinate aspect of the activity; creating the link between the at least one advisor and the at least one timeline; and displaying the at least one timeline, the at least one timeline event, and the at least one advisor offer simultaneously on the visual output.

One or more embodiments may include the timeline events having a plurality of timeline event icons, and the advisor includes an advisory icon.

One or more embodiments may include the further step of displaying on the visual output a plurality of timelines each pertaining to subject matter different from that of every other timeline.

One or more embodiments may include the step of displaying on the visual output of the data processor comprises the further step of displaying and concealing an at least one of the timelines and the advisor by user manipulation of the human-machine-interface.

One or more embodiments may include the step of displaying the at least one timeline and a plurality of subject matter selection icons on each of the at least one timeline, wherein each of the plurality of subject matter selection icons represent a different timeline of the at least one timeline, and the step of displaying on the visual output of the data processor comprises the further step of selectively activating and canceling the at least one timeline by clicking on a predetermined symbol displayed on the display screen.

One or more embodiments may include the step of selectively activating and canceling a timeline comprises the further step of displaying at least two of the timelines simultaneously.

One or more embodiments may include the step of removing a generated advisory icon from display on the visual output by manipulation of the human-machine-interface.

One or more embodiments may include the step of providing management programming loaded into the data processor comprises the further step of dedicating one timeline to activities pertaining to one of the work of the user of the method, the residence of the user of the method, at least one motor vehicle used by the user, at least one child of the user, a pregnancy in the social circle of the user, and a wedding.

One or more embodiments may include a system for a user-vendor interface between a user and a vendor. The system includes a memory; and a processor coupled to the memory, the processor being configured to: receive input from a team lead vendor for a team timeline for a team; create the team timeline for the team; display the team timeline for the team; receive input from the team lead vendor for starting the team with at least one team member; create the team with the at least one team member; display the team with the at least one team member; receive input from the at least one team member for a team member event; create the team member event in the team timeline; display the team member event in the team timeline; receive input from the team lead vendor to publish the team timeline for access by a timeline user; create the published team timeline for access by the timeline user; and display the published team timeline and permit access by the timeline user, wherein the user-vendor interface serves as a virtual middle layer allowing users to interface with a plurality of vendors using the same user-vendor interface.

One or more embodiments may include a system wherein the processor further configured to: receive input from the timeline user to subscribe to the published team timeline; create the team member event in a timeline for the timeline user; and display the team member event in a timeline for the timeline user.

One or more embodiments may include a system wherein the processor further configured to: receive input from the team lead vendor to search for the at least one team member; receive input from the team lead vendor to send an invitation for the at least one team member; create at least one invitation for the at least one team member; and display the at least one invitation for the at least one team member.

One or more embodiments may include a system wherein the processor further configured to: receive input from a single vendor for a single vendor timeline; create the single vendor timeline; and display the single vendor timeline.

One or more embodiments may include a system wherein the processor further configured to: receive input from the team lead vendor for a team lead vendor event for the team timeline; create the team lead vendor event in the team timeline; and display the team lead vendor event in the team timeline.

One or more embodiments may include a system wherein the at least one team member comprises a plurality of team members, the team member event comprises a plurality of team member events for each of the team members, and the team timeline comprises a single timeline for the team.

One or more embodiments may include a system wherein the processor is further configured to: receive input from the at least one team member for accepting the invitation from the team lead vendor to allow the at least one team member to access the team timeline; create access to the team timeline for the at least one team member; and display access to the team timeline for the at least one team member.

One or more embodiments may include a system wherein the at least one team member is a vendor.

One or more embodiments may include a system wherein the processor is further configured to: receive input from the at least one team member for one or more of adding, deleting and updating the team member event on the team timeline; and implement the one or more addition, deletion and update to the team member event on the team timeline.

One or more embodiments may include a system wherein the published team timeline is republished and the published timeline continues to exist as a historical published team timeline.

One or more embodiments may include a system wherein the processor is further configured to: receive user input from the timeline user to at least one of subscribe and unsubscribe to one or more of the team timeline and a single vendor with a single vendor timeline; and implement the at least one of the subscription and unsubscription to the one or more of the team timeline and the single vendor timeline for the timeline user, wherein the team timelines, when unsubscribed, are retained as historical timelines for use in uniform historical comparisons.

One or more embodiments may include a system wherein the processor is further configured to: receive input from the team lead vendor to one or more of delete and change the team member event; create the one or more deletion and change to the team member event in the team timeline; and display the one or more deletion and change to the team member event in the team timeline.

One or more embodiments may include a system wherein the team member event comprises one or more of a coupon and advertisement.

One or more embodiments may include a system wherein the processor is further configured to: receive input from the timeline user to create the user timeline; create the user timeline; display the user timeline; receive input from the timeline user to browse one or more of the team timeline from one or more of the team lead vendor and the single vendor to subscribe to one or more of the team timeline; create a subscription to the one or more of the one or more team vendor timelines and the single vendor timeline for the timeline user, wherein the subscription directs the team member event to one or more of: a) a main timeline of the user timeline, and b) at least one sub-timeline of the user timeline; and display a subscription to the one or more of the one or more team vendor timelines and the single vendor timeline for the timeline user, wherein the subscription directs the team member event to one or more of: a) a main timeline of the user timeline, and b) at least one sub-timeline of the user timeline.

One or more embodiments may include a system wherein each of the user, single vendor and team vendor timelines are updated and an original timeline is maintained as a historical timeline for comparison.

One or more embodiments may include a system wherein the team lead vendor includes one or more of a teacher, doctor, company, advisory and vendor; and the timeline user includes one of a parent, patient, consumer, company, advisor and vendor.

One or more embodiments may include a system wherein the processor is further configured to: receive input from at least one timeline user for creating a main timeline; create the main timeline; and display the main timeline.

One or more embodiments may include a system wherein the processor is further configured to: receive input from at least one timeline user to create at least one sub-timeline, wherein each of the at least one sub-timeline has a unique category; create the at least one sub-timeline with the unique category; and display the at least one sub-timeline with the unique category, wherein the at least one sub-timeline is one of: shared with and copied to another timeline user.

One or more embodiments may include a system wherein the processor is further configured to: receive input from the at least one timeline user to create a timeline user event; create the timeline user event on the main timeline; display the timeline user event on the main timeline; receive input from the at least one timeline user to create the timeline user event in one or more of the at least one sub-timeline; create the timeline user event in one or more of the at least one sub-timelines; and display the timeline user event in one or more of the at least one sub-timelines.

One or more embodiments may include a system wherein the processor is further configured to: receive input from at least one of the team lead vendor, the team member, and the single vendor for a seeded timeline event including at least one of a one-time event, a recurring event, and a flexible event; create the seeded timeline event on one or more of the team timeline and the single vendor timeline; and display the seeded timeline event on one or more of the team timeline and the single vendor timeline.

One or more embodiments may include a system wherein the processor is further configured to: receive input from one or more of: the team lead vendor, the single vendor and the user timeline for sharing one or more of the team timeline, the single vendor timeline, and the user timeline; create one or more of: the shared team timeline, the shared single vendor timeline, and the shared user timeline; and display one or more shared team timeline, shared single vendor timeline, and shared user timeline.

One or more embodiments may include a system wherein one or more of: the team timeline and the single vendor timeline includes a plurality of events, and one or more of the team lead vendor and the single vendor designates an event as a pop-up event.

One or more embodiments may include a system wherein the timeline user subscribes to one or more single and team lead vendor, and the pop-up event is filtered to accept only a pop-up event from the subscribed-to vendors.

One or more embodiments may include a system wherein the pop-up event is filtered based upon key words by the timeline user.

One or more embodiments may include a system wherein the processor is further configured to: receive input regarding auto-populating an event; create the auto-populated event in one or more of the team vendor timeline and the single vendor timeline; display the auto-populated event in one or more of the team vendor timeline and the single vendor timeline; receive input from the timeline user to subscribe to one of the team vendor timeline and the single vendor timeline; and create the subscription.

One or more embodiments may include a system wherein the processor is further configured to: receive input from one or more of the single vendor and the team lead vendor selecting one or more of a category and a sub-category relating to a vendor business; create the one or more category and sub-category; display the one or more category and sub-category; receive input from the ad-creator vendor for creating an advertisement by selecting a media file based on the one or more category and sub-category for a target vendor wherein the target vendor is one or more of the single vendor and the team lead vendor; create the advertisement for delivery to one or more of the: category and sub-category of the target vendor; and display the advertisement for delivery to one or more of the: category and sub-category of the target vendor.

One or more embodiments may include a system for a user-vendor interface between a user and a vendor, the system including a memory; and a processor coupled to the memory, the processor being configured to: receive an event from a timeline user for a main timeline; create the event from the timeline user in the main timeline; display the event from the timeline user in the main timeline; receive a categorized event from a timeline user for a sub-timeline; create the categorized event from the timeline user in the sub-timeline; display the categorized event from the timeline user in the sub-timeline; receive a vendor event from a vendor for a vendor timeline; create the vendor event from the vendor in the vendor timeline; display the vendor event from the vendor in the vendor timeline; allow the timeline user to have access to the vendor timeline; allow the timeline user to subscribe to the vendor timeline; and display at least one of the main timeline, the sub-timeline and the subscribed-to vendor timeline, wherein the user-vendor interface serves as a virtual middle layer allowing users to interface with a plurality of vendors using the same user-vendor interface.

One or more embodiments may include a system wherein the vendor includes one or more of a single vendor, a team-lead vendor and the timeline user.

One or more embodiments may include a system wherein the processor is further configured to: create a plurality of sub-timelines each of which correspond to one of a plurality of unique categorizations, wherein each of the plurality of unique categorizations are different; display a plurality of sub-timelines each of which correspond to one of a plurality of unique categorizations, wherein each of the plurality of unique categorizations are different; receive a plurality of categorized events, wherein each of the plurality of categorized events correspond to one of the plurality of unique categorizations; create each of the plurality of categorized events in one of the plurality of the sub-timeline, wherein each of the plurality of categorized events relate to one of the plurality of unique categorizations; and display each of the plurality of categorized events in the one of the plurality of sub-timelines.

One or more embodiments may include a system wherein each of the plurality of sub-timelines is an additional timeline created for one of a plurality of categories of life, wherein each of the plurality of categories of life comprises one or more of: sports, work, school, family business, departments, goods, and serves.

One or more embodiments may include a system wherein the event and the vendor event contain information comprising one or more of: title, date, type, media, and sub-timeline.

One or more embodiments may include a system wherein the event and the vendor event comprise one or more of: a life event, a coupon, an advertisement, and advice.

One or more embodiments may include a system wherein the processor is further configured to: receive third-party calendar information from a third-party; create a third-party event in one or more of: the user main timeline, user sub-timeline, and the vendor timeline; and display a third-party event in one or more of: the user main timeline, user sub-timeline, and the vendor timeline.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein:

FIG. 2 shows a representative screen display similar to FIG. 1, but showing additional timelines.

FIG. 10A depicts an exemplary interface which may be used by vendors and team vendors.
FIG. 10DD depicts an exemplary interface which may be used by vendors and team vendors.

FIG. 10II depicts an exemplary interface which may be used by vendors and team vendors.

FIG. 10JJ depicts an exemplary interface which may be used by vendors and team vendors.

FIG. 10O depicts an exemplary interface which may be used by timeline users.

FIG. 10Q depicts an exemplary interface which may be used by timeline users.

FIG. 10R depicts an exemplary interface which may be used by timeline users.

FIG. 11BB depicts an exemplary interface using the planning system in the teacher and parent relationship.

FIG. 11CC depicts an exemplary interface using the planning system in the teacher and parent relationship.

FIG. 11EE depicts an exemplary interface using the planning system in the teacher and parent relationship.

FIG. 11F depicts an exemplary interface using the planning system in the teacher and parent relationship.

FIG. 11G depicts an exemplary interface using the planning system in the teacher and parent relationship.

FIG. 11I depicts an exemplary interface using the planning system in the teacher and parent relationship.

FIG. 11O depicts an exemplary interface using the planning system in the teacher and parent relationship.

FIG. 12D depicts exemplary user timelines in accordance with the principles of the invention.

FIG. 15C depicts an exemplary user interface for sharing.

FIG. 16E depicts an exemplary user interface for an offer purchase.

FIG. 16F depicts an exemplary user interface for an offer purchase.

FIG. 17CC is an embodiment for illustration of planning system.

DETAILED DESCRIPTION

Figure 1:
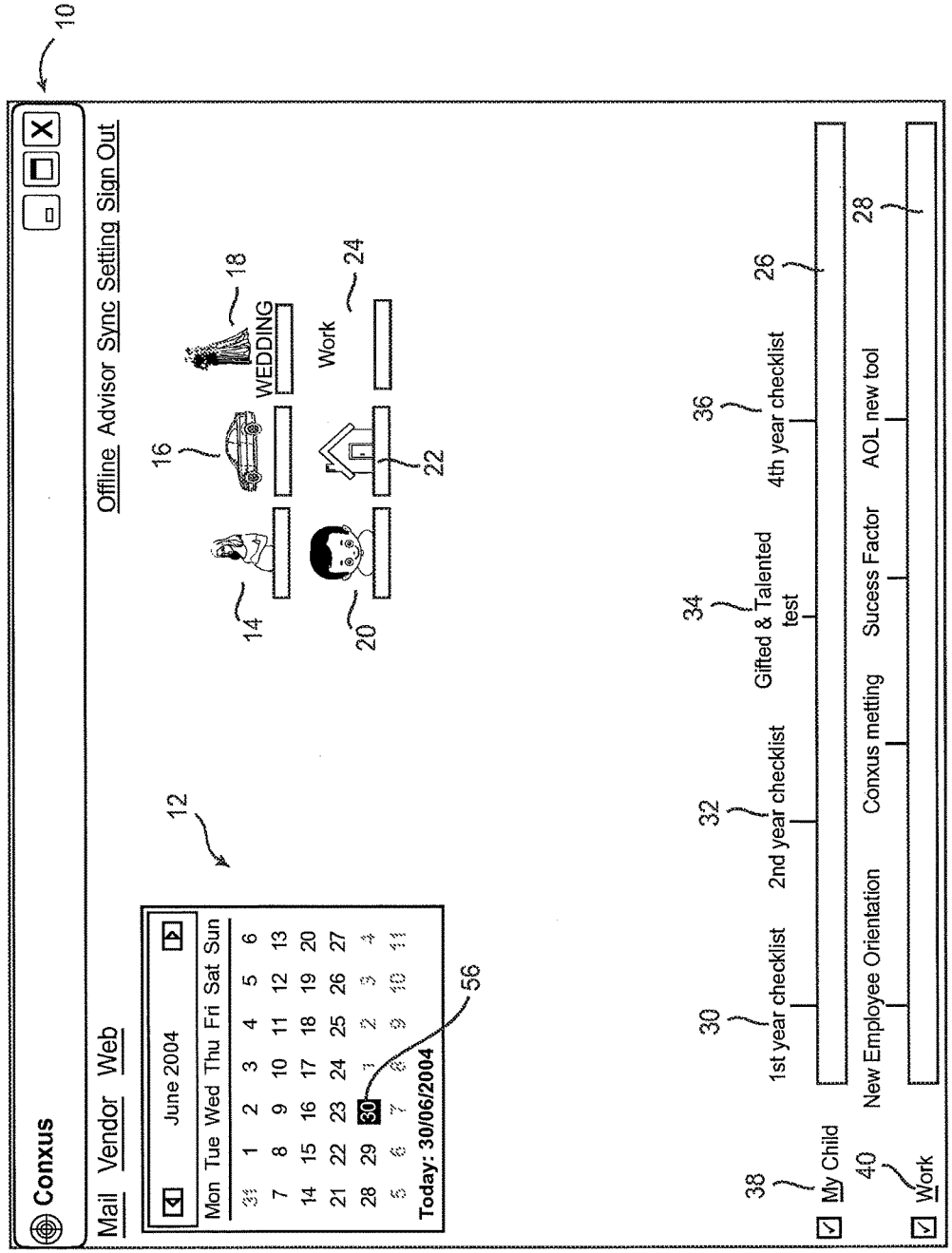
FIG. 1 shows a representative screen display depicting planned events or activities arranged along timelines, in addition to other features.

The systems and methods described herein are directed toward a web-based social planning system to assist various user types to better organize their lives and/or businesses. Users are faced with a multitude of options in managing schedules, from the rudimentary post-it note to the smart phone reminder. Some web-based services exist with features that digitize the process of keeping track of life events and tasks, however, there still exists a need for a synchronized planning system. In accordance with the principles of the invention as described herein and variations thereof, the systems and methods are directed toward a scheduling and organizing context that can be utilized among consumers, enterprises, and vendor markets.

The systems and methods are directed toward an online planning tool and social planning system that efficiently merges the many accounts where users store important information, including calendar information. By utilizing organized parallel timelines to manage different functions and aspects of a user's life, such as school, work, and family, the systems and methods associated with the planning system deliver multiple timelines dedicated to those aspects and/or life categories. The complimentary social component allows users to connect with friends, teachers, and colleagues through those timelines. This focus allows the systems and methods associated with the planning system to be attractive to businesses and vendors that need to communicate with customers and prospects about upcoming events and/or promotions, and provide common ground for this communication to take place. It is contemplated that the systems and methods can be utilized in a product for both web and mobile application formats.

The systems and methods are contemplated for use to plan and organized events such as celebrations, medical, educational, vacations, etc. The systems and methods can also be implemented for use in enterprises for project management, asset management, and/or firmware patch management. Additionally, health care management, event management in government contracting (e.g., Requests for Proposals (RFP), Requests for Information (RFI), and government contracting teaming management (Prime-contractor/Sub-contractor) are contemplated for use the systems and methods described herein. The systems and methods may also be used with vendors, whether receiving formal payment or not. The systems and methods may be utilized to allow vendors to serve as advisors for consumer queries, for example, a woman searches for a pregnancy advisor and subscribes to one on the planning system described herein, then receives advice as well as specific advertisements that makes sense for her particular needs. Additionally, in this vendor aspect of the systems and methods described herein, the planning system allows vendors, as a single vendor and/or as a vendor group, which preferably is represented by a team lead vendor, to provide, for example, coupons in the form of pulled advertisements. Pulled advertisements may include, for example, a user choosing his/her own ads category. These features and functionalities of the systems and methods may create benefits including customer loyalty.

The systems and methods in accordance with the principles of the invention allows users to: consolidate everything important to the user's life; share timelines or set their timelines as private; include both future events as well as past events; track businesses' and/or individuals' own internal schedules; marry data from different sites, for example, an e-vite response to a birthday and a flight confirmation for a vacation will all populate in the planning system systems and methods; provide simple subscription features; follow the timelines of people and companies; search functionality; search by vendor, school, person, etc.; attach pictures and other media or documents to the timeline and accessed by users; subscribe to another's timeline; add a person or vendor to an existing timeline, or can create a new timeline; internally schedule within a business, particularly useful for project management; plan events or promotions that pertain to multiple people; post coupons and other promotions to their timeline which users can follow; subscribe to school events such as children's talent shows, field trips, or parent-teacher conferences; and/or have a mobile application that provides convenience for on-the-go scheduling; and/or utilize a sidebar app that allows the systems and methods associated with the planning system to synchronize with GOOGLE calendar, for example.

The systems and methods further implement a teaming methodology that connects vendors and consumers. These systems and methods involve creating opportunities for strategic alliances to occur to add value for vendors as well as consumers. For example, airline, rental car, and hotel companies partner through sites such as TRAVELOCITY. But TRAVELOCITY requires a high-degree of maintenance, web hosting, and support to efficiently manage those three types of vendors and cannot integrate. On TRAVELOCITY, for example, if one of those businesses decides that it wants to create a new promotion with another business (for example, buy an airline ticket and receive 50% off Persian rugs from an importer), TRAVELOCITY, for example, can't accommodate that promotion.

In accordance with the systems and methods of the inventive planning system, dynamic teaming is created by utilizing a single sign-on within the same planning system and/or graphical user interface (GUI). In accordance with the principles of systems and methods described herein, businesses can provide savings for seasonal businesses looking to take advantage of visibility through new alliances or teams. For example, vendor promotions can include an ice cream discount with swimming pool passes in the summer, or oil change discounts with tire coupons in the winter. The systems and methods allow vendors to team. In particular, the vendors are not required to create a separate static website to manage promotions and, instead, in accordance with the principles of the invention, promotional teaming functions can be performed by using the systems and methods associated with the planning system to create, build, and organize teams of different vendors. In certain aspects of the systems and methods, the teams of vendors can appear as a single vendor through the use of the team lead vendor feature.

As described herein, the systems and methods have applicability across various aspects of life including enterprises, vendors, schools, and consumers. Some relationship segments may include, for example, mother-child including, for example, targeting pregnant women, parent-student-school, for example, can target private schools, and student-college, for example, can target school alumni groups.

In certain implementations, the present invention is a system or method of generating a visual presentation which is functional to visually organize and present in graphic form planned future activities of a user of the system or method, arranged along a timeline. In this particular implementation, every asset and/or every aspect of life may have a timeline. Examples of these assets and/or aspects may include a child, a car, a home, a printer, a server, a sport, a wedding, health, or an organ. The system can also store future, current and/or past events of the user. The system or method may display subordinate aspects of the planned activities, and may identify vendors of goods, services, or both goods and services for supporting the planned future activities. The invention may be thought of both as a method, which comprises steps to be described hereinafter, or alternatively as a system, which comprises a physical apparatus and associated peripherals, and programming capable of implementing the steps of the method. The physical apparatus may comprise for example a data processor such as a personal computer, a visual output such as a display screen or computer monitor, a human-machine-interface (ex. mobile device), and conventional connection apparatus for communicating to the internet. The human-machine-interface may comprise a keyboard, a computer mouse, a joystick, integrated or separate touchscreen, any other physically manipulated device for entering commands into the processor, or any combination of these. As the physical apparatus of the system may be conventional in physical form and in function, apart from programming which implements the steps of the method, the physical apparatus need not be described in detail.

The invention is best explained with reference to images which may appear on the visual output element of the processor, such as a monitor or other display screen. It will be understood that succeeding images or screens may be navigated in conventional fashion.

The term advisor and/or system advisor can be used to describe a layer between the consumer and the vendor, which also can be referred to as a user-vendor interface. An advisor can include a vendor. The planning system as implemented in various aspects can serve as a layer between a user and a vendor. For example, the planning system can serve as a layer between the vendor and the consumer. In the implementation of an advisor concept, the word "vendor" can also be used because it may be more understandable to the public. However, for purposes of the planning system, an advisor can be referred to as a vendor where the vendor receives a fee that can be zero or a number. As such, under certain circumstances, if the fee is zero, that provider could be considered an advisor, but if the fee is more than zero, it can be considered a vendor. However, for purposes of the planning system, advisor and vendor can be used interchangeably and the planning system contemplates systems and methods that can either be for a fee or not for a fee.

The planning systems and methods are providing an abstract layer between a timeline user (e.g., a consumer) and a vendor. This can also be referred to as a virtual layer. This layer can also be referred to as an advisor. Accordingly, the words "vendor" and "advisor" may be used interchangeably for purposes of the planning system and should in no way be limiting. Therefore, an advisor can be an abstract layer that sits between a consumer and a vendor. For example, the consumer no longer buys goods directly from MACY'S, instead the consumer buys goods from a virtual MACY'S vendor within the planning system that is representing the actual MACY'S.

As described herein, various events and event types may be used. A vendor timeline can have different types of events. They can be a one-time event or a fixed-date event. They can be re-occurring events. Seeded events that are dependent events or flexible events can get seeded by consumer customized parameters. The vendor may ask users to enter some additional data when timeline users want to subscribe to events, such as birthdate, wedding date, baby delivery date. Vendors' entries can come from a variety of sources. Three (3) sources include vendors entering their own entries, such as events and coupons into their vendor timeline, vendors that have entries auto-populated by an auto-populate functionality, and/or vendors that provide two-way API for the planning system to communicate with them, such as FACEBOOK, through a customized populate module.

Users may unsubscribe in various ways. Some examples include a timeline user clicking on "My Vendor" and choosing the vendor it wants to unsubscribe. A pop-up will ask the user under what conditions do they want to unsubscribe. Some conditions can include deleting all past events and terminating receiving any future events from the vendor timeline. This can be referred to as "delete past and no future feed". Another condition may be that the timeline user does not want to receive any new events from the vendor timeline. This can be referred to as "keep past but no future feed".

Timeline sharing can be implemented in various ways. The timeline user can share information with others by sharing its sub-timeline. For example, the vendors or the order of events that the user timeline used during her wedding can be shared with another friend by sharing the sub-timeline. The timeline user could allow a subordinate user, such as an underage child, who gets separated from the parent's oversight, that grown-up child can start his or her own timeline outside the parent's supervision. For example, a mother may manage the child's sub-timeline, but when the child grows up this feature allows the timeline to split to another single entity.

Various vendor types are contemplated. These may include both single vendors and/or team-lead vendors. A single vendor is associated with one vendor. The single vendor may choose to be or not to be a team member of a team. The Team-lead vendor is associated with multiple vendors who teamed up. It will be seamless to the timeline user. This means that the user can subscribe to a team vendor in the same way as a single vendor. The user won't be aware of the existence of the multiple vendors that team up together "behind the scenes". The use of the term "vendor" can apply to both a single vendor and/or a team vendor. From the timeline user's perspective, a single vendor or a team vendor is the same because it is seamless to a user. The timeline user does not know that a vendor is a team vendor who has one or more vendors behind it. The vendors also have a vendor-user timeline.

The systems and methods contemplate various criteria for suggesting advisors. The systems and methods may suggest advisors and/or vendors to the user based upon user's chosen event types, keywords used in the user event title and description, the user's previous purchases, the advisor's or vendor's rank decided by users, the advisor's or vendor's purchases, the most-purchased offers by other users, and/or special offers/advisors/vendors suggested by the admin.

In accordance with the systems and methods, an intelligent event-type suggestion is provided. The system intelligently suggests standard event types if the user did not choose the event type. To do so, it can possibly use the following techniques: 1) suggest event types by using keywords that are found in the title or description of the event; 2) suggest event types by analyzing user's previous purchases; 3) suggest event types by analyzing the event types that user has previously chosen; and/or 4) if the system could not find a way to suggest an event type, it can occur to the user to explicitly choose an event type for getting better results from the planning system.

Criteria for suggesting advisors is also contemplated. The system can suggest to the users based on the following: 1) user's chosen event types; 2) keywords used in user event title and description; and/or 3) user's previous purchases.

In accordance with the principles of the invention, consumers can share advice or a portion of their timeline with other consumers as knowledge sharing. Vendors can have a central place for their offering timeline in different trades and track historical coupons and compare it with other vendors. Vendors can team up dynamically and create a joint-venture timeline with joint coupons. The framework is a one-stop shop. Users and consumers can plan and track life events in one main timeline. Users and consumers have the ability to group events into different timeline categories. Synchronization is offered with well-known calendars. Vendors may offer advice and/or coupons and a vendor timeline and classify themselves as an advisor in a service or trade.

Consumers can subscribe to an advisor timeline in one stage of life and unsubscribe from an advisor in another stage of life. As such, the systems and methods are a one-stop shop for subscription and subscriptions to vendors are ones that the user chooses based upon interest, religion, belief. The systems and methods also provide for auto-populating or a mail-grabber. Mail-grabber or auto-populate uses vendors' advertising e-mails to match registered vendors and the planning system. With the e-mails that the mail-grabbers or auto-populate algorithm send to users, after matching e-mails, the system will create one event for each e-mail and put it in the vendor timeline automatically. Also the planning system will publish the vendor timeline automatically so all subscribers will see the new event in their main timeline or sub-timeline. The three (3) types of vendors include a vendor that creates its own event in the planning system, a vendor for which its coupons appear in the planning system with the auto-populate module, and a vendor that provides a RSS feed or an API to bring their offerings/events to the planning system.

Referring first to FIG. 1, there is shown a screen 10 which is representative of screens which may be used to implement the methods and systems described herein. It should be understood that the screen 10 and other screens illustrated herein provide examples for purposes of explaining the invention, and should not be construed in a limiting sense. The screen 10 may depict a representation of a one month calendar 12, any number of subject matter selection icons such as the six selection icons 14, 16, 18, 20, 22, 24, and at least one timeline such as the two timelines 26, 28. The subject matter selection icons each represent a different timeline.

Each timeline 26 or 28 is in the form of a serial visual element such as a horizontal bar. Other visual representations are contemplated including, vertical. Each timeline 26, 28 pertain to one aspect of the life of the user, the subject matter of each being different from that of every other timeline. In the examples presented herein, the timeline 26 is directed to a child of the user; the timeline 28 is directed to the work or job of the user; a timeline 42 is directed to the house or other residence or property of the user; a timeline 44 is related to a pregnancy of a member of the social circle of the user; a timeline 46 is related to an automobile or other motor vehicle of the user; and a timeline 48 is related to a social occasion to be undertaken within the social circle of the user, and more specifically, a wedding of a member of the social circle of the user. In most cases, the social circle of the user will be a family member, but may of course be friends and other associates of the user.

Legends 30, 32, 34, 36 may appear proximate the bar of a timeline such as the timeline 26. These legends 30, 32, 34, 36 may be connected to their associated bar with location along the timeline 26 being in serial relation to indicate the order in which the subject matter is to be addressed. Alternatively stated, location of the timeline icon along the timeline represents a point in time when a specific subordinate activity or aspect of the general activity or aspect of life represented by that particular timeline is to be addressed by the person using the screen 10 and associated method of generating a visual presentation. Location of events called out by legends 30, 32, 34, 36 may be arbitrarily spaced apart along the timeline 26, such as evenly spaced apart, or alternatively may be spaced apart in a manner reflecting proportionality of magnitude of time intervals intended to occur between events called out by the legends 30, 32, 34, 36.

Regardless of the selected form, legends or other graphical device provide a plurality of timeline icons disposed along the timeline display, wherein each timeline icon, such as the timeline icons 30, 32, 34, 36, represents a subordinate aspect pertaining to the planned future activity. In the example of the timeline 26, the planned future activity is those activities which pertain to a child, this being indicated by the legend or indicia 38. Similarly, the legend 40 indicates that the second timeline 28 actively being displayed is that pertaining to the work or vocation of the user.

In the screen 10, two timelines 26, 28 are active, or are being displayed. Other timelines (not shown) may be stored in memory and may be summoned by invoking appropriate ones of the selection icons 14, 16, 18, 20, 22, 24. Any number of timelines may be made active at the user's discretion. Timelines such as the timelines 26, 28 may be activated or deactivated by for example clicking on the appropriate selection icon 14, 16, 18, 20, 22, or 24 using a computer mouse associated with the processor.

Figure 2:
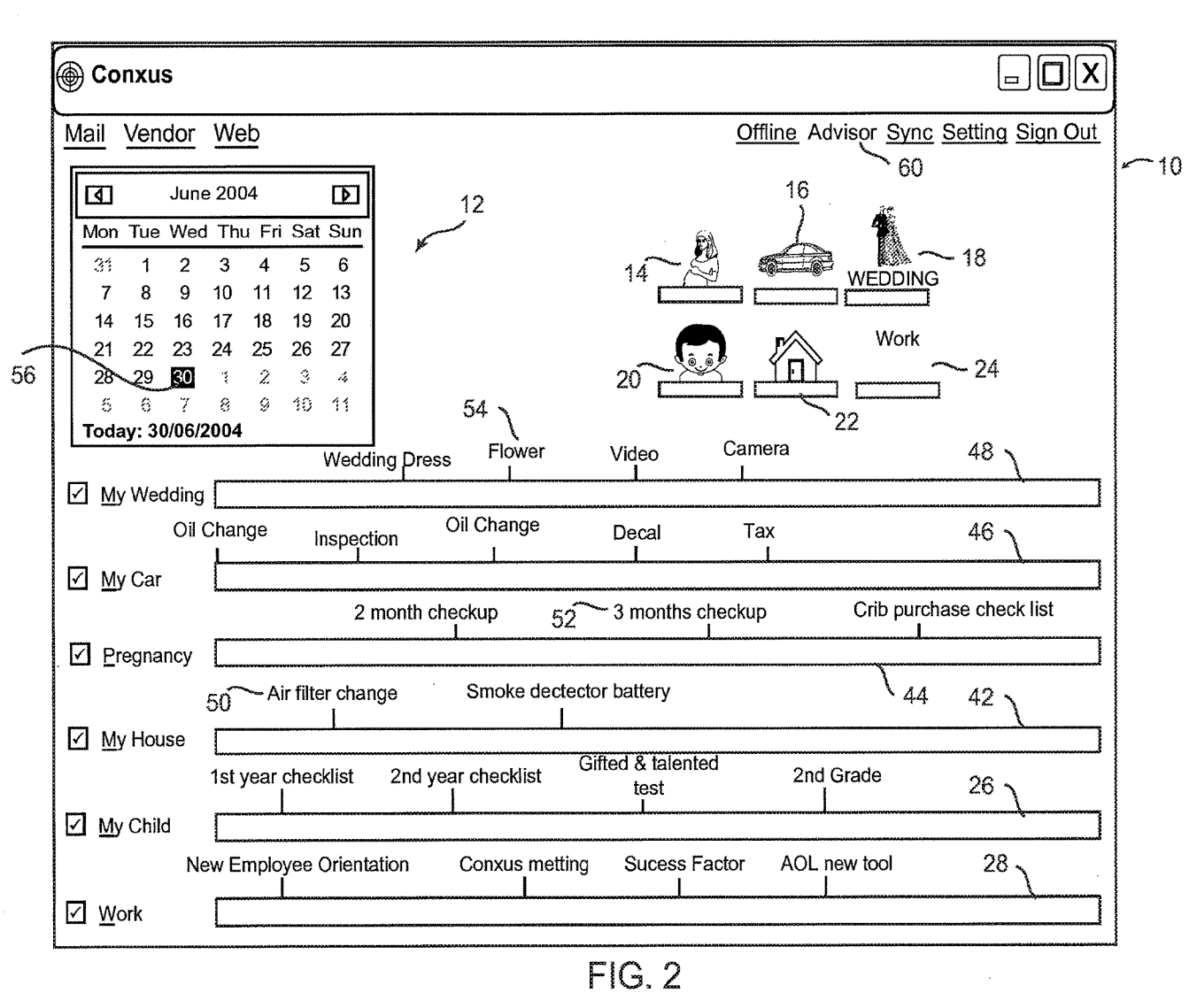

FIG. 2 shows a new screen 41 in which additional timelines 42, 44, 46, 48 being active in addition to the timelines 26, 28 of the screen 10 of FIG. 1. The additional timelines 42, 44, 46, 48 each have respective timeline icons such as the timeline icons 50, 52, 54, to name but a representative few. The management programming which administers the novel method or system is functional to selectively display and conceal or cancel any of the timelines by user manipulation of the human-machine-interface, such as by clicking on a predetermined symbol, such as the selection icons 14, 16, 18, 20, 22, 24 displayed on the display screen using a computer mouse. Control of the number of timelines displayed, such as the timelines 26, 28, 42, 44, 46, 48, is therefore in the hands of the user. Fewer active timelines, such as seen in FIG. 1, will reduce visual clutter of the screen 10. More active timelines, displayed simultaneously, such as seen in FIG. 2, will maximize the number of aspects of life to be planned. This latter feature may be useful for example in identifying potential scheduling or other conflicts.

The calendar 12 may display the current month or may be linked to a selected date to show the full month for a month other than the current month. The current day may be highlighted or otherwise emphasized, as exemplified by the solid background 56.

Figure 3:
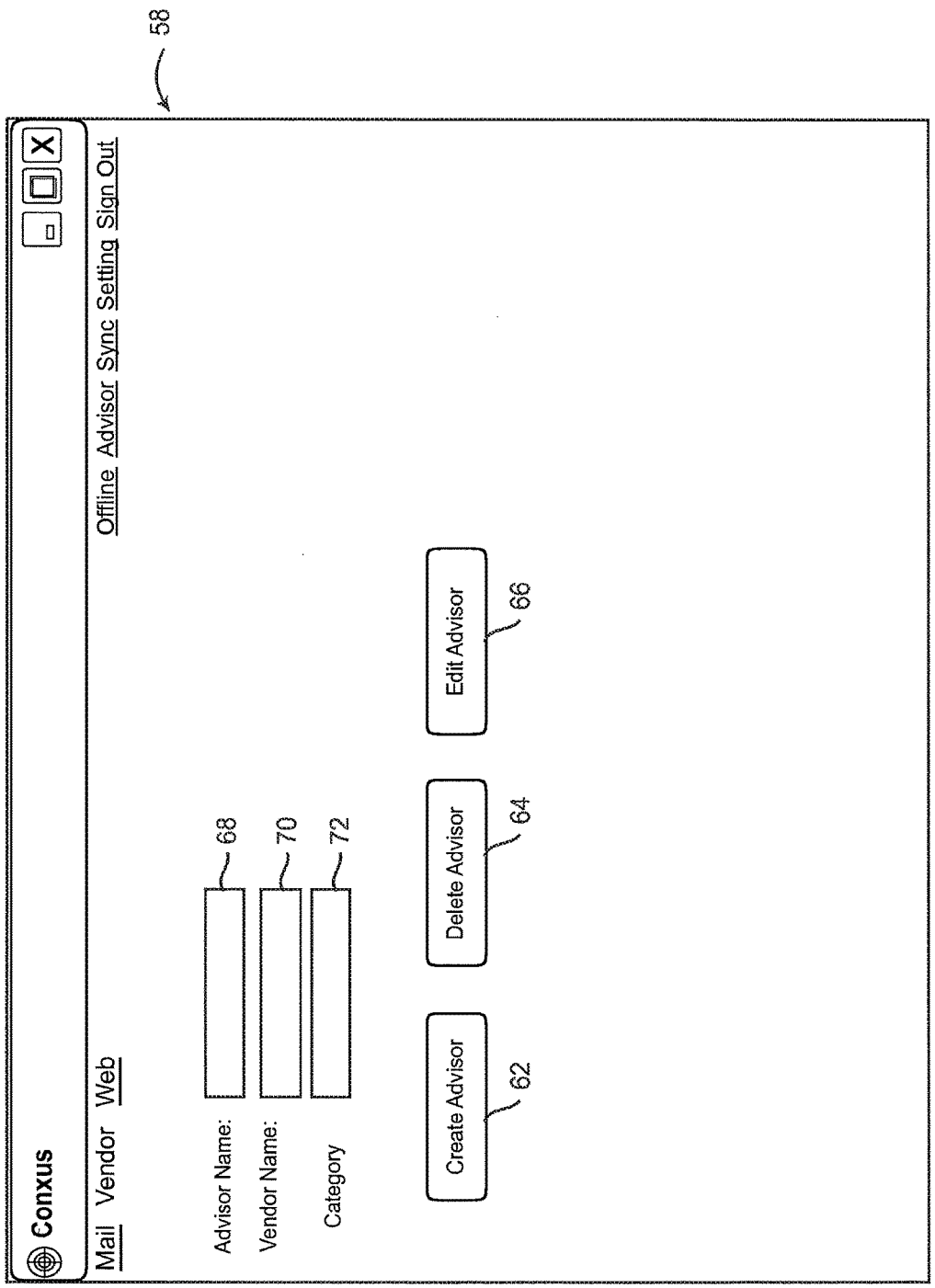
FIG. 3 shows a representative screen display depicting commands which may be used to categorize on-line advertisers and to generate content displays based on advertising content.

Turning now to FIG. 3, the novel system contemplates provision of at least one advisory icon. A new screen 58 has been generated for example by clicking on the "Advisor" icon 60 of FIG. 2. With calendar 12, selection icons 14, 16, 18, 20, 22, 24, and timelines 26, 28, 42, 44, 46, 48 omitted for visual clarity, the screen 58 shows a command icon 62 for creating an advisory icon, a command icon 64 for deleting an advisory icon, and a command icon 66 for editing a created advisory icon. Fillable spaces 68, 70, 72 are provided respectively, for entering the identity of a commercial vendor of goods or services or both, the actual name of the vendor, and which category or identity will be used with this vendor. Vendors are selected from among those who are pre-approved by a host provider (or not) and provide information from a web source, and who commercially offer goods or services to the general public. In conducting general internet searching, the user may limit vendors to those offering goods and services which pertain to the subordinate aspect of the planned future activity. The resulting advisory icon contains data corresponding to advertising content, which is transmitted over the internet from the web source. Any number of advisory icons may be generated in this manner. Advisory icons may be linked to the subject matter of any selected timeline, such as the timeline 26.

Figure 4:
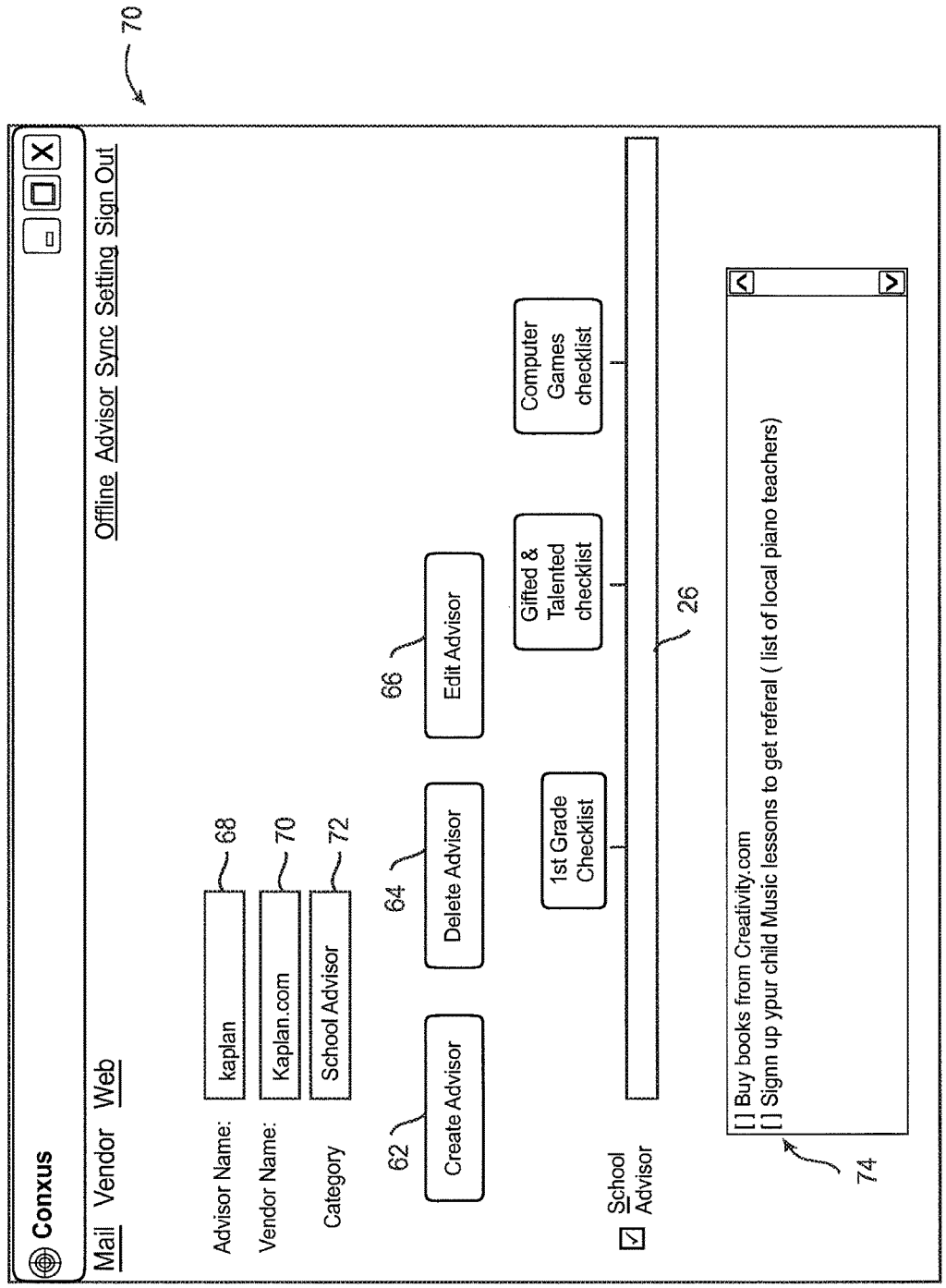
FIG. 4 shows a representative screen display depicting elements of FIG. 3, but including additional display options.

FIG. 4 shows a screen 70 generally corresponding to the screen 58 of FIG. 3, but differing in that it is also populated by the timeline 26, pertaining to a child. It will be seen that the user has entered into the fillable space 68 a vendor known as "kaplan", the formal name used on the internet by this vendor being "Kaplan.com", entered into the fillable space 70, and a category of "school advisor" having been entered into the fillable space 72. An advertiser can cooperate with other advertisers to cross brand each other's goods. For example, Kaplan.com could provide information for a related vendor such as Creativity.com and vice versa.

Below the timeline 26 appears two legends 74 which offer the user goods, services, and proposed events or items. These goods and services are offered by the vendor Kaplan.com. The legends 74 are automatically generated when that vendor is summoned using an advisory icon which has been generated using the command icon 62. The management programming of the novel method and system is functional to display at least one of the advisory icons by clicking on a predetermined symbol displayed on the display screen, such as the advisor icon 60 (see FIG. 2) using the computer mouse.

Part of the process of generating the legends 74, which may be regarded as an advisory icon, is a screening process in which the management programming which has been entered into the processor to administer the novel method is functional to apply predetermined acceptance criteria to the advisory icons. Predetermined acceptance criteria may include determination of geographic proximity of vendors to the premises to be used by the user in engaging in a planned future activity and other qualifications which may be selected by the user or provided by the management programming or both. Other criteria may include cost and price considerations, delivery or lead time for goods and services, and the nature of specialized products, to name but a few. The concept of the advisory icon tailors vendors to the personal situation of the user of the novel system.

The preceding disclosure can be visualized by the advisor linking the user with the appropriate vendor, USER→ADVISOR/PLANNING SYSTEM VENDOR←VENDOR. For example, the USER can be a consumer, the ADVISOR/PLANNING SYSTEM VENDOR can be the virtual middle layer, and the VENDOR is an actual vendor or the auto-populate functionality. The virtual layer between a user and a vendor can be referred to as an advisor or a planning system vendor. The advisor can be a planning system vendor or user. The vendors utilized and referred to in the planning system are not actual vendors. They are virtual vendors that the planning system is presenting. It also contemplated that additional modes of information transfer can be achieved between the parties other than that shown above, for example a vendor may receive usable information from the user as the user completes its timeline.

Potential vendors who fail to meet the acceptance criteria are inhibited from participation in the advisory icons. This elimination of many potential vendors results in qualification of a pool of potential vendors who meet criteria desirable to the user; thereby improving the search experience of the user.

It will be seen from FIG. 4 that the timeline display, the timeline icons, and the advisory icon are all displayed simultaneously on the screen 70 or other visual output.

The management programming which administers the novel method and system is functional to generate, display, delete, and conceal any of the advisory icons by user manipulation of the human-machine-interface.

The invention may be thought of as a method of generating subject matter such as the content of the screens shown in FIGS. 1-7. The method may comprise a step of providing a data processor having a visual output, a human-machine interface, and an internet connection, and a step of providing management programming loaded into the data processor, which management programming is disposed to generate a display on the visual output of the data processor, wherein the visual output comprises a timeline display comprising at least one serial visual element representing at least one timeline comprising a time interval during which at least one planned future activity is to be performed, and at least one advisory icon, wherein the advisory icon displays a commercial offering of at least one of a publicly available commercial good or a publicly available commercial service pertaining to the subordinate aspect of the planned future activity, wherein the subject matter of the advisory icon contains data transmitted over the internet from a web source of the vendor of the commercial good or commercial service.

Figure 5:
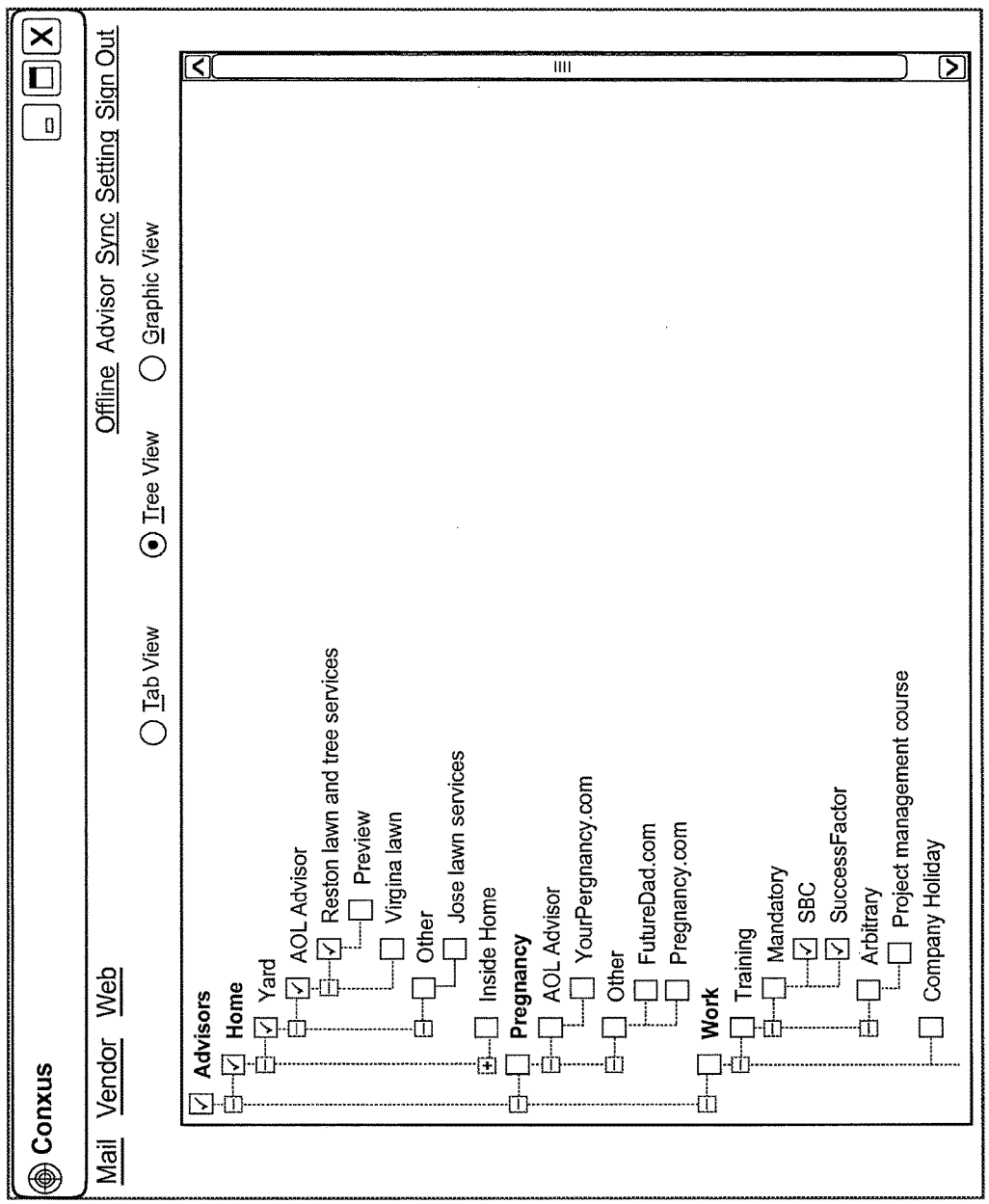
FIG. 5 shows an alternative display format which may be used to display subject matter which could be displayed using the format of FIG. 1.
Figure 6:
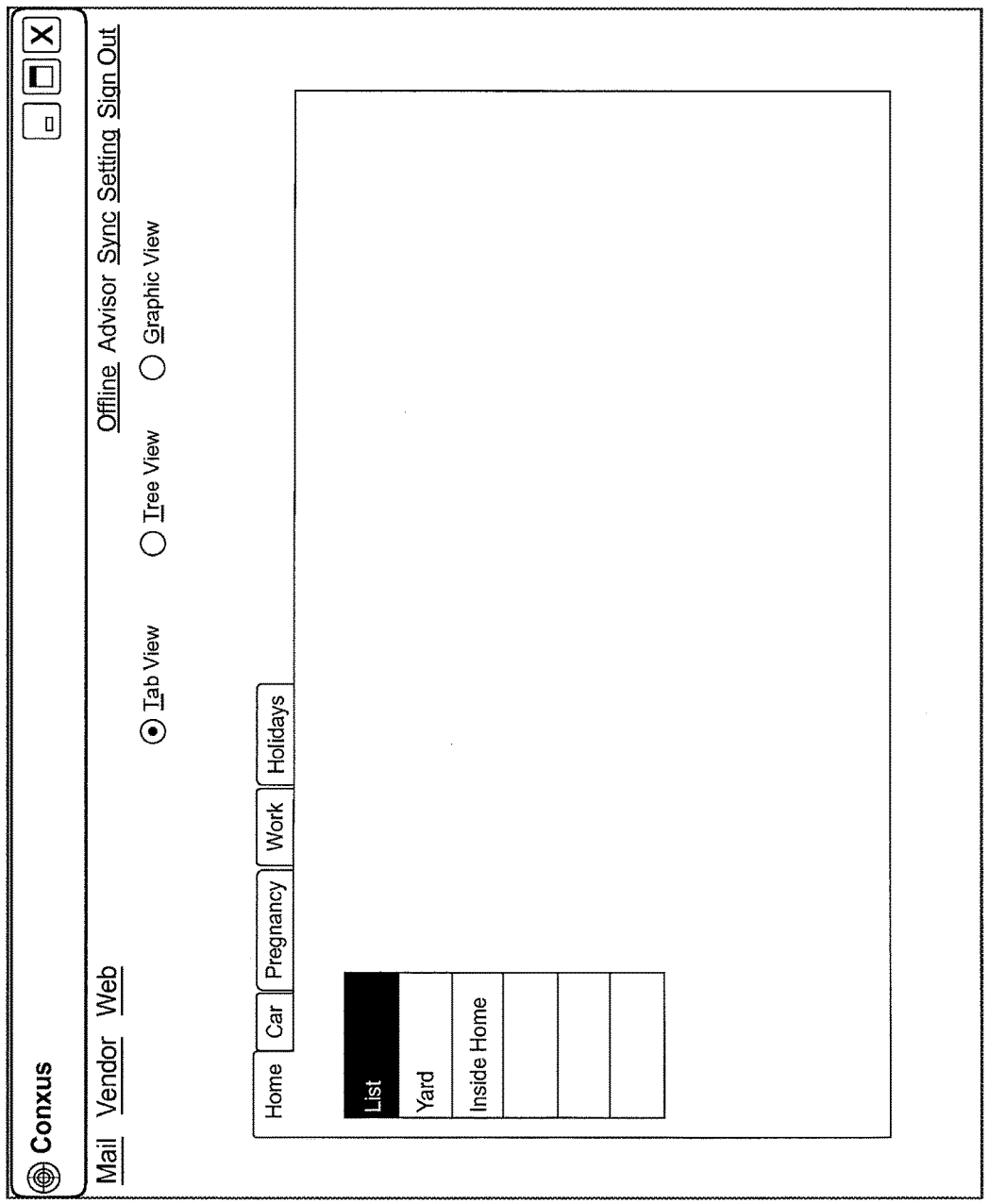
FIG. 6 shows a further alternative display format which may be used to display subject matter which could be displayed using the format of FIG. 1.
Figure 7:
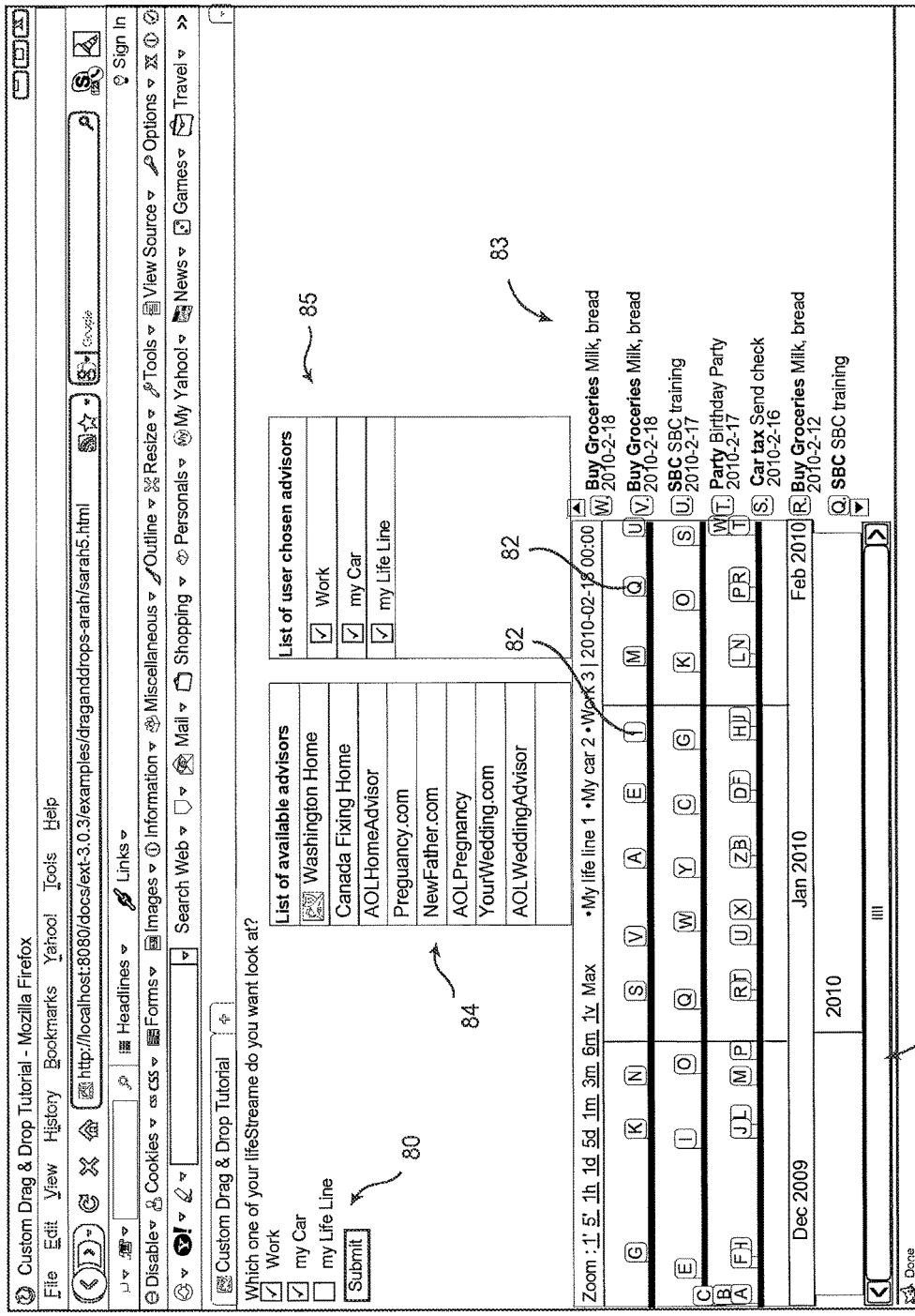
FIG. 7 shows a still further alternative display format which may be used to display subject matter which could be displayed using the format of FIG. 1.

The format of visual effects such as timelines may be varied. FIGS. 5, 6, and 7 each show an alternative format for displaying subject matter. In particular with FIG. 7, some additional functional aspects are present. For example, the user is able to select which timelines from the list of chosen timelines it would like to display by "checking" the boxes 80 (or the boxes located on the timeline 85) next to the representative timelines they would like to display. This allows the user to integrate different timeline together into a timeline summary 81. When a number of timelines are integrated, the timeline summary may include reference symbols 82 to represent a particular event is taking place at a particular time in the timeline summary. The reference symbols are then defined in an alternate portion in the form of a "key" 83 so that the complete event descriptions, which correspond to a reference symbol, can be shown more clearly. As also shown in FIG. 7, the user is able to select which timelines it would like to add to his/her life by selecting from all available timelines 84. Furthermore, the user can display or hide and web host generated timelines 85.

As described above, each timeline pertains to one aspect of the life of the user. The subject matter of each timeline being different from that of each other timeline. Each timeline can be selected and deselected, such as by clicking on a predetermined symbol. As further described above, one way of selecting and deselecting each timeline may be through the use of the predetermined symbol, such as subject matter selection icons. A predetermined symbol and/or an icon is a representation for selecting and/or deselecting each timeline. Predetermined symbols and/or icons can be any type of representation for a user interface to select, deselect and/or summon a timeline. Other ways of selecting, deselecting and/or summoning each of the timelines can include, for example, instead of, in addition to, or in combination with the predetermined symbols and/or icons, for example, tabs, horizontal tabs, vertical tabs, elongated features, overlapping features, shapes, geometric shapes, and/or other displayable interfaces for interfacing with a user, including, for example, any type of user such as a timeline user, a vendor, and advisor. For example, as described in more detail below, the icons can be represented as a series of horizontal elongated tabs that appear in an overlapping representation. As described above, the icon can have a visual representation and/or text that may relate to the subject matter of the timeline. As described below, the icon is shown if the form of a tab and the tab can include a subject or title. The tab can be selected and/or deselected to display and/or not display the timeline.

As described above, a calendar, for example, can be displayed. The calendar may contain all the events on the user. All the events on the calendar can be separated by subject matter through the use of the subject matter timelines. As such the calendar can be referred to as a main calendar and can also be represented in other display format such as a main timeline.

As described above, legends or timeline icons 30, 32, 34, 36, for example, represent a subordinate aspect pertaining to an activity. Those activities on a timeline can be referred to as entries, events or otherwise, and are described in more detail throughout this application.

As described above, vendors and/or advisors can be linked to the subject matter of any timeline. Any number of each can be linked to a timeline. An advisor and/or vendor can cooperate with other advertisers and/or vendors to cross brand each other's goods and/or services. For example, the methods and systems contemplate the use of a single vendor and/or multiple vendors cooperating, also, referred to as teaming and/or a team vendor. As discussed above with reference to FIG. 4, screen 70 shows the advisor vendor display. The advisor Kaplan 68/vendor Kaplan.com 70 can provide information for related vendors, as shown on the vendor display in FIG. 4. For example, the vendor timeline icon "Gifted & Talented Checklist" may provide information for the related vendors shown at 74. As illustrated in FIG. 7, the user through the user display can select and/or unselect the timelines for display at 80, search the list of available advisors (e.g., find an advisor or vendor) at 84 and/or view a list of user chosen advisors (e.g., my advisor or vendor list) at 85. The list of available advisors (e.g. find a vendor) at 84 includes a single vendor (e.g. pregnancy-.com) or an advisor and/or vendor that is cooperating with other vendors by selections under the "list of available advisors" 84 as, e.g., "AOL WeddingAdvisor", "AOL-HomeAdvisor." For example, on the user display at FIG. 7 "AOLHomeAdvisor" is displayed as one selection, but may include information for at least one related vendor, which is displayed only on the vendor display, at FIG. 4, display 74. The vendor, for example, AOLHomeAdvisor, selectable by the user in display FIG. 7, can be referred to a team lead vendor. On the vendor side, the example uses Kaplan as the team lead vendor. The team lead vendor may include one or more vendors. A timeline user may select and/or unselect single vendors (e.g., pregnancy.com, FIG. 7) and/or team lead vendors (e.g., AOLHomeAdvisor, FIG. 7). An advisor can include a vendor, but the vendor can be a vendor of goods and services for zero payment and/or for payment of money. As shown in FIG. 7, the vendor is a vendor user of the methods and systems by way of the advisor/vendor display. The advisor/vendor are linked to the subject matter of the user time by the user selecting from the list of available advisors (find a vendor) and by selecting from that list advisors the choice or selection appears in the list of user chosen advisors (my vendors).

The methods can generate a visual presentation which is functional to visually organize and present planned future activities of a user of the method, to display subordinate aspects of the planned future activities, and to identify vendors of goods, services, or both goods and services for supporting the planned future activities.

A data processor has a visual output, a human-machine interface, and an internet connection. The management programming is loaded into the data processor. The visual output of the data processor displays a timeline display with at least one serial visual element representing at least one timeline comprising a time interval during which at least one planned future activity is to be performed, a plurality of timeline icons disposed along the timeline display, where each timeline icon represents a subordinate aspect pertaining to the planned future activity, and location of the timeline icon along the timeline represents a time when the subordinate aspect is to be addressed by the user.

At least one advisory icon can display a commercial offering of at least one of a publicly available commercial good or a publicly available commercial service pertaining to the subordinate aspect of the planned future activity. Although non-commercial goods, services and/or advise can be coffered as well. The subject matter of the advisory icon can contain data transmitted over the internet from a web source of the vendor.

At least one command icon can be displayed using the human-machine-interface. Input from at least one of a user or a vendor relating to the displayed command icon can be received through the human-machine interface;

At least one advisory icon can be created using the input received from at least one of a user or a vendor. The advisory icon can include fillable spaces for entering, for example, the identity data of a commercial vendor of goods or services or both having advertising content which is transmittable over the internet, the actual name of the entered vendor, and a category or identity of the entered vendor, such that the resulting advisory icon contains data corresponding to the advertising content.

Potential vendors can be screened by applying predetermined acceptance criteria.

At least one of the fillable spaces can be filled with the identity of a commercial vendor which has met the predetermined acceptance criteria. The timeline display, the timeline icons, and the advisory icon with vendors which have been filled in the fillable spaces can be displayed simultaneously on the visual output. The visual output can display a representation of a calendar. The visual output can display a plurality of timelines each pertaining to subject matter different from that of every other timeline. Any of the timelines and/or advisory icons can be displayed and/or concealed by user manipulation of the human-machine-interface. Potential vendors can be screened by applying predetermined acceptance criteria such as geographic proximity of vendors to the premises to be used by the user in engaging in a planned future activity.

One timeline can be dedicated to activities pertaining to the work, the residence, at least one motor vehicle, at least one child, a pregnancy in the social circle of the user, a social occasion to be undertaken by the social circle of the user, and/or a wedding.

The system described herein can be referred to as a personal and/or user planning system. The system can receive input through a human-machine interface from at least one user or vendor and create from the input at least one timeline having subject matter associated with an aspect of the life the at least one user or vendor. The timeline can include at least one timeline icon related to the subject matter of the timeline. The system can also create from the input at least one advisory icon associated with the at least one timeline. The advisory icon can include advertising or promotional information relating to a vendor, and can be selectively associated with the at least one timeline based on a predetermined acceptance criteria. The at least one timeline can be displayed along with the at least one timeline icon and the at least one advisory icon associated with the at least one timeline.

The users and/or vendors can create multiple timelines and each of the multiple timelines can be associated with a different category or aspect of the life of the users and/or vendors. The users and/or vendors can add to or remove from their timeline(s) at least one timeline icon or at least one advisory icon created by another user or vendor. The vendor(s) can create, add to, or subtract from a timeline for purposes of cross-promotion.

Advertisements may be presented in accordance with the settings entered by one or more advisors as described herein. An advertisement may be presented concurrently with one or more timelines on the display, and the advertisement may be selected based on timeline icons of the team timeline. In one or more embodiments, advertisements presented in the side panel may be only those for user-selected advisors, e.g. the advisor belonging to one or more of the timelines presently in view.

Figure 8A:
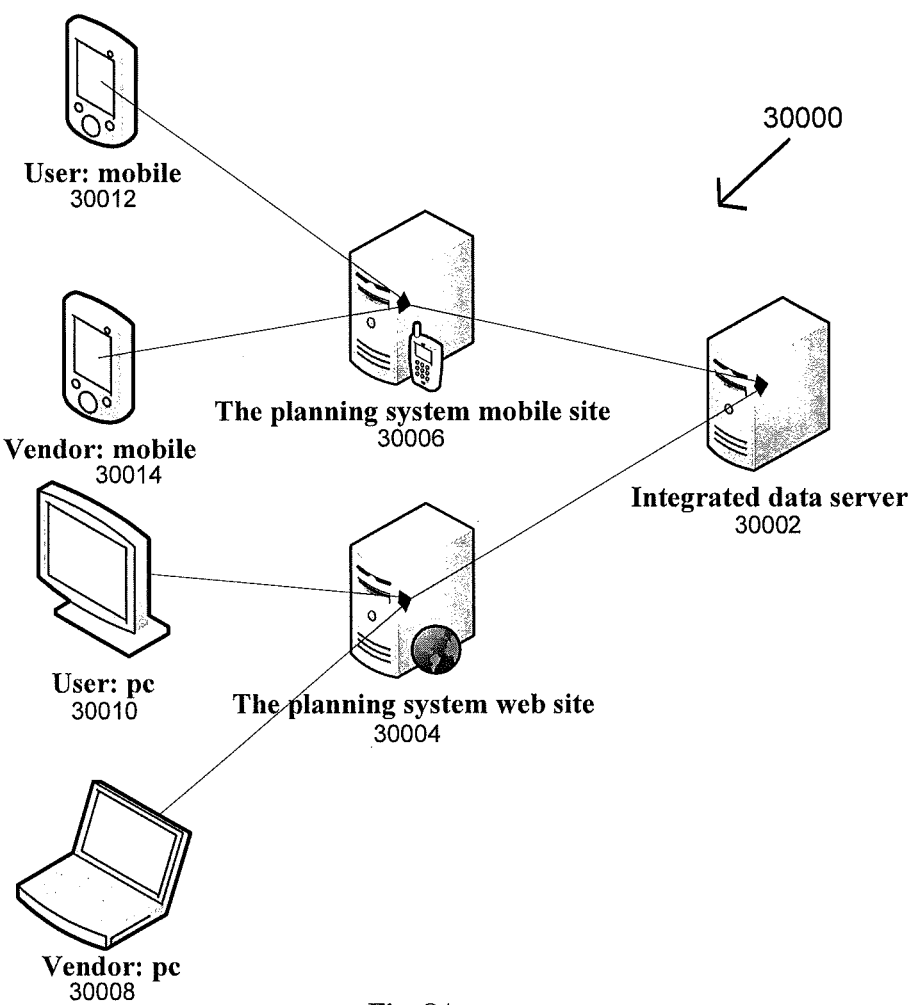
FIG. 8A depicts an exemplary architectural diagram.

FIG. 8A shows an exemplary system deployment view at 30000 for implementing the systems and methods described herein. System 30000 includes an integrated data server 30002, a computer system 30004 for a website implementation, a computing system 30006 for a mobile site implementation, a vendor personal computer 30008, a user personal computer 30010, a user mobile 30012, and a vendor mobile 30014. Each of these devices in system 30000 may have two-way communication therebetween for implementing the methods and functionalities described herein.

This diagram shows how the planning system different components respond to End-Users requests. All Users, including both Timeline Users and Vendors can reach planning system from almost all common devices including PC, Laptop, Tablet and Smartphones; it means any devices that have access to internet and can run a web browser can be used as an entry point to this planning system. The systems and methods offer different web UI for desktop, mobile and tablet, all of these UI will access the planning system core web services using AJAX that interact with provided business logic. This business logic will use a data management layer to store and retrieve information to and from an integrated database.

Figure 8B:
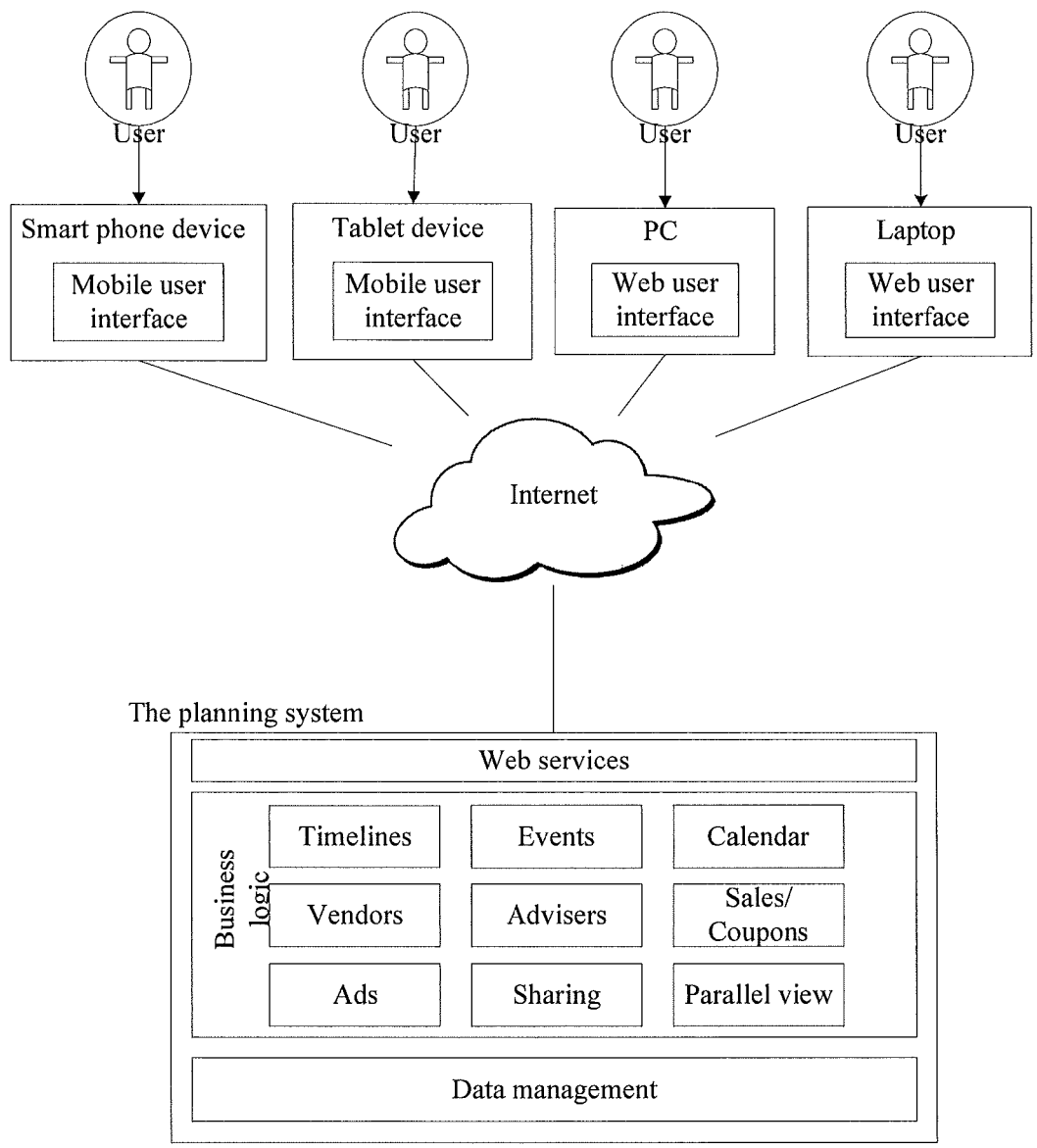
FIG. 8B depicts an exemplary architectural diagram.

FIG. 8B shows a representative timeline user architectural diagram. This diagram demonstrates overall view of the system working parts at "Timeline User" side. Timeline Users can reach Planning system from almost all common devices including PC, Laptop, Tablet and Smartphones. It means any devices that have access to internet and can run a web browser can be used as an entry point for Timeline users, several web UI for desktop, mobile and tablet can be used by Timeline User, those Web UI will access to the planning system core web services using AJAX and interact with provided business logic, including Events, Sub-Timelines, Subscribed Vendors, Calendar, Multiple Timeline View Modes (Parallel View, Calendar View, Hourly View and Flow View), buy coupons and offers, sharing sub-timelines and configuring and choosing desired Advertisements. These business logic will use a data management layer to store and retrieve information to and from an integrated database.

Figure 8C:
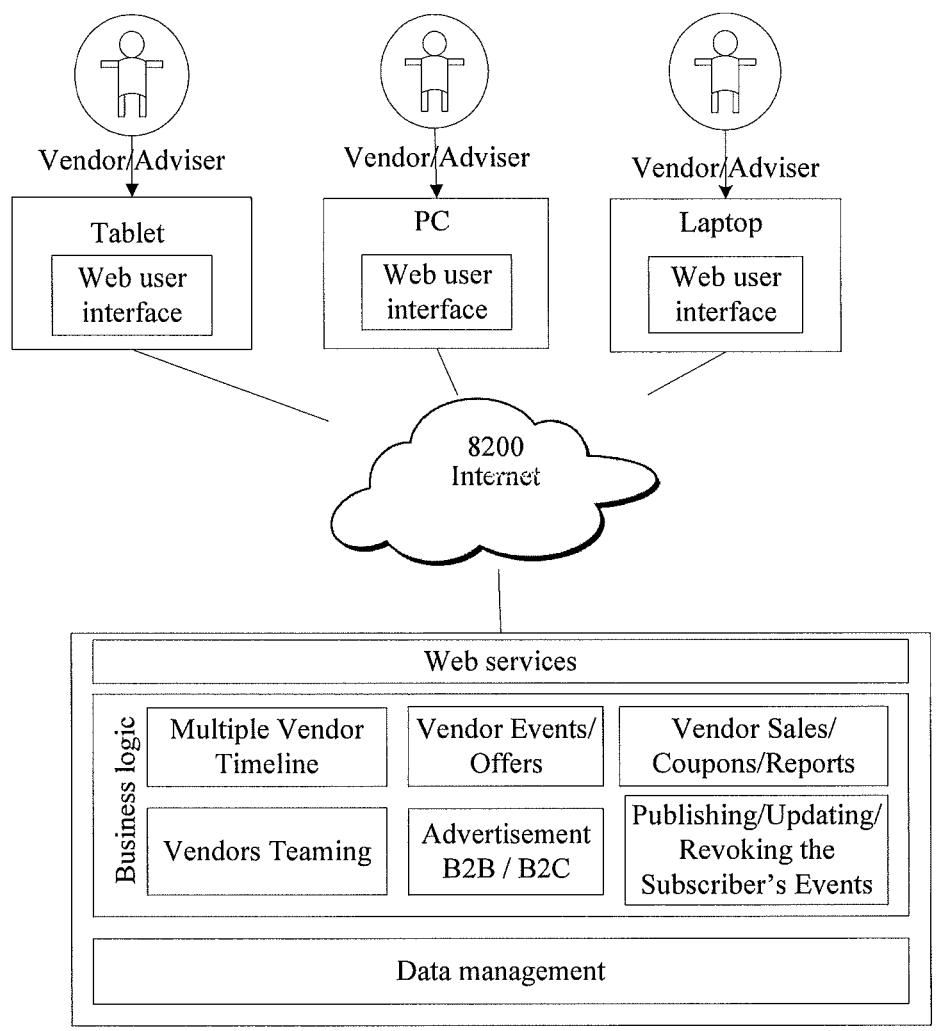
FIG. 8C depicts an exemplary architectural diagram.

FIG. 8C shows a vendor user architectural diagram. This diagram demonstrates an overall view of the system working parts at "Vendor User" Vendor side. Vendor Users can reach the planning system from almost all common devices including PC, Laptop, Tablet and Smartphones. It means any devices that have access to internet and can run a web browser can be used as an entry point for Vendor users, several web UI for desktop, mobile and tablet can be used by them, those Web UI will access to the planning system core web services using AJAX and interact with provided business logic, including Vendor Timelines Management, Events/Offers Management, Sales Management, Teaming, Advertisement for Customers and other Vendors and publishing Vendor Timelines to customers; these business logic will use a data management layer to store and retrieve information to and from an integrated database.

9A demonstrates an overall view of a block diagram of the actions available to the "Timeline User" 8000 in the planning system and methods.

Block 8000 shows the Timeline User overall and the actions available to the timeline user.

Block 8001 shows the Register/Sign-in/Sign-out actions.

Block 8002 shows the Create/Manage zero or more "Timeline User" Event actions.

Block 8003 shows the Create/manage zero or more "Sub-Timeline" actions.

Block 8004 shows the Find/Subscribe/Unsubscribe "Vendor Timeline" actions.

Block 8005 shows the Purchase goods/services through offers and coupons via third party vendors or from the planning system actions.

Block 8006 shows the Share/Copy portion of his/her "Sub-Timeline" with/to another "Timeline User" actions.

Block 8007 shows the Become a "Vendor User" actions.

Block 8008 shows the Sync his/her "Sub Timelines" with other calendar provider services such as Google, Facebook, etc. actions.

Block 8009 shows the Choose his/her own Pop-up Ads actions.

Figure 9A:
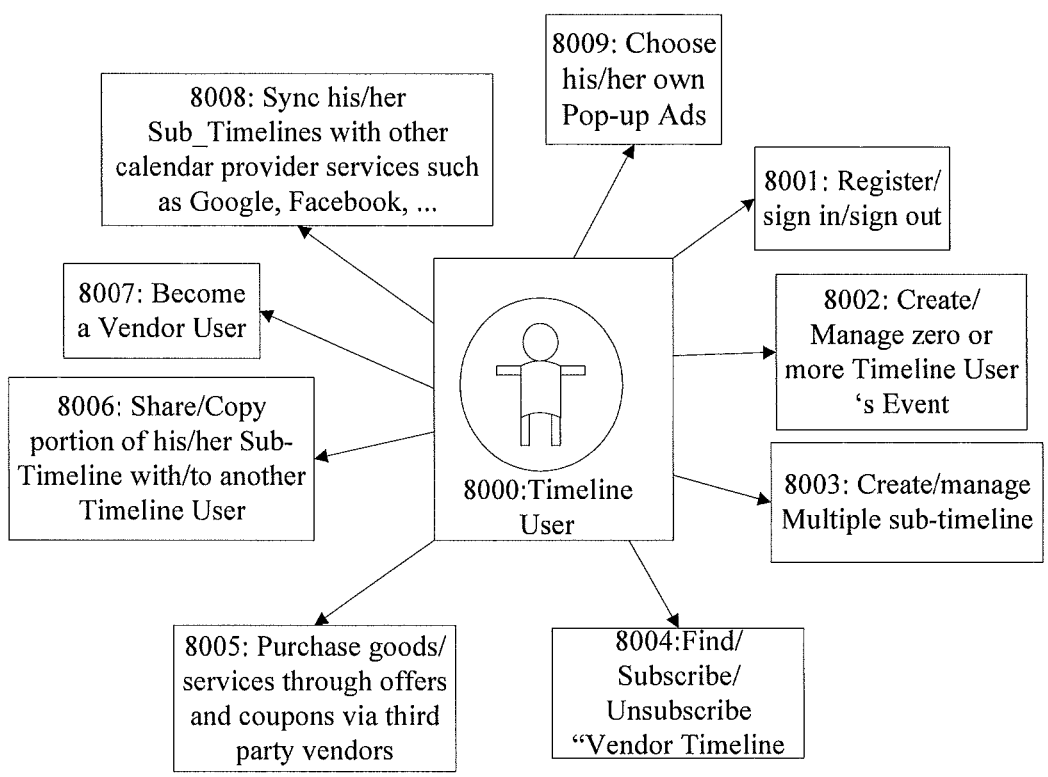
FIG. 9A depicts an exemplary logic flow diagram.
Figure 9B:
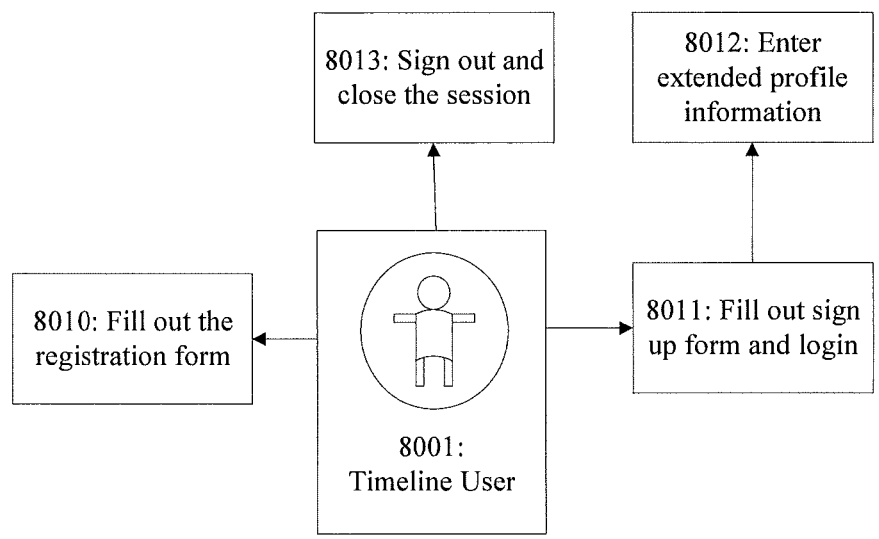
FIG. 9B depicts an exemplary logic flow diagram.

FIG. 9B shows actions of Timeline User such as registration, sign in, sign out and profile editing. FIG. 9B is a blow out of Timeline User action 8001.

Block 8001 shows the Timeline User: Register/sign in/sign out actions.

Block 8010 shows the Fill out the registration form actions.

Block 8011 shows the Fill out sign up form and login actions.

Block 8012 shows the Enter extended profile information actions.

Block 8013 shows the Sign out and close the session actions.

Figure 9C:
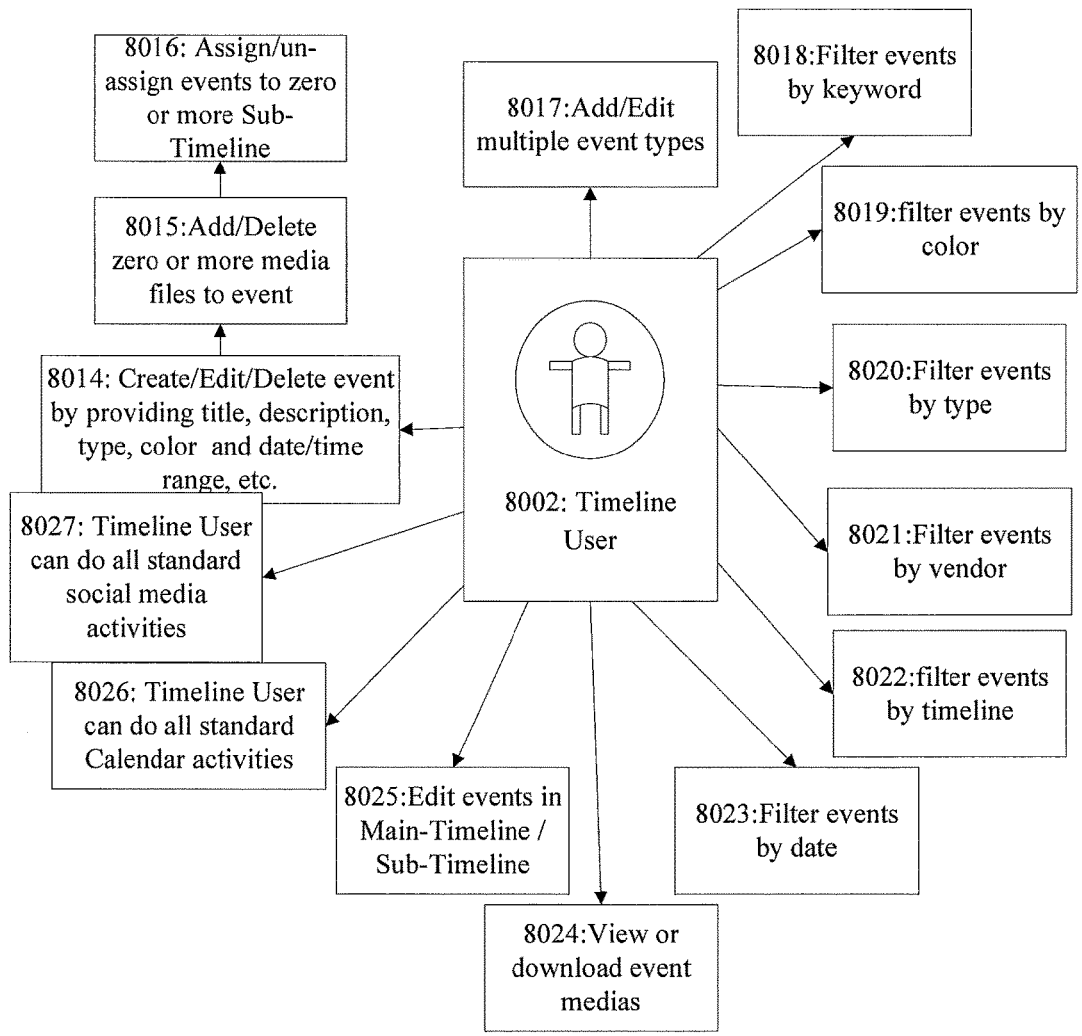
FIG. 9C depicts an exemplary logic flow diagram.

FIG. 9C shows all actions for event creation/editing/search, uploading Medias, associating events with different "Sub-Timeline". FIG. 9C is a blow out of User Timeline action 8002.

Block 8002 shows the "Timeline User: Create/Manage zero or more "Timeline User" Event actions.

Block 8014 shows the Create/Edit/Delete event by providing title, description, type, color, date/time range, etc. actions.

Block 8015 shows the Add/Delete zero or more media files to event actions.

Block 8016 shows the Assign/un-assign events to zero or more Sub-Timeline actions.

Block 8017 shows the Add/Edit multiple event types actions.

Block 8018 shows the Filter events by keyword actions.

Block 8019 shows the Filter events by color actions.

Block 8020 shows the Filter events by type actions.

Block 8021 shows the Filter events by vendor actions.

Block 8022 shows the Filter events by Sub-Timeline actions.

Block 8023 shows the Filter events by date actions.

Block 8024 shows the View or download event media actions.

Block 8025 shows the Edit events in Main-Timeline/Sub-Timeline actions.

Block 8026 shows the Timeline User can do all standard Calendar activities actions.

Block 8027 shows the Timeline User" can do all standard social media activities actions.

Figure 9D:
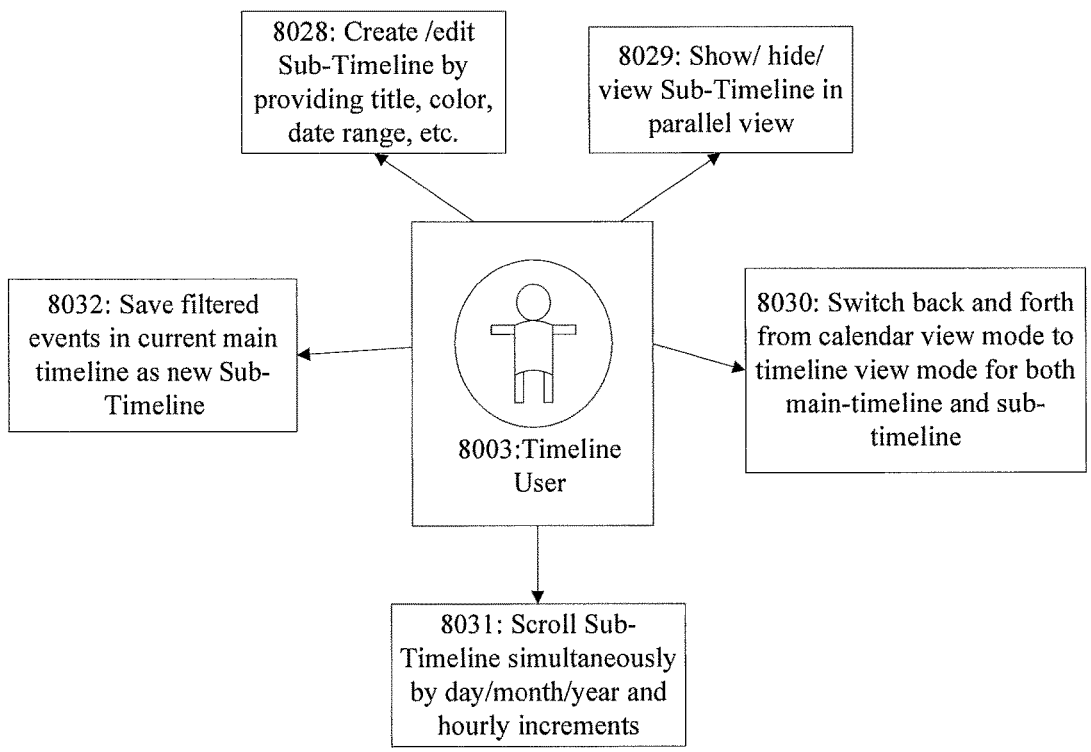
FIG. 9D depicts an exemplary logic flow diagram.

FIG. 9D shows the process of creating and editing Sub-Timelines. A Sub-Timeline can be created from scratch. Also the filtered events in Main Timeline can be saved as brand new Sub-Timeline. FIG. 9D is a blow out of Timeline User action 8003.

Block 8003 shows all Timeline User, Create/manage/manage Sub-Timeline actions.

Block 8028 shows all Create/Edit timeline by providing title, color, date range, etc. actions.

Block 8029 shows all Show/hide/view Sub-Timeline in parallel view actions.

Block 8030 shows all Switch back and forth from calendar view mode to timeline view mode for both main-timeline and sub-timeline actions.

Block 8031 shows all Scroll Sub-Timeline simultaneously by day/month/year and hourly increments actions.

Block 8032 shows all Save filtered events in current main timeline as new Sub-Timeline actions.

Figure 9E:
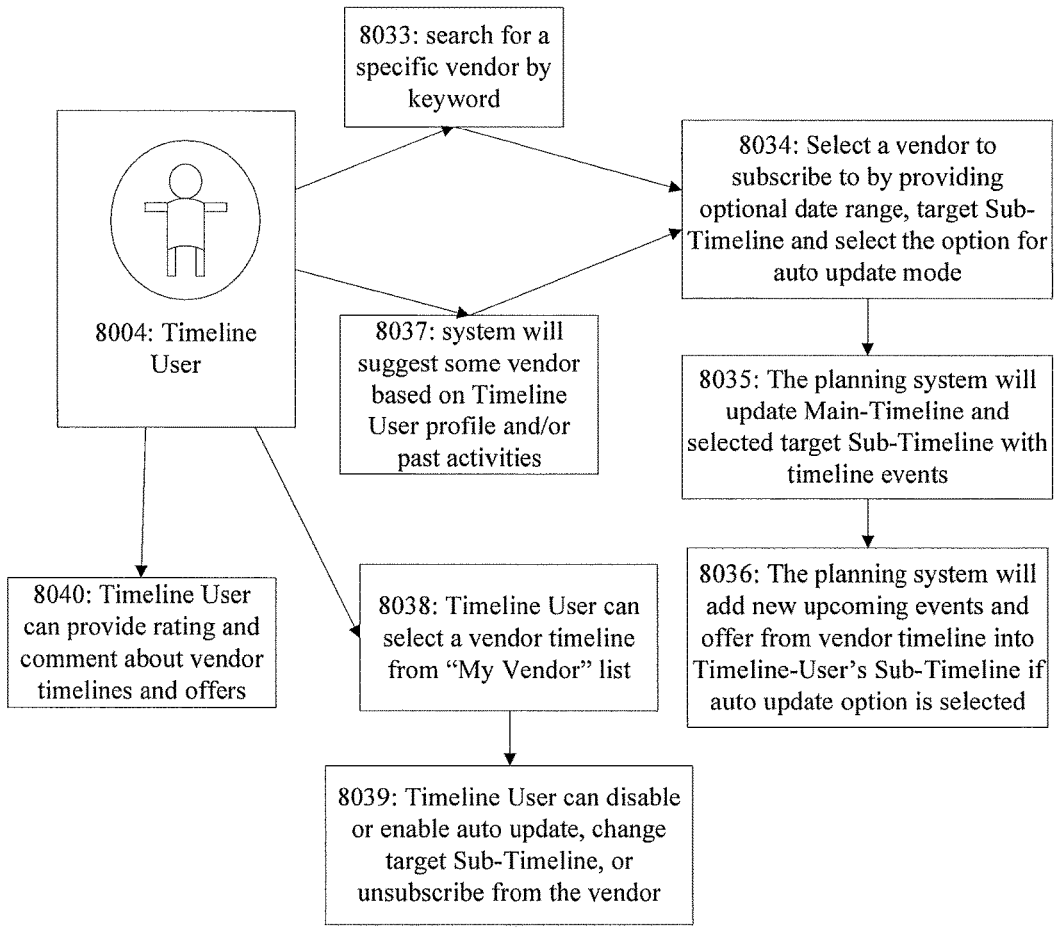
FIG. 9E depicts an exemplary logic flow diagram.

FIG. 9E shows the process of subscribing to a Vendor Timeline and providing value to possible service scope parameters or seeded events questions. FIG. 9E is a blow out of Timeline User action 8004.

Block 8004 shows all Timeline User: Find/Subscribe/Unsubscribe "Vendor Timeline" actions.

Block 8033 shows all search for a specific vendor by keyword actions.

Block 8034 shows all Select a vendor to subscribe to by providing optional date range, target Sub-Timeline and select the option for auto update mode actions.

Block 8035 shows all The planning system will update Main-Timeline and selected target Sub-Timeline with timeline events actions.

Block 8036 shows all The planning system will add new upcoming events and offer from vendor timeline into Timeline-User's Sub-Timeline if auto update option is selected actions.

Block 8037 shows all system will suggest some vendor based on Timeline User profile and/or past activities actions.

Block 8038 shows all Timeline User can select a vendor timeline from "My Vendor" list actions.

Block 8039 shows all Timeline User can disable or enable auto update, change target Sub-Timeline, or unsubscribe from the vendor actions.

Block 8040 shows all Timeline User can provide rating and comment about vendor timelines and offers actions.

Figure 9F:
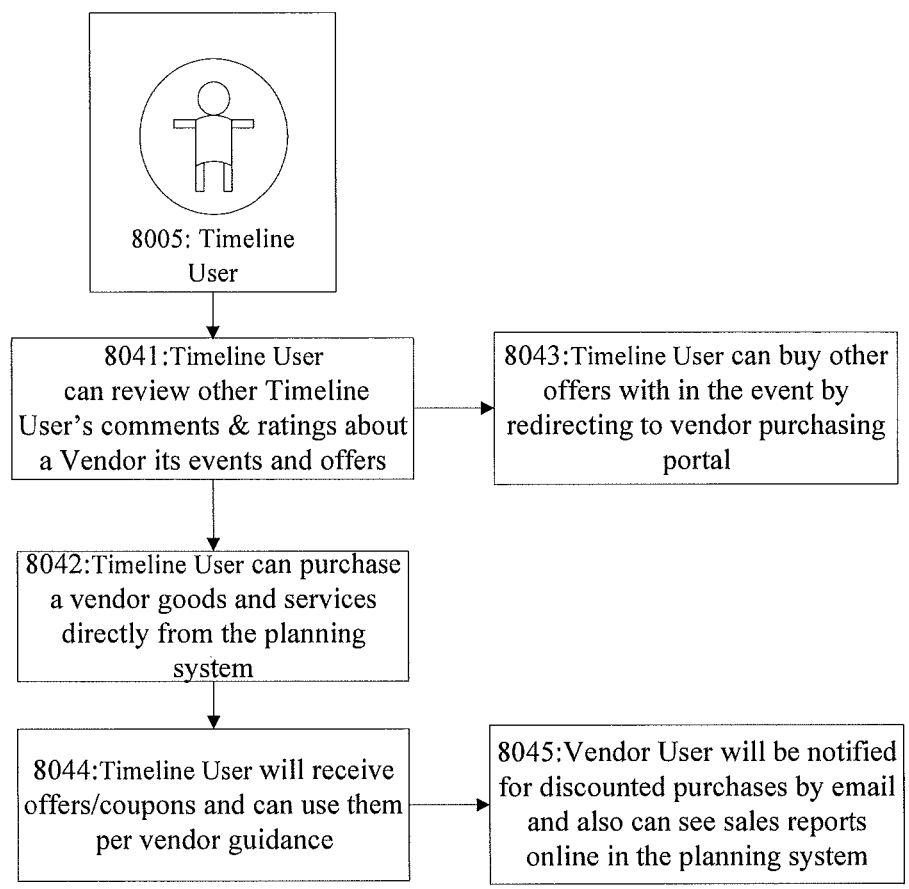
FIG. 9F depicts an exemplary logic flow diagram.

FIG. 9F shows the process of purchase goods/services through offers and coupons via third party vendors or from the planning system. In both cases the Timeline User will review the offers within the events then depending on the offer date, the user can purchase the Good or Services. FIG. 9F is a blow out of Timeline User action 8005.

Block 8005 shows the Timeline User: purchase goods/services through offers and coupons via third party vendors actions.

Block 8041 shows all Timeline User can review other Timeline User's comments & ratings about a Vendor its events and offers actions.

Block 8042 shows all Timeline User can purchase a vendor goods and services directly from the planning system actions.

Block 8043 shows all Timeline User can buy other offers with in the event by redirecting to vendor purchasing portal actions.

Block 8044 shows all Timeline User will receive offers/coupons and can use them per vendor guidance actions.

Block 8045 shows all Vendor User will be notified for discounted purchases by email and also can see sales reports online in the planning system actions.

Figure 9G:
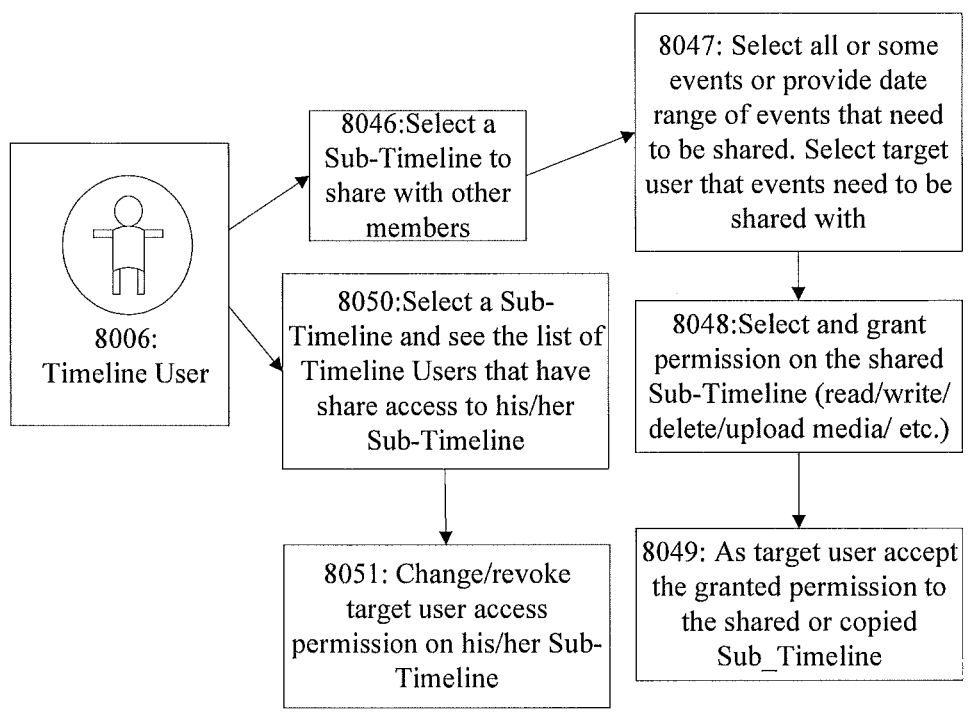
FIG. 9G depicts an exemplary logic flow diagram.

FIG. 9G is a diagram that describes how Timeline Users can share a portion of their Sub-Timeline with other member by granting certain permissions to target Timeline User. This concept covers a scenario of a mother managing her child timeline until the child grows up and the mother could copy the child Sub-Timeline to the adult child account. Another scenario is when an executive assistant manages her boss's account. The boss could grant certain permissions to his executive assistant for managing his account. FIG. 9G is a blow out of Timeline User action 8006.

Block 8006 shows all Timeline User: Share/Copy portion of his/her "Sub-Timeline" with/to another "Timeline User" actions.

Block 8046 shows all Select a Sub-Timeline to share with other members actions.

Block 8047 shows all Select all or some events or provide date range of events that need to be shared. Select target user that events need to be shared with actions.

Block 8048 shows all Select and grant permission on the shared Sub-Timeline (read/write/delete/upload media/etc.) actions.

Block 8049 shows all As target user accept the granted permission to the shared or copied Sub-Timeline actions.

Block 8050 shows all Select a Sub-Timeline and see the list of Timeline Users that have share access to his/her Sub-Timeline actions.

Block 8051 shows all Change/revoke target user access permission on his/her Sub-Timeline actions.

Figure 9H:
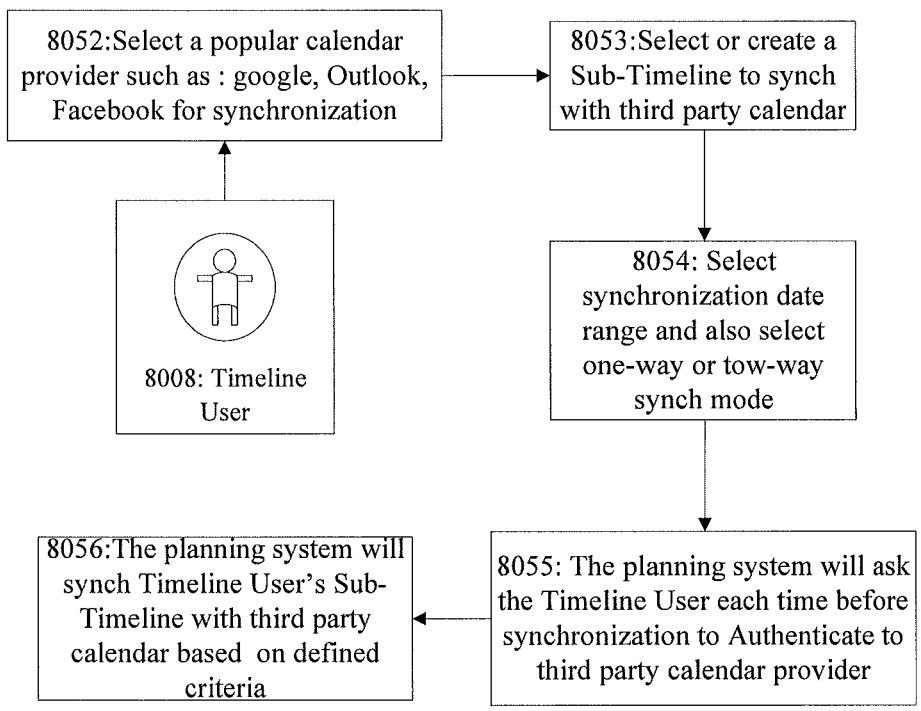
FIG. 9H depicts an exemplary logic flow diagram.

FIG. 9H is a diagram that describes the process of synching basic calendar with major calendar provider such as Facebook, Google, Outlook, etc. Synchronization can be two-way and can be between external calendar and user Main Timeline. Synchronization can also be between the external calendar and a "Sub-Timeline". FIG. 9H is a blow out of Timeline User action 8008.

Block 8008 shows all Timeline User: Synch user timelines with other calendar providers actions.

Block 8052 shows all Select a popular calendar provider such as: google, Outlook, Facebook for synchronization actions.

Block 8053 shows all Select or create a Sub-Timeline to synch with third party calendar actions.

Block 8054 shows all Select synchronization date range and also select one-way or tow-way synch mode actions.

Block 8055 shows all The planning system will ask the Timeline User each time before synchronization to Authenticate to third party calendar provider actions.

Block 8056 shows all The planning system will synch Timeline User's Sub-Timeline with third party calendar based on defined criteria actions.

Figure 9I:
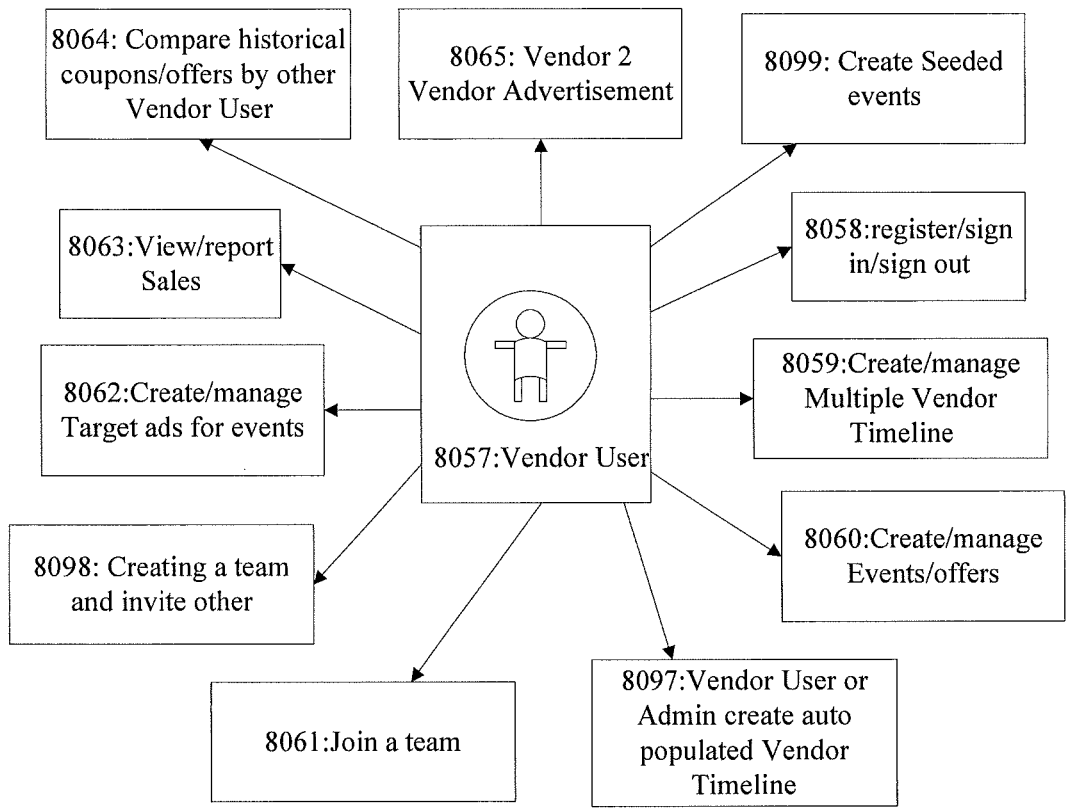
FIG. 9I depicts an exemplary logic flow diagram.

FIG. 9I is a diagram that demonstrates all important actions that the Vendor User can do in the planning system. This diagram is referenced as 8057.

Block 8057 shows all Vendor User Overall and the action available to the vendor user.

Block 8058 shows all Register/Sign-in/Sign-out actions.

Block 8059 shows all Create/Manage "Vendor Timeline" actions.

Block 8060 shows all Create/Manage Events/Offers actions.

Block 8061 shows all Join a team actions.

Block 8098 shows all Creating team and invite others actions.

Block 8062 shows all Create/Manage Target Ads for events actions.

Block 8063 shows all View/report Sales actions.

Block 8064 shows all Compare historical coupons/offers by other "Vendor User" actions.

Block 8065 shows all Vendor 2 Vendor Advertisement actions.

Block 8099 shows all Create Seeded events actions.

Block 8097 shows all Vendor User or Admin create auto populated Vendor Timeline actions.

Figure 9J:
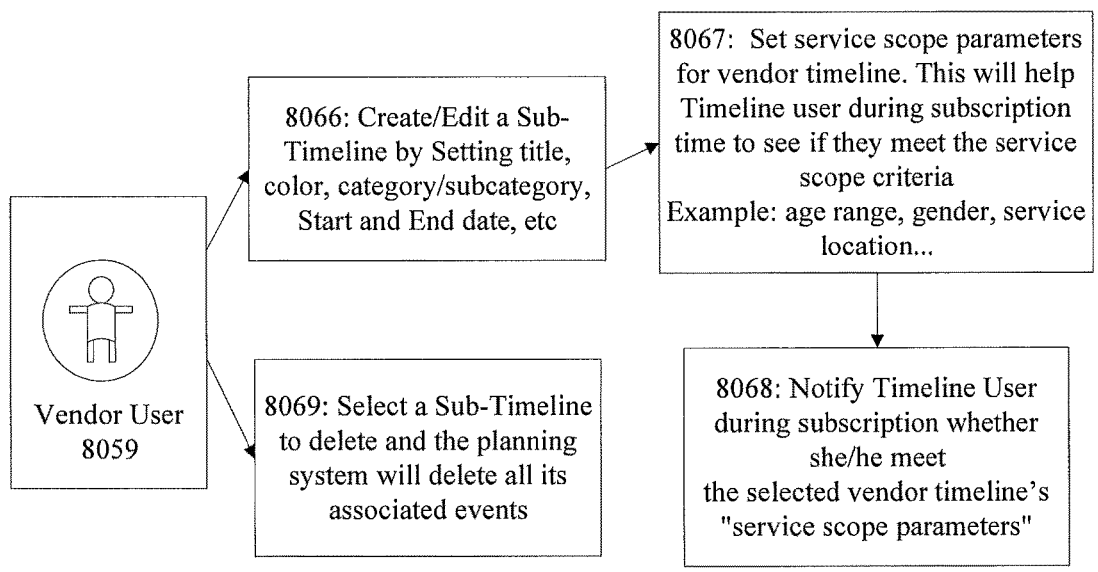
FIG. 9J depicts an exemplary logic flow diagram.

FIG. 9J is a diagram that displays creation/editing/deleting of Vendor Timeline. Each Vendor can have one or many Timelines. These Timelines could be seeded and have service scope parameters or they can be simple timeline with static events. FIG. 9J is a blow out of Vendor User action 8059.

Block 8059 shows all Vendor User: Create/Manage "Vendor Timeline" actions.

Block 8066 shows all Create/Edit a Sub-Timeline by Setting title, color, category/subcategory, Start and End date, etc. actions.

Block 8067 shows all Set service scope parameters for vendor timeline. This will help Timeline user during subscription time to see if they meet the service scope criteria Example: age range, gender, service location . . . example: age range, Gender, etc. actions.

Block 8068 shows all Notify Timeline User during subscription whether she/he meet the selected vendor timeline's "service scope parameters" actions.

Block 8069 shows all Select a Sub-Timeline to delete and the planning system will delete all its associated events actions.

Figure 9K:
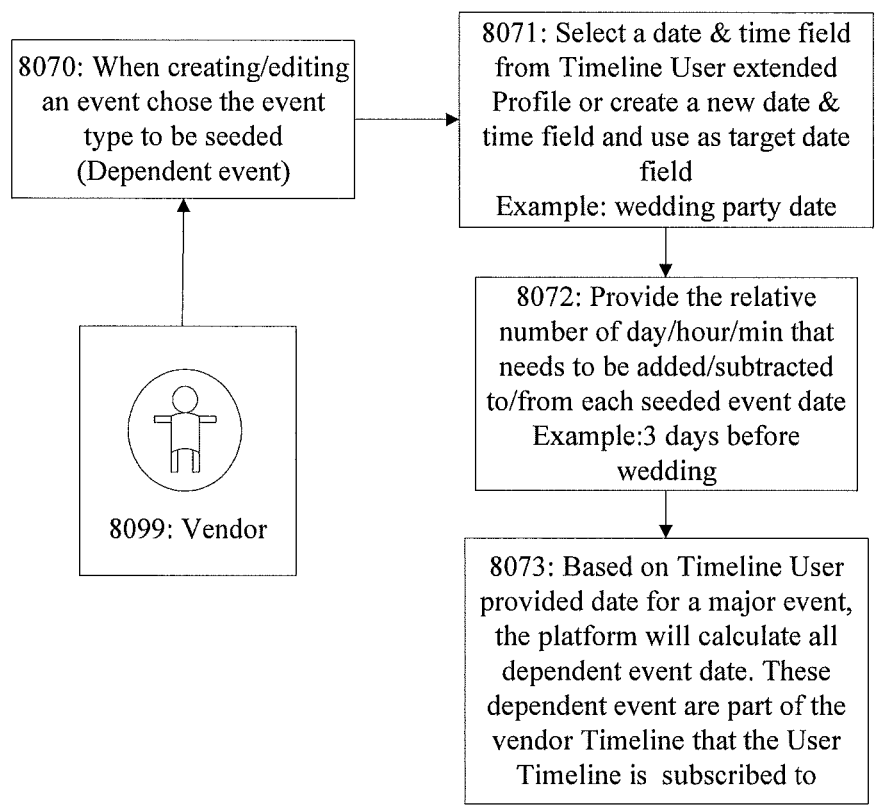
FIG. 9K depicts an exemplary logic flow diagram.

FIG. 9K is a diagram that shows how events in Vendor Timelines can be seeded. This means there are events that their dates are dependent on other event dates. For example child delivery date can be a seeded parameter to set all the events that need to take place before the child birth. For example if a "Timeline User" such as a pregnant lady subscribes to a vendor that provides goods and services for before and after pregnancy, that vendor needs to know the baby delivery date. This event date will change all the previous relative dates for this vendor timeline. When user provides the initial parameter, the vendor with seeded events will update all his relative and dependent events and provide a customized timeline for this mother. FIG. 9K is a blow out of Vendor User action 8099.

Block 8099 shows all Vendor: Create seeded events by vendor actions.

Block 8070 shows all When creating/editing an event chose the event type to be seeded (Dependent event) actions.

Block 8071 shows all Select a date & time field from Timeline User extended Profile or create a new date & time field and use as target date field actions. An example may include a wedding party date.

Block 8072 shows all Provide the relative number of day/hour/min that needs to be added/subtracted to/from each seeded event date. Example: 3 days before wedding Block 8073 shows all Based on Timeline User provided date for a major event, the planning system will calculate all dependent event date. These dependent event are part of the vendor Timeline that the User Timeline is subscribed to actions.

Figure 9L:
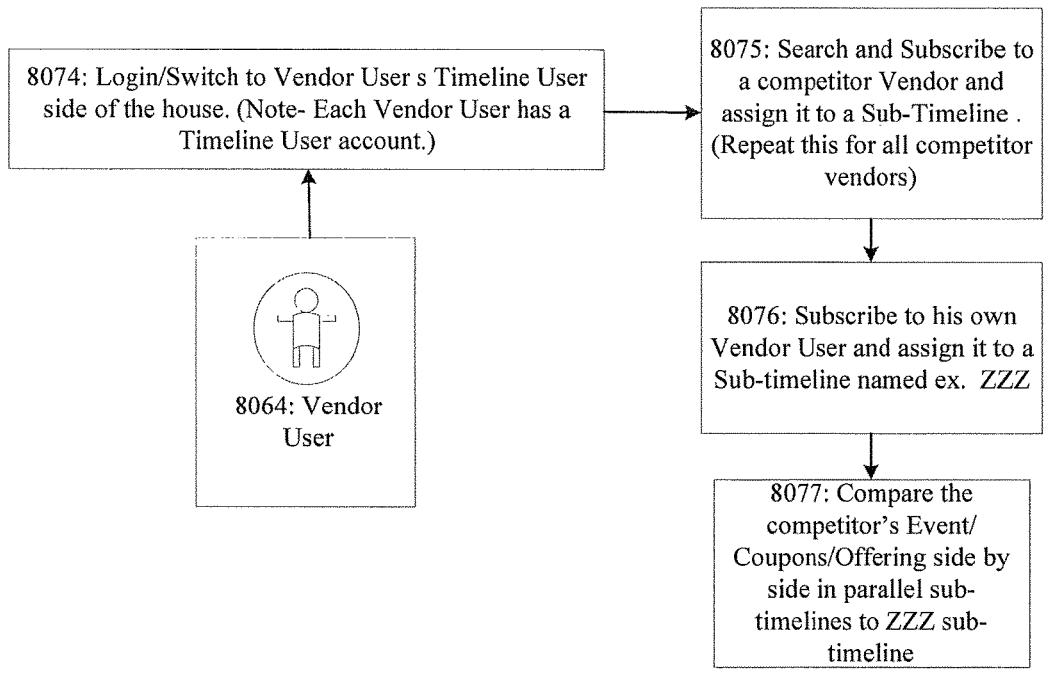
FIG. 9L depicts an exemplary logic flow diagram.

FIG. 9L is a diagram that shows how vendors can compare their competitor's events/coupons/offers in a timeline with their own timeline. Vendors could compare the competitor offers in the past and predict their competitor's offer in future in a very clean user interface of parallel Sub-timelines. FIG. 9L is a blow out of Vendor User action 8064.

Block 8064 shows all Vendor User: Compare historical Events/Offers/Coupons by other "Vendor User actions.

Block 8074 shows all Login/Switch to "Vendor User"'s "Timeline User" side of the house actions. (Note—Each "Vendor User" has a "Timeline User" account.)

Block 8075 shows all Search and Subscribe to a competitor Vendor and assign it to a "Sub-Timeline" actions. (Repeat this for all competitor vendors)

Block 8076 shows all Subscribe to his own "Vendor User" and assign it to a "Sub-timeline" named ex. "ZZZ" actions.

Block 8077 shows all Compare the competitor's Event/Coupons/Offering side by side in parallel sub-timelines to "ZZZ" sub-timeline actions.

Figure 9M:
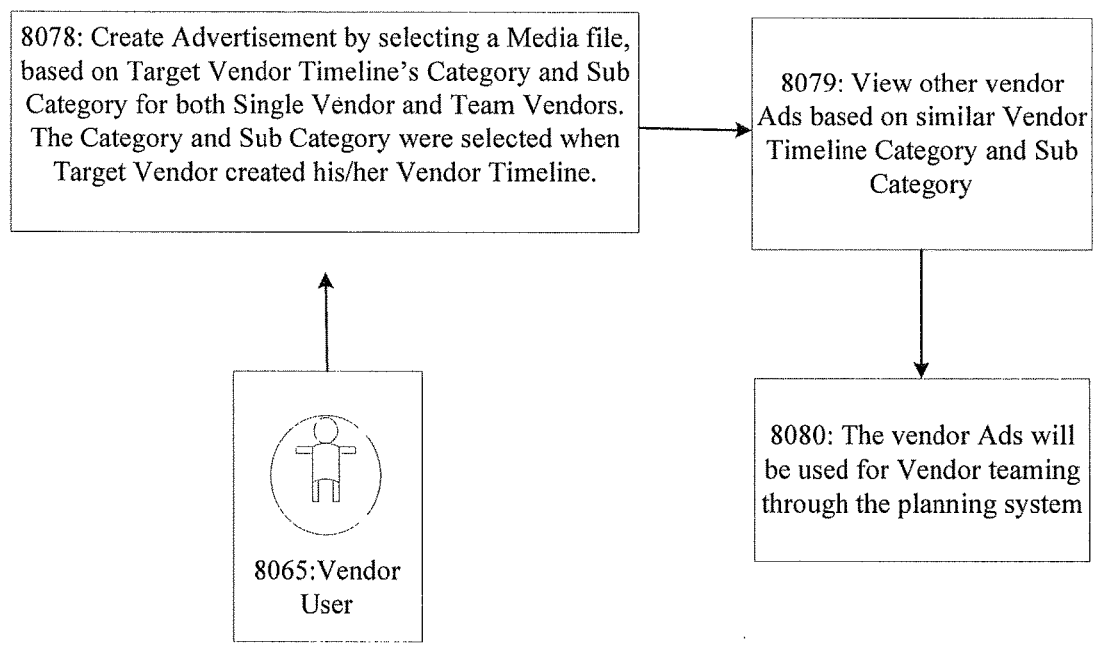
FIG. 9M depicts an exemplary logic flow diagram.

FIG. 9M shows the Vendor 2 Vendor advertisement. In the planning system vendors could create advertisement for other vendor through a uniform interface. FIG. 9M is a blow out of Vendor User action 8065.

Block 8065 shows all Vendor User: Vendor 2 Vendor Advertisement (b2b) actions.

Block 8078 shows all Create Advertisement by selecting a Media file, based on Target Vendor Timeline's Category and Sub Category for both Single Vendor and Team Vendor actions. The Category and Sub Category were selected when Target Vendor created his/her Vendor Timeline.

Block 8079 shows all View other vendor Ads based on similar Vendor Timeline Category and Sub Category actions.

Block 8080 shows all The vendor Ads will be used for Vendor teaming through the planning system actions.

Figure 9N:
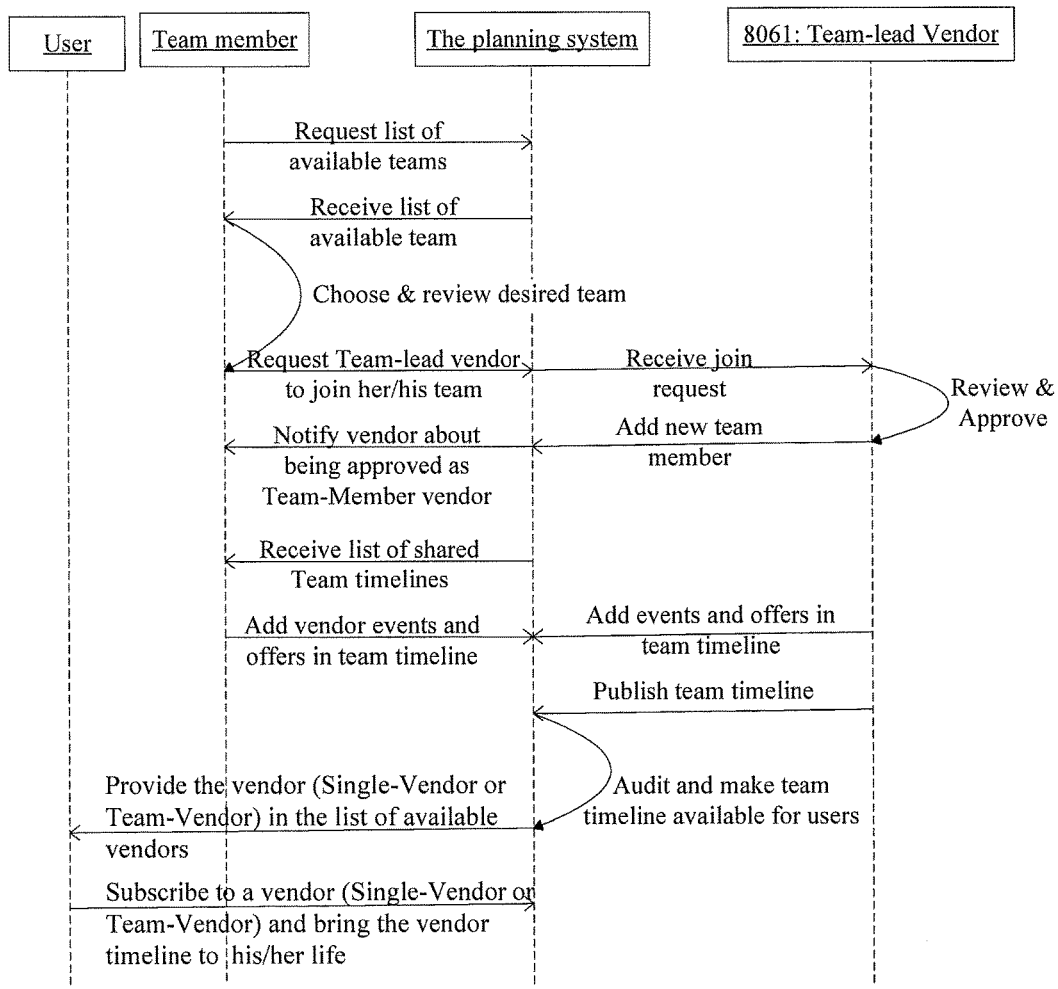
FIG. 9N depicts an exemplary logic flow diagram.

FIG. 9N depicts joining a team. This sequence diagram shows the step by step process for a vendor joining an existing team of one or many vendors. FIG. 9N is a blow out of Vendor User action 8061.

Block 8061 shows all Vendor User: Join a team actions. The "User", "Team Member", "The planning system" and "8061: Team-lead Vendor" are each represented by a column with a broken/dashed line extending along the column. The actions between each of the four (4) are shown by lines with directional arrow head shows input(s), output(s) and action(s) to/from/between each of the four (4) columns. According to the exemplary flow diagrammed in FIG. 9N, the team member requests a list of available teams utilizing the planning system. The planning system provides the team member with a list of the available teams. From that, the team member can choose and review desired teams. Utilizing the planning system, the team member can request to join the team. This request goes from the team member to the team lead vendor. The team lead vendor receives the request to join and can review and, if desired, can approve the request. If the team lead vendor approves the request, the team member is added to the team. The team lead vendor utilizing the planning system notifies the team member that it has been approved as a member of the team, this can be referred to as becoming a team-member vendor.

The team member can also through utilizing the planning system receive a list of shared team timelines. The team member can add vendor/its own team member events and offers into the team timeline utilizing the planning system. The team lead vendor can also add events and offers into the team timeline. The team lead vendor manages the team timeline and upon the approval of the team lead vendor, the team timeline can be published utilizing the planning system. The team lead vendor is the lead for auditing and making the team timeline available for users. Preferably, the actions are in the sole control of the team lead vendor. Team members cannot perform these actions. Utilizing the planning system, the vendor is provided in the list of available vendors accessible by the users. The vendor may be a single vendor and/or a team vendor. The user through the planning system can review the list of available vendors through the user display and subscribe and/or unsubscribe to a vendor. By subscribing to the vendor, the user brings the vendor timeline into his or her life. The user can bring the vendor timeline into the user interface as part of the main timeline alone and/or in combination with one or more sub-timelines. Again, the vendor can be a single vendor and/or team vendor.

The actions shown in FIG. 9N include:
Team-member Vendor<->the planning system;
Request for list of available teams;
Receive list of available team;
Team-Member Vendor;
Choose & review desired team;
Team-member Vendor<->the planning system;
Request Team-Lead vendor to join her/his team;
The planning system<->Team-Lead Vendor;
Receive join request;
Team-Lead Vendor;
Review & Approve;
The planning system<->Team-Lead Vendor;
Add new team member;
Team-Member<->The planning system;
Notify vendor as being approved as Team-Member vendor;
Receive list of shared team timelines;
Add vendor events and offers in team timeline;
The Planning system<->Team-Lead vendor;
Add events and offers in team timeline;
Publish team timeline;
The planning system;
Audit and make team timeline available for Timeline Users;
Timeline User;
Provide the vendor (Single-Vendor or Team-Vendor) in the list of available vendors; and/or
Subscribe to a vendor (Single-Vendor or Team-Vendor) and bring the vendor timeline to his/her life.

Figure 9O:
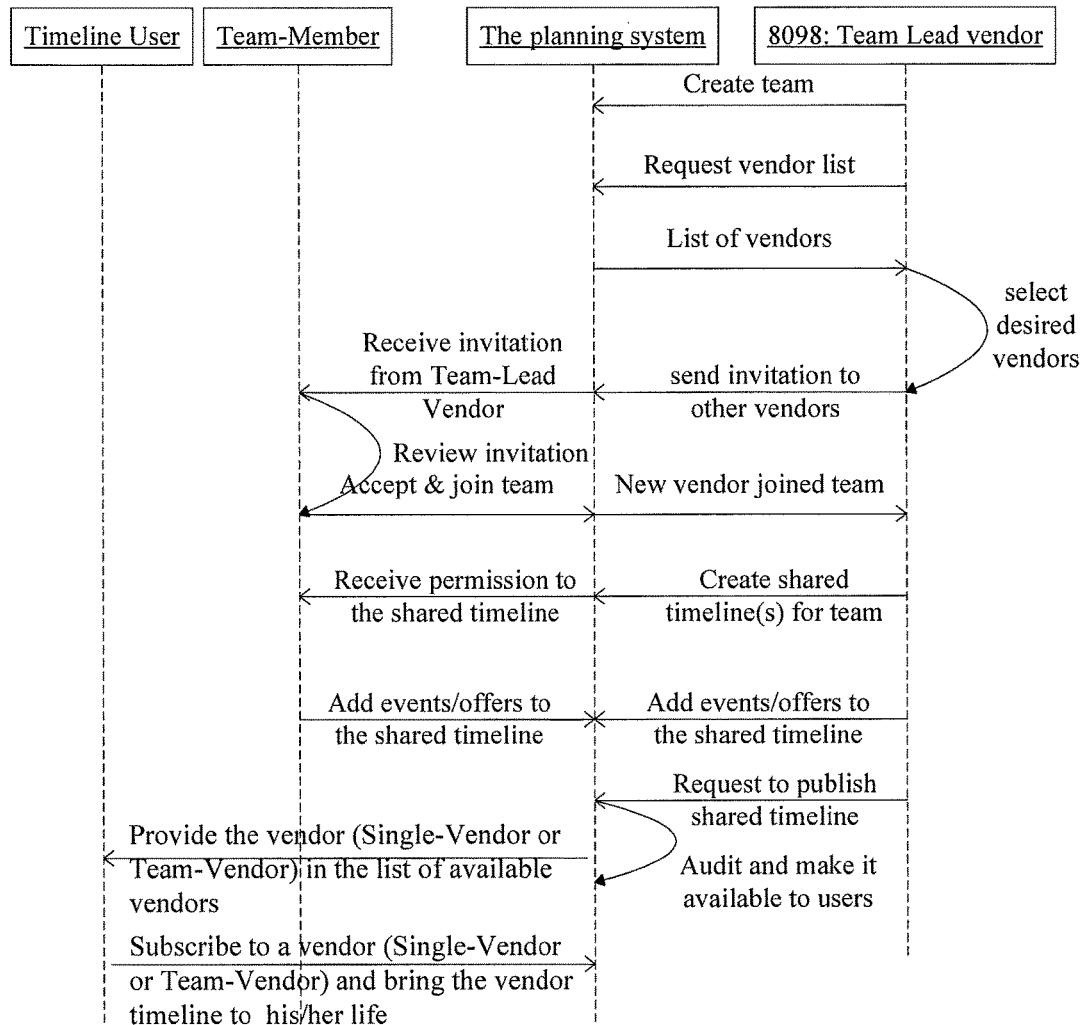
FIG. 9O depicts an exemplary logic flow diagram.

FIG. 9O depicts a sequence diagram that shows the step by step process of creating team of vendors to work with each other and provide good or services. This diagram also shows inviting team members and creating a Team Timeline. FIG. 9O is a blow out of Vendor User action 8098.

Block 8098 shows Vendor User creating team and invite others actions. The "Timeline User", "Team Member", "The planning system" and "8098: Team Lead vendor" are each represented by a column with a broken/dashed line extending along the column. The actions between each of the four (4) is shown by lines with directional arrow heads shows input(s), output(s) and action(s) to/from/between each of the four (4) columns. As shown by the flow diagram of FIG. 9O, the Team-Lead vendor can create a team utilizing the planning system. The Team-Lead vendor requests a vendor list utilizing the planning system and is provided with a list of vendors that are part of the planning system. The Team-Lead vendor can view the list of vendors and can send invitations to the vendors selected. As a result of those invitations, utilizing the planning system, a team member receives the invitation from the Team Lead vendor and can review the invitation. The team member can accept an invitation and join the team. The team member is joined to the team. The Team Lead vendor can create shared timeline(s) for the team. The team member is provided permission to the shared team timeline. Preferably the team member cannot access the team timeline until permission is granted by the Team Lead vendor to share the team timeline with the team member. The team member may now add events/offers to the shared timeline. The Team Lead vendor may also add events/offers to the shared timeline. The Team Lead vendor can request to publish the shared timeline utilizing the planning system. The Team Lead vendor audits and makes the team timeline available to users. Utilizing the planning system, the timeline user has access to the list of available vendors. The vendors can include single vendors and/or team vendors. Once the Team Lead vendor has published the team timeline, it will be in the list of available vendors on the timeline user interface. If the timeline user subscribes to a vendor timeline, the vendor timeline will be brought into the timeline user's system. The vendor can be a single vendor and/or a team vendor.

The actions shown in FIG. 9O include:
Team-Lead vendor;
Create team;
Request vendor list;
List of vendors;
Team-Lead vendor;
Select desired vendors;
The planning system<->Team-Lead vendor;
send invitation to other vendors;
The planning system<->Team-Member vendor;
Receive invitation from Team-Lead;
Team-Member vendor;
Review invitation;
The planning system<->Team-Member vendor;
Accept & join team;
The planning system<->Team-Lead vendor;
New vendor joined team;
Create shared timeline(s) for team;
The planning system<->Team-Member vendor;
Accept & join team;
Receive permission to the shared timeline;
The planning system<->Team-Lead vendor;
Create shared timeline(s) for team;
Add events/offers to the shared timeline;
The planning system<->Team-Member vendor;
Add events/offers to the shared timeline;
The planning system<->Team-Lead vendor;
Request to publish shared timeline;
The planning system;
Audit and make it available to users;
The planning system<->Timeline User;
Provide the vendor (Single-Vendor or Team-Vendor) in the list of available vendors; and Subscribe to a vendor (Single-Vendor or Team-Vendor) and bring the vendor timeline to his/her life.

Figure 9P:
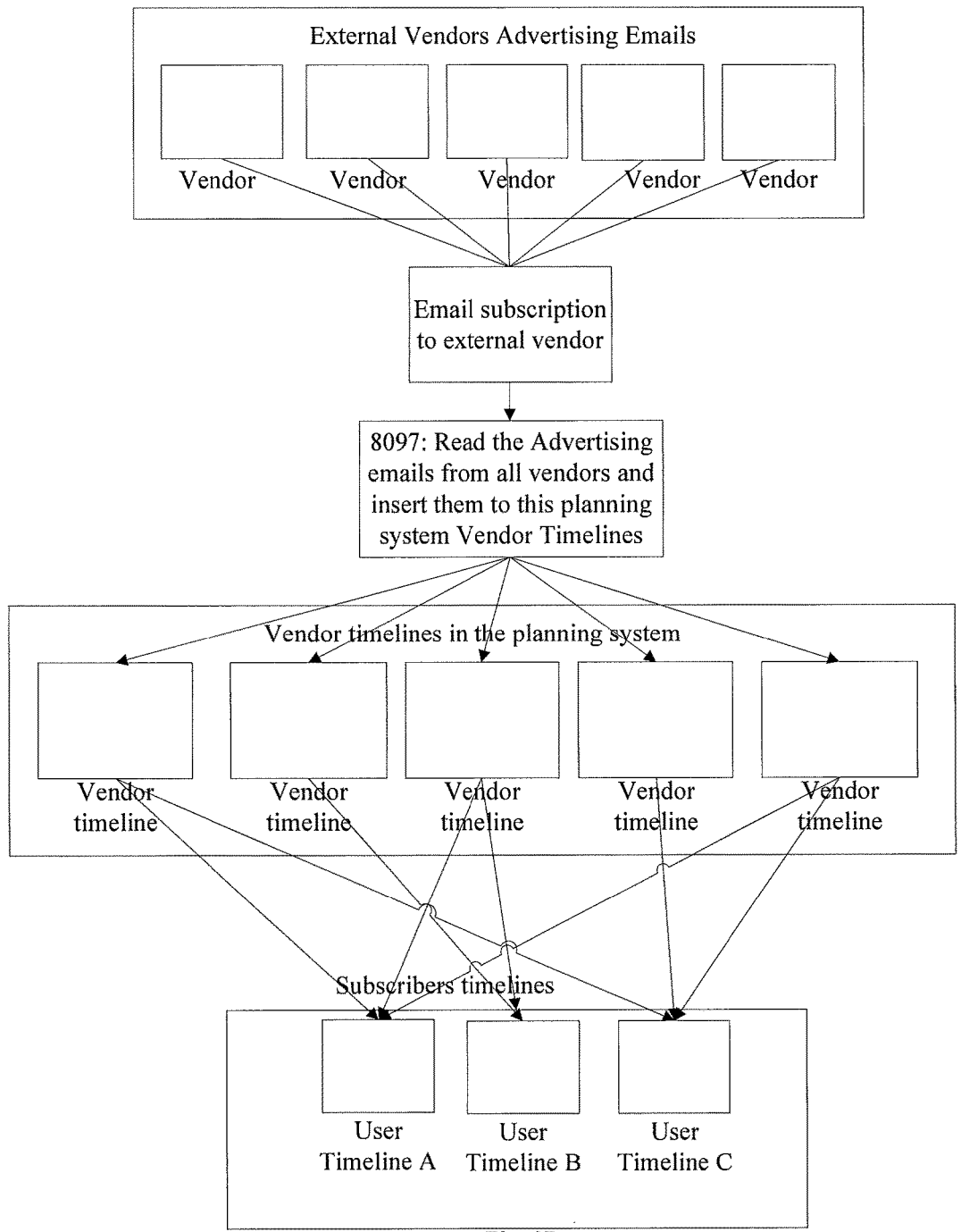
FIG. 9P depicts an exemplary logic flow diagram.

FIG. 9P is a diagram that shows how the planning system can auto populate Timelines for none-user Vendor as long as these vendors offer email subscriptions. In another word the auto populate algorithm can retrieve all coupons/offers/events/deals by external vendor that don't have Vendor User account in the planning system. This auto populate algorithm organizes the vendors Ads/coupons/offers/events in form of Timelines and make it available for Timeline Users to subscribe to. This planning system offers a uniform user interface that is yet more organized than receiving annoying subscription emails from different vendor that clutter the email box. In this diagram the planning system uses an "Auto populate" algorithm. In order to auto populate a "Vendor Timeline", system admin manually subscribes to all popular vendors who offer email subscription using the planning system email account(s). The planning system "Auto populate" algorithm reads the received email from these vendors and insert an event for each email into the right "Vendor Timeline". Later on, the Timeline User subscribes to an auto populate Vendor Timeline and stores it in a "Sub-Timeline". Even though the user gets all the annoying deals/offer/events/coupons, but since they are sitting in their own Sub-Timeline, they won't bother the user until user absolutely need them for certain purchases. Plus anytime user doesn't want a "Vendor Timeline", the process of un-subscription is through a uniform user interface and simple.

If a vendor like "MACYS" has different categories of subscription, such as "MACYS Furniture", "MACYS Kitchen", etc., the planning system could use the same "Auto populate algorithm" but use different Admin email account. The combination of vendor name and "system-admin-email" will be the determining factor for the algorithm to decide which "Vendor Timeline" an event belongs to and needs to be created in. For example for "MACYS" we could have multiple "Vendor Timeline" in the planning system such as "MACYS Furniture", "MACYS Kitchen". The emails associated with each category will land as an event in "Vendor Timeline", "MACYS Furniture" or "MACYS Kitchen" accordingly. FIG. 9P is a blow out of Vendor User action 8097

Block 8097 shows User Vendor: Auto-populate vendor timelines actions.

Figure 9Q:
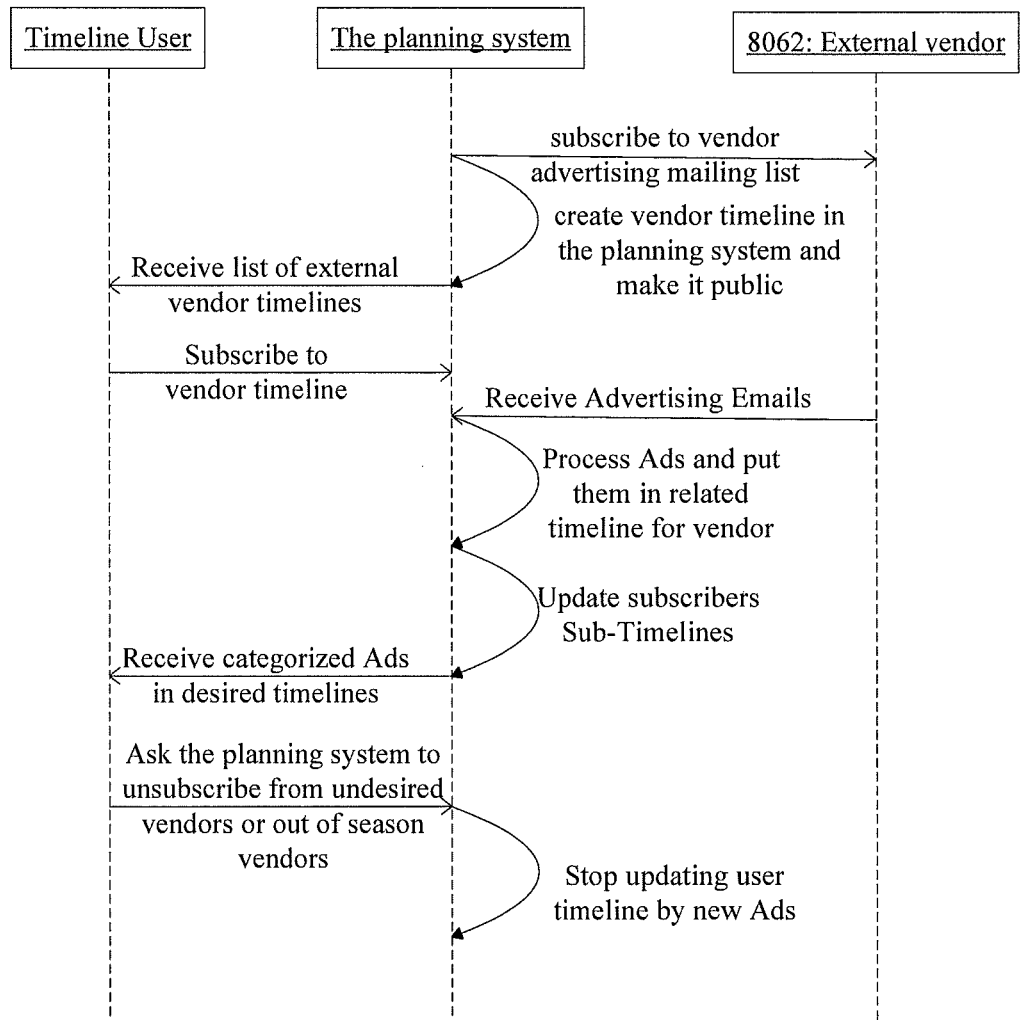
FIG. 9Q depicts an exemplary logic flow diagram.

FIG. 9Q is a sequence diagram that shows the planning system can be used as centralized one stop shot for on demand subscribing and unsubscribing to/from different Vendors. FIG. 9Q is a blow out of Vendor User action 8062.

Block 8062 shows User Vendor: central Ads subscription/unsubscribing actions. The "Timeline User", "The planning system" and "8062: External vendor" are each represented by a column with a broken/dashed line extending along the column. The actions between each of the four (4) is shown by lines with directional arrow heads shows input(s), output(s) and action(s) to/from/between each of the four (4) columns. Through utilizing the planning system, the External vendor can subscribe to vendor advertising, mailing list(s). The External vendor can create a vendor timeline utilizing the planning system and make it publicly accessible through the planning system to users. The timeline user through the planning system receives a list of External vendor timelines. The timeline user can subscribe to one or more vendor timeline(s). Utilizing the planning system, the External vendor can receive advertising e-mails, process ads and put them in related timelines for the vendor, and update subscribers' timelines. The timeline user through the planning system can receive the categorized ads in desired timelines. The timeline user can utilize the planning system to unsubscribed from undesired vendors or out-of-season vendors. Utilizing the planning system, the timeline user will stop receiving updates because the planning system will stop updating the user timeline with new ads.

The actions shown in FIG. 9Q include:

The planning system<->External vendor;
subscribe to vendor advertising mailing list;
The planning system;
Create vendor timeline in the planning system and make it public;
The planning system<->Timeline User;
Receive list of external vendor timelines;
Subscribe to vendor timeline;
The planning system<->External vendor;
Receive Advertising Emails;
The planning system;
Process Ads and put them in related timeline for vendor;
Update subscribers' "Sub_Timeline";
The planning system<->Timeline User;
Receive categorized Ads in desired timelines;
Ask the planning system to unsubscribe from undesired vendors or out of season vendors;
The planning system; and
The planning system stop updating user timeline by new Ads.

Figure 10A:
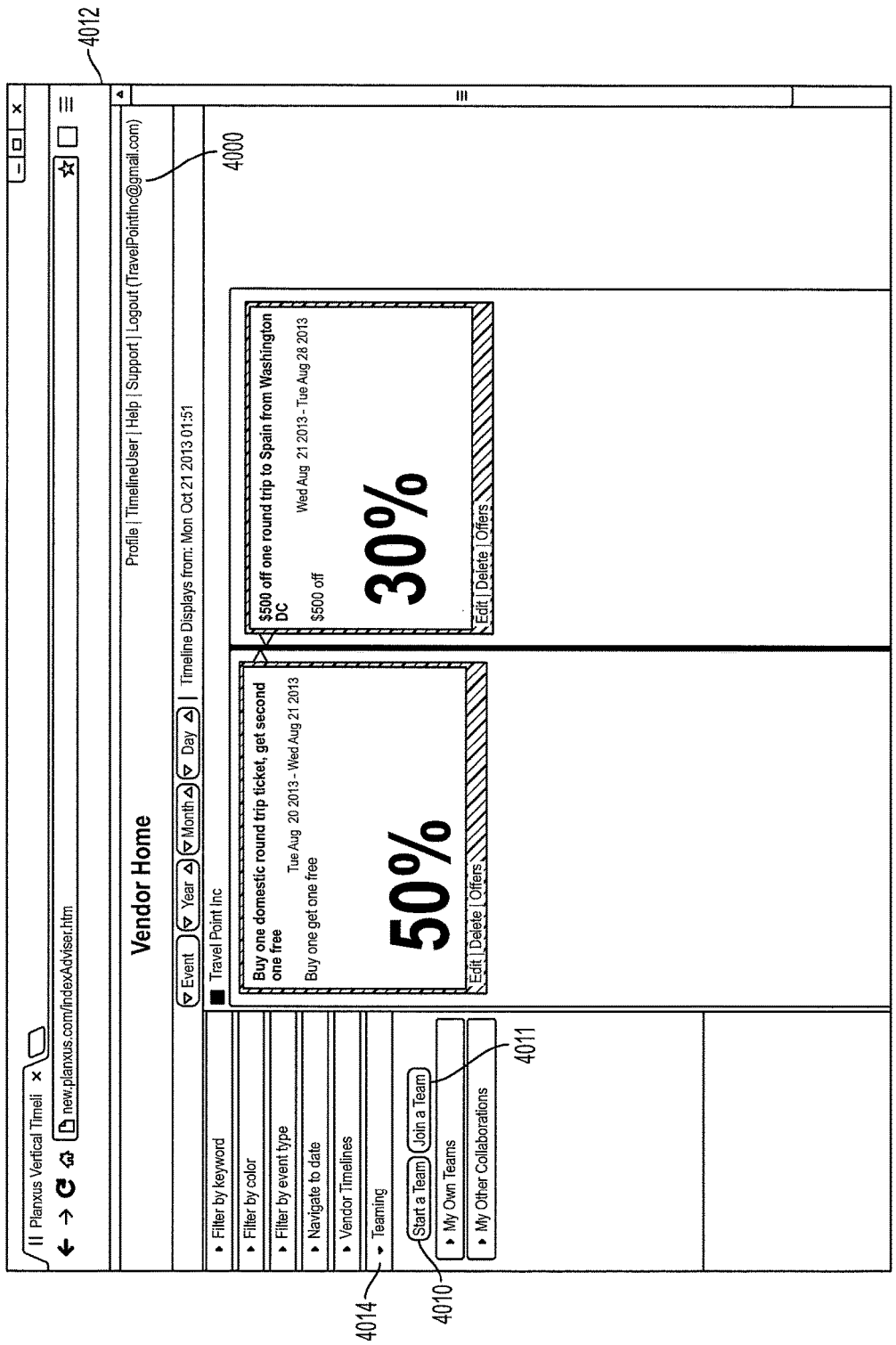
FIG. 10AA depicts an exemplary interface which may be used by vendors and team vendors.
Figure 10A:
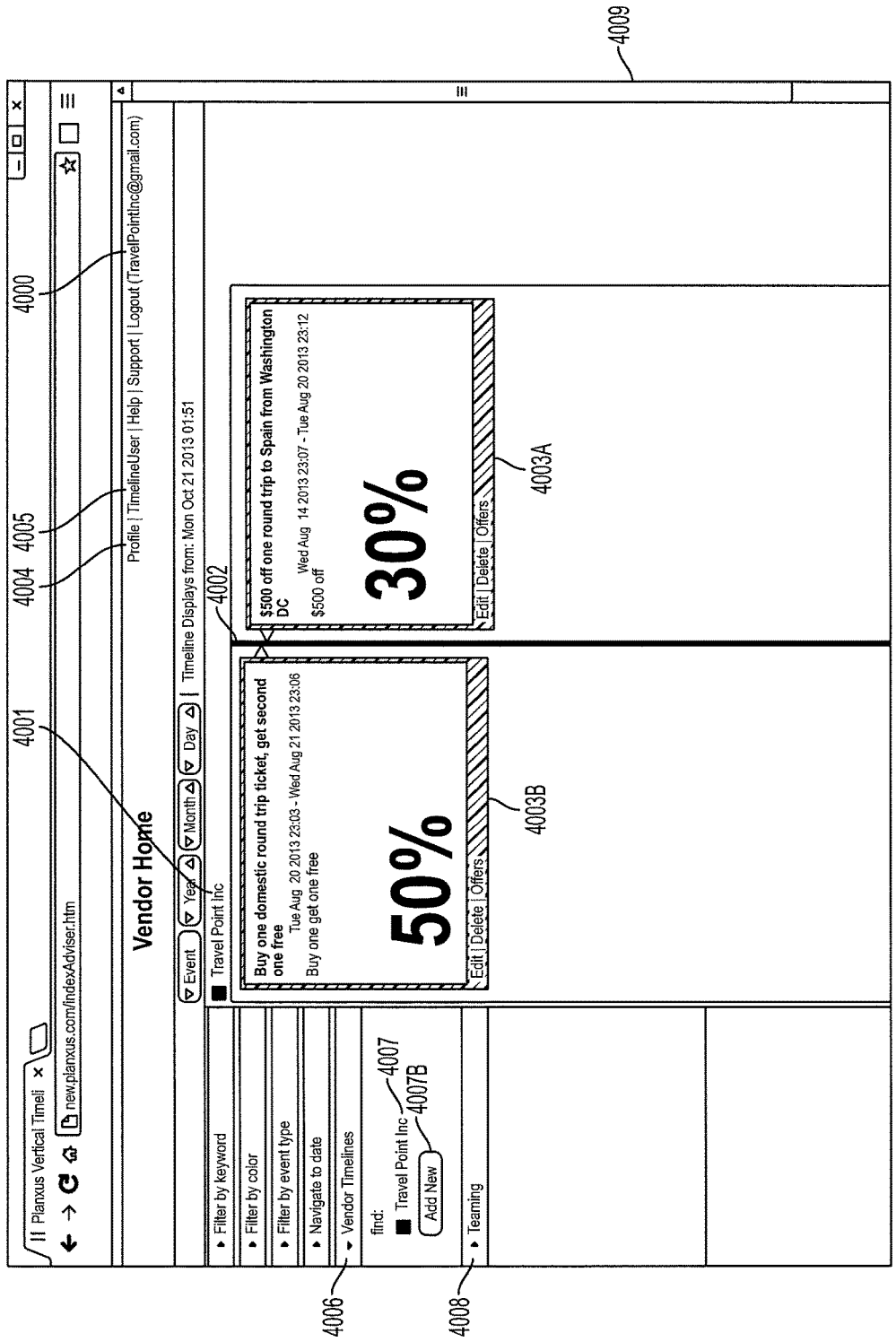

FIGS. 10AA-10R depict exemplary interfaces used for a teaming functionality, including, for example, creating a team vendor and associated features and functionalities.

The use of the term "vendor" includes both a "Single vendor" and "Team-lead vendor," as discussed in more detail herein. Generally, a single vendor may include a vendor utilizing systems and methods for a single entity. A vendor, however, may also include teams of vendors. Those teams of vendors are led by one vendor, referred to as a team-lead vendor, as discussed in more detail herein. The following description relates to an exemplary implementation of a team-lead vendor system and method. Again, a vendor may be a type that is compensated and/or paid or not compensated and/or paid.

Referring to FIG. 10AA, a vendor home screen is shown. The vendor home, generally, may include a profile 4004 for the vendor, a timeline user link 4005 to the vendor's own timeline user interface and a user identification 4000, which can be a userid, and can be represented by an e-mail address, for example. The user may be a vendor and/or a timeline user. As shown, the vendor home may include a vendor timeline option 4006 and a teaming option 4008.

The vendor user is "Travel Point Inc" and has a user identified at 4000 of TravelPointInc@gmai.com. This vendor user may want to create a "team vendor" or team-lead vendor. The team can be identified by the team vendor and may be called "Travel Lead Team," for example, as discussed in more detail with reference to FIG. 10B and hereafter.

The vendor, however, also may create its own vendor timelines 4006. As shown in FIG. 10AA, the vendor timeline(s) are shown generally at 4007. The vendor can create entries, events and/or group of events on its own regular timeline, e.g., "Travel Point Inc" timeline 4002. Accessing through Travel Point Inc 4007, the vendor can display its timeline as shown under the Travel Point Inc open header 4001 to display its timeline 4002. For example, displayed Travel Point Inc timeline 4002, included two entries, 4003A and 4003B. As shown the Travel Point Inc timeline 4002 includes "$500 off round trip to Spain from Washington D.C." 4003A and "Buy one domestic round trip ticket, get second one free" at 4003B.

The following will provide an exemplary method of utilizing this vendor functionality. In screen 4009, a "Vendor user" with userid TravelPointInc@gmail.com, as user identification 4000, has signed in. Clicking on the "Vendor Timeline" 4006 on the left menu allows all of the Vendor's timeline(s) of a "Vendor user" to be displayed shown generally at 4007. The vendor user "Travel Point Inc." has only one timeline referenced at 4002 and its name is "Travel Point Inc." 4001.

This "Vendor User" has two events in its timeline that are offering 50% coupon 4003B and 30% coupon 4003A on certain dates/time. This "Vendor User" at this point is a "Single vendor". If "Vendor User" clicks on "Add New" button labeled 4007B, a new "Vendor Timeline" can be created.

If "Vendor user" clicks on profile link 4004, "Vendor user" could change vendor's name, title, logo and vendor service scope, type, etc. If "Vendor user" Clicks on "TimeLineUser" link 4005, "Vendor user" could switch to its own "Timeline user" account. (Note—Every "Vendor user" has a "Timeline User" account.)

If "Vendor User" clicks on Teaming left menu 4008, the vendor user can view the teams for which the vendor user serves as the "Team-lead Vendor" and teams the vendor user is a "Team Member" of, as shown, for example as "My Own Teams" in FIG. 10A.

Referring to FIG. 10A, a vendor home display is shown with reference to teaming with other vendors that may share common interests and/or users, such as car rental, hotel and department store for vendor "Travel Point Inc" (userid TravelPointInc@gmail.com). As part of the vendor home, the vendor can have access to the tools to create teams, as shown, at teaming 4014 with Start a Team 4010 and Join a Team 4011 functionalities. This teaming can be referred to as happening on the fly and there is no need to create a dedicated website.

As shown in an exemplary display, in screen 4012, in order to create a "Team Timeline", "Vendor User" with userid TravelPointInc@gmail.com as the user identification 4000, the vendor clicks on left menu "Teaming" 4014 and clicks on "Start a Team" 4010. If a vendor user also wants to be a member of a team "Vendor user" could click on button "Join a team" 4011 and join a team as member.

Figure 10B:
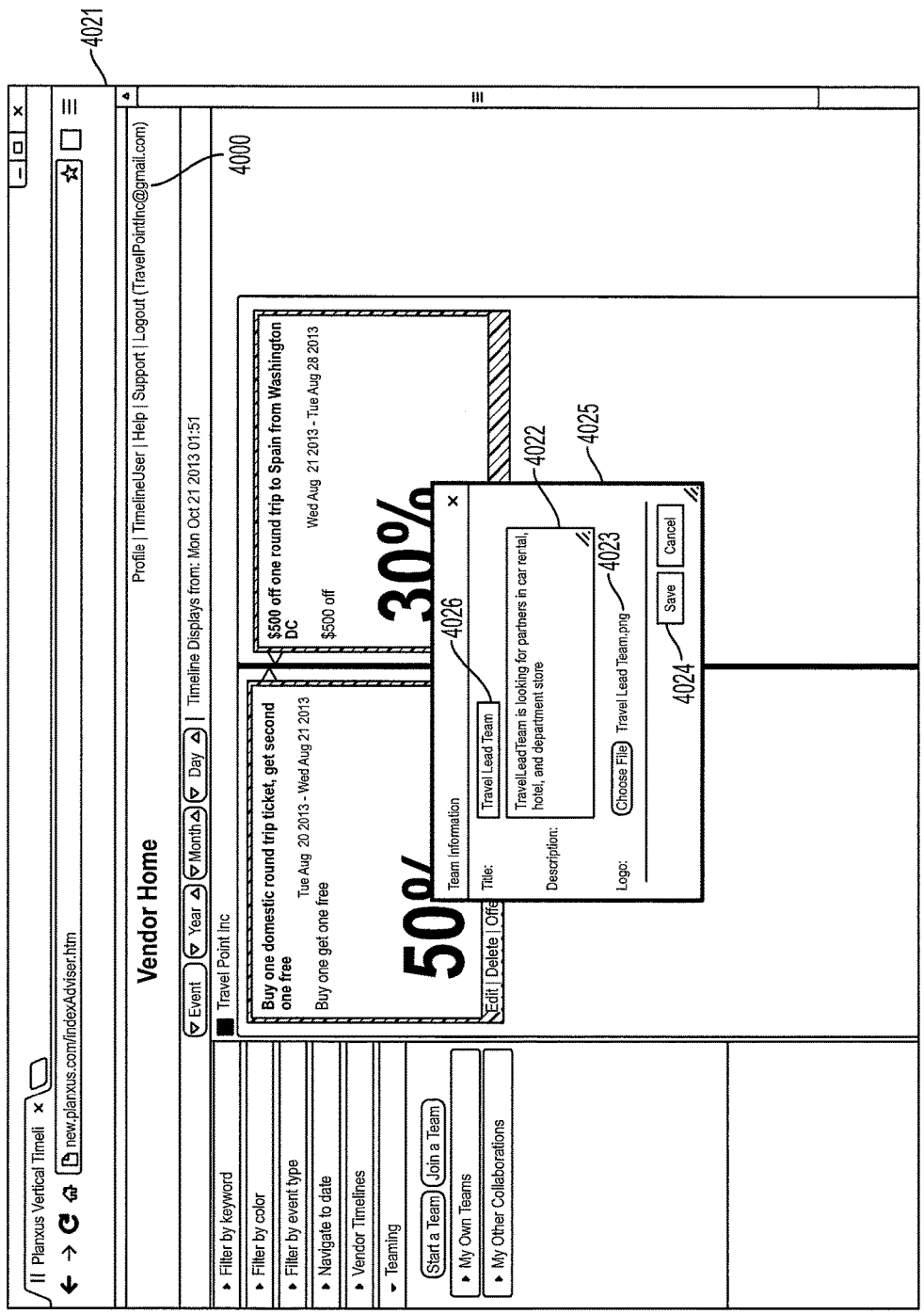
FIG. 10B depicts an exemplary interface which may be used by vendors and team vendors.

Referring to FIG. 10B, the vendor home screen 4021 show the user display after the vendor user has selected "Start a Team" 4010, a team information entry screen 4025 can display and allow for naming of the team, for example, "Travel Lead Team", among other things.

As shown, the "Vendor User" with userid "TravelPointInc@gmail.com as the user identification 4000 may name the team "Travel Lead Team" in the title field 4026. "Vendor User" may enter the description 4022 of the team vendor's mission, purpose and/or goals and may choose a logo 4023. After "Vendor User" is done entering "Team Vendor" information, user clicks on save button 4024 (or cancel to abort) and "Travel Lead Team" can be created in the system and can be displayed under the list of timelines belonging to "Vendor User", "Travel Point Inc" as discussed in more detail and shown in FIG. 10D at 4042.

Figure 10C:
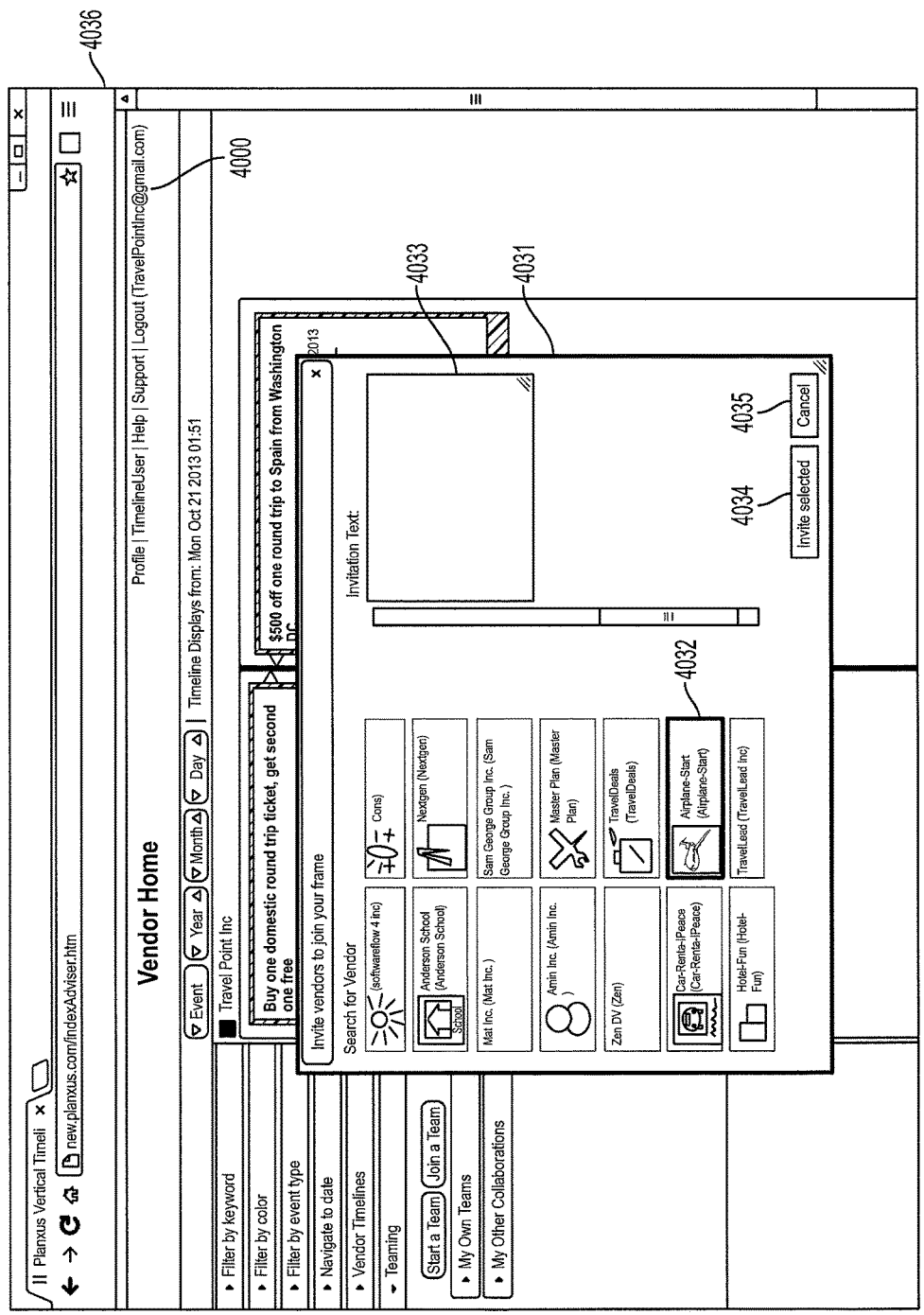
FIG. 10C depicts an exemplary interface which may be used by vendors and team vendors.

Referring to FIG. 10C, the vendor may invite vendors to join the vendor team, such as Airline-Star. (The Travel Lead Team invite option is displayed at 4047 in FIG. 10D and is discussed with reference to that figure.) Continuing to refer to FIG. 10C, however, as displayed in screen 4036, the "invite vendors to join your team" display is shown with a search for vendor field and pre-populated vendors. The "Vendor User" with userid "TravelPointInc@gmail.com" as the user identification 4000 serving as a team lead vendor, may invite other "Vendor Users", such as "Airline-Star" 4032 to join the team the vendor created called Travel Team Lead, for example. In pop-up screen 4031 the team lead vendor user can scroll up and down to choose the "Vendor User" the team lead vendor user would like to be in his team as member through a selection option 4034. In the field called "Invitation Text" 4033, the team lead vendor user enters the invitation text at 4033 so that "Airline-Star," for example, as a prospective team member receives the invitation and reads the invitation and can accept or reject the offer. Finally "Vendor user", "Travel Point Inc.", serving as team lead vendor, clicks on "Invite selected" button 4034. If "Vendor User", clicks on Cancel button 4035, he cancels out of this page and doesn't choose any member for his team at this time.

Figure 10D:
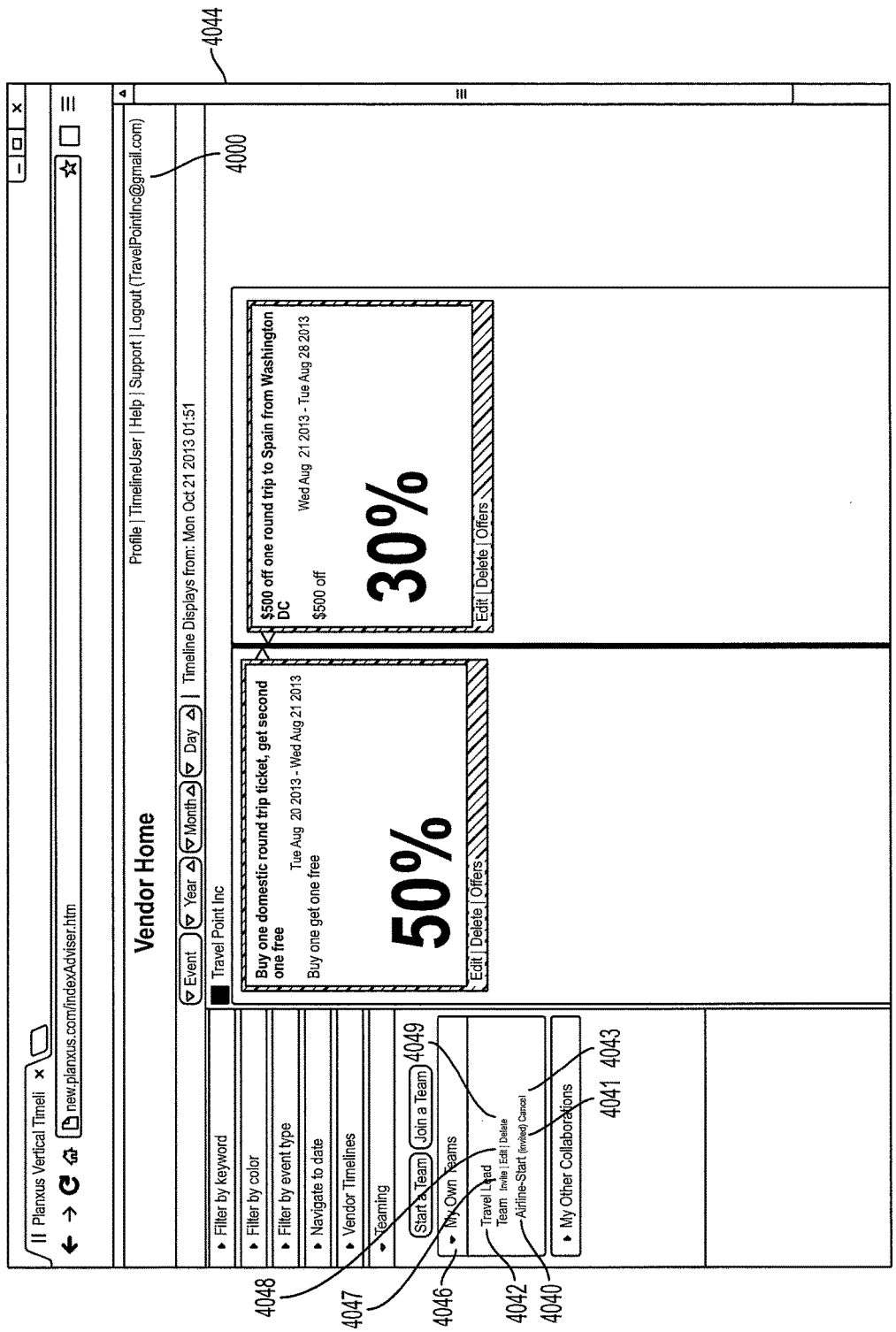
FIG. 10D depicts an exemplary interface which may be used by vendors and team vendors.
Figure 10D:
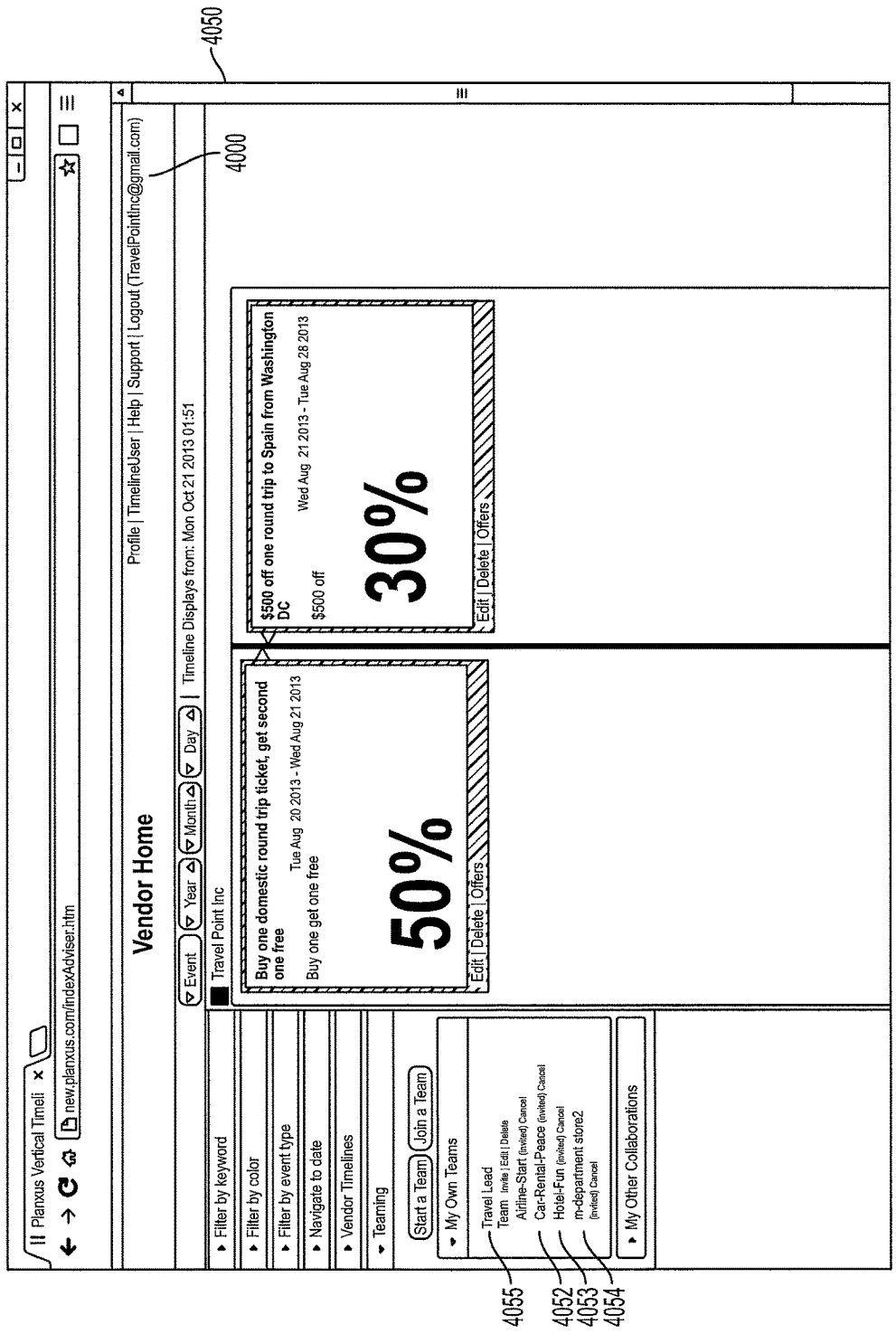

Referring to FIG. 10D, an invited vendor is displayed as part of the Travel Lead Team with designated status, such as invited, accepted, or rejected. As shown, the invited vendor, Airline-Start, may be shown as invited but not accepted. A team lead vendor may invite multiple vendors to join the team, e.g. a hotel, a travel company, or a department store. For example, a vendor may click on an "invite" hyperlink next to "Travel Lead Team" and choose another vendor such as a "m-department store" (not shown.) The vendors business may have nothing to do with travel, but can be used along with hotel and car rental as a coupon to get a gift during the travel.

Screen 4044 of FIG. 10D shows "Vendor User" with userid "TravelPointInc@gmail.com" as the user identification 4000 having clicked on left menu "My Own Team" 4046 and expands it as illustrated. "Vendor User", "Travel Point Inc.", will see a list of the team(s) that the team lead vendor is the team-lead of As shown, under My Own Teams 4046, a team with name of "Travel Lead Team" is created and has one "Vendor user" member Airline-Start 4040. As shown in the invited status. Next to team "Travel Lead Team" 4042 there are three (3) hyperlinks "Invite" 4047, "Edit" 4048 and "Delete" 4049. If the team lead vendor/vendor use clicks on "Invite" 4047, team lead vendor user can "Invite" more "Vendor Users" (e.g., as shown in FIG. 10C) as member(s) to the team lead vendor team. If the team lead vendor user clicks on "Edit" 4048, it could change detail about the "Team vendor" such as title, logo, etc. If user clicks on "Delete" 4049 it could delete the "Team timeline".

Next to Airline-Start, there are two hyperlinks, "Invited" 4041 which is disabled at the moment and "Cancel" 4043 that is clickable. Since "Vendor User", "Travel Point Inc." already invited "Airline-Start", it shows "Invited" 4041. If the team lead vendor decides to cancel the invitation, it can click on the "Cancel" 4043 hyperlink and revoke the invitation.

FIG. 10DD shows screen 4050, for "Vendor User" with userid "TravelPointInc@gmail.com" as the user identification 4000. The team lead vendor can repeats all the previous discussed steps and invite more "Vendor user(s)" to the "Vendor Timeline", "Travel Lead Team" 4055. The team lead vendor has chosen three (3) more "Vendor users" as team members to join the Travel Lead Team. The team lead vendor has invited "Car-Rental-Peace" 4052, "Hotel-Fun" 4053 and "m-department store2" 4054.

As can be seen the nature of "m-department store" 4054 ostensibly has nothing to do with airfare, car rental and hotel business. However this is to demonstrate that totally disjoined businesses could team up dynamically, without a need to create a static website such as TRAVELOCITY to accommodate their short term or long term teaming requirement. Each invited Vendor User can conduct business and offer event/coupons/advise to all the "Timeline User(s)" that subscribe to their "Team-lead Vendor". The "Team timeline" creates a wrapper around the entire team members that when "Timeline user" tries to subscribe to a "Team vendor" it acts like "Single vendor" timeline and it will be seamless to "Timeline user." Preferably, the team can be displayed to a timeline user as if it were a single vendor, when, indeed, it is a collection of one or more vendors represented as one vendor through the team lead vendor.

Figure 10E:
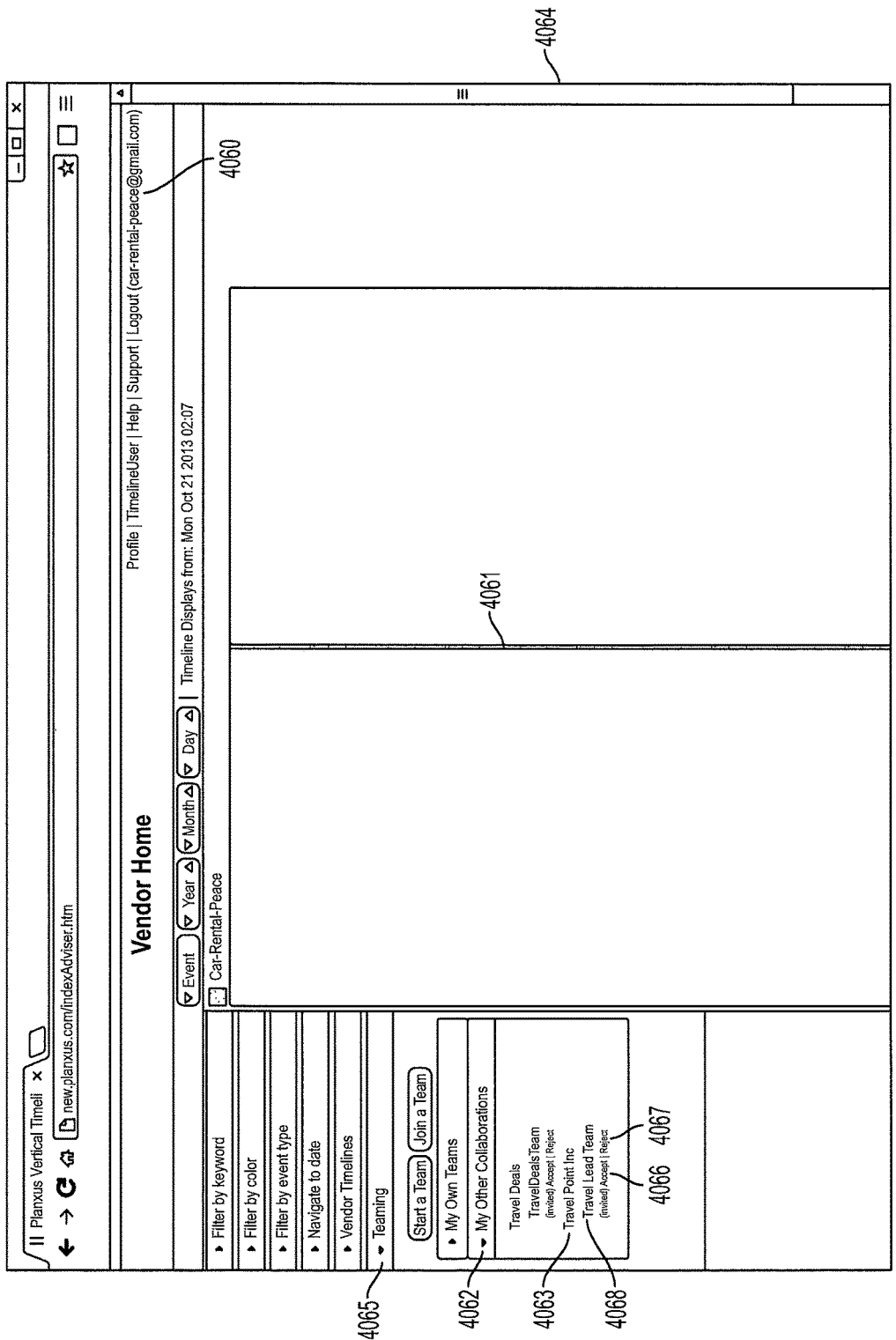
FIG. 10E depicts an exemplary interface which may be used by vendors and team vendors.

Referring to FIG. 10E, a vendor home is shown, however, this is the vendor home of "car-rental-peace@gmail.com" as the user identification 4060. The vendor user has a Teaming option 4065, which has not entries in this display. If user "car-rental-peace@gmail.com" logs in and clicks on "My Other Collaborations", 4062 that vendor user can see the display "Travel Point Inc." 4063 as the team lead vendor and its team "Travel Lead team" 4068. The vendor user recipient of the invitation has a choice to "Accept" 4066 or "Reject" 4067 the invitation. The user may be asked to confirm the selection of accepting or rejection via a popup dialogue box.

Figure 10F:
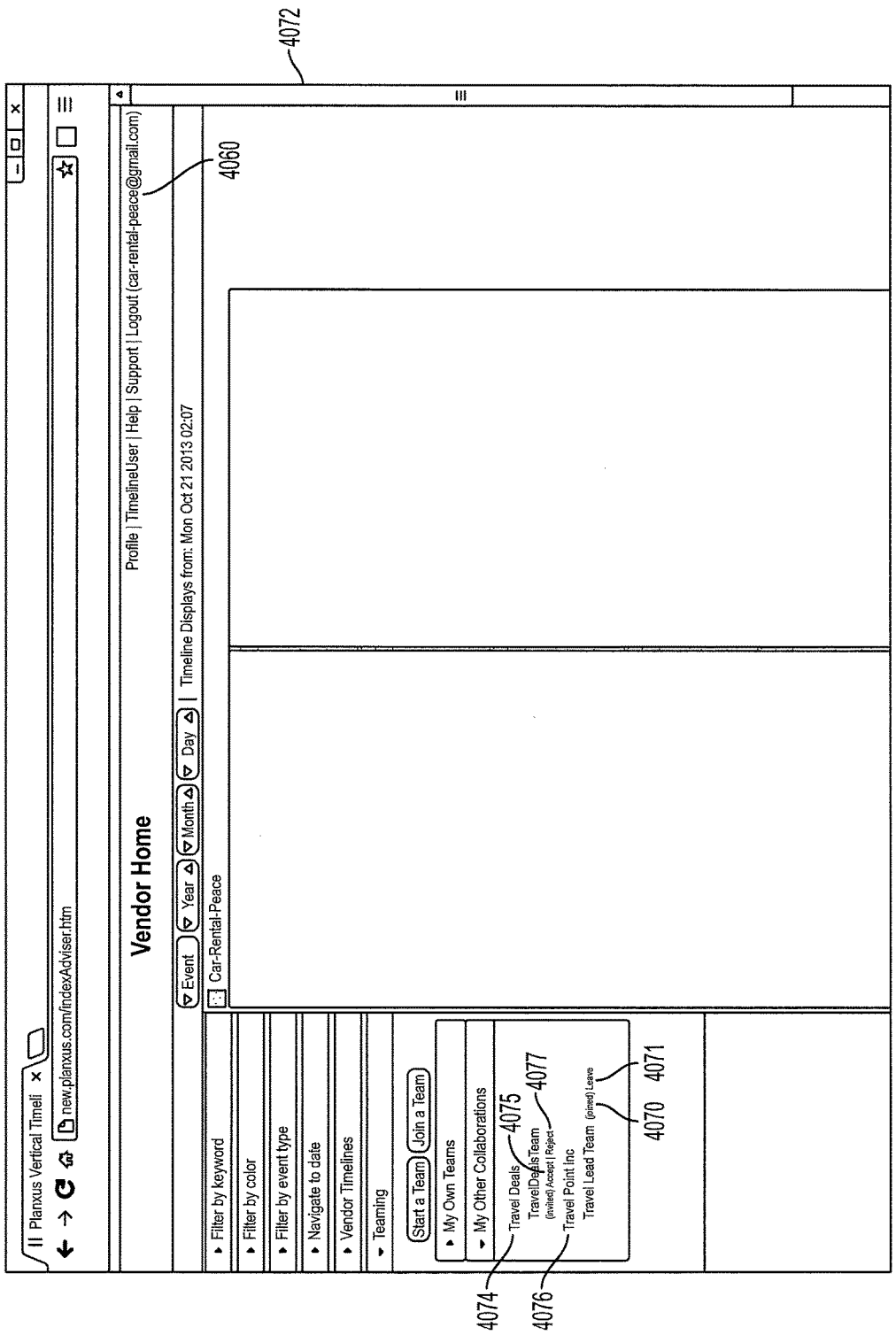
FIG. 10F depicts an exemplary interface which may be used by vendors and team vendors.

Referring to FIG. 10F, "Vendor user", "car-rental-peace" screen display 4072 has accepted 4075 (not rejected 4077) the invitation from "Team-lead vendor", "Travel Point Inc." 4076. The "Travel Lead Team (invited) Accept | Reject" changes to "Travel Lead Team (joined) Leave" 4070 (joined), 4071 (leave). The hyperlink "Joined" 4070 is not active because "Vendor User" has already joined the team and the hyperlink "Leave" 4071 is clickable because the vendor user can leave the team anytime. As it is shown "Vendor user" "car-rental-peace@gmail.com" as the user identification 4060 hasn't accepted the invitation from another "Team-lead Vendor" "TravelDeals" 4074 as the status still says "Accept" 4075, and "Reject" 4077. Notice that "TravelDeals" may be the competition for "Travel Point Inc." 4076 or "Single Vendor", "car-rental-peace" can be the team member of two different "Team-lead vendor" with different terms and conditions.

Figure 10G:
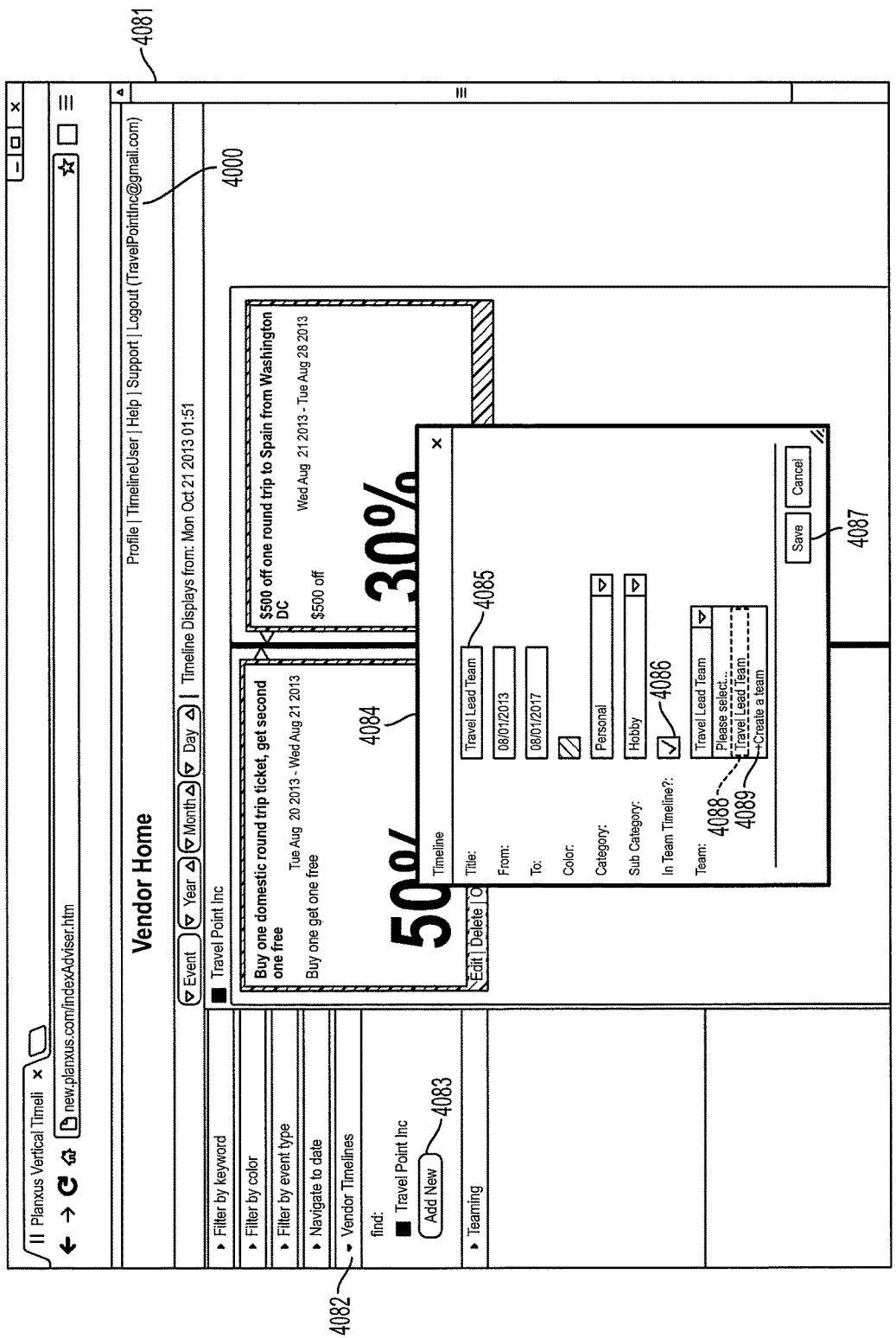
FIG. 10G depicts an exemplary interface which may be used by vendors and team vendors.

Referring to FIG. 10G, at this point "Vendor User", "Travel Point Inc." 4080, created a "Vendor team" called "Travel Lead Team". In screen 4081 "Vendor User", "Travel Point Inc." 4080 can create a "Vendor timeline" based on a "Team" that was created earlier called "Travel Lead Team". To do this, the "Vendor User" clicks on the left menu "Vendor Timeline" 4082 and expands it, then clicks on "Add New" button 4083 in order to create a "Team Timeline". In pop-up screen 4084 "Vendor user" enters the "Team timeline" "Title" 4085, "From" date/time, "To" date/time, "Color", "Category" of "Team timeline", "Sub Category" of "Team timeline", and clicks on the check box "Is Team Timeline?" 4087 and chooses the "Travel Lead Team" 4089 from the dropdown. This dropdown shows the list of "Teams" created before. In this drop down "Vendor User" could also create a new "Team" by clicking on "+Create a team" 4089 and the same dialog as FIG. 10B will pop up and will allow "Vendor user" to create a new "Team" in order to associate it to a "Team-lead timeline". Finally "Vendor user" clicks on "Save" button 4087.

Figure 10H:
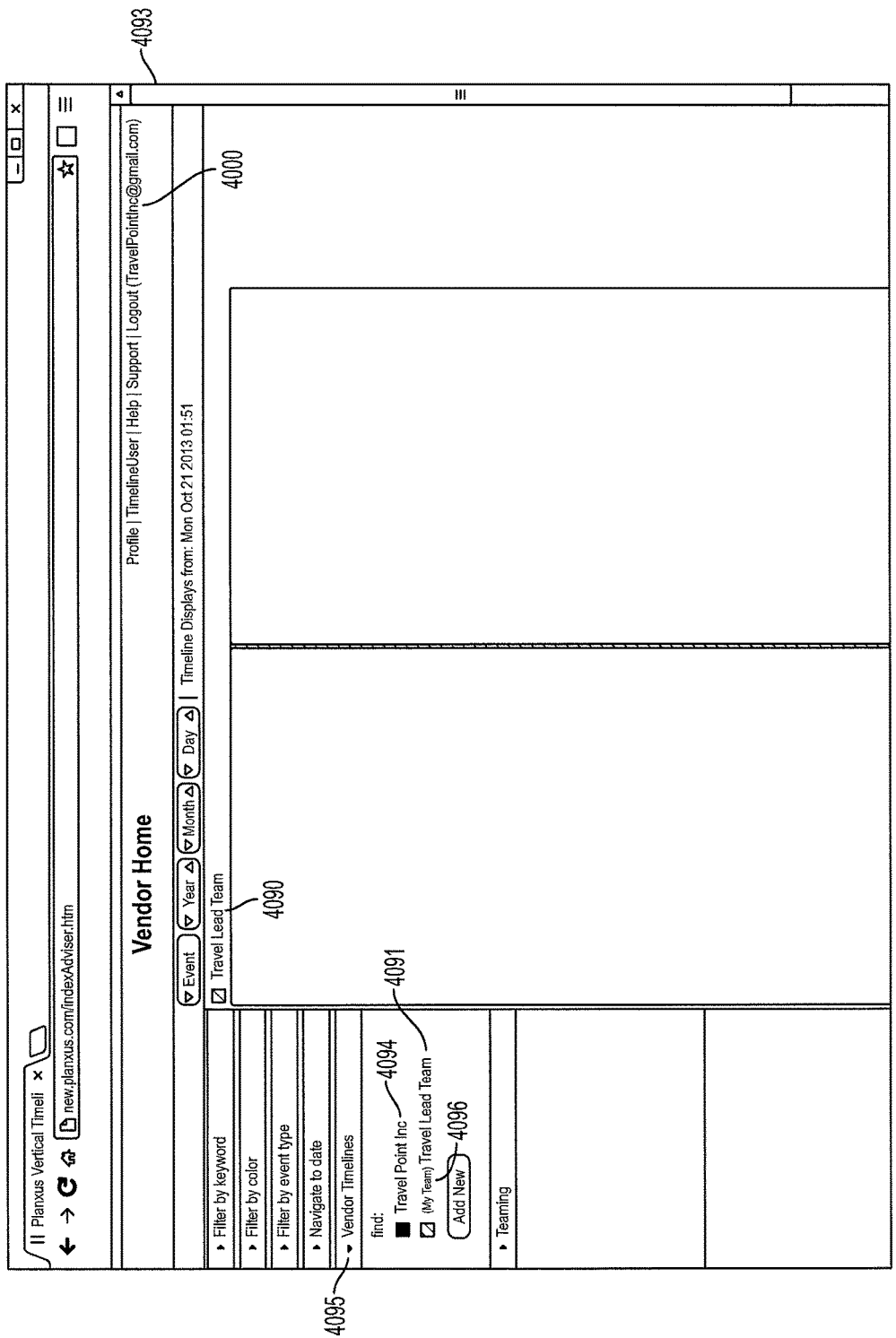
FIG. 10H depicts an exemplary interface which may be used by vendors and team vendors.

Referring to FIG. 10H, in screen 4093, if "Vendor User", "Travel Point Inc." 4092 clicks on left menu, "Vendor Timeline" 4095 and expands it, a list of "Vendor User's" timeline can be displayed. The new "Team timeline", "Travel Lead Team" 4091 is also added next to "Vendor user" regular "Vendor Timeline", "Travel Point Inc." 4094, however "Team timeline" has a prefix of (My Team) 4096.

Figure 10I:
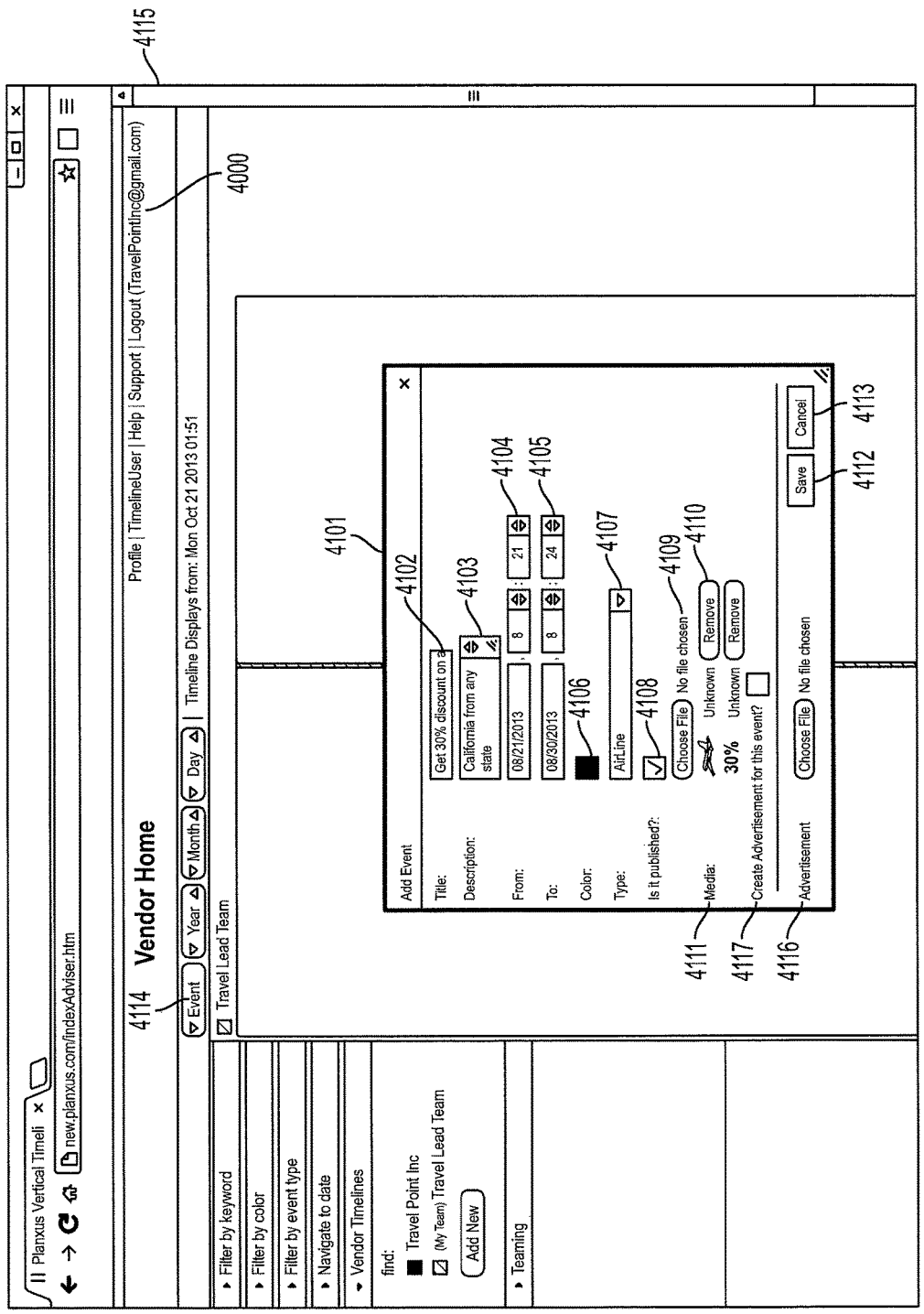
FIG. 10I depicts an exemplary interface which may be used by vendors and team vendors.
Figure 10I:
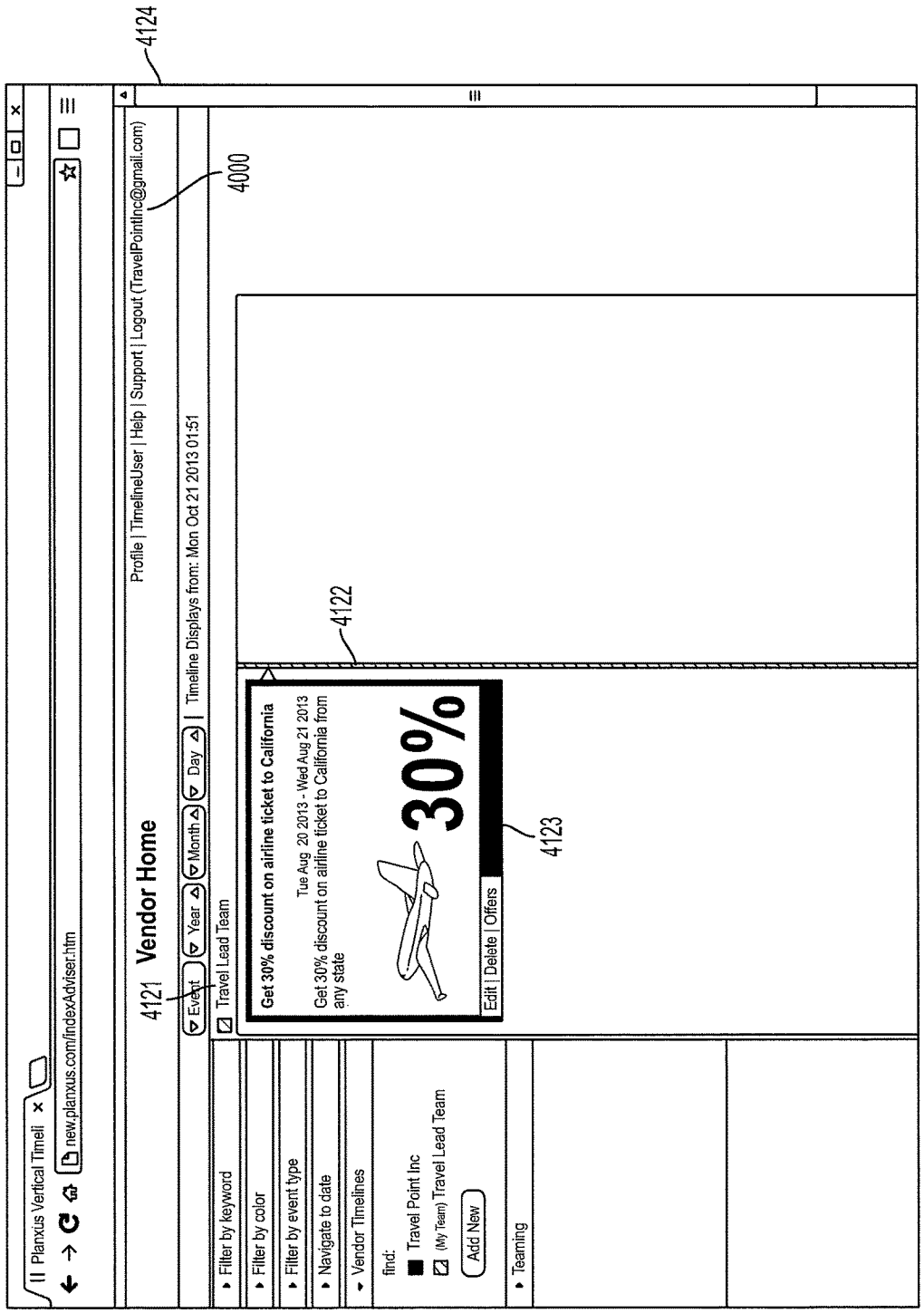

Referring to FIG. 10I, user "TravelPointInc@gmail.com" can create an event in "Team Timeline." As displayed in screen 4115, "Vendor user", "Travel Point Inc.", 4000, can start creating "Vendor events" in "Team Timeline". Whether "Vendor User" creates events in "Team Timeline" or regular "Single Vendor Timeline", creation of events is the same process. In screen 4115, "Vendor User" clicks on button "Event" 4114, screen 4101 pops up. "Vendor User" enters "Title" of the event 4102, "Description" of the event 4103, "From" date/time of the event 4104, "To" date/time of the event 4105, the choice of the "Color" for "Vendor User" of the event 4106, "Type" of the event from the dropdown 4107, "Is it published" checkbox 4108 in order to force publishing the event in case the checkbox is checked, "Media" 4111 that a file associated to the event could be browsed by clicking on "Choose File" and uploaded to the event. The Media could be pictures, logo, coupons, etc. "Vendor User" could remove the Media by clicking on "Remove" button 4110. The "Vendor User", "Travel Point Inc." could decide if this event needs to be pop-up ads and if so he will click the checkbox "Create Advertisement for the event" and he needs to provide an "Advertisement" 4116 by choosing a file. This file can be any type of media (image/video/etc.). This media will be displayed as pop-up ads next to any "Timeline User" screen that has subscribed to "Travel Point Inc." Finally "Vendor User", "Travel Point Inc." can click on the "Save" button 4112 and save the event or could click on "Cancel" button 4113 and cancel the "Team Timeline Event".

Referring to FIG. 10II, in screen 4124, "Vendor User", "Travel Point Inc.", 4120, can view its newly created "Team Timeline Event" 4123, in "Team Timeline", "Travel Lead Team", 4121 and its "Team-lead timeline" 4122.

Figure 10J:
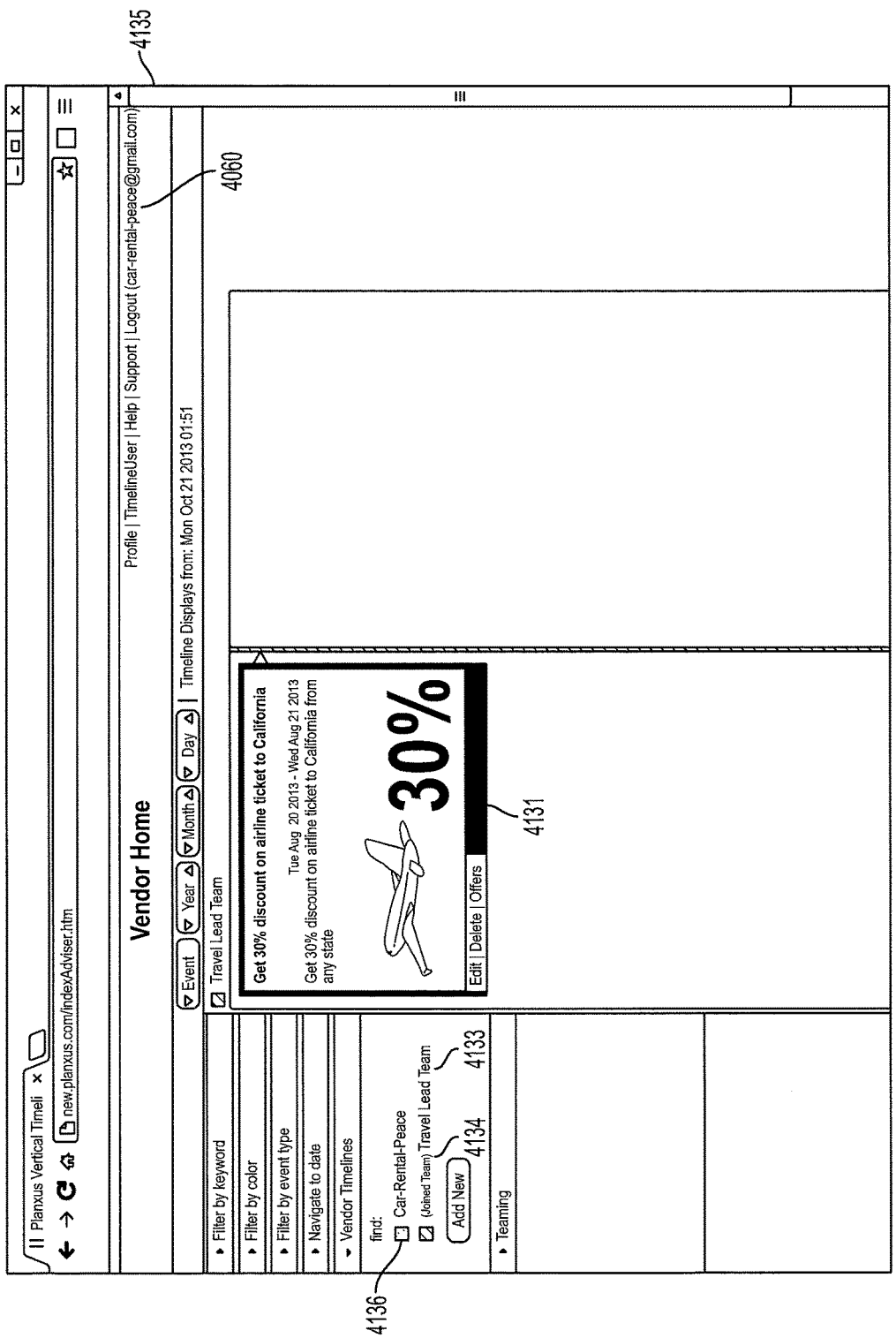
FIG. 10J depicts an exemplary interface which may be used by vendors and team vendors.
Figure 10J:
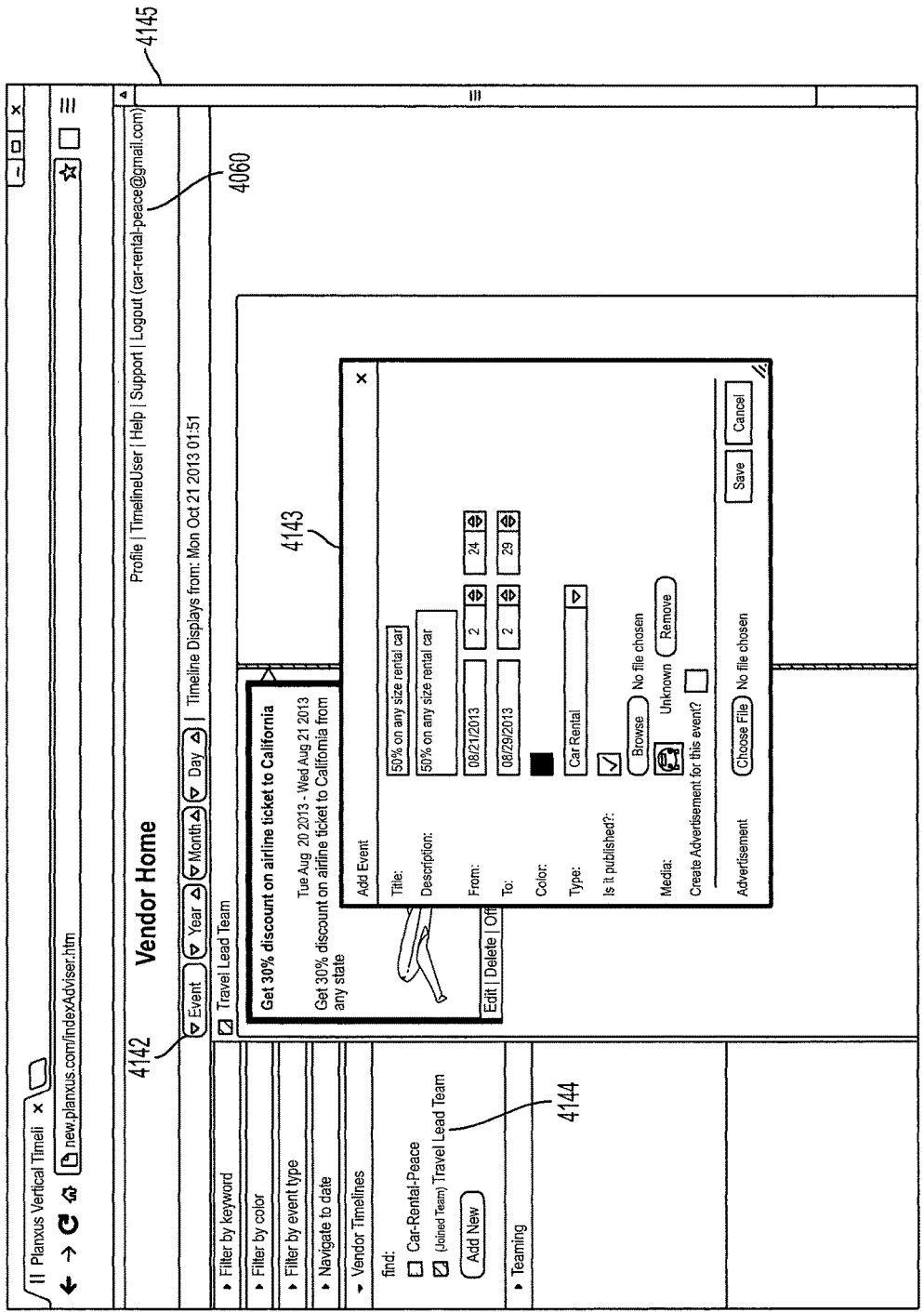

Referring to FIG. 10J, in screen 4135, if "Vendor user," car-rental-peace@gmail.com as the user identification 4060 logs into the system and refreshes its screen and displays its list of "Vendor Timeline", the vendor user will find the "Team Timeline", "Travel Lead Team", 4133 and the newly created event "Get 30% discount . . . " 4131 displayed in the timeline. This event was created by "Team-lead vendor", "Travel Point Inc." Needless to say that "Car-Rental-Peace" is also a "Single Vendor" with a "Single Vendor Timeline" that is called "Car-Rental-Peace" 4136, "Car-Rental-Peace" is also "Team Member Vendor" 4133 to "Travel Lead Team". The hyperlink "Joined Team" 4134 is dimmed and shows "Vendor User", "Car-Rental-peace" is part of a "Vendor team", "Travel Lead Team".

Referring to FIG. 10JJ, in screen 4145, "Vendor user", "Car-Rental-Peace" 4140 could create "Vendor Events" in "Team Timeline", "Travel Lead Team" 4144 by clicking on "Event" button, 4142. The event creation dialog 4143 will pop-up, and "Vendor User", "Car-Rental-Peace" could create the event as explained in dialog 4101 in FIG. 10I. Screen 4145 shows that "Team-Member Vendor" can create events in the same timeline as "Team-Lead Vendor". Event creation detail is explained in FIG. 10I.

Figure 10K:
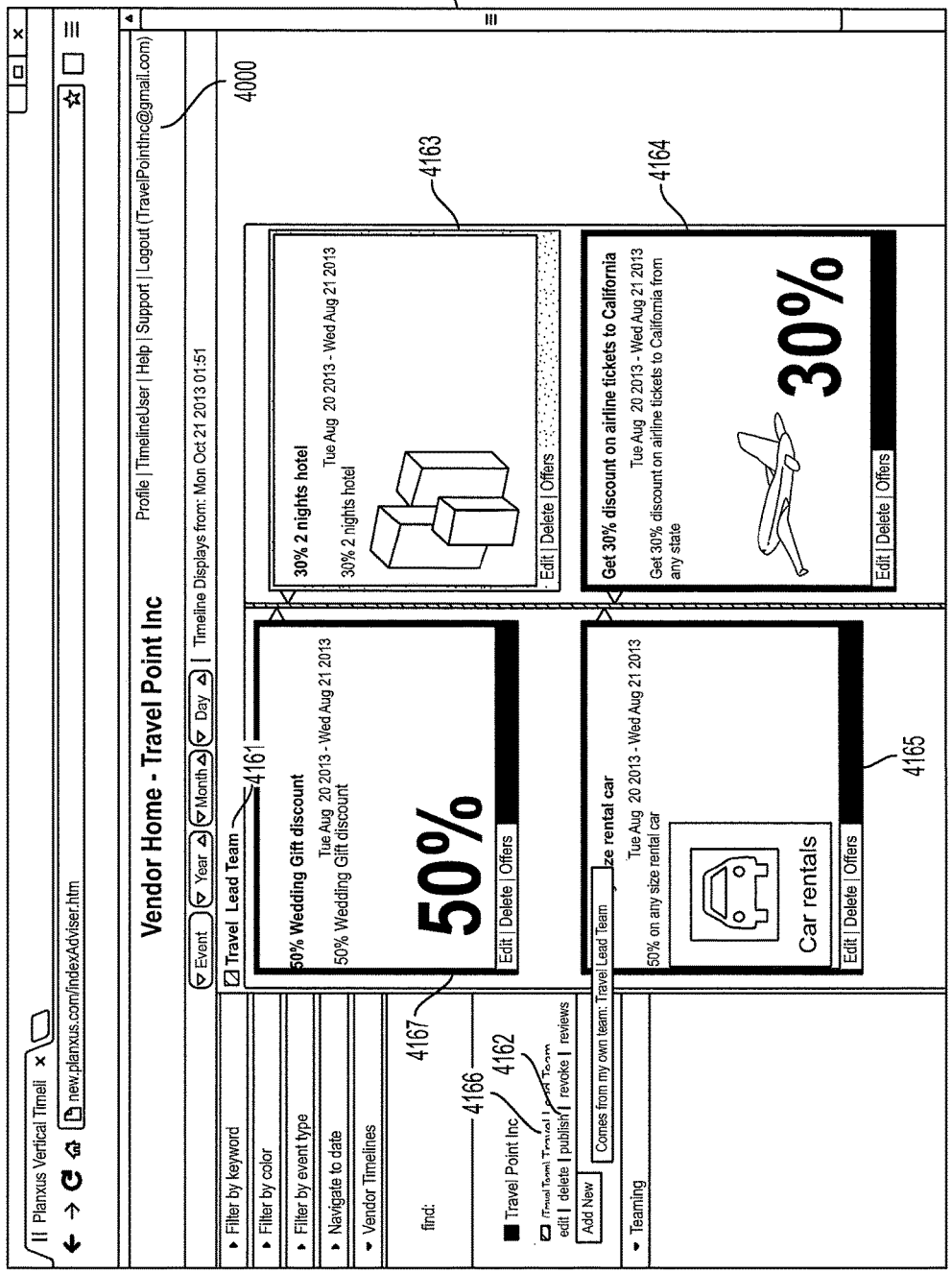
FIG. 10K depicts an exemplary interface which may be used by vendors and team vendors.

Referring to FIG. 10K, a display shows a timeline in which multiple team members have added events, by way of the team lead vendor. User travelpointinc@gmail.com who started the team "Travel lead Team" may publish the timeline that is created by his team members. The team lead vendor can delete and remove events offered by its team members and eventually publish them on the team timeline. In screen 4146, it is shows the "Team Timeline" populated with events added by team-member vendors on the team and published 4162 by the "Travel Lead Team." The event "Get 30% discount on airline . . . " 4164 was created by "Airline- Start", the event "50% on any size rental car" 4165 was created by "Car-Rental-Peace", the event "30% 2 nights hotel" 4163 was created by "Hotel-fun", the event "50% wedding gift discount" 4167 was created by "m-department store 2". However, only "Team-lead Vendor", "Travel Point Inc." 4160, can delete other "Team-member vendor" events. Finally after "Team-lead Vendor", "Travel Point Inc." is satisfied with the "Team timeline" as a "Team-lead Vendor" 4166 can publish 4162 the "Team Timeline." After publishing, when a "Timeline User" logs in to the system, the timeline user can see this new "Vendor" when they click on "Find a Vendor". It is important to mention that for "Timeline User", "Single Vendor" or "Team Vendor" is the same and subscribing to both can be done in same way as described in FIG. 10L, subscribing to a "Team Vendor" or FIG. 11C, subscribing to a "Single Vendor"

Now if any consumer user such as Maryjones@gmail.com logs in, that timeline user/consumer will see displayed "Travel Lead Team" as a timeline vendor that the timeline user could subscribe to it. Notably the timeline user could be a consumer/timeline user and/or a single vendor accessing through the vendor's timeline user interface. At this point it is invisible to the Mary Jones that four (4) companies (vendors) collaborated. The timeline user sees only the team lead vendor interface.

Figure 10L:
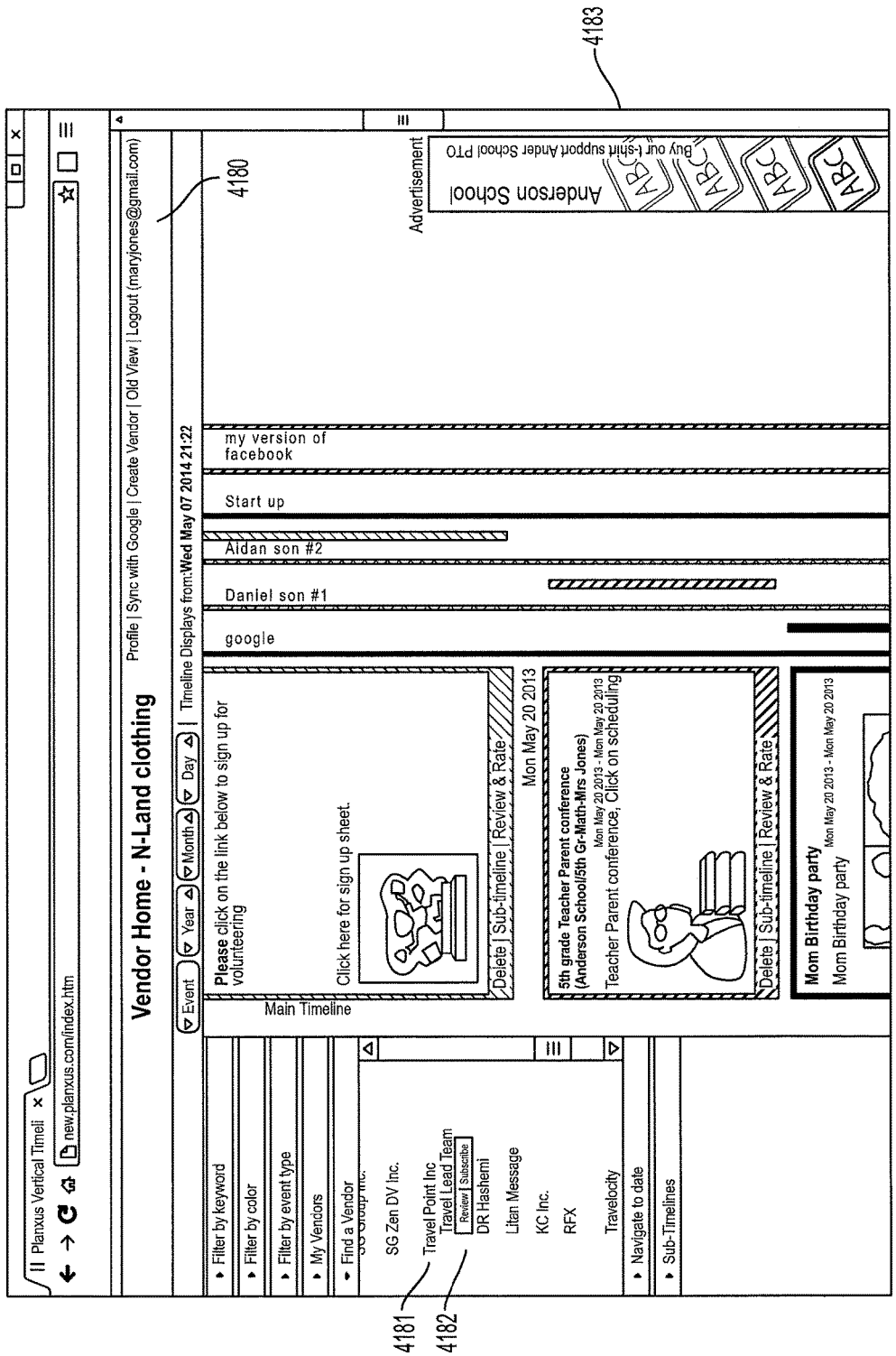
FIG. 10L depicts an exemplary interface which may be used by vendors and team vendors.

Referring to FIG. 10L, a timeline user interface is shown. If any "Timeline User" logs in, such as Maryjones@gmail.com as user identification 4180, that timeline user can Find a Vendor and see, for example, "Travel Lead Team" as a timeline vendor that the timeline user can subscribe to and/or unsubscribe to. At this point it is invisible to the Mary Jones that vendor "Travel Lead Team" is a collaboration, for example, a collaboration of four (4) companies. In particular, in screen 4183, "Timeline User", Maryjones@gmail.com as user identification 4180 logged in. She clicks on left menu "Find a Vendor" 4181 and expands it. "Mary Jones" is looking for a "Vendor" to handle her Travel matters. She finds "Travel Point Inc." 4181 as an available Vendor in list of the system vendors. "Mary Jones" clicks on hyperlink "Subscribe"4182 and after steps in FIG. 10M-P "Travel Point Inc." will appear in the timeline user's list of "My vendors." By unsubscribing it will be removed from My Vendors and appear in Find a Vendor.

Figure 10M:
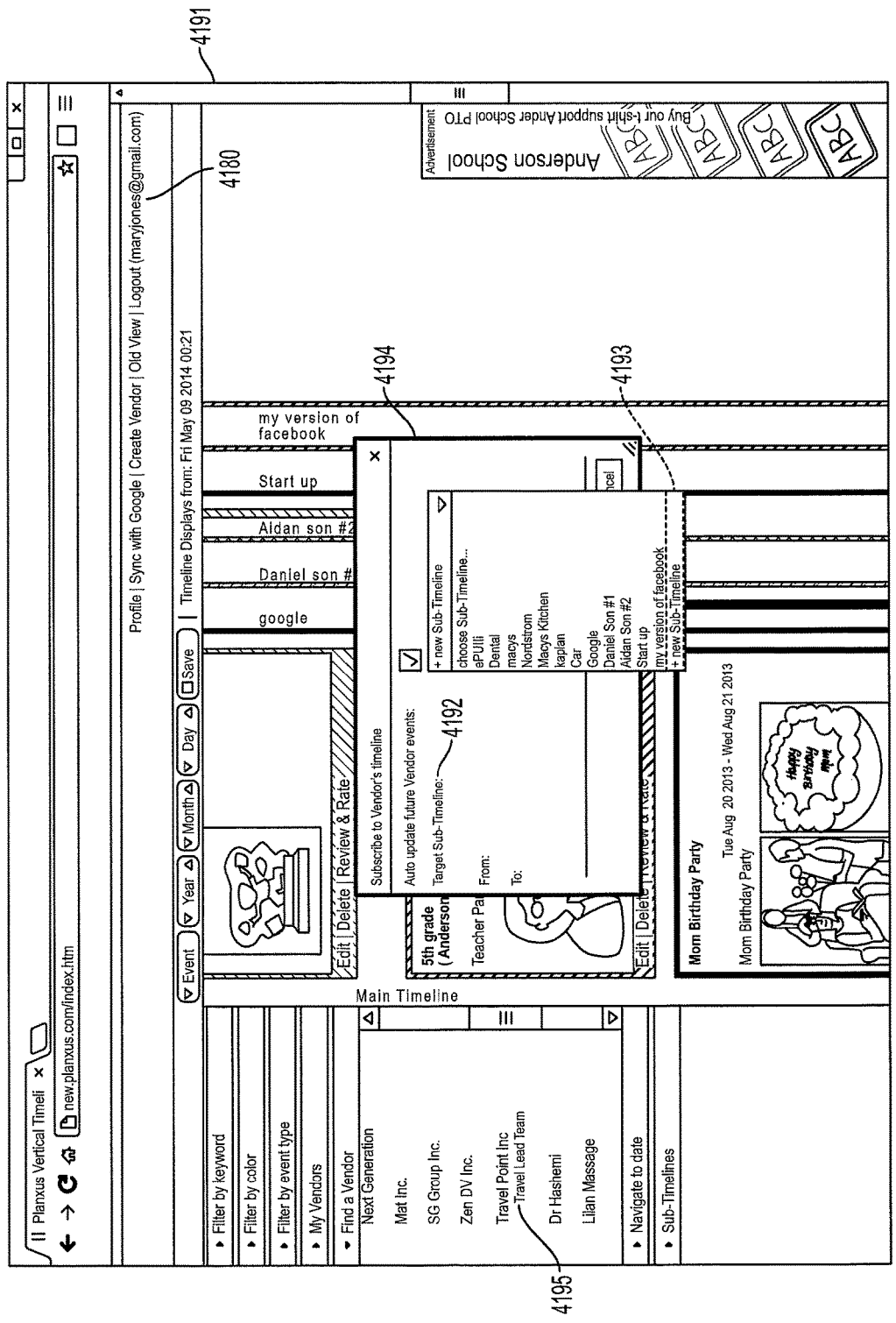
FIG. 10M depicts an exemplary interface which may be used by timeline users.

Referring to FIG. 10M, the timeline user display is shown. In screen 4191, as a continuation from FIG. 10L, the "Timeline User", Maryjones@gmail.com as user identification 4180 was trying to subscribe to "Travel Point Inc." 4195. A popup screen "Subscribe to Vendor's timeline" 4194 is displayed. "Mary Jones" has to choose an option for "Target Sub-Timeline" 4192 by either Choose an existing Sub-Timeline or create a new Sub-Timeline by clicking on "+New Sub-Timeline". She clicks on "+New Sub Timeline" 4193 and a new dialog pops up that allows her to create a new "Sub-Timeline" as displayed in FIG. 10N. Once the "Sub-Timeline" is created FIG. 10O explains the future steps.

Figure 10N:
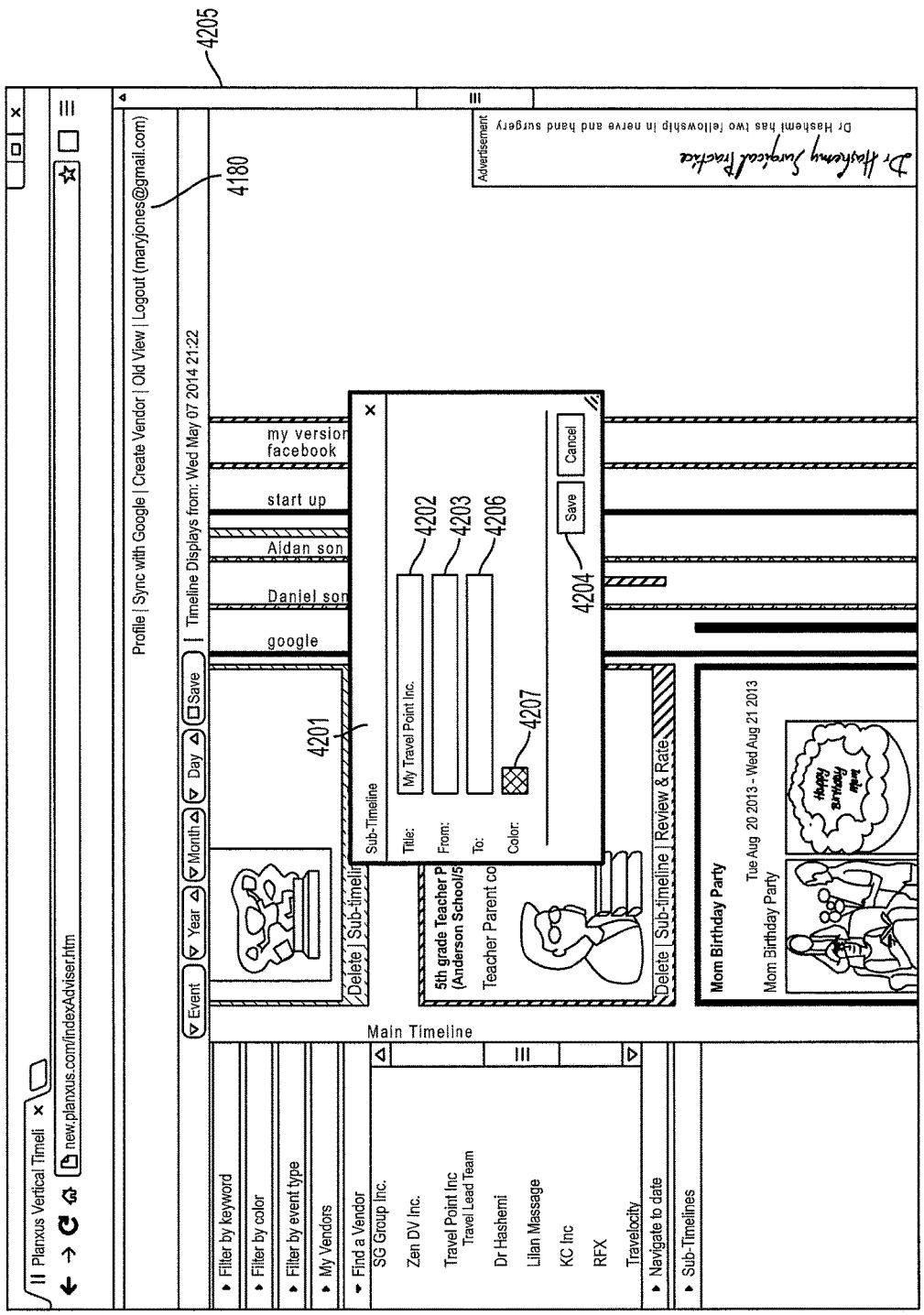
FIG. 10N depicts an exemplary interface which may be used by timeline users.
Figure 100:
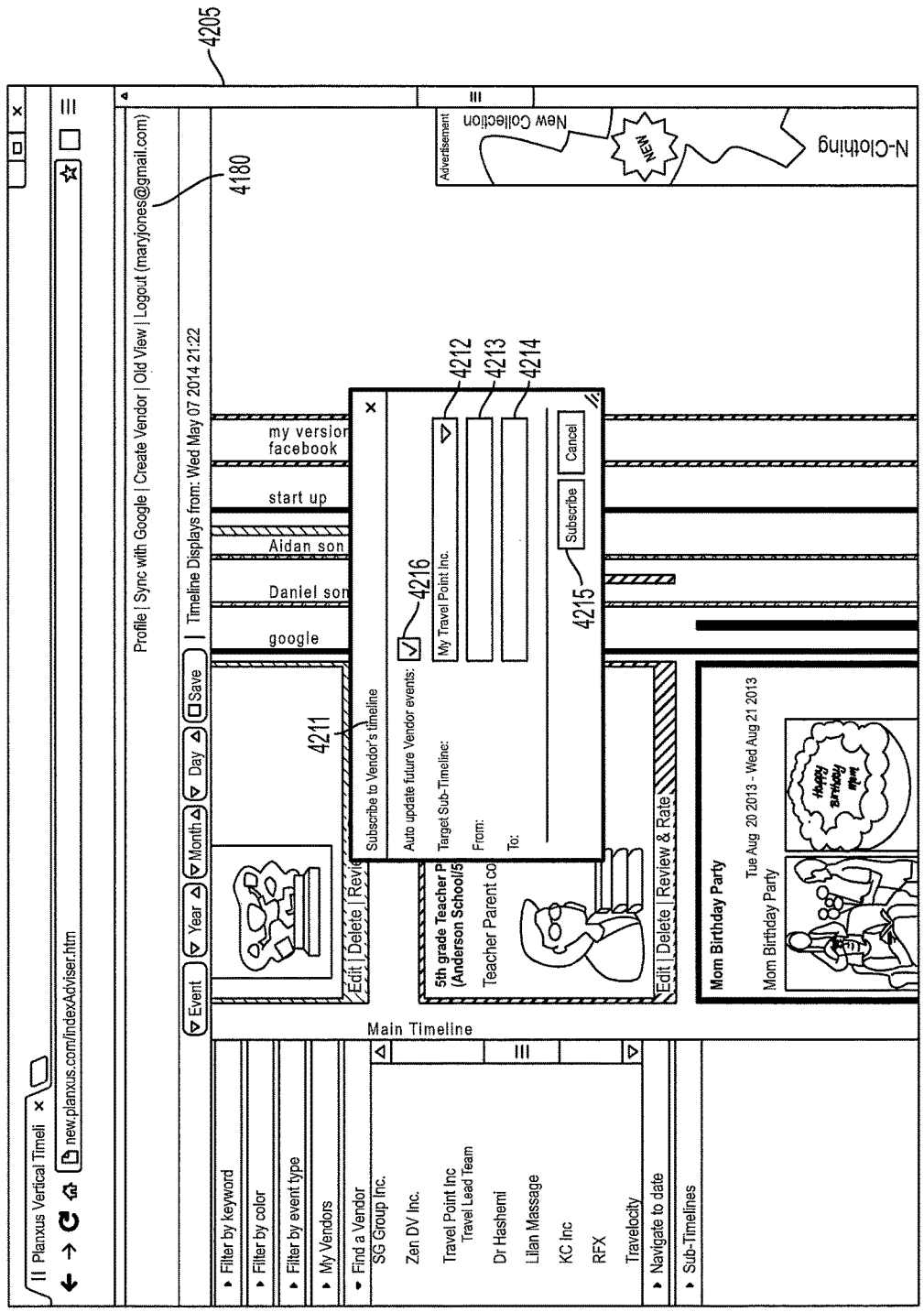

Referring to FIG. 10N, as continuation from FIG. 10M, "Timeline User", Maryjones@gmail.com as user identification 4180 was trying to Create a "Sub-Timeline" in screen 4205. In pop-up screen "Sub-Timeline" 4201, "Mary Jones" enters "My Travel Point Inc." for "Sub-Timeline" title 4202 and enter "From" date 4203, "To" date 4206 for duration of the "Sub-Timeline" and chooses the "Sub-Timeline" color 4207. Finally the timeline user clicks on "Save" button 4204. A "Sub-Timeline" with title "My Travel Point Inc." gets created.

Referring to FIG. 10O, as continuation from FIG. 10N, "Timeline User", Maryjones@gmail.com as user identification 4180 was trying to subscribe to a vendor's timeline. In screen 4211, "Mary Jones" clicks the checkbox "Auto update future Vendor events" 4216 in order to receive the future vendor's event as an auto-feed in her "Sub-Timeline". She chooses "My Travel Point Inc." as the "Target Sub-Timeline" 4212 and she enters "From" date 4213, "To" date 4216 in order to provide date range for subscribing to events in "Vendor Timeline", "Travel Point Inc." and brings them as feed to "Sub-Timeline" named "My Travel Point Inc." 4212. This means "Mary Jones" only subscribes to "Vendor Events" belonging to "Travel Point Inc." only within these date ranges provided. Finally "Mary Jones" clicks on "Subscribe" button 4215 and "Mary Jones" gets subscribed to vendor "Travel Point Inc."

Figure 10P:
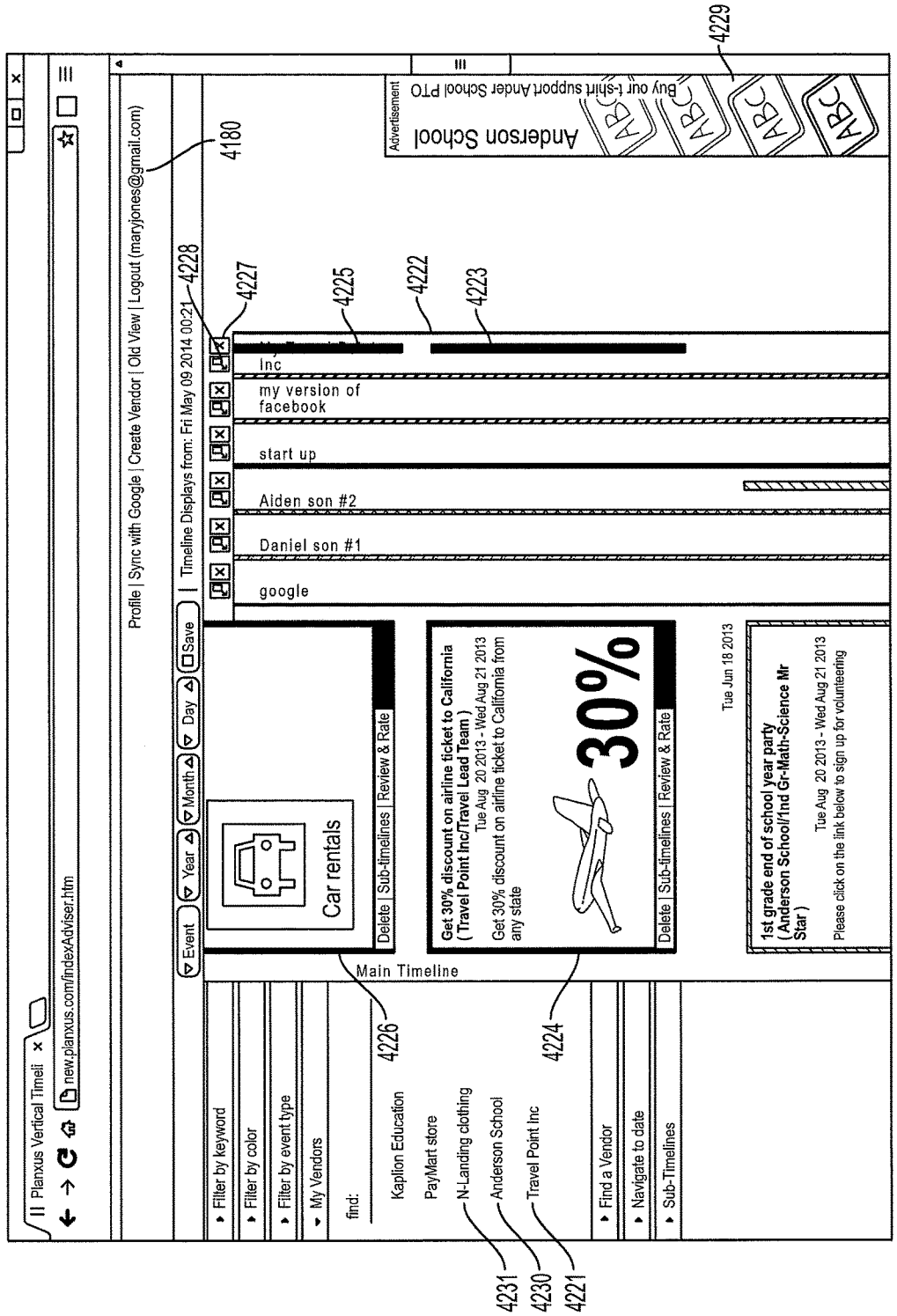
FIG. 10P depicts an exemplary interface which may be used by timeline users.

Referring to FIG. 10P, as continuation from FIG. 10O, after "Timeline User", Maryjones@gmail.com as user identification 4180 is subscribed to "Travel Point Inc.", if she clicks on left menu "My Vendors" and see "Travel Point Inc." 4221 is listed as her subscribed vendors. Also the "Sub-Timeline", "My Travel Point Inc." 4222 is created and displayed as collapsed sub-timeline. As it is displayed, all events in "Travel Point Inc." are shown in "Main Timeline" as well, event 4224 is equal to event 4223, and event 4226 is equal to event 4225. "Mary Jones" can click on button "X" 4227 above "Sub-Timeline", "My Travel Point Inc." and hide this "Sub-Timeline". "Mary Jones" could expand a "Sub-Timeline" by clicking on button 4228. On right hand side of the screen a pop-up ads 4229 is blinking. As it is shown it belongs to "Anderson School" 4230 that is listed under "My vendors". Referring to FIG. 10Q the pop-up ads changes to "N-Clothing store" 4237, that is one of the vendors listed under "My vendors" section of FIG. 10P as "N-Land Clothing" 4231.

Referring to FIG. 10Q, "Timeline User", Maryjones@gmail.com as user identification 4180, can click on left menu "Sub-Timeline", 4236 and see the list of her "Sub-Timelines". "Mary Jones" could hide "Sub-Timeline", "My Travel Point Inc." as it is explained in FIG. 10P. "Mary Jones" could unhide a "Sub-Timeline", "My Travel Point Inc." by double clicking on the "My Travel Point Inc." 4236 listed under left menu. If you notice, the pop-up ads changes from "Anderson School" 4229 in FIG. 10P to "N-Clothing store" 4237 in FIG. 10Q. "N-Clothing Store ads" belong to one of the vendors listed under "My vendors" section of FIG. 10P as "N-Land Clothing" 4231.

Figure 10R:
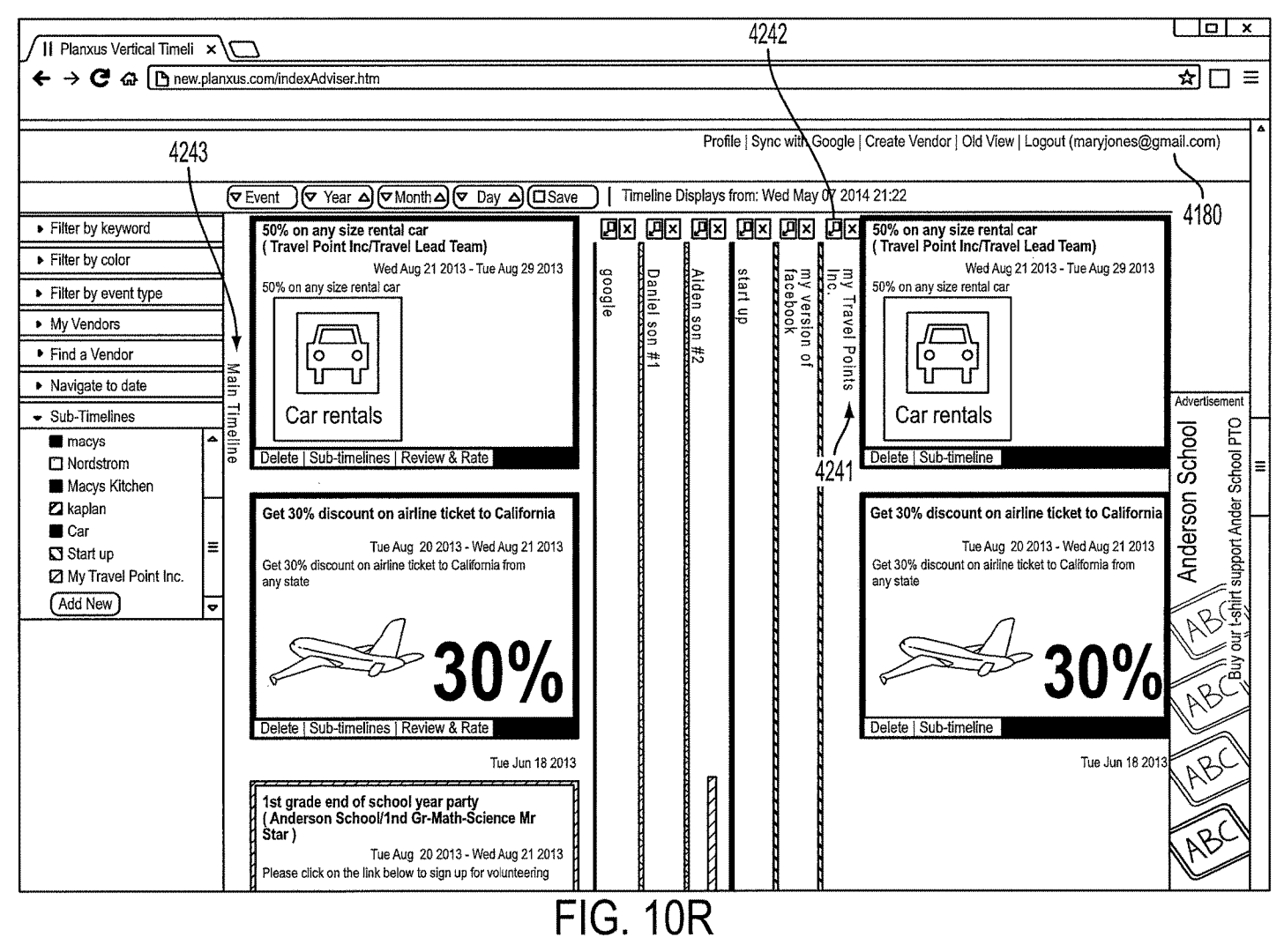

Referring to FIG. 10R, "Timeline User", Maryjones@gmail.com as user identification 4180, can expand her "Sub-Timeline", "My Travel Point Inc." by clicking on button 4242. As it is shown the same events in "Sub-timeline", "My Travel Point Inc." 4241 are displayed in "Main-Timeline" 4243.

The systems and methods described herein may work with many types of vendor and consumer relationships, such as teacher and parents, doctors and patients, department stores and shoppers, etc.

Figure 11A:
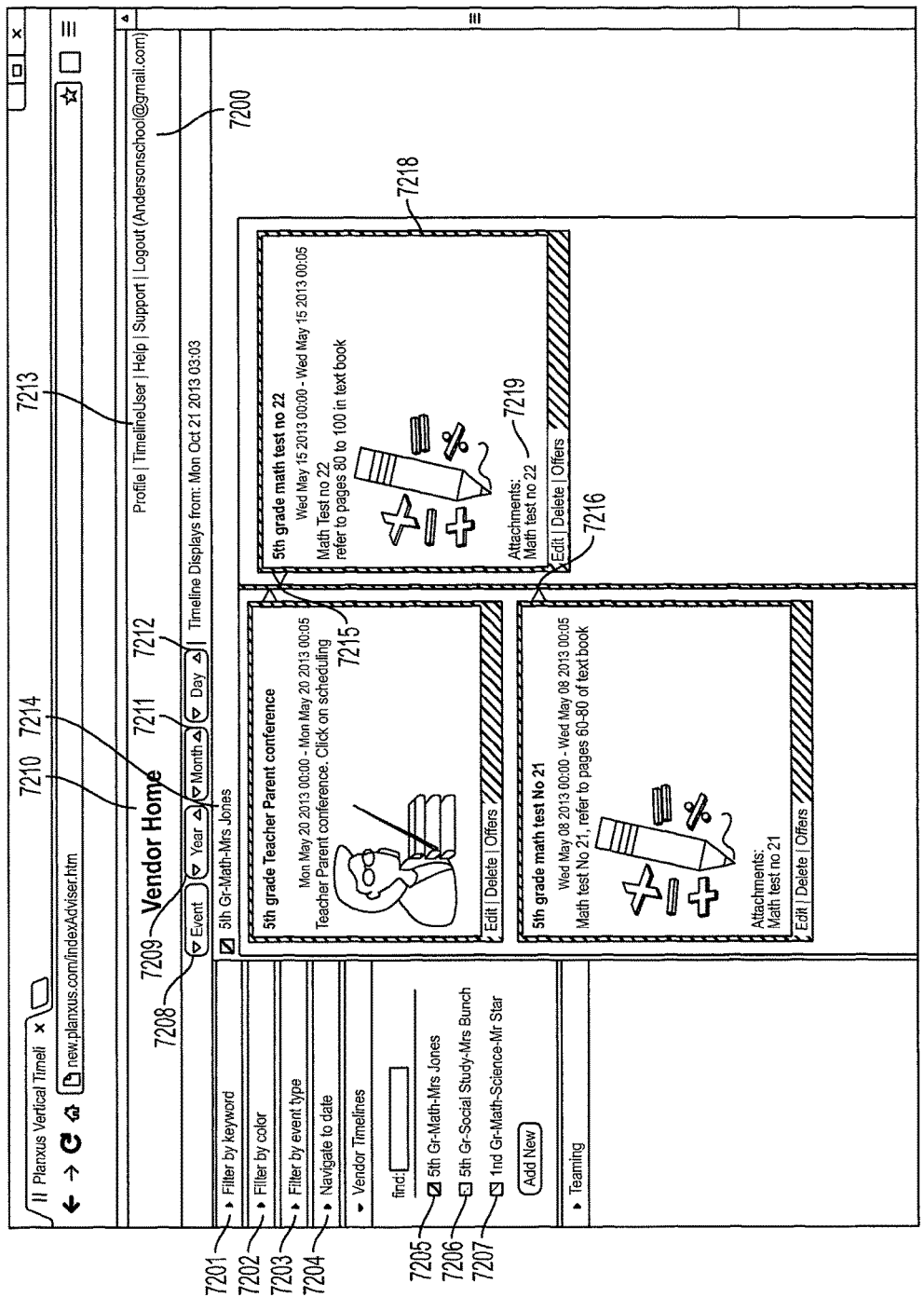
FIG. 11A depicts an exemplary interface using the planning system in the teacher and parent relationship.
Figure 11B:
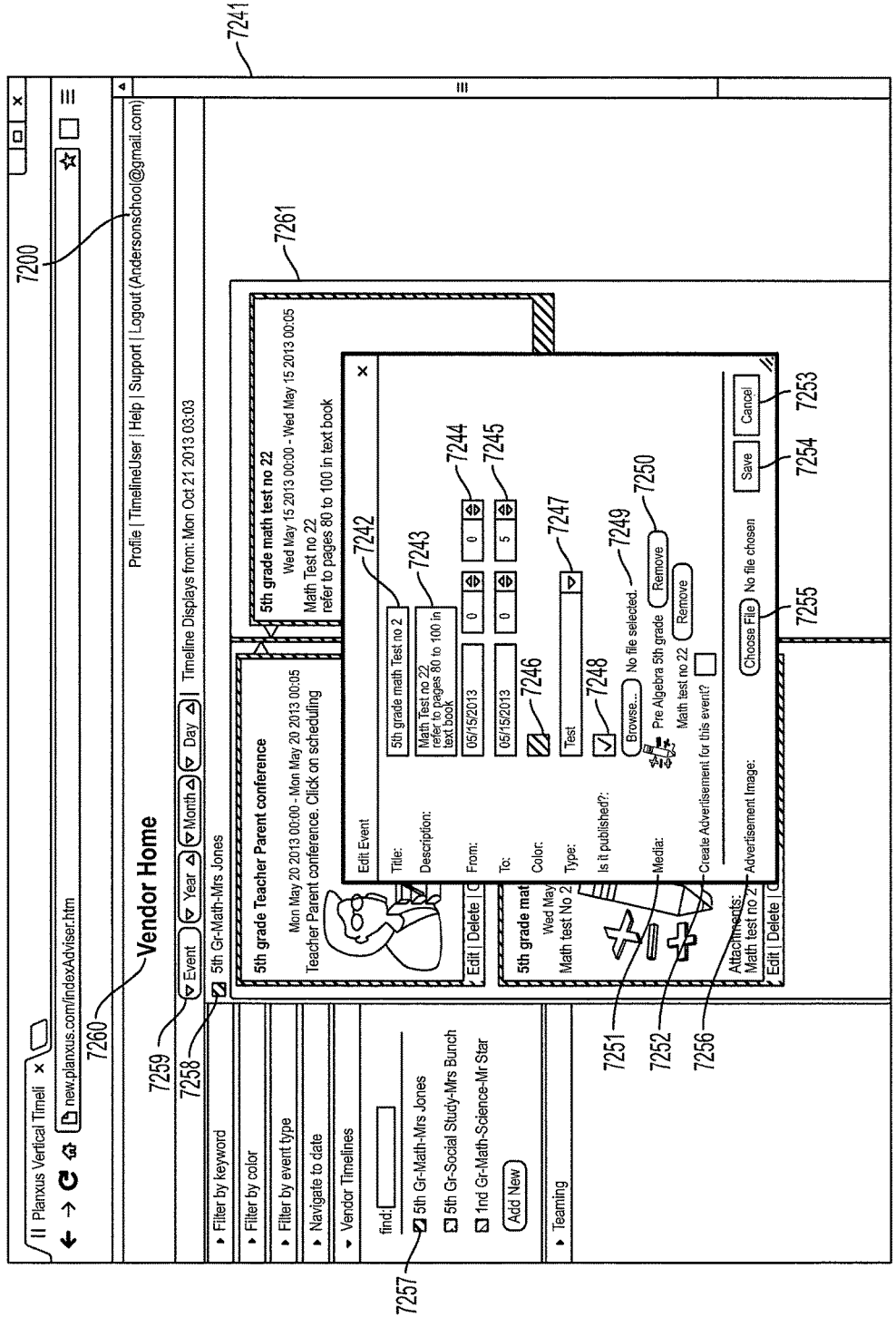
FIG. 11B depicts an exemplary interface using the planning system in the teacher and parent relationship.
Figure 11C:
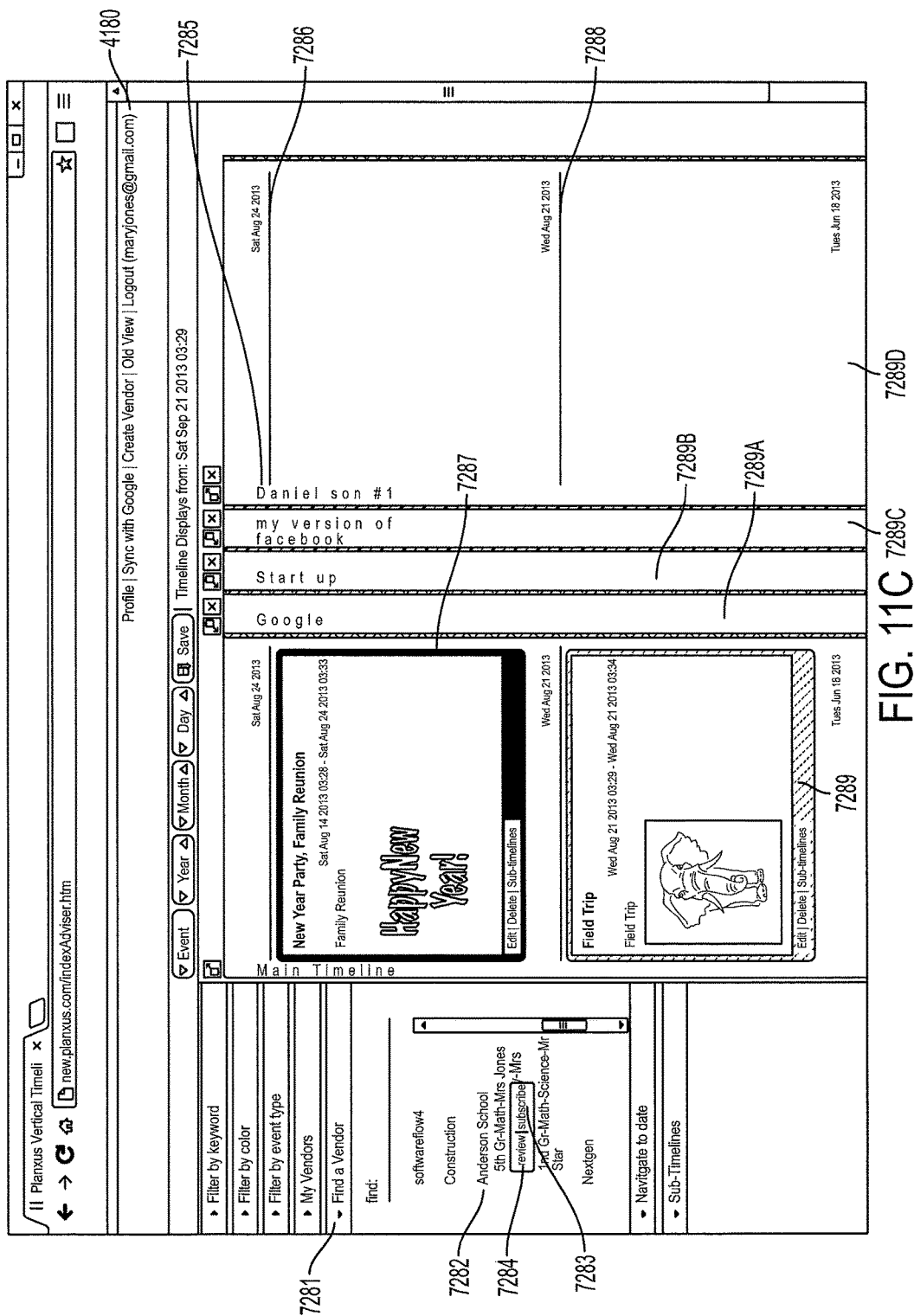
FIG. 11C depicts an exemplary interface using the planning system in the teacher and parent relationship.
Figure 11C:
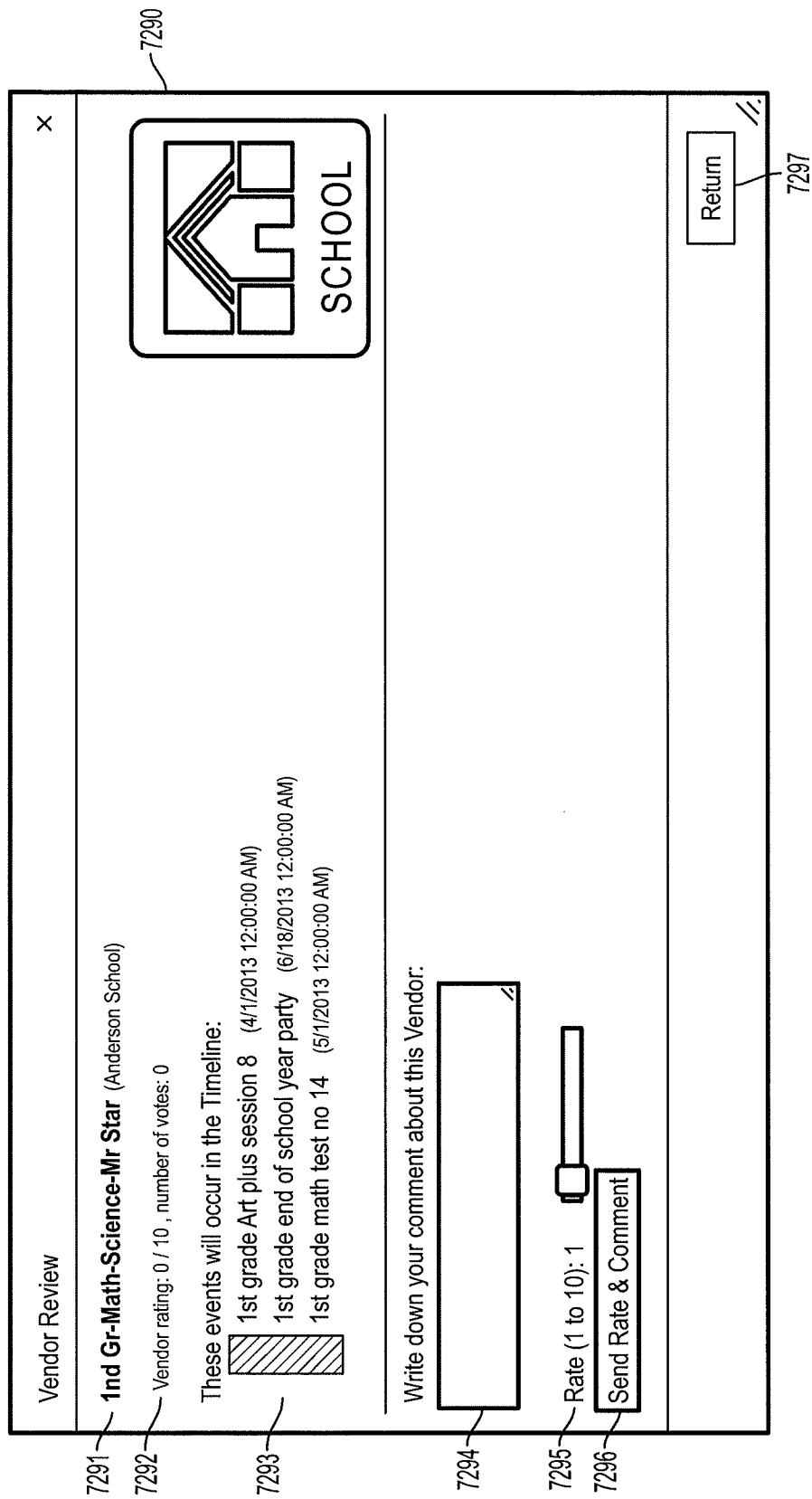
Figure 11D:
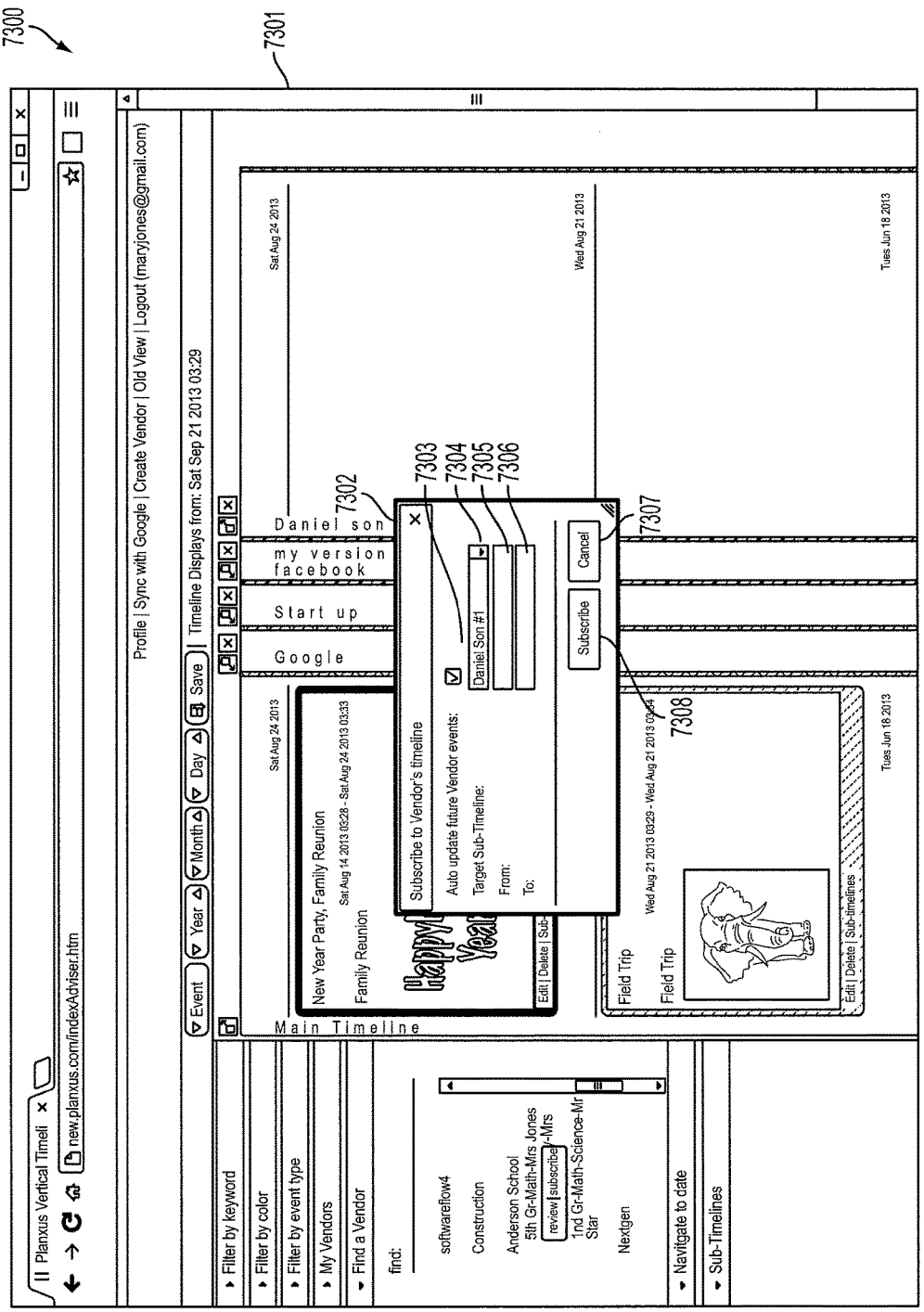
FIG. 11D depicts an exemplary interface using the planning system in the teacher and parent relationship.
Figure 11E:
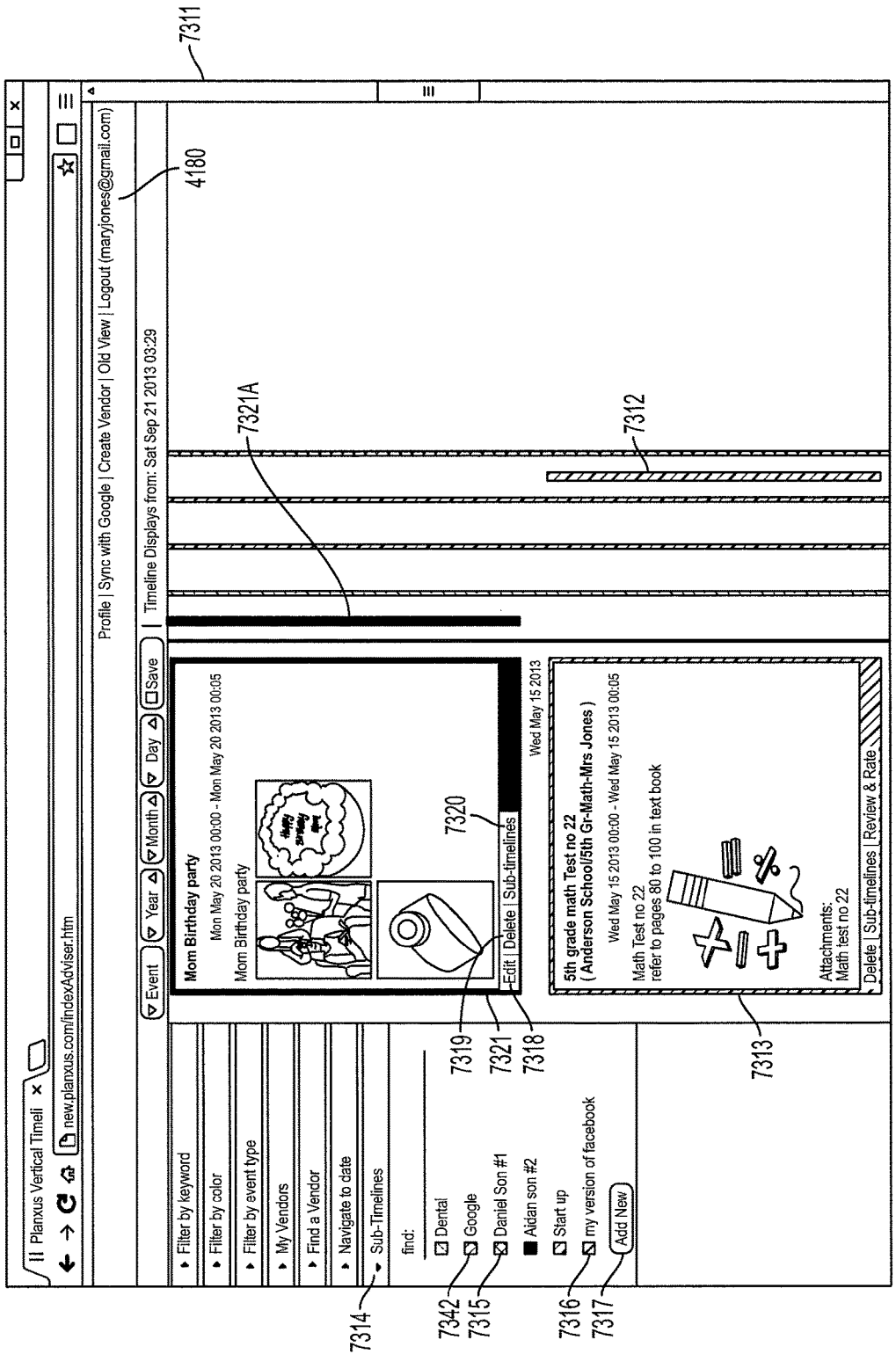
FIG. 11E depicts an exemplary interface using the planning system in the teacher and parent relationship.
Figure 11E:
Figure 11F:
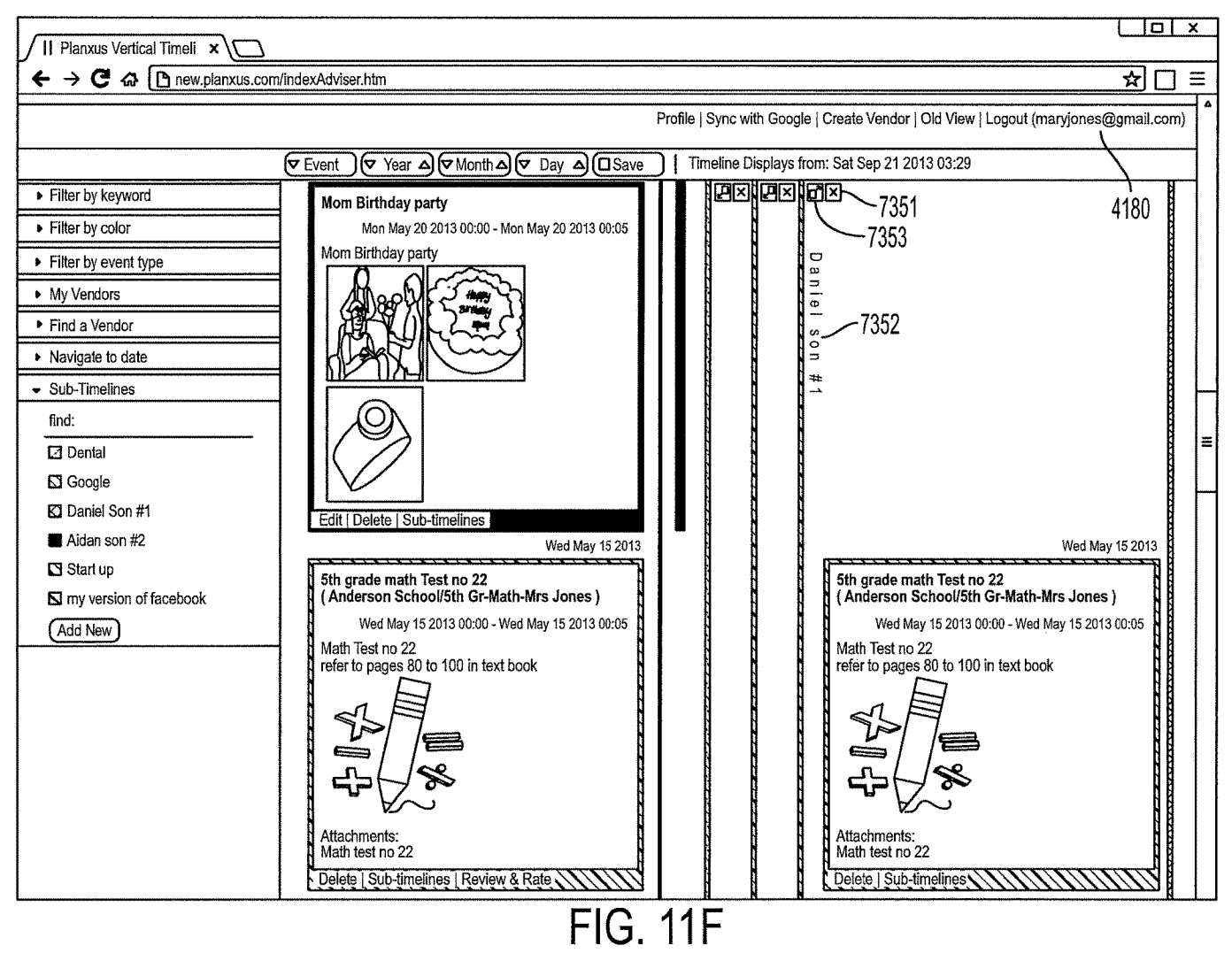
Figure 11G:
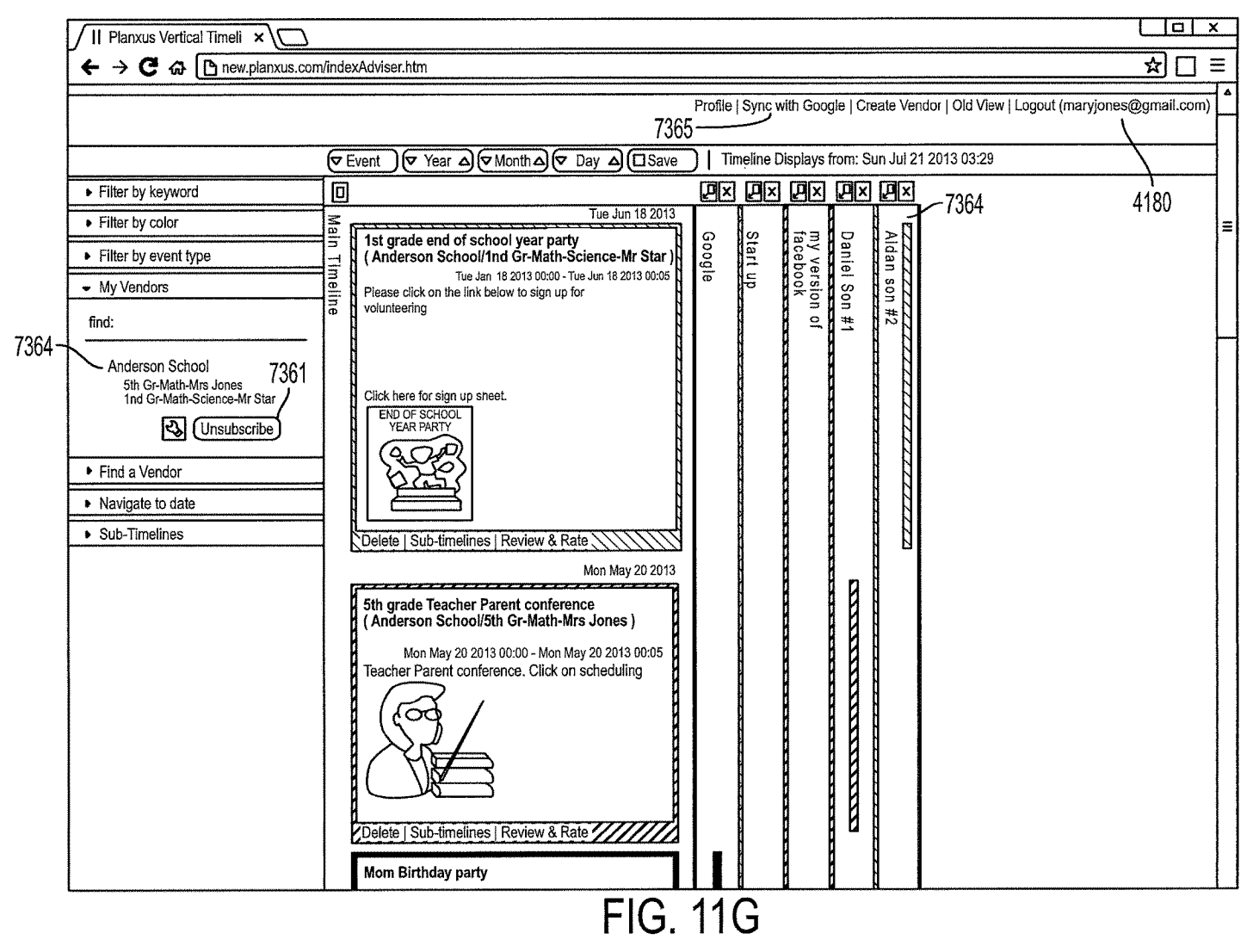
Figure 11H:
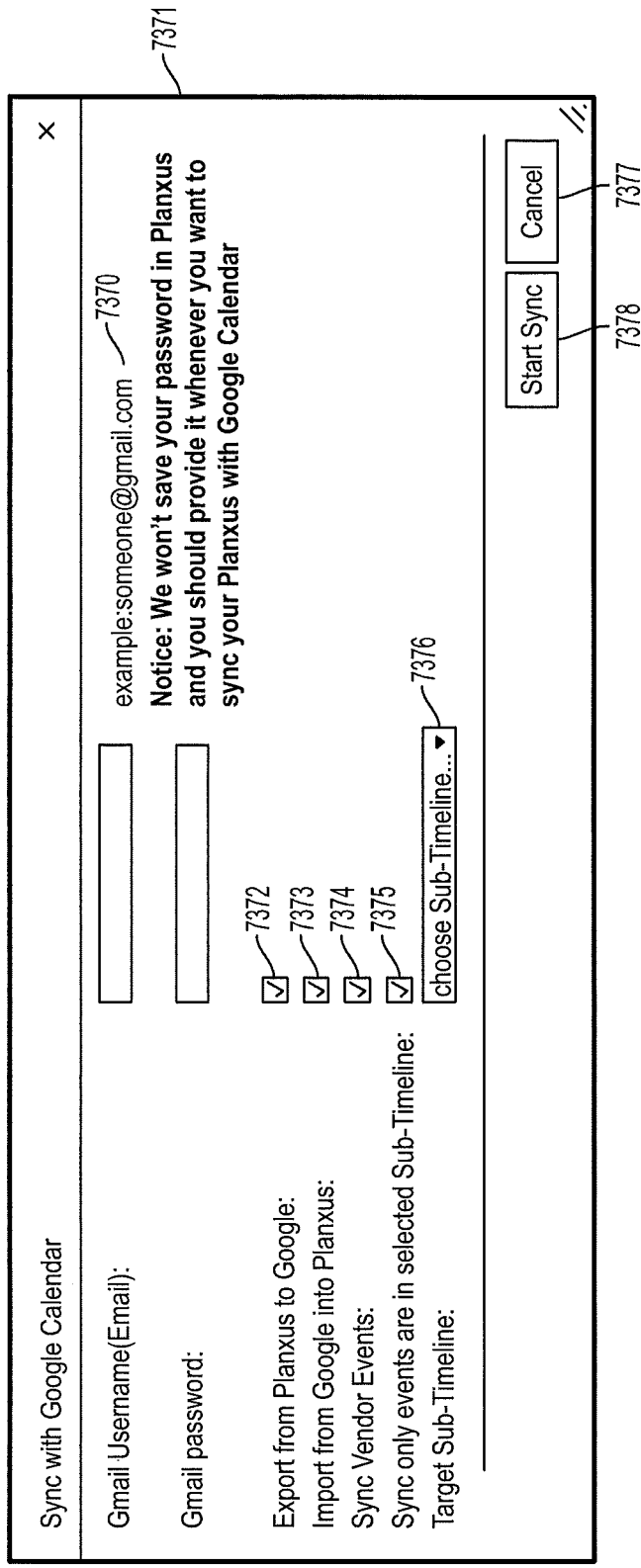
FIG. 11H depicts an exemplary interface using the planning system in the teacher and parent relationship.
Figure 11I:
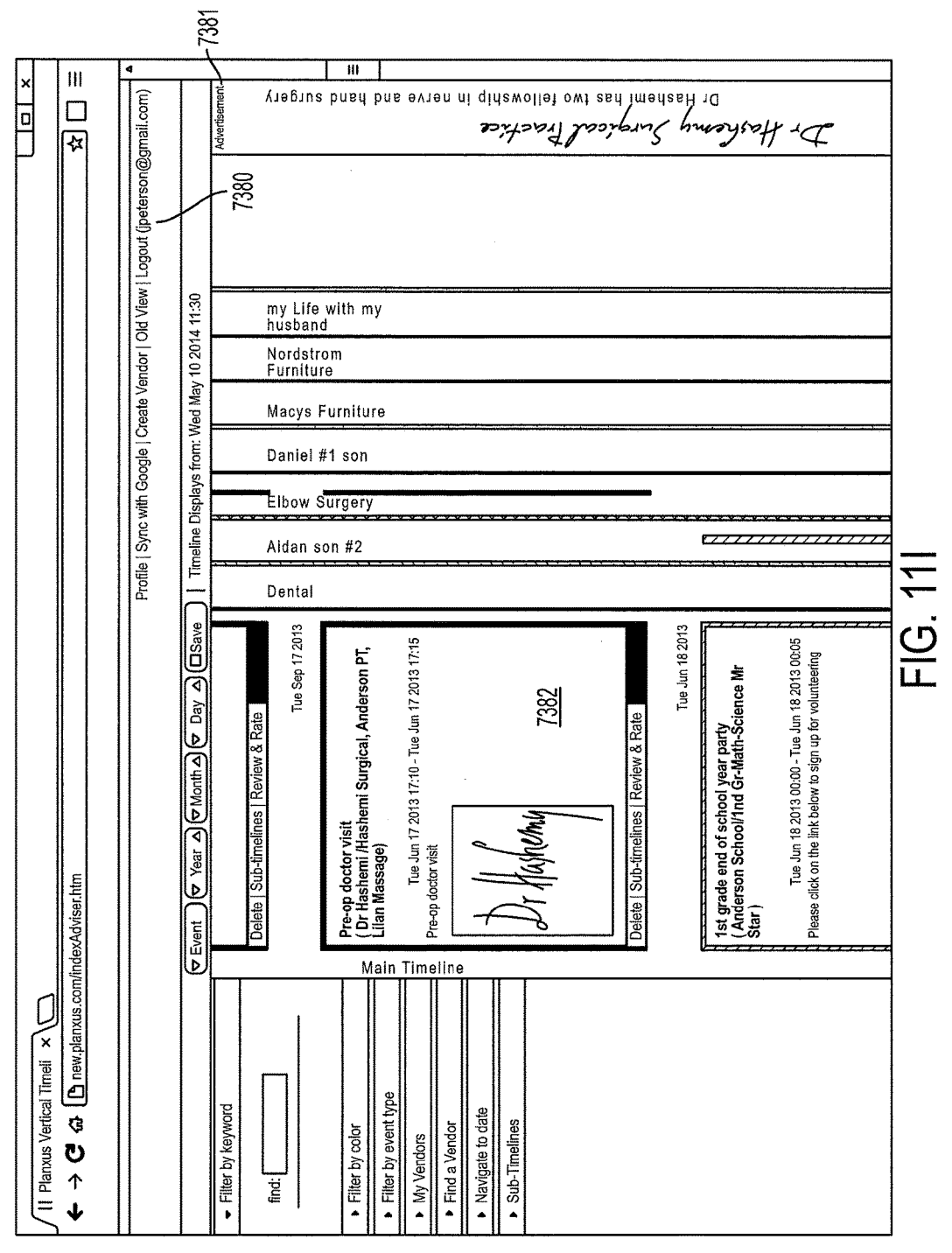
Figure 11J:
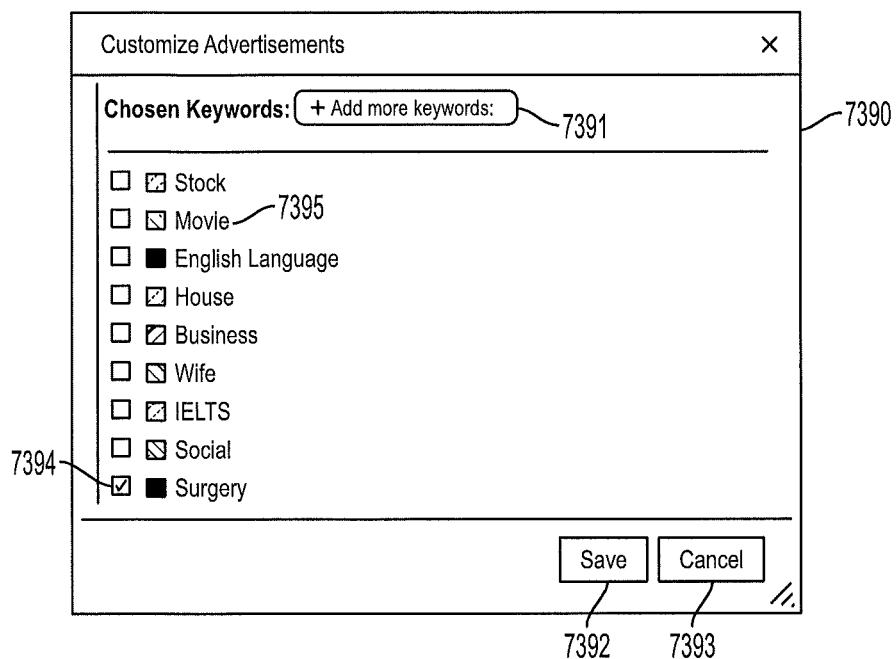
FIG. 11J depicts an exemplary interface using the planning system in the teacher and parent relationship.
Figure 11K:
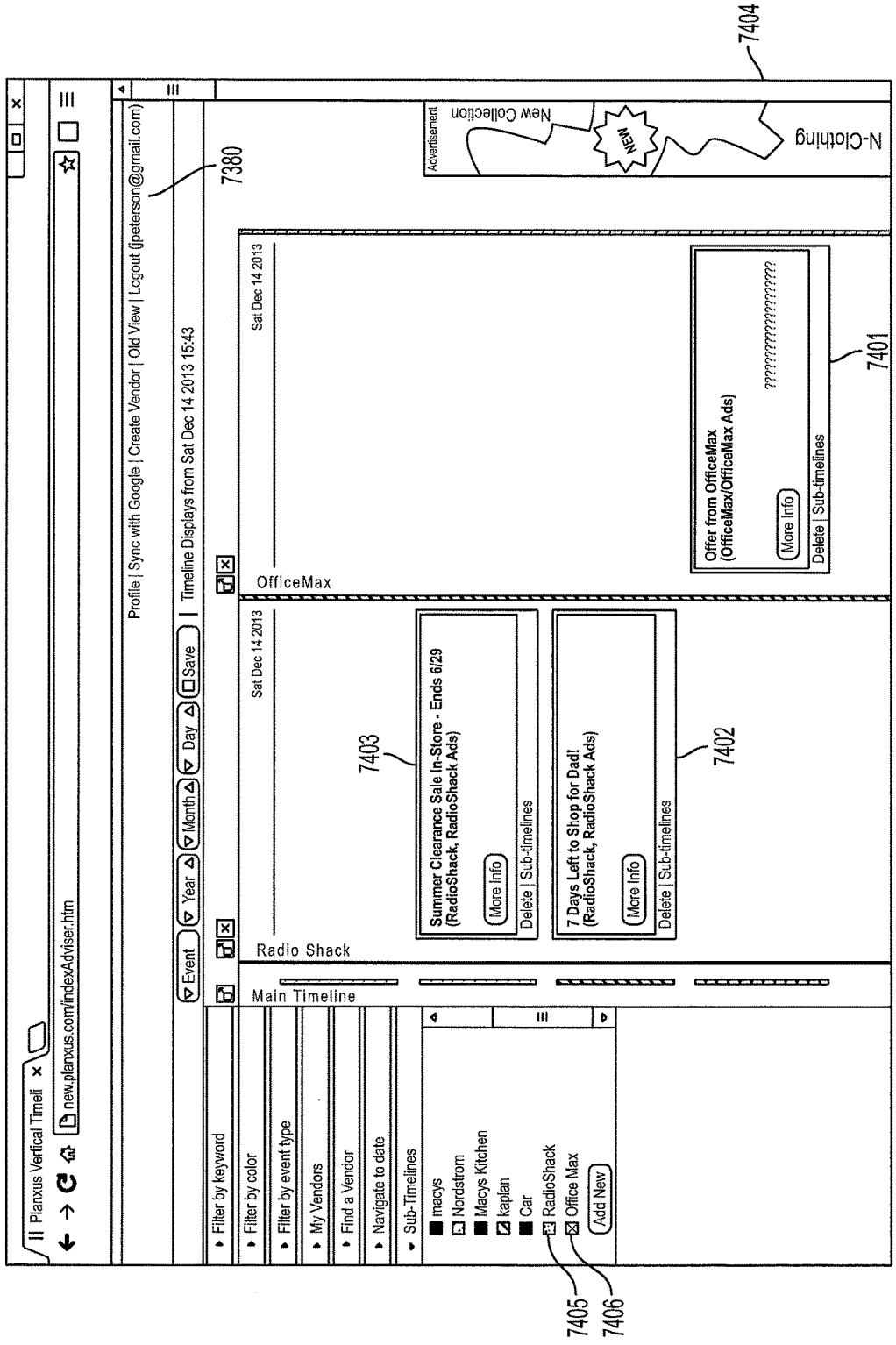
FIG. 11K depicts an exemplary interface using the planning system in the teacher and parent relationship.
Figure 11L:
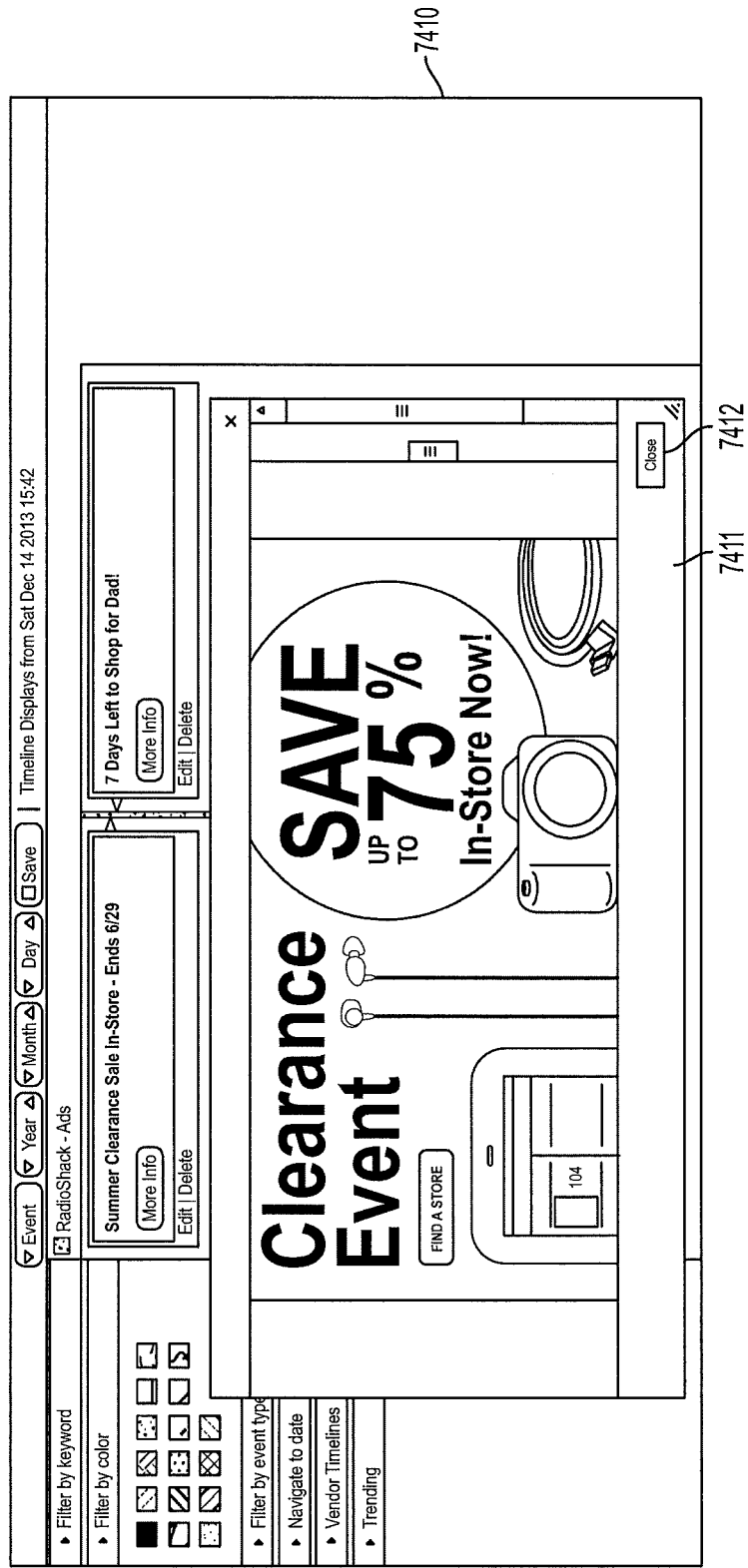
FIG. 11L depicts an exemplary interface using the planning system in the teacher and parent relationship.
Figure 11M:
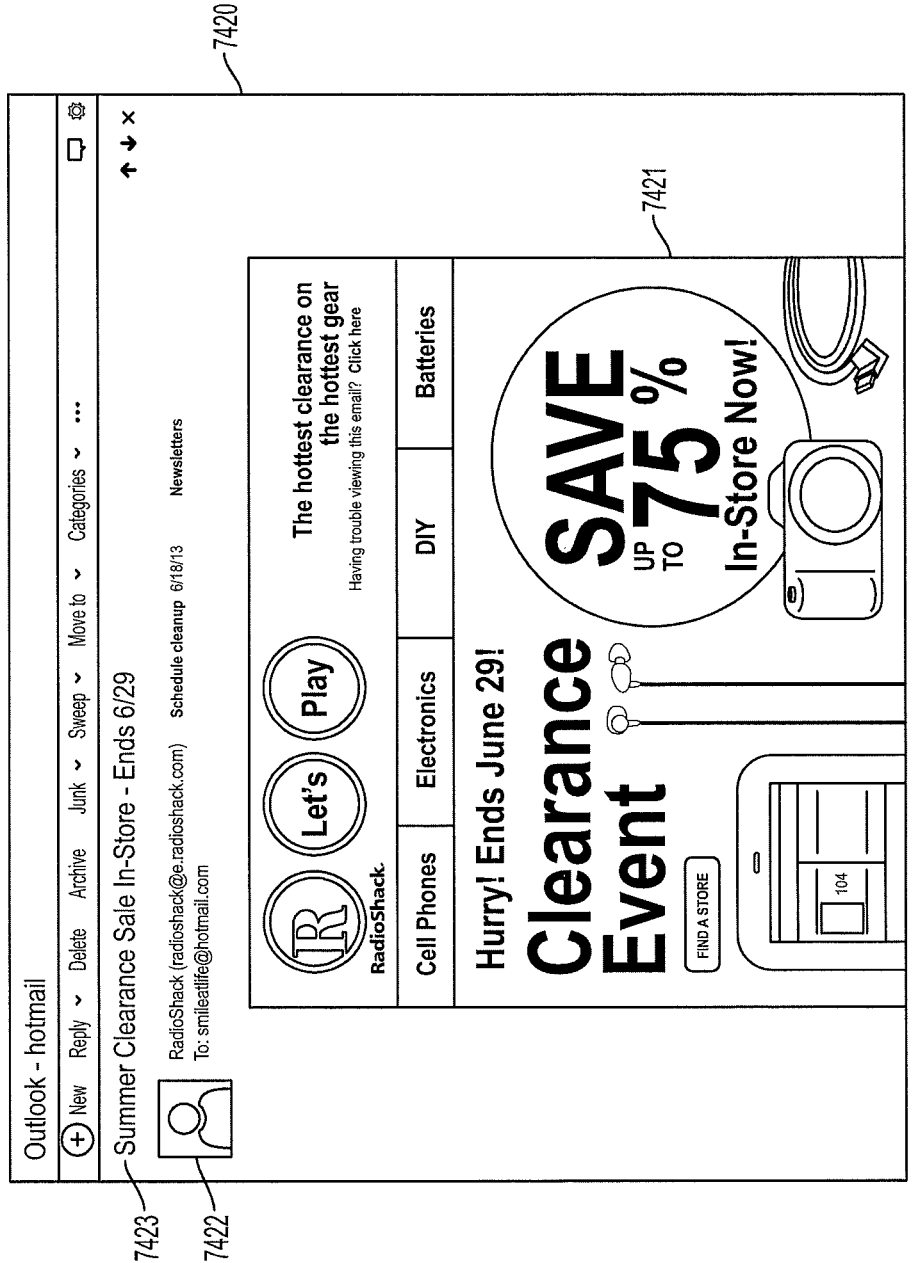
FIG. 11M depicts an exemplary interface using the planning system in the teacher and parent relationship.
Figure 11N:
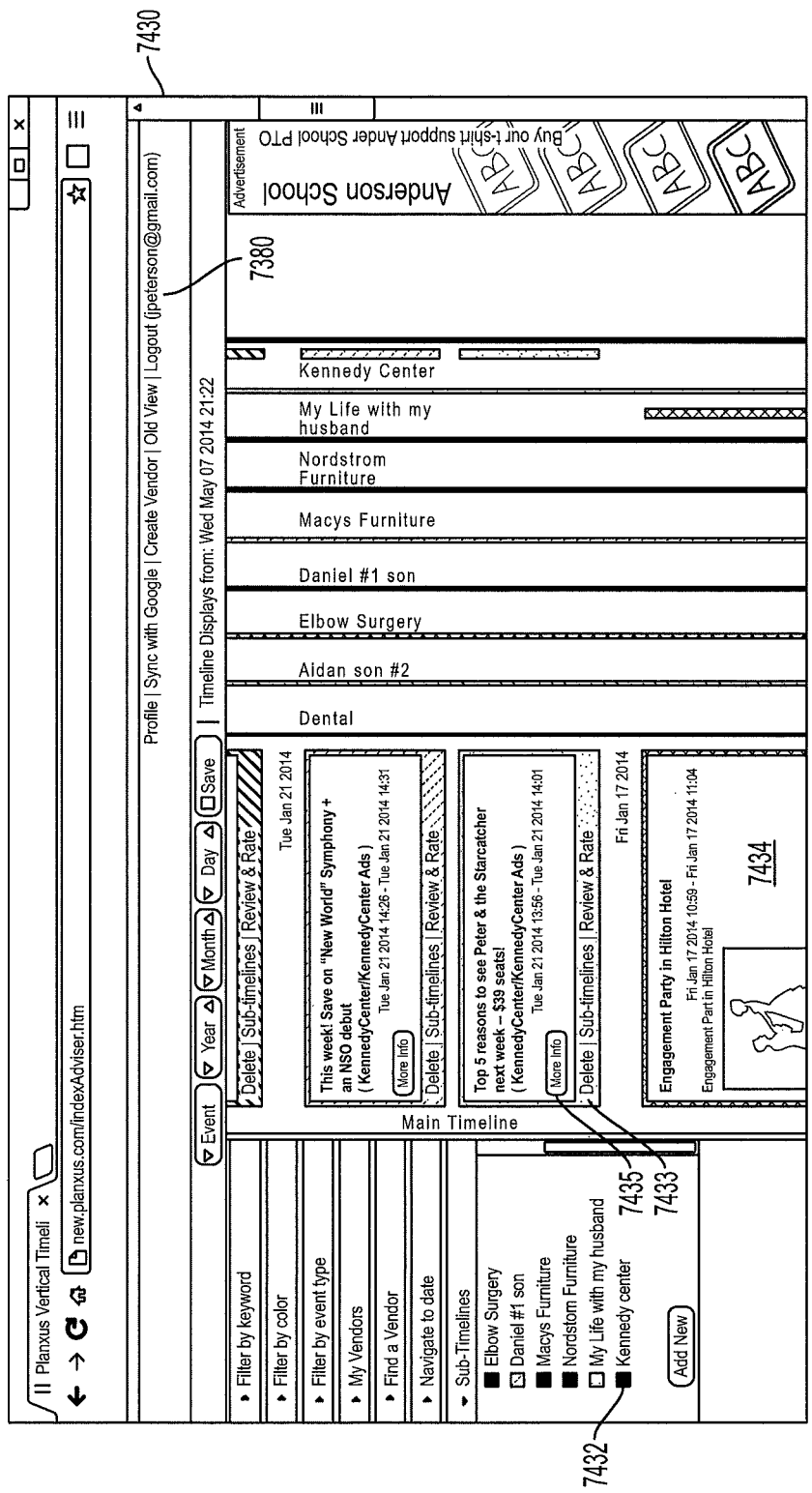
FIG. 11N depicts an exemplary interface using the planning system in the teacher and parent relationship.
Figure 110:
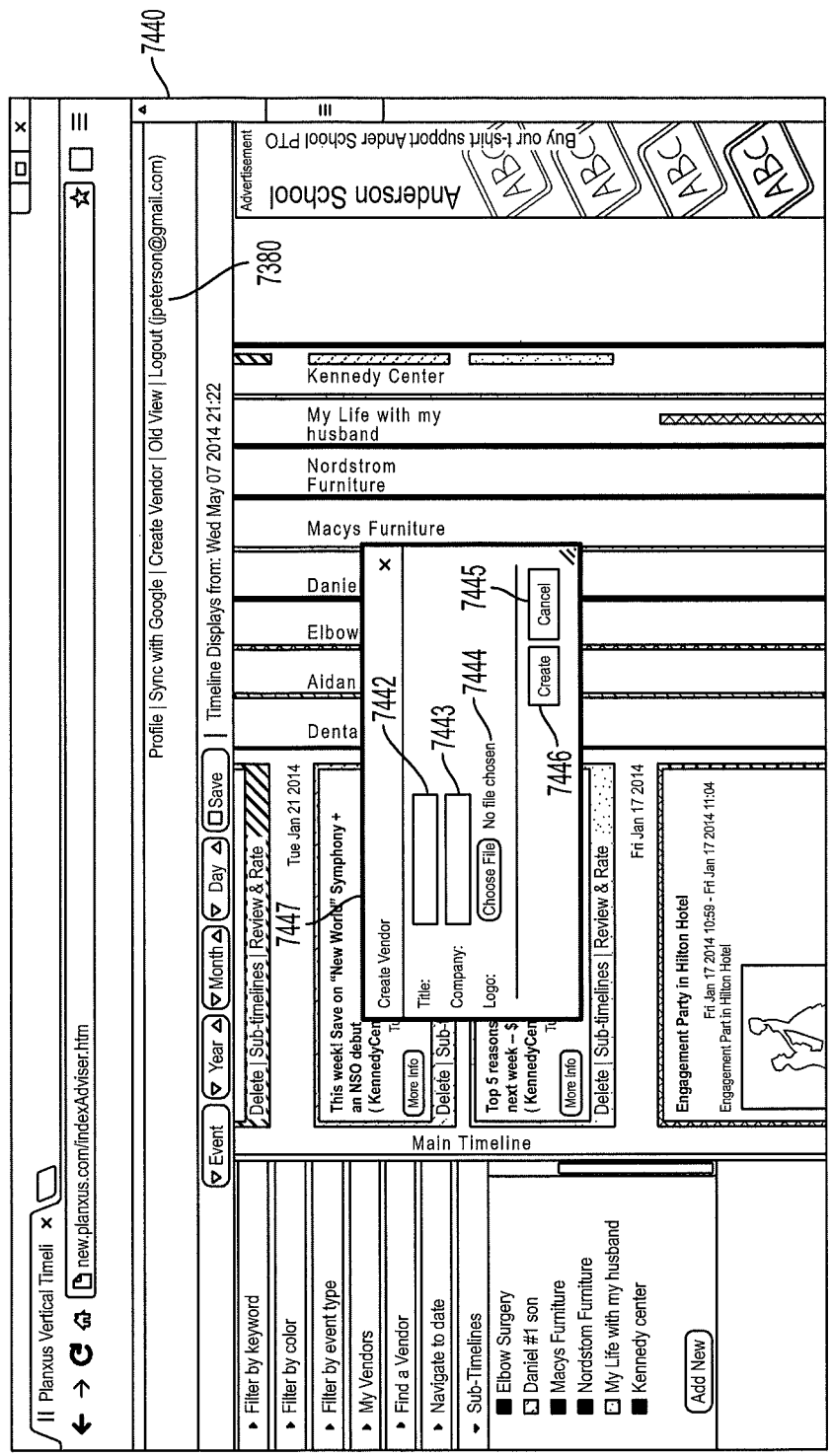
Figure 11P:
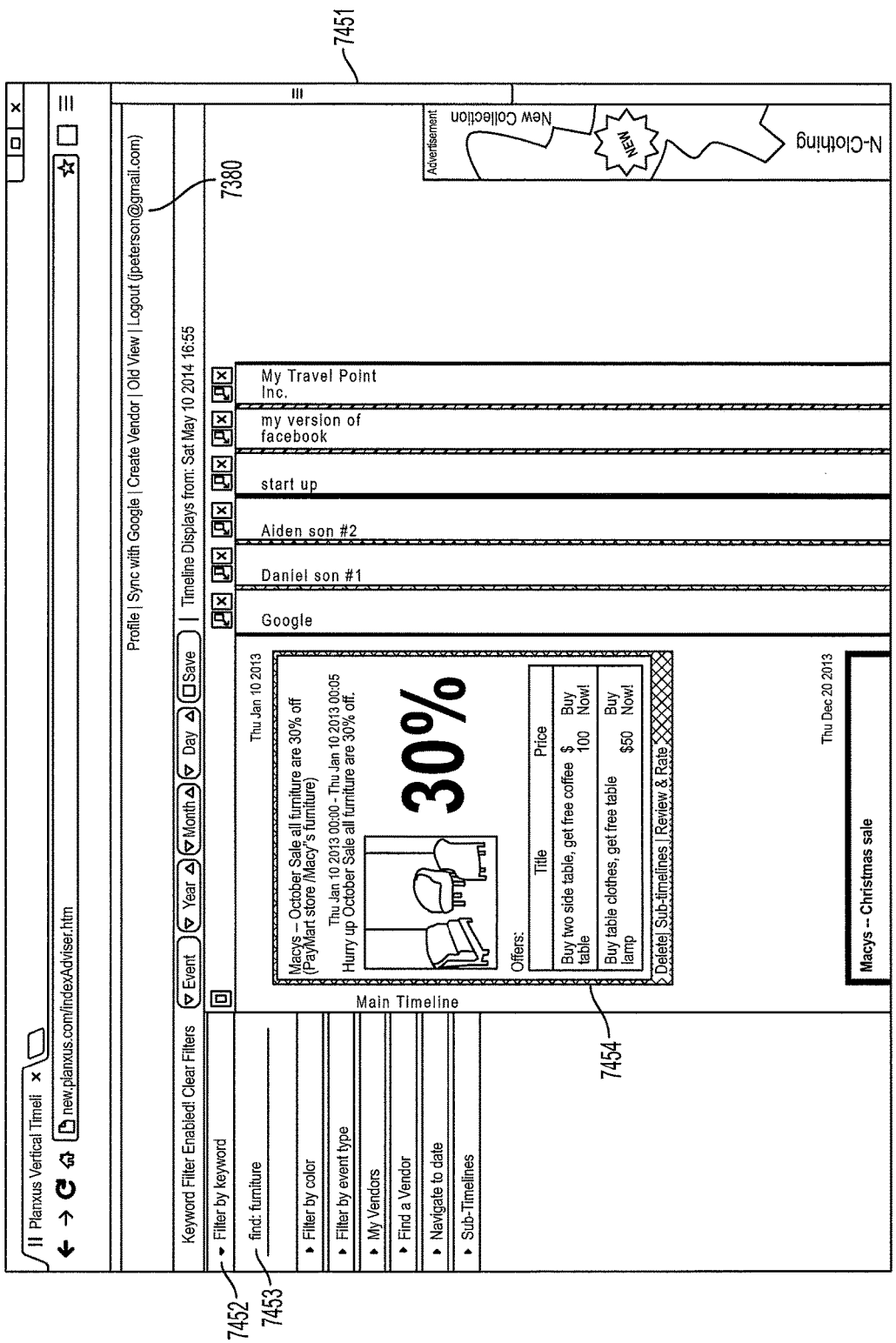
FIG. 11P depicts an exemplary interface using the planning system in the teacher and parent relationship.
Figure 11Q:
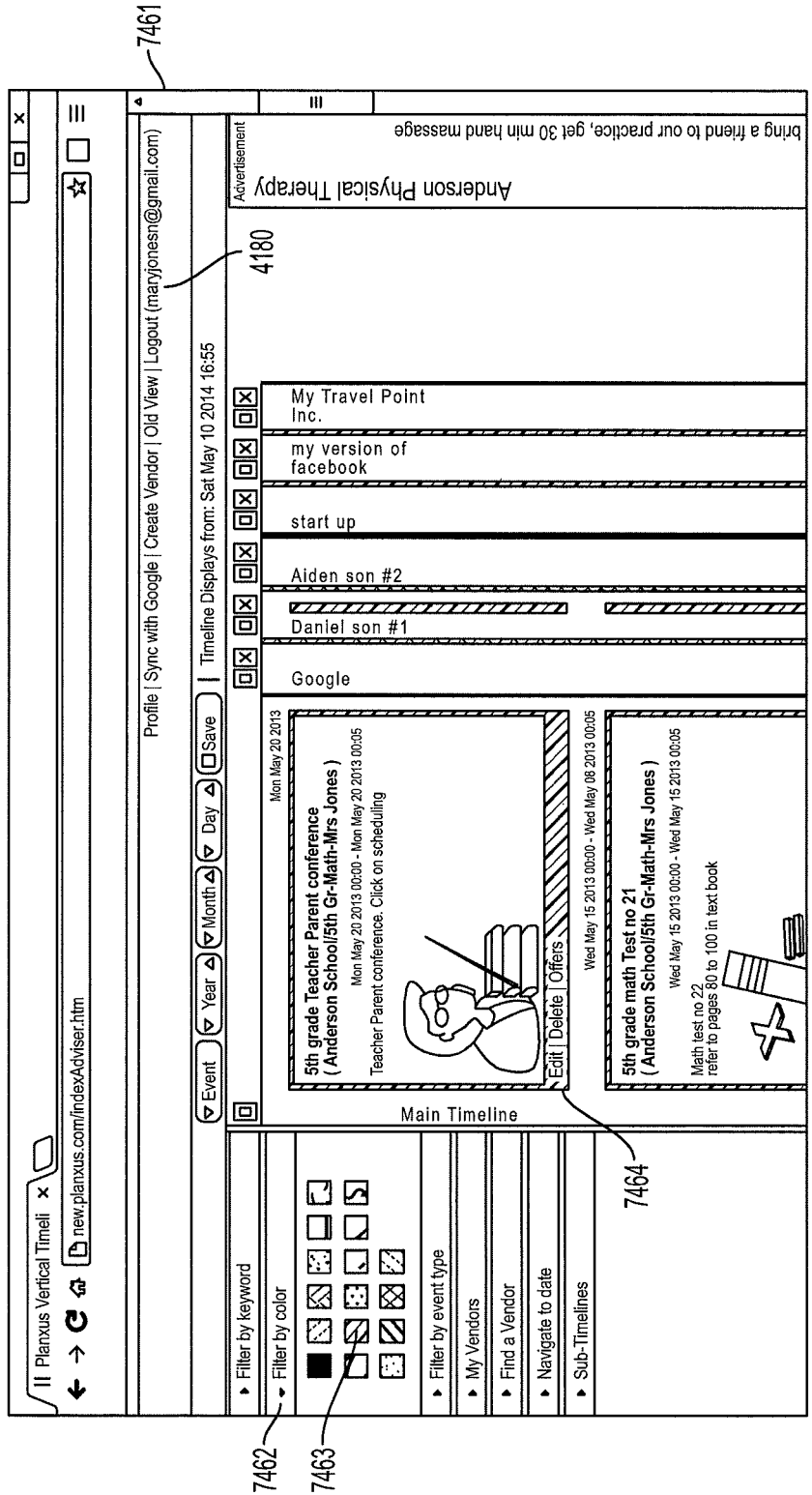
FIG. 11Q depicts an exemplary interface using the planning system in the teacher and parent relationship.
Figure 11R:
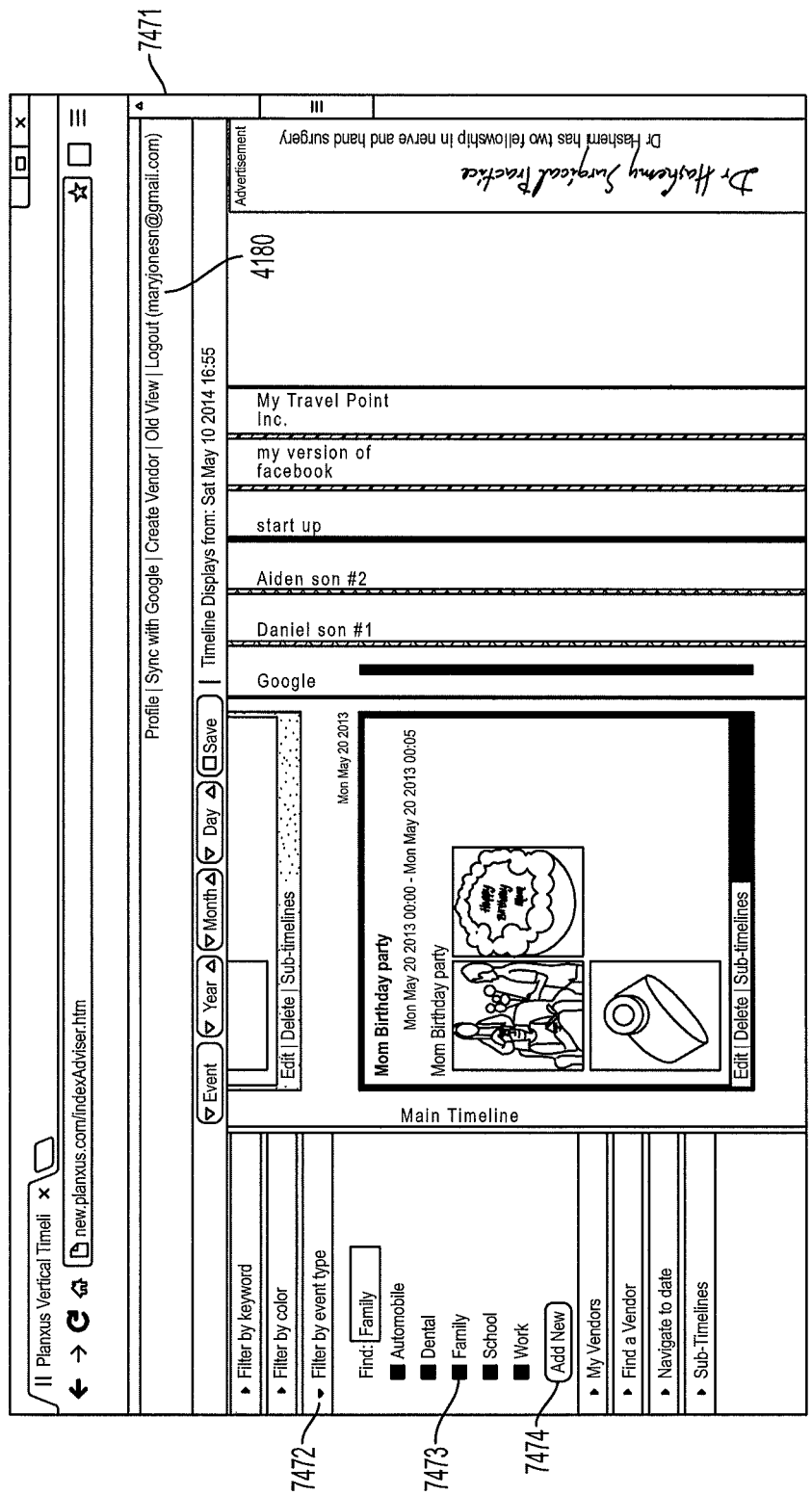
FIG. 11R depicts an exemplary interface using the planning system in the teacher and parent relationship.

FIGS. 11A-11R depict exemplary interfaces using the planning system in the teacher and parent relationship. In this implementation, vendor may be a teacher and/or school. This school may have many timelines for different classes. A teacher may have permission to create events on some timelines and other timelines could be read only. For example, the teacher can create events in her vendor (teacher) timelines. The teacher may attach test material and/or pictures to events as well, The following provides a more detailed discussion of this teacher-parent implementation of the systems and methods.

Referring to FIG. 11A The "User Vendor", andersonschool@gmail.com as user identification 7200 is the admin for "Anderson School". He logged in to his account in "Anderson school" site. At this point the school has three (3) "Vendor Timeline", for example, "5th Gr-Math-Mrs Jones" 7205, "5th Gr-Social Study-Mrs Bunch" 7206, "1st Gr-Math-Science-Mr Star" 7207. Each of the teachers, Mrs. Jones, Mrs. Bunch and Mr. Star has their own account and could log in and change the timeline they have access to. One teacher could also manage one or more timeline. For example a violin teacher may teach from 1st to 6th grade students and have one timeline per class, a total of 6 timelines.

By clicking on "Add New" button under the "Vendor Timeline", the vendor user can add a new "Vendor Timeline". Currently the "Vendor timeline" that this "User Vendor" is looking at is "5th Gr-Math-Mrs-Jones" 7214. He has three events scheduled in them. One of the events, shown at event 7218, is directed to a "5th grade Math Test no 22" that is scheduled on "Monday May 15, 2013 from 10:00 AM to 10:30 AM" and its landing on the timeline is at point 7215. The order of the events in "Vendor Timeline" is from oldest events at the bottom and the most recent events on top. The landing point 7216 is lower than 7215 which means event 7215 is the most recent one. In event 7218 there is an attachment 7219 that is a media attached by the teacher, Mrs. Jones. This attachment is the sample math test that teacher attached for her parent/students to download. If "Vendor User" wants to create a new event, he clicks on button "Event" 7208. If "Vendor User" clicks on button "Year" 7209 up/down arrow the year goes up/down and timeline scrolls up/down. If "Vendor User" clicks on button "Month" 7211 up/down arrow the month goes up/down and timeline scrolls up/down for the month. If "Vendor User" clicks on button "Day" 7212 up/down arrow the day goes up/down and timeline scrolls up/down.

Every "Vendor User" has a "Timeline User" account. If "Vendor User" clicks on hyperlink "TimelineUser", 7213, "Vendor User" could switch to the "Timeline User" side. The vendor user has its own user timeline as well. Through this hyperlink button 7213 the user could switch between its' "User Vendor" home and its' "Timeline User" home.

Events on each timeline could be filtered if "User Vendor" clicks on "Filter by keyword" 7201, and enter a keyword. As a result all events that have this keyword will be shown. Referring to FIG. 11P, that display shows the same functionality on the "Timeline User" side.

At the time an event being created, "Vendor User" decides on the event color. Color could have a special meaning for the "Vendor User". Every event on each timeline could be filtered if "User Vendor" clicks on "Filter by color" 7202, and choose on a color. As a result all the events that have the same color will be shown. Refer to FIG. 11Q, that display shows the same functionality on the "Timeline User" side.

At the time an event is getting created, "Vendor User" decides on the "Event Type". Every event on each timeline could be filtered if "User Vendor" clicks on "Filter by Event Type" 7203, and choose a type or enter a type. As a result all the events that have the same type will be shown. Referring to FIG. 11R, that display shows the same functionality on the "Timeline User" side.

If "Vendor User" clicks on "Navigate to Date" 7204, "Vendor User" could choose a day in the calendar to jump to those dates in the timeline, or could click on the hyperlink year or hyperlink month to scroll the timeline to those dates.

There are three (3) hyperlinks under each event named "Edit", "Delete" and "Offers" (not shown). By clicking on "Event" hyperlink "Vendor User" could edit the event. By clicking on "Delete" hyperlink "Vendor User" could delete the event. By clicking on "Offers" hyperlink, "Vendor User" could add more Sales offers/coupons for each event. Each event could be associated to more than one offer.

Referring to FIG. 11B "User Vendor", andersonschool@gmail.com as user identification 7200, is on "Vendor Home" side 7260 and viewing one of her "User Timeline", "5th Gr-Math-Mrs-Jones" displayed at 7258 and 7257. She is trying to edit one of the events "5th grade math Test no 22" 7261 the she created before. "Vendor User" clicks on "Edit" hyperlink under the event and the "Edit Event" dialog box pops up. User could edit event "Title" 7242, event "Description" 7243. User could edit the start date/time and end date/time of the event in field "From" 7244 and "To" 7245. "Vendor User" could choose a color for each event and in this screen the color 7246 could be changed, by clicking on the color square, a color pallet will be displayed a different color can be chosen. Event "Type" 7247 could also be changed. In this drop down either an existing event "Type" gets chosen or a new event "Type" can be created by the "Vendor User" on the fly. The vendor user could also decide if this event needs to be published or not by checking the check box next to "Is it published?" 7248. Events on the "Vendor User" timeline will be visible to "Timeline User" timeline if and only if they get published by the "User Vendor". In field "Media" 7251 by clicking on "Browse" button 7250, one or many media files such as pictures, videos, word doc, excel, etc. could be uploaded. If checkbox "Create Advertisement for the event?" 7252 is checked, "User Vendor" will upload media files for popup ads. For doing so "User Vendor" choose an "Advertisement Image" 7256 by clicking on "Choose File" 7255 and upload a media file. Finally user click on "Save" button 7254 and all changes to the event made by the "Vendor User" gets updated. If "User Vendor" clicks on "Cancel" button 7253, all her changes won't be saved.

If user clicks on "Event" button 7259, the "Add Event" dialog box will be displayed that has all the above fields as described in previous paragraph and by clicking "Save" a brand new event gets created.

Referring to FIG. 11BB "User Vendor", andersonschool@gmail.com as user identification 7200, is on "Vendor Home" side 7272. This figure shows yet another "Vendor Timeline", "1st Gr-Math-Science-Mr Star", 7271 that sits on a vertical timeline 7273. One of its events is "1st grade end of school year party" 7274. This timeline is created by Mr. Star, 1st grade teacher. He created all events related to his classroom activities with media attached to them.

Referring to FIG. 11C "Timeline User", Maryjones@gmail.com as user identification 4180, is on "Timeline User Home" side. She is a parent and has two children in first and second grade attending "Anderson School". She wants to subscribe to teacher's timeline for both 1st grade and 5th grade. Mary Jones could login to the planning system and manage her life in one stop shop for her job related events, children's sport, children school, doctors, shopping, coupons etc. Last year Mary had to use a separate stand-alone system, such as "BLACKBOARD.com", to manage one of her son's school activities who was going to public school. For her second son's school activities she had to use a private school website. This year Anderson school teachers are using the planning system described herein and Mary Jones can manage most of her life events using the same User Interface.

FIG. 11C shows the displayed user timelines. "Timeline User" has one "Main Timeline" and a couple of "Sub Timeline" parallel to each other. The events can be separated by dashed lines 7286, 7288 that represent a day. All events within one day are between 2 dashed lines or they could go over a dashed line if they take more than a day. In the same fashion all events can be displayed relative to hours and each dashed line will represent an hour of the day.

In FIG. 11C "Mary Jones" has already created a "Sub Timeline" called "Daniel Son #1" 7285. She clicks on left menu "Find a Vendor" 7281, she can scroll up/down the list of vendors or she enters a keyword and clicks on the "Find" button. She finds "Vendor Timeline", "Anderson School" 7282 and she clicks on it. Under "Anderson School" 7282, three (3) "Vendor Timeline" are displayed. She hovers over "5th Gr-Math-Mrs Jones" and clicks on "Subscribe" button 7283 and the pop-up displayed in FIG. 11D will be shown.

In FIG. 11C if "Mary Jones" before subscribing to "Vendor Timeline", "1st Gr-Math-Science-Mr Star" clicks on "Review" button 7284 the pop-up FIG. 11CC will be displayed that allows "Mary Jones" to read other "Timeline Users" review for "Vendor Timeline" before subscribing to it and/or Mary Jones could provide review for this "Vendor Timeline".

Referring to FIG. 11CC as continuation of FIG. 11C, "Mary Jones" was trying to review a "Timeline Vendor" before subscribing to it. In this figure "Vendor Rating" and number of voters 7292 are displayed, that means "Mary Jones" could get some confidence before subscribing to this "Vendor User". Also all events belong to "Vendor Timeline" "1st Gr-Math-Science-Mr Star" 7291 are displayed. Mary Jones could provide her review in field "Write down your comment about this Vendor:" 7294. She can provide a rate by clicking on the slide button 7295 and click on button "Send Rate & Comment" 7296. The "Vendor User" icon 7290 is shown on top right corner. By clicking on button "Return" 7297 all reviews get saved.

Referring to FIG. 11D as continuation of FIG. 11C, Mary Jones is trying to subscribe to "5th Gr-Math-Mrs Jones", the pop-up "Subscribe to Vendor's timeline" 7302 will be displayed. Mary Jones can unclick on "Auto update future Vendor events" 7303 to subscribe to events in the past only without any feed for future. For "Target Sub-Timeline" 7304, she could also create a new "Sub Timeline" or she could choose an existing "Sub Timeline" that she created before. In this example she has chosen "Daniel son #1". She could optionally enter duration of time she wants to subscribe to a timeline by entering date/time in "From" 7305 and "To" 7306 fields. Finally "Timeline User", Mary Jones, clicks on "Subscribe" button 7308 and the subscription to a "Vendor User" is completed. Once subscribed, it means from now on Mary Jones, will get automatic feeds of all events posted by "5th Gr-Math-Mrs Jones", or instead of subscribing she has the option to cancel 7307.

Referring to FIG. 11E, "Timeline User", Maryjones@gmail.com as user identification 4180, is on "Timeline User Home" side. This screen shows that after Mary Jones subscribed to "Vendor Timeline", "5th Gr-Math-Mrs. Jones", the event "5th grade math Test no 22" is displayed in both "Main Timeline" at 7313 and "Sub Timeline", "Daniel 1st Son" at 7315 at "Daniel 1$^{st}$ Son" timeline display tab as shown by bar 7312. Bar 7312 can be any representative symbol, bar and/or color and is preferably visually correlated with the entry on the main timeline.

Mary Jones also clicked on left menu "Sub Timelines" 7314 and expanded it. The "Sub Timeline", "Daniel son #1", 7315 is displayed. Also "Sub-Timeline", "My version of FACEBOOK" 7316 is displayed. With available API shared by FACEBOOK, user FACEBOOK Single "User Timeline" could be fed into the planning system as a "Sub-Timeline". By Clicking on "Add New" button new "Sub-Timeline" could be added.

Event "Mom Birthday Party" 7321 is created directly by Mary Jones and some pictures are attached to this personal event. This event doesn't belong to any "Vendor Timeline" because the timeline user created it. There are three (3) hyperlinks at the bottom of this event: "Edit" 7318, "Delete" 7319, "Sub-Timelines" 7320. If Mary Jones clicks on "Edit" button 7318, she would be able to edit the event she created directly in the planning system as it is shown in FIG. 11EE. By clicking on "Delete" 7319, a "Timeline User" event could be deleted. By clicking on "Sub-Timelines" 7320, a screen will pop up that allows the target "Sub-Timeline" for the events to be changed. The event could be moved from one "Sub-Timeline" to another or could be removed from all "Sub-Timelines", or one Event could get repeated in many "Sub-Timelines". As shown in FIG. 11E, bar 7321A shows that event "Mom Birthday Party" 7321 is in the sub-timeline 7342. GOOGLE sub-timeline 7342 is shown collapsed, as discussed in more detail with respect to FIG. 11F.

In FIG. 11E if user clicks on "Event" button. The same dialog as "Edit" event shown in FIG. 11E will pop up, but its title would say "Add Event".

Referring to FIG. 11EE, as continuation of FIG. 11E "Timeline User", Maryjones@gmail.com clicked on "Edit" hyperlink under event "Mom Birthday Party" 7321. The screen "Edit Event" 7330 pops up. In this screen Mary Jones could update Event "Title", Event "Description", Event duration entering date/time in "From" 7334 and "To" 7335 fields. Event "Color" 7336 can be changed by user's taste for personal categorization. For event "Type" 7337 Mary Jones could use an existing event "Type" that she created before or she could create a new event "Type" by clicking on "+New Type" under the drop down. In field "Media" 7339 user could choose zero or many media files 7338. A "Media" can be removed by clicking on "Remove" button 7340.

On the right hand side this event can be associated to zero or many "Sub-Timelines" or a brand new "Sub-Timelines" can be added by clicking on "+" button 7341. At this time this event is associated to "GOOGLE", "Sub-Timeline" 7342. Finally Mary Jones clicks on "Save" 7345 and her events get updated, otherwise she clicks on "Cancel" Button 7344 and her changes doesn't get updated.

The "New Event" dialog has the same components as shown in FIG. 11EE.

Referring to FIG. 11F, "Timeline User", Maryjones@gmail.com can click on button 7353 and collapse/expand "Sub-Timeline", "Daniel son #1" 7352 or click on "X" 7351 and hide "Sub-Timeline", "Daniel son #1" 7352 by double clicking on "Sub-Timeline", "Daniel son #1" under "Sub-Timeline" menu, "Daniel son #1" can be unhidden.

As it is displayed the same event shown in main timeline can also be displayed in zero, one, or more different "Sub-Timeline". It means "Main Timeline" always displays all events. Some events may only be in the "Main Timeline" if no "Sub-Timeline" is selected by a user.

Referring to FIG. 11G, "Timeline User", Maryjones@gmail.com can unsubscribe from a "Vendor Timeline". For example after her second son is finishing first grade, she can unsubscribe from "1st Gr-Math-Science-Mr Star" 7364. To do so she clicks on left menu "My Vendors", search for "Anderson School" and double click on "Anderson school" to see list of "User Vendor", timelines. Then she can hover over "Vendor Timeline", "1st-Gr-Math-Science-Mr Star" and clicks on the button 7361 to unsubscribe. As it is shown the planning system provides a uniform user interface (UI) for subscribing and unsubscribing to any vendor instead of digging into different vendor website(s) to try to find how to "Unsubscribe". For example, to subscribe to "TARGET" and "MACYS" websites and later on to unsubscribe from them requires familiarity with their ever changing websites.

In screen 11G, if Mary Jones wants to synchronize her planning system with GOOGLE in two ways she could do that by clicking on hyperlink "Sync with GOOGLE" 7365 and/or screen 7371 shown in FIG. 11J will pop up.

Referring to FIG. 11H, continuation of FIG. 11G "Timeline User", Maryjones@gmail.com, will login to GOOGLE Calendar providing GMAIL username 7370 and GMAIL password 7371. Mary Jones could decide to do one (1) way or two (2) way synchronization between GOOGLE calendar and the planning system by clicking on Check box for "Export from PLANNING SYSTEM to GOOGLE" 7372 and/or Check box for "Import from GOOGLE into PLANNING SYSTEM" 7373. The user could also choose to "Synch Vendor Events" 7374 and/or "Synch only events are in a selected "Sub-Timeline" 7375. Mary Jones could also choose the "Target Sub-Timeline" 7376 where the synchronization will appear in its own dedicated sub-timeline. Some third parties provide an API to the public for synchronization. Conventional synchronization can be used in accordance with the principles of the invention.

Referring to FIG. 11I, "Timeline User", Jpeterson@gmail.com as user identification 7380, John Peterson, logged in to "Timeline User Home". Not all "Vendor Timeline" that he has subscribed to have pop-up ads. In this screen, "Jpeterson" has subscribed to the "Dr Hashemi" timeline. "Dr Hashemi" has provided a pop-up ads on some of his "Timeline Event". For example he created a pop-up ads associated for "Pre-op Doctor Visit". The Ads shown at 7381 on the right hand side of the screen can be blinking and rotating, but these ads instead of being "Pushed Advertisement", are controlled by the user and are considered pulled advertisement. The first reason for that is that these ads are only coming from "Vendor Timeline" listed "My Vendors" in the left menu. Secondly even the ads coming from the list of "My Vendors" could be filtered by the "Timeline User" provided keyword. If User clicks on rotating ads 7381, a pop-up screen will show up as shown in FIG. 11L.

Referring to FIG. 11J, "Timeline User", Jpeterson@gmail.com, John Peterson, can click on "Add more keywords". This will allow adding of new keywords in order to filter pop-up ads. The existing list of keywords could be disabled and enabled by clicking on the check box next to each keyword. As it is shown keyword "Surgery" is checked and that is why the pop-up ads form "Dr. Hashemi" pop-up ads are allowed to show up as pop-up ads next to John Peterson screen because he chooses so. Finally when user clicks on "Save" button all new keyword filters get saved. This feature in the planning system allows to users to pick and choose their ads, their vendor from a particular minority group, religious group, etc. Therefore the internet pop-up ads could be filtered by choice.

In certain implementations, in the same fashion that a user subscribed to schools, a user could subscribe to department stores and see all the coupons under one sub-timeline. These sub-timelines could be hidden and unhidden. When they are needed they could be unhidden and further expanded/unexpanded as discussed earlier herein. For example, MACY'S coupons could be hidden until one needs to go shopping there.

In one or more embodiments, the system may be used to track historical coupons. For example, a user may be interested in comparing the coupons currently offered by advisors with coupons offered by those advisors the previous year at the same time, e.g. comparing post-Thanksgiving "Black Friday" deals of the current year with the previous year. Although a year is used as an example, any timeframe, such as weeks, days, or months, may be used to identify coupons to compare.

In one or more embodiments, the system may enable a user to share a timeline or a portion of a timeline with other users, such as consumers. The timeline or portion may be shared as a copy, so that the second person can edit or change the copy without affecting the user's timeline.

Referring to FIG. 11K "Vendor Timeline" entry/event could come from three (3) sources:

Category A—Vendors that enter their own entries (Events, coupons) into their "Vendor timeline"

Category B—Vendors that their entries will be auto-populated by "Auto populate" module Category C—Vendors that provide two ways API for the planning system to communicate with them such as FACEBOOK, GROUPON, TWITTER, etc. through a "Customized Populate module"

A vendor can be in Hybrid mode and be in more than one Category which means a "Vendor User" can have an auto-populate event/timeline (Category B) created by the planning system as well as self-entry event/timeline (Category A).

Referring to FIG. 11K, "Timeline User", Jpeterson@gmail.com, John Peterson, has subscribed to two "Vendor Timeline", "OFFICEMAX" 7406, and "RADIOSHACK" 7405. Both of these are falling into "category B" of vendors that their "Vendor Timeline" entries/events gets auto-populated by the planning system.

The planning system uses an "Auto populate" algorithm. In order to auto-populate a "Vendor Timeline", the planning system admin manually subscribes to all popular vendors who offer e-mail subscription using the planning system e-mail account(s). The planning system "Auto populate" algorithm reads the planning system received e-mail from these vendors and insert an event for each e-mail into the right "Vendor Timeline".

Referring to FIG. 11K John Peterson has "Sub-Timeline", "Radio Shack" 7405 that is expanded and it shows two events, "Summer Clearance sale-In-Store-End Jun. 29, 2013 . . . "7403 and "7 Days Left to Shop for Dad!" 7402. John Peterson has "Sub-Timeline", "OFFICMAX" 7401 that is expanded and it shows one event, "Columbus Day Savings %20 off In Store+Online" 7401. These events are extracted from e-mail subscriptions to RADIO SHACK and OFFICEMAX by the planning system "Auto populate" algorithm behind the scene. If "Timeline User", John Peterson 7400, clicks on button "More Info" in the event entry "Columbus Day Savings %20 off In Store+Online" 7401 the pop-up shown in FIG. 11L will be displayed.

If a vendor like "MACYS" has different category of subscription, such as "MACYS Furniture", "MACYS Kitchen", etc. The planning system could use the same "Auto populate algorithm" but use different planning system Admin e-mail account. The combination of vendor name and "PLANNING SYSTEM-admin-e-mail" will be the determination factor for the algorithm to decide which "Vendor Timeline" an event belongs to and needs to be created in. For example for "MACYS" we could have multiple "Vendor Timeline" in the planning system such as "MACYS Furniture", "MACYS Kitchen". The e-mails associated with each category will land as an event in "Vendor Timeline", "MACYS Furniture" or "MACYS Kitchen" accordingly.

Referring to FIG. 11L, continuation form FIG. 11K after "Timeline User", "John Peterson" clicked on "More Info" on one of the auto-populates events. In this screen if user clicks on the "RADIOSHACK-Clearance Event Save up to 75%", the "RADIOSHACK" web site will be opened and user could purchase the item form "RADIOSHACK" directly. In this situation the planning system is just one stop shop for all coupons/offers/events. The planning system is just a layer that represents all vendors with the same look and feel, with same vendor subscription/un-subscription user interface, etc.

Vendor<—Planning System Advisor—>Consumer

The planning system offers its own uniform purchasing portal for all Vendors and it could take advantage of GOOGLE WALLET, PAYPALL, etc.

Referring to FIG. 11M, it shows the body of original e-mail "RADIOSHACK-Clearance Event Save up to 75%" 7421, received from RadioShack in "PLANNING SYSTEM-Admin-e-mail" account. The sender is "RADIOSHACK" 7422 and the e-mail subject "Summer Clearance Sale In-Store-Ends 6/29" 7423 is the "Event Title" in the planning system in "Sub-Timeline", "RADIOSHACK".

Referring to FIG. 11N shows the "Timeline User", Jpeterson@gmail.com, John Peterson, 7431 "Timeline User Home". This screen shows how the planning system can be used for vendors that invite people to events such as performances. Screen 7430 shows another example of "Vendor Timeline", "KENNEDYCENTER" that is auto-populated by the planning system and is "subscribed to" by "Timeline User", "John Peterson". This "Vendor Timeline" is displayed under John Peterson's "Sub-Timeline", "KENNEDYCENTER" 7432. The event "Top 5 reasons to see Peter & the Starcatcher next week—$39 seats!", 7433, can be viewed in more detail by clicking on "More Info" button that opens up a pop-up. If user clicks on the pop-up, the "KENNEDY CENTER" site will open up and it allows the ticket to be purchased form "KENNEDY CENTER". Another user options is that after user sees the event he can physically go to Kennedy center and purchase the ticket there.

The planning system offers a one stop shop for all coupons/events, life events, vendor events, advises, etc. There are other internet sites that offer central place for coupons, but they are not Smart Calendar or Social Media at the same time. However, the planning system is a smart calendar that is social media for consumers and vendors in one stop shop and covers C2C (Consumer to Consumer), (Business 2 Consumer) and B2B (Business to Business) relationships/transactions.

The Event "Engagement Party in Hilton Hotel" 7434 is an example of an event that "Timeline User" "John Peterson" created and sites next to the "Auto populated" events.

To differentiate an event that "Timeline User created" from an event that belongs to a "Vendor User", one can look at the strip at the bottom of the events. If the hyperlink under the events read as "Edit", "Delete", "Sib-timelines" then that is a "Timeline User" generated event. If the bottom strip says "Delete", "Sub-timelines", "Review & Rate" then it is a "Vendor User" generated event. As it is shown in event 7433 belong to "KENNEDY CENTER", the strip under event show "Delete", "Sub-timelines", "Review & Rate" because this event belong to Travelocity.

Referring to FIG. 11O shows how the "Timeline User" can be an advisor or a vendor. A "Timeline User", Jpeterson@gmail.com, John Peterson, 7441 can click on the hyperlink "Create Vendor" and the screen "Create Vendor" 7477 will pop up, John Peterson could enter the title in field "Title" 7442 for his "Vendor User" account, the company name if he has any in the field "Company" 7443 and upload a logo file in field "Logo" 7444. Finally he clicks on button "Create" 7446 and "Vendor User" account gets created for John Peterson with the same userid. From now on a new hyperlink on top of the screen that says "Vendor Home" will allow John Peterson to switch to his "Vendor User" account. When John Peterson is on "Vendor User Home", he could click on a hyperlink called "TimelineUser" and switch back to "Timeline User Home". When John Peterson is on the Vendor side he could create many of his own "Vendor Timeline" and provide free advise that all users could subscribed to or he could sell goods/services. This allows a dynamic e-commerce web site creation for a simple consumer such as John Peterson who wants to be a vendor of goods/services/advise without the pain of hiring someone to create a static website for him and without doing any marketing to find subscriber, he could start from friends and it could go viral.

Referring to FIG. 11P the "Timeline User". "Mary Jones" 7450 can filter his events by clicking on left menu "Filter by keyword" 7452, and enter a keyword. As a result all events that have this keyword will be shown.

There is one more subject here that is good to mention. As it is shown in screen 7451 the event, "MACYS, October sale all furniture are 30% off . . . ", 7454 shows list of offers by "MACYS" and Mary Jones could click on "Buy Now" and purchase this item from Macys, through the planning system.

Referring to FIG. 11Q the "Timeline User". "Mary Jones" 7460 can filter the events by color. The time an event is getting created, "Timeline User" decides on the event color. Also every event created by the "User Vendor" may have a special color. Color could have a special meaning for the "Timeline User" or "Vendor User" to classify their events. Every event on each timeline could be filtered if "Timeline user" clicks on "Filter by color" 7462, and click on a color. In this screen Mary Jones, clicked on "Green" color 7463. As a result all the events that have the same green color will be shown. In this example Event 7464 and another green color event are the only events displayed in all timelines.

Referring to FIG. 11R, "Timeline User", Maryjones@gmail.com, 7470 could filter her events by "Event type". Every event that is getting created by the "Timeline User" or "Vendor User" has an "Event Type" that is either created by the user on the fly or user uses an existing "Event type". Every event on each timeline could be filtered if "Timeline User" clicks on "Filter by Event Type" 7472, and choose a type or enter a type. As a result all the events that have the same type will be shown.

There is no screen for "Navigate to Date". If "Timeline User" clicks on "Navigate to Date" on left menu, "Timeline User" could choose a day in the calendar to jump to those dates in the timeline, or could click on the hyperlink year or hyperlink month to scroll the timeline up/down to those dates.

Figure 11S:
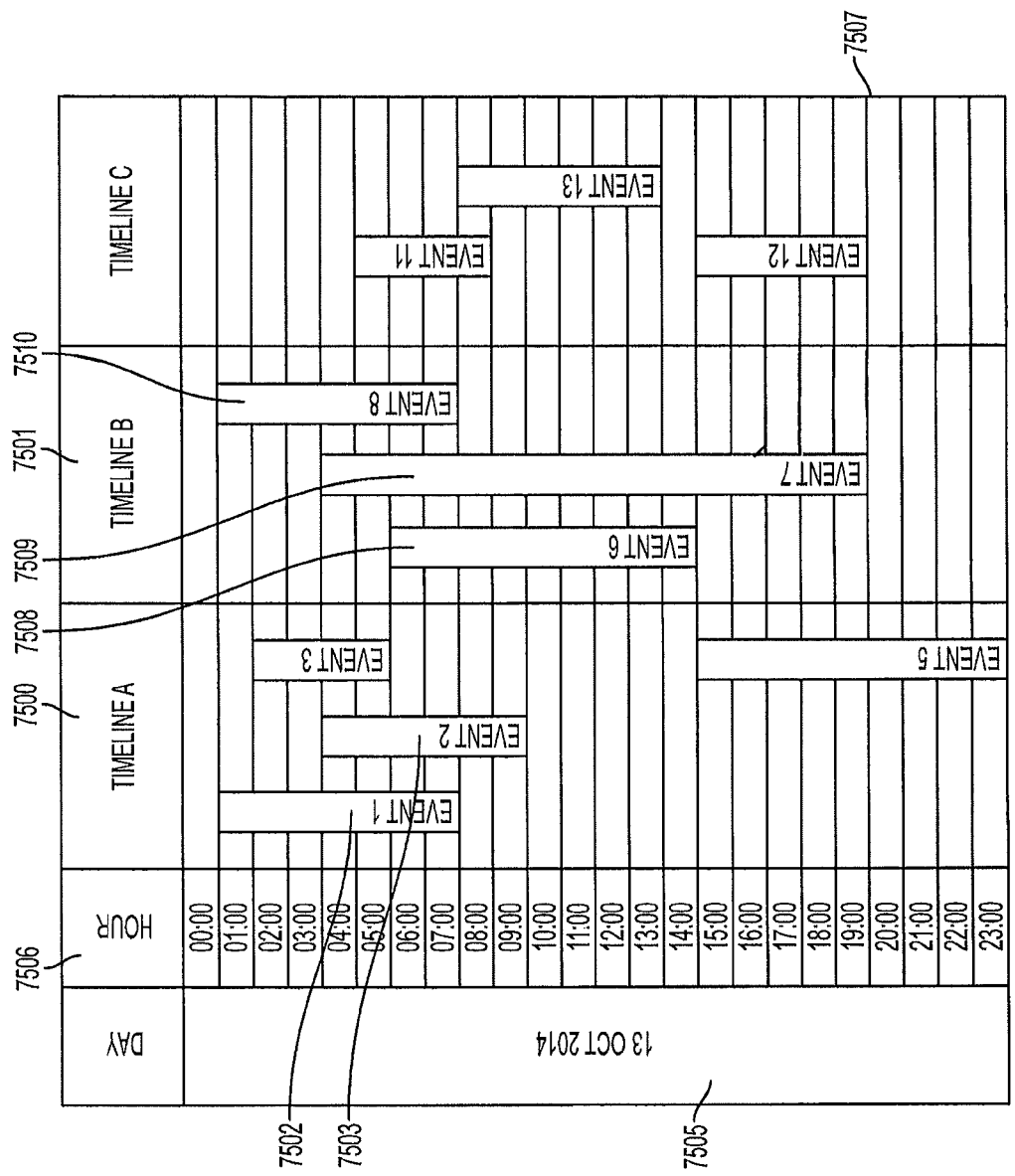
FIG. 11S is an embodiment for illustration of timelines.

Referring to FIG. 11S, "Timeline User" could click on a day and see the events in different hours 7506 of the day

7505. As it is shown, all the Sub-Timelines 7500 that are not hidden will be displayed in parallel and depending on the number of events that are under each "Sub-Timeline" the width of the "Sub-Timeline" could be increased or decreased. For example under "Sub-Timeline", "Timeline A", the "Event 1", 7502 starts at 1:00 AM and ends at 8:00 AM, the "Event 2", 7503 starts at 4:00 AM and finishes at 9:00 AM. Since "Event 1" and "Event 2" having conflict or overlap, the planning system algorithm opens a new invisible column for conflicting events. However event "Event 5" and "Event 3" don't have any overlap and could stay in the same invisible column. The width of this invisible column is equal to the event strip. The "Sub-Timeline", "Timeline B" also shows 3 parallel events, "Event 6" 7508, "Event 7" 7509 and "Event 8" 7510, as it is displayed they all have conflict and are in 3 different invisible columns.

Figure 12A:
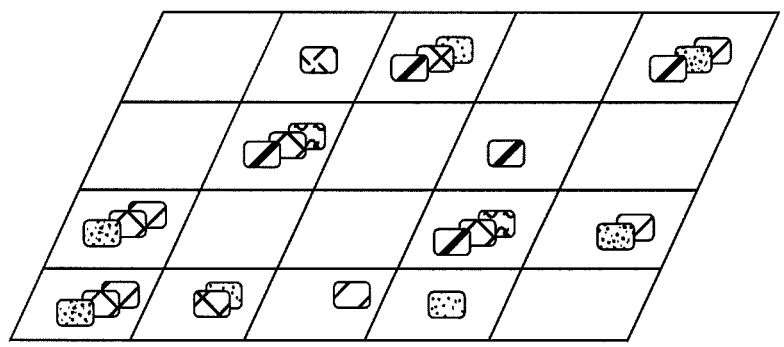
FIG. 12A depicts a prior art calendar.
Figure 12B:
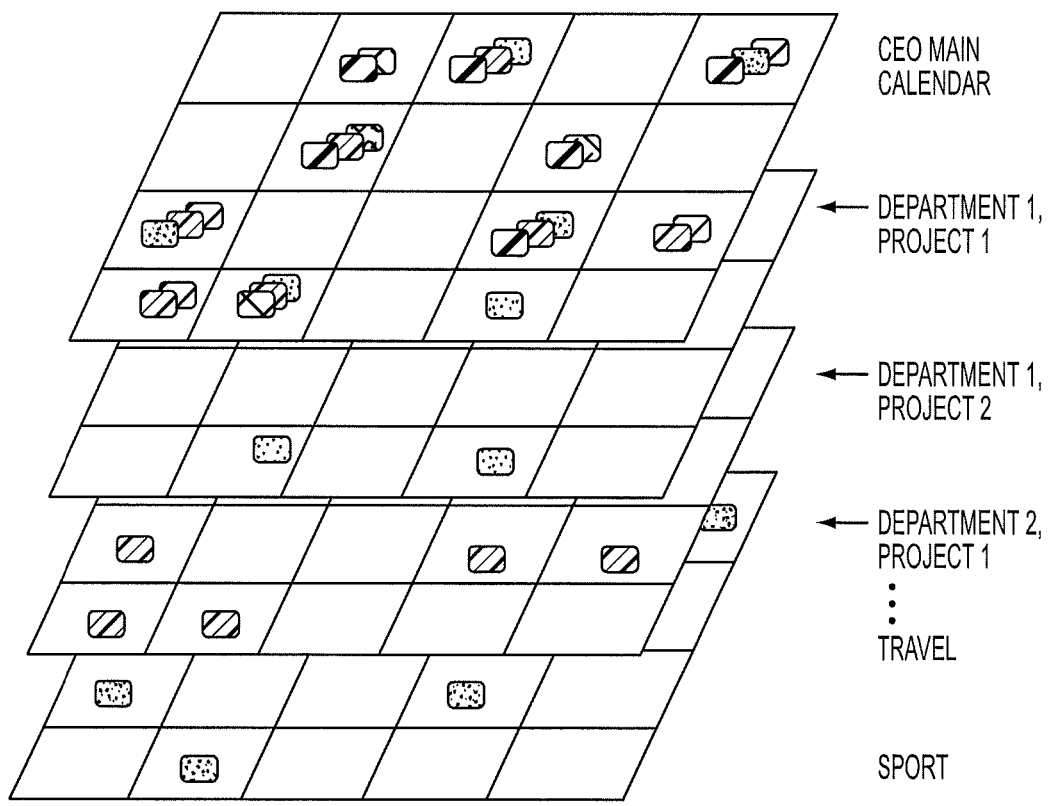
FIG. 12B depicts a three-dimensional calendaring and social networking planning system in accordance with the principles of the invention.

FIG. 12A represents a Prior Art one-dimensional calendar. As is typical, all events are listed by date on the flat, one-dimensional calendar. By contrast, in accordance with the principles of the invention, the systems and methods described herein implement the use of what can be referred to as a three-dimensional calendar system as represented in FIG. 12B. In one implementation, this planning system utilizes timelines and sub-timelines for categorization and separation of life events of users. As illustrated in the example shown in FIG. 12B, the main calendar, for example, of a CEO in a two-dimensional representation can include all events of the user, which can be referred to, for example, as the main calendar or timeline. The other dimensions, extending into a third-dimension by representation in FIG. 12B, shows categorized events by categorized layers or sub-timelines, for example, such as department projects, travel and sports.

Referring again to FIG. 12A, a typical calendar is displayed. Traditional calendars are usually 2-dimensional. Whether we have month, week or daily view of a calendar we still have 2-dimental calendar because we only keep track of the event and their associated time. After a while a typical calendar gets cluttered and events that are unrelated appear next to each other or on top of each other. Some calendar companies added a color feature which means during event creation user can associate each event with a color. FIG. 12A represents these differences graphically with lines and spacing. This allows user to classify different event type with different color/graphics to make their calendar more readable, but the user interface for calendar is poor. In FIG. 12 A shows that all unrelated events are on top of each other and in once glance it is hard to see the life dashboard.

Referring to FIG. 12B shows a company CEO calendar in accordance with the principles of the invention. He is managing several projects in different departments, plus his work related travel, personal travel and his sport activities are taking portion of his calendar. If he keeps his work related calendar and his personal calendar separated he will miss a meeting or an event due to unforeseen conflicts. As you see his calendar is much cluttered. If we add a new dimension to his calendar called "Calendar Type" or "Event Category", he would see events that are related and belong to the same category in one calendar. These calendars are parallel to each other. In other implementations, parallel timelines can be used instead of parallel calendar view.

Figure 12C:
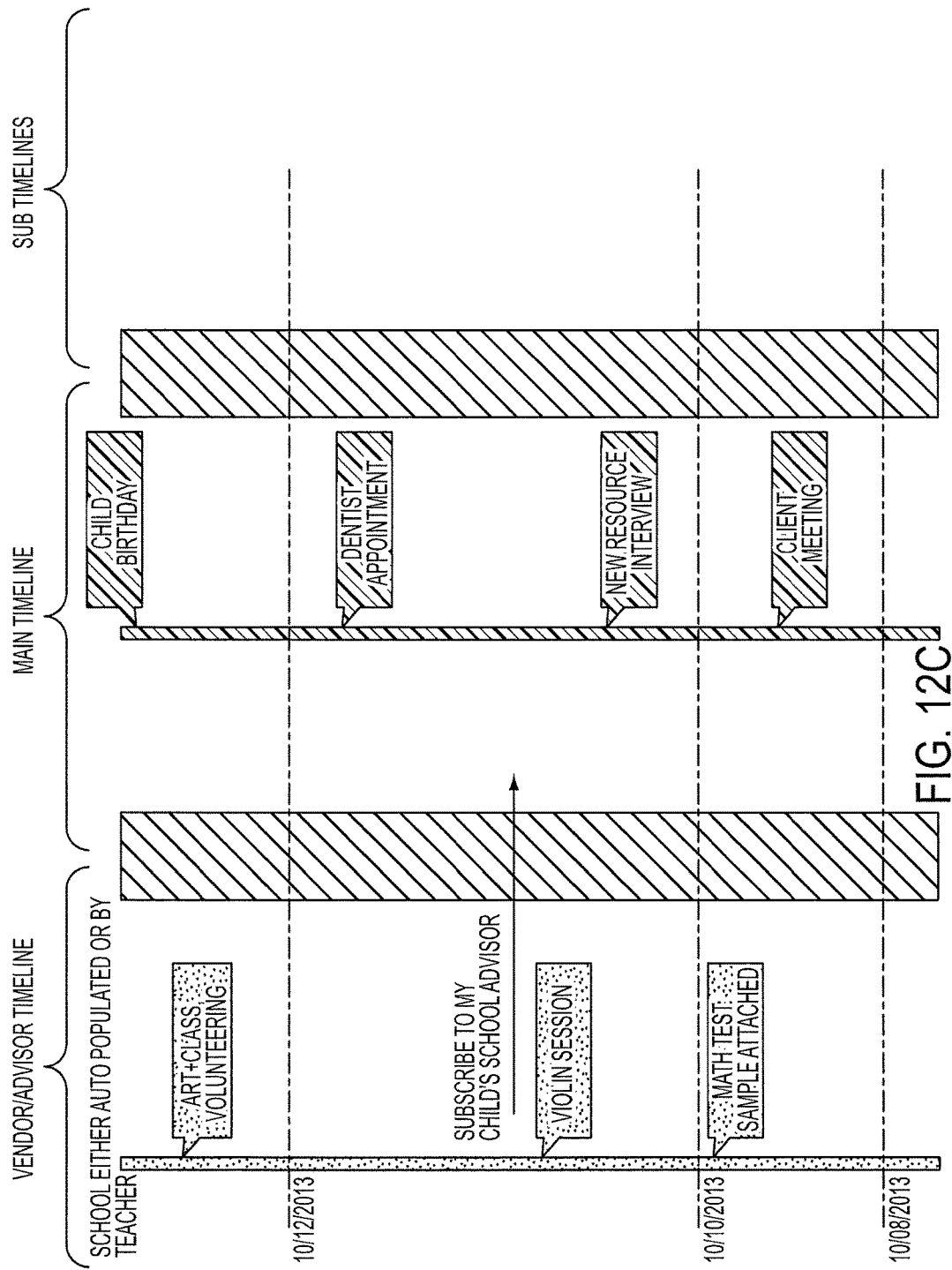
FIG. 12C depicts exemplary user timelines in accordance with the principles of the invention.

Referring to FIG. 12C three types of timelines are introduced: Vendor/Advisor timeline, Main timeline and Sub-timeline. The days in this timeline are separated by dashed lines. A teacher in a school can create classroom events such as math test, violin session, Art+ class volunteering, etc. in his/her Vendor/Advisor Timeline. As it is shown in FIG. 12C a parent can synchronize his GOOGLE Calendar with the planning system and the orange events will be displayed in Main Timeline. User is allowed to go and change the landing spot of GOOGLE events and put them in right Sub-Timeline. If the parents subscribe to the child 'school timeline' all the events that the teacher created will be added to the main timeline as well as to a the dedicated Sub-Timeline called 'child' as it is shown in FIG. 12D.

Referring to FIG. 12D it is shown that a parent, Mary Jones, has subscribed to a teacher timeline and all classroom events are fed into Mary Jones's Main-Timeline as well as 'child' dedicated Sub-Timeline. A teacher timeline is an example of a vendor that creates its own event manually.

Figure 12E:
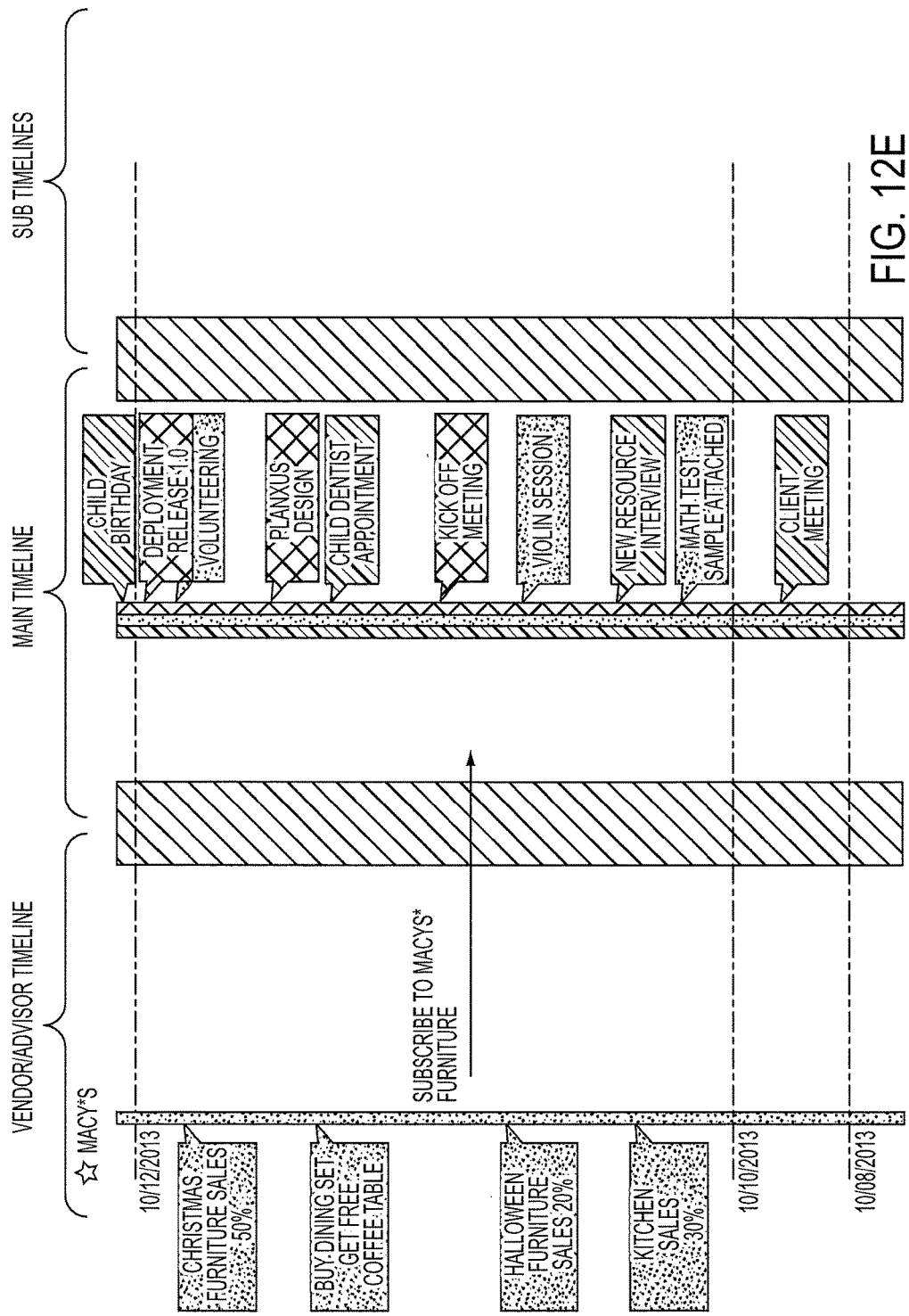
FIG. 12E depicts exemplary user timelines in accordance with the principles of the invention.
Figure 12F:
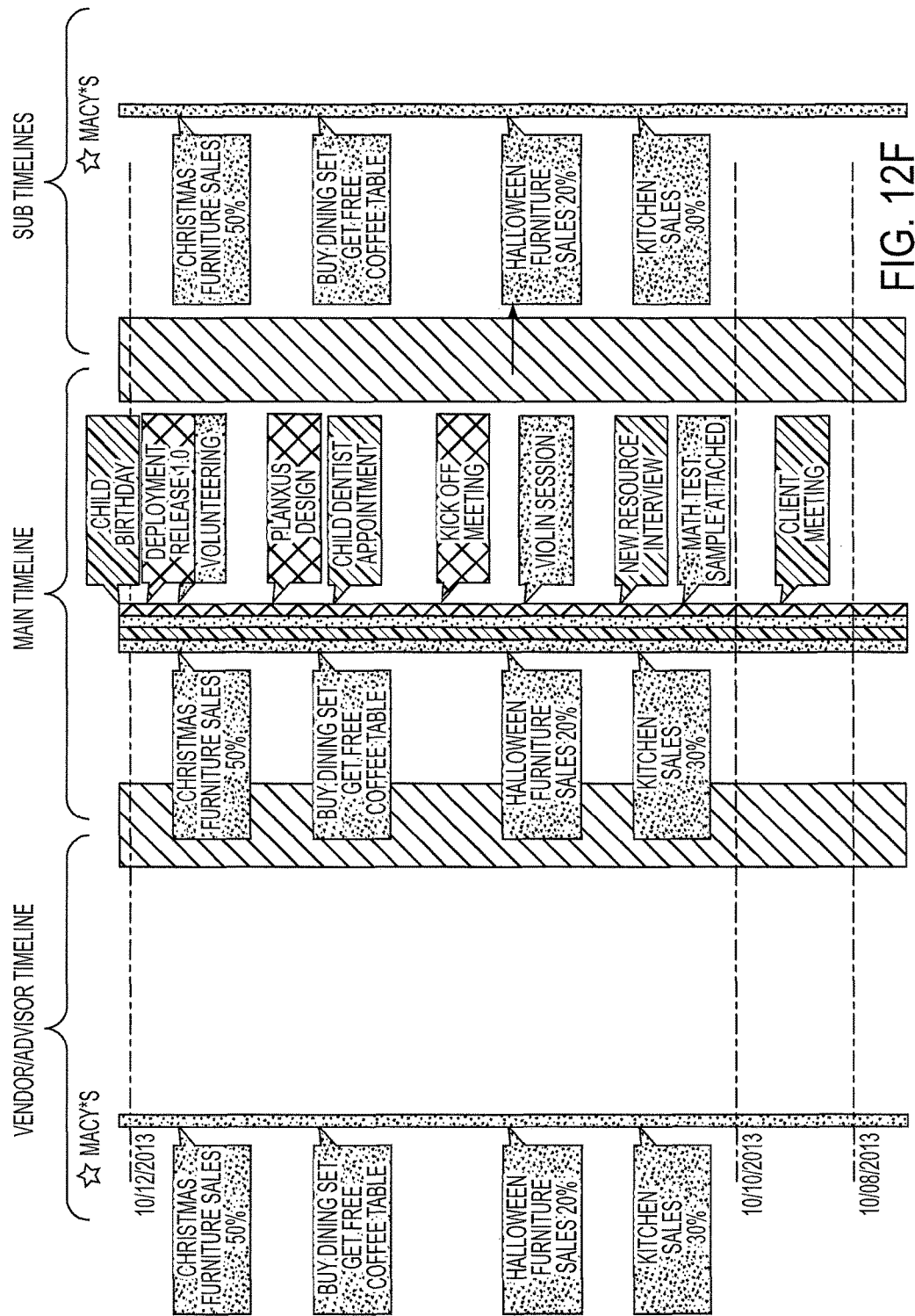
FIG. 12F depicts exemplary user timelines in accordance with the principles of the invention.
Figure 12G:
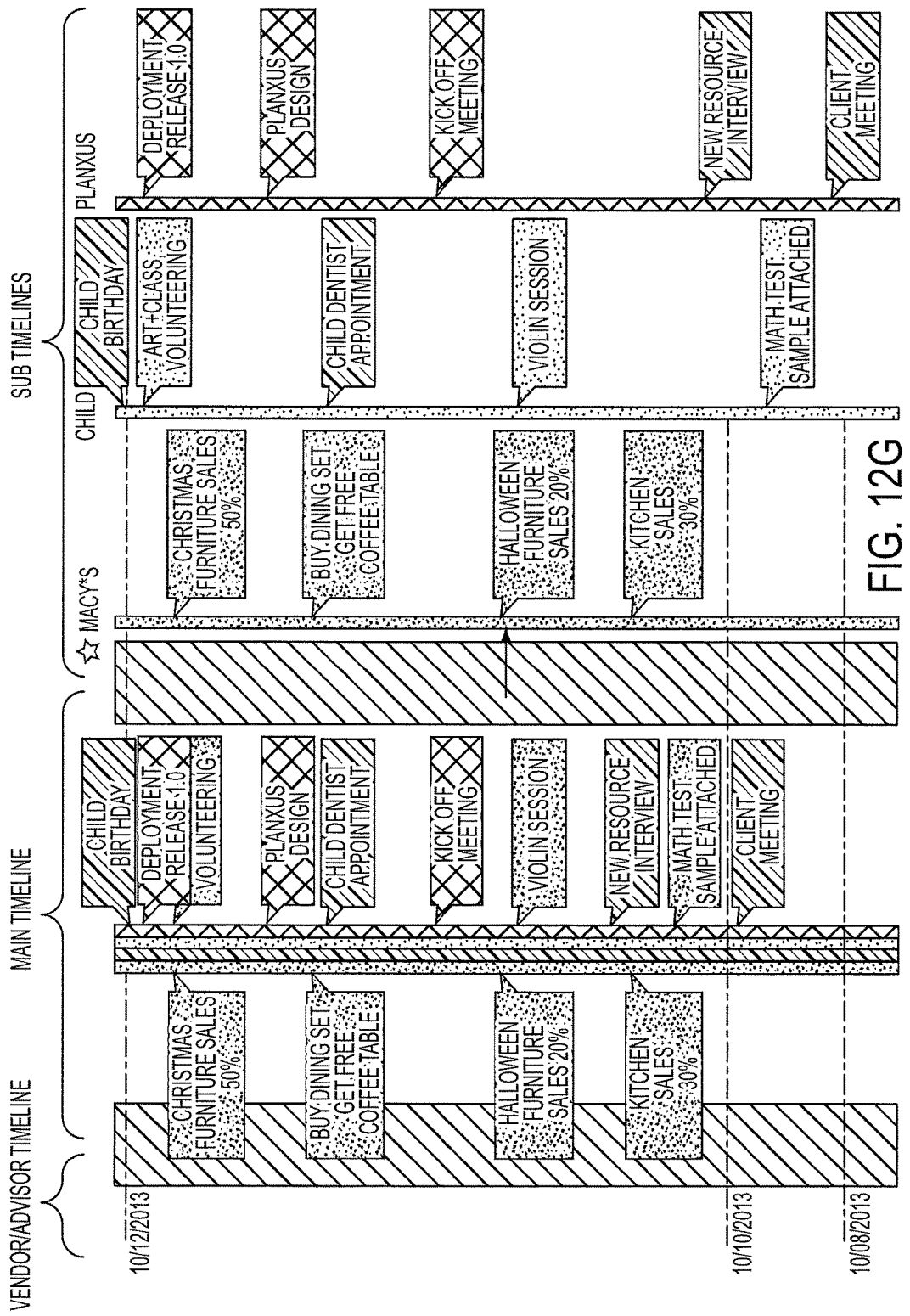
FIG. 12G depicts exemplary user timelines in accordance with the principles of the invention.
Figure 12H:
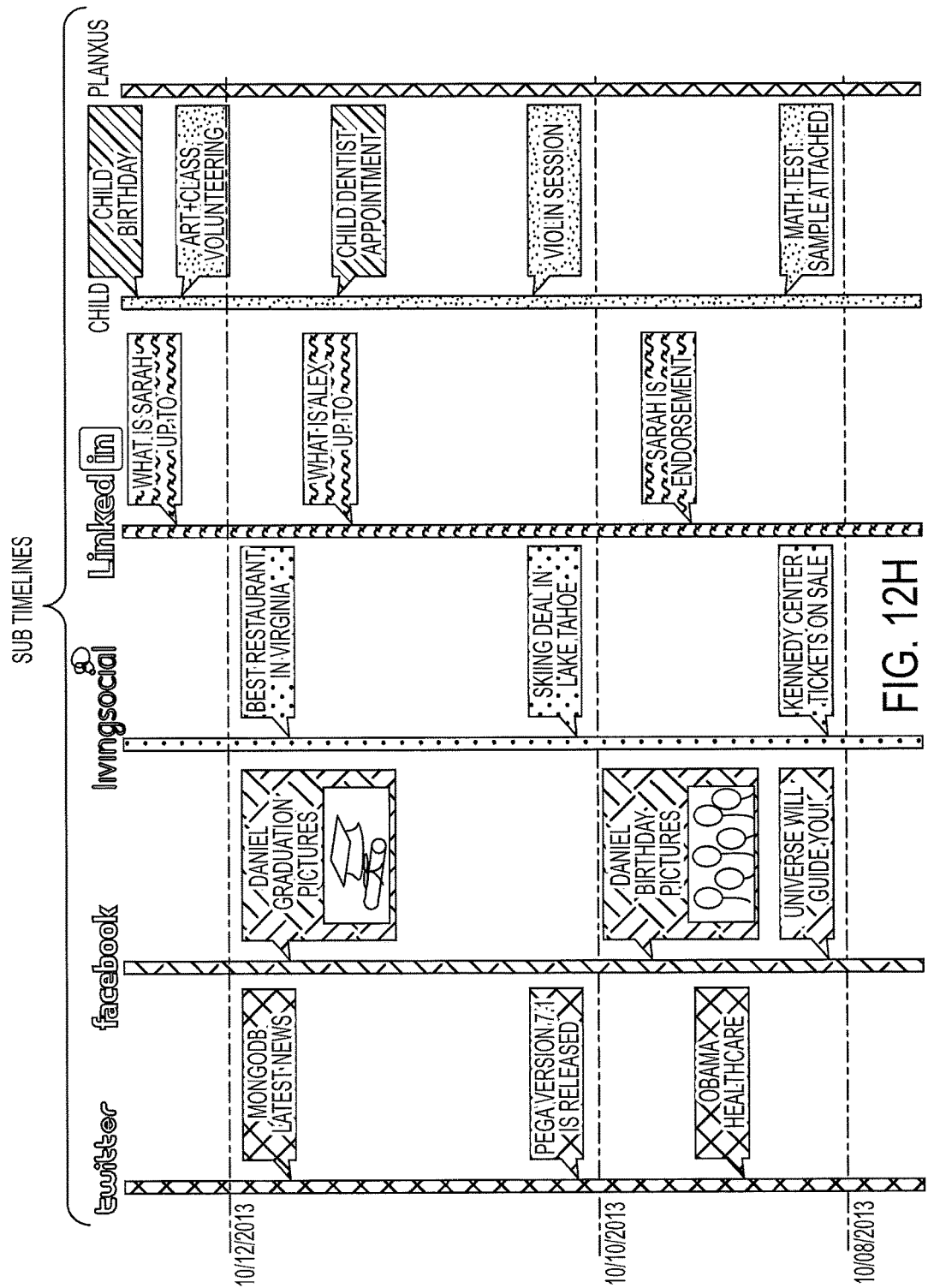
FIG. 12H depicts exemplary user timelines in accordance with the principles of the invention.

Referring to FIG. 12E it is shown that a parent has subscribed to MACYS timeline and all MAYCS events/sales are fed into Mary Jones's Main-Timeline as well as 'MACYS' Sub-Timeline. "MACYS" is the example of a vendor that is deals/coupons/offers are populated through planning system algorithm Referring to FIG. 12G it is shown that a parent has subscribed to PLANXUS IT project and all "PLANXUS IT project" events are fed into Mary Jones's Main-Timeline as well as 'PLANXUS IT project' Sub-Timeline. This is an example of using the planning system for project management. As it is shown the user has 3 parallel Sub-Timelines and only one Main Timeline. This view provides a different view to one's life. It is more like a dashboard of life's event.

Referring to FIG. 12 H if the API to FACEBOOK, TWITTER, LINKEDIN are available eventually different social media could come under the proposed planning system. The popular social Media such as FACEBOK and GOOGLE+ are not calendar and calendars such as GOOGLE or OUTLOOK are not social media. The new planning system that we are proposing here is combining Calendar and social media to have a super calendar that allows purchasing, providing advice, etc. as well as vendor teaming. All other sites co-exist. We are not competitor we are just a platform.

Figure 13:
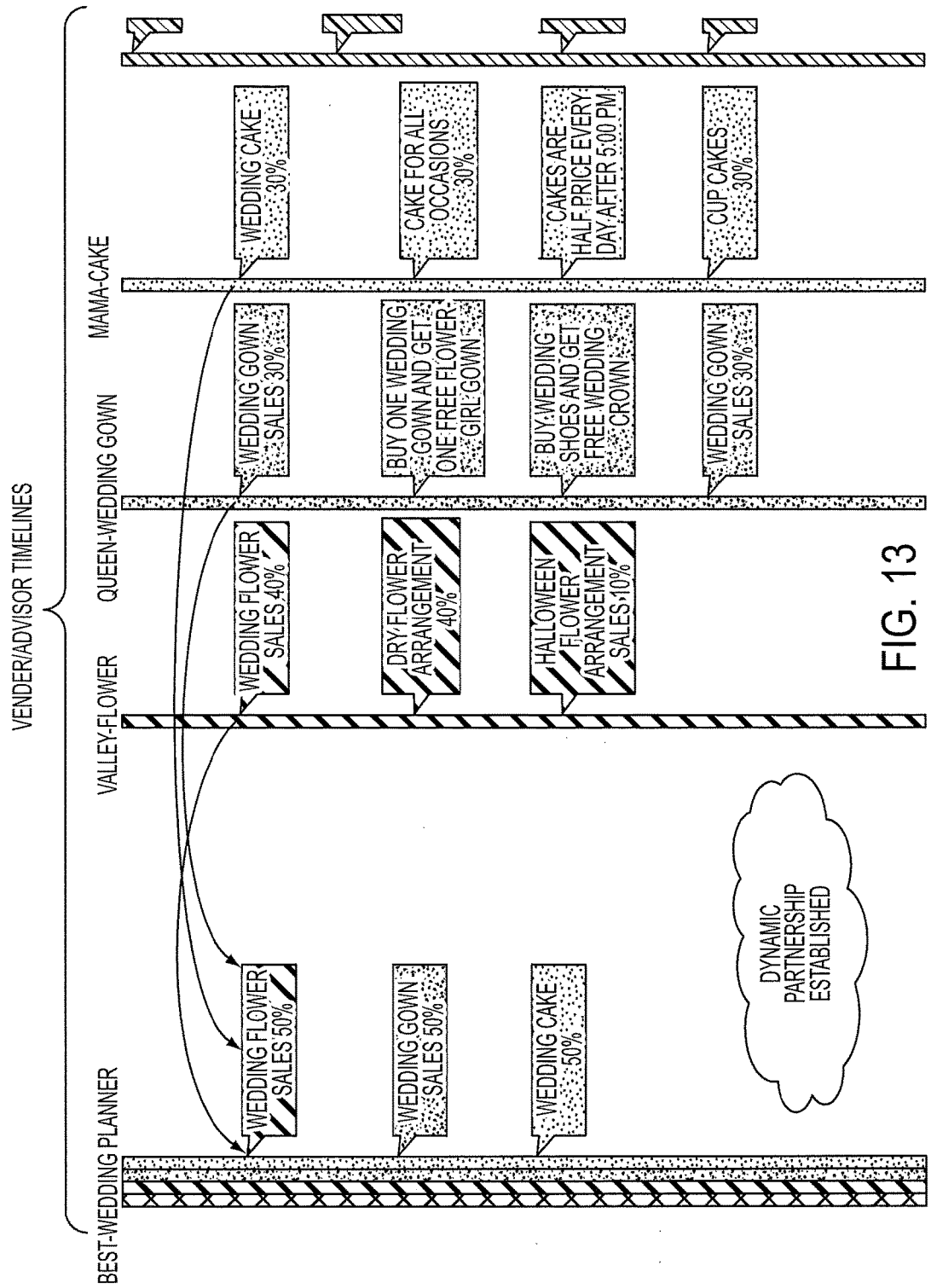
FIG. 13 depicts an exemplary vendor teaming timeline.

Referring to FIG. 13 shows that different vendors such as valley-flower, Queen Wedding Gown, Mama Cake and ABC flower each have their own "Vendor Timeline" and they offer their own coupons/events/offers. Now "Best-Wedding Planner" wants to team up with couple of vendor and create a team. He sent teaming requests to four (4) vendors "Valley-flower", "Queen-Wedding-Gown", "Mama-Cake" and "ABC flower". After negotiation, "Best-Wedding planner" chooses "Valley-flower", "Queen-Wedding Gown" and "Mama-Cake" as his team member but he did not accept "ABC flower" or maybe "ABC flower" didn't want to team up with "Best-Wedding planner". The negotiation is a 2 way system invitation, acceptance and rejection using a workflow offered in planning system.

With these systems and methods, the following can be achieved: dynamic partnership happened on the fly; they can add new team members or remove team members; for their teaming they don't need the creation of any website such as static website "Travelocity" that can only deal with travel, air, and car rental and nothing else; if "Best-Wedding planner" as part of this teaming wants to team up with MACYS it can happen on the fly without planning; the B2B advertisement could happen between vendors before teaming or as part of teaming; from the "Timeline User" perspective, it is invisible whether a vendor is a "Team Vendor" or a "Single Vendor". He/she could subscribe to both in the same fashion.

Figure 14A:
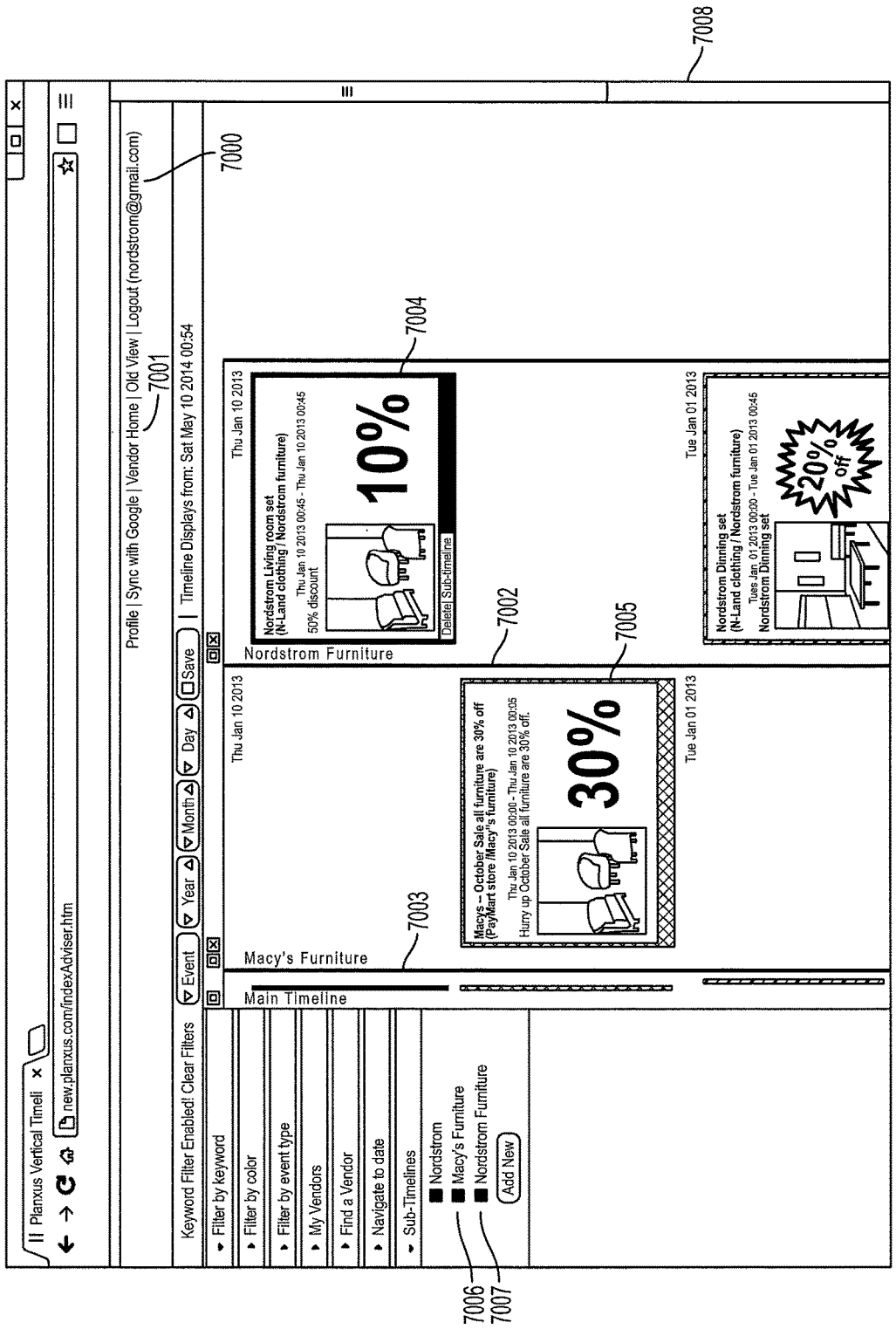
FIG. 14A depicts an exemplary interface used for historical comparison.

Referring to FIG. 14A "Vendor User", "nordstrom@gmail.com", NORDSTROM as user identification 7000, has switched to "Timeline User Home". In the planning system every "Vendor User" has a "Timeline User account". In this screen "Vendor User", "NORDSTROM", 7000, is trying to compare "Vendor Timeline", "MACYS Furniture" with its own "Vendor Timeline", "NORDSTROM Furniture". In this paragraph we refer to "NORDSTROM" as user, instead of "Timeline User". In order to do so "NORDSTROM" user finds his own "Timeline Vendor" in list of available "Vendor Timeline" and subscribe to "NORDSTROM Furniture" and assign it to "Sub-Timeline", "NORDSTROM Furniture" 7004 and by double clicking on button 7007 it will be displayed. Then "NORDSTROM" user finds "Vendor Timeline", "MACYS Furniture", subscribe to it and then assign it to "Sub-Timeline", "MACYS Furniture" 7003. By double clicking on 7006 it will be displayed. Now if "NORDSTROM" user has two "Sub-Timeline", "NORDSTROM" and "MACYS" parallel next to each other. He could compare his own events/offers belong to "NORDSTROM Furniture" with "MACYS Furniture" events/offers side by side. He can scroll up and down and look at all the events/offers in the past and near future. This allows "NORDSTROM" save money on competitor market analysis; he can have series of competitors assigned to different "Sub-Timeline" and compare their activity on daily basis. Also from the event/offers/coupons offered by competitor in the past, "NORDSTROM" could predict the future event/offers/coupons. For example "Vendor Timeline", "Macys Furniture" offers "MACYS—October Sale all furniture 30% off" 7005 on Jan. 10, 2013, versus "NORDSTROM Living room set is 10% off" 7004 on Jan. 12, 2013.

Figure 14B:
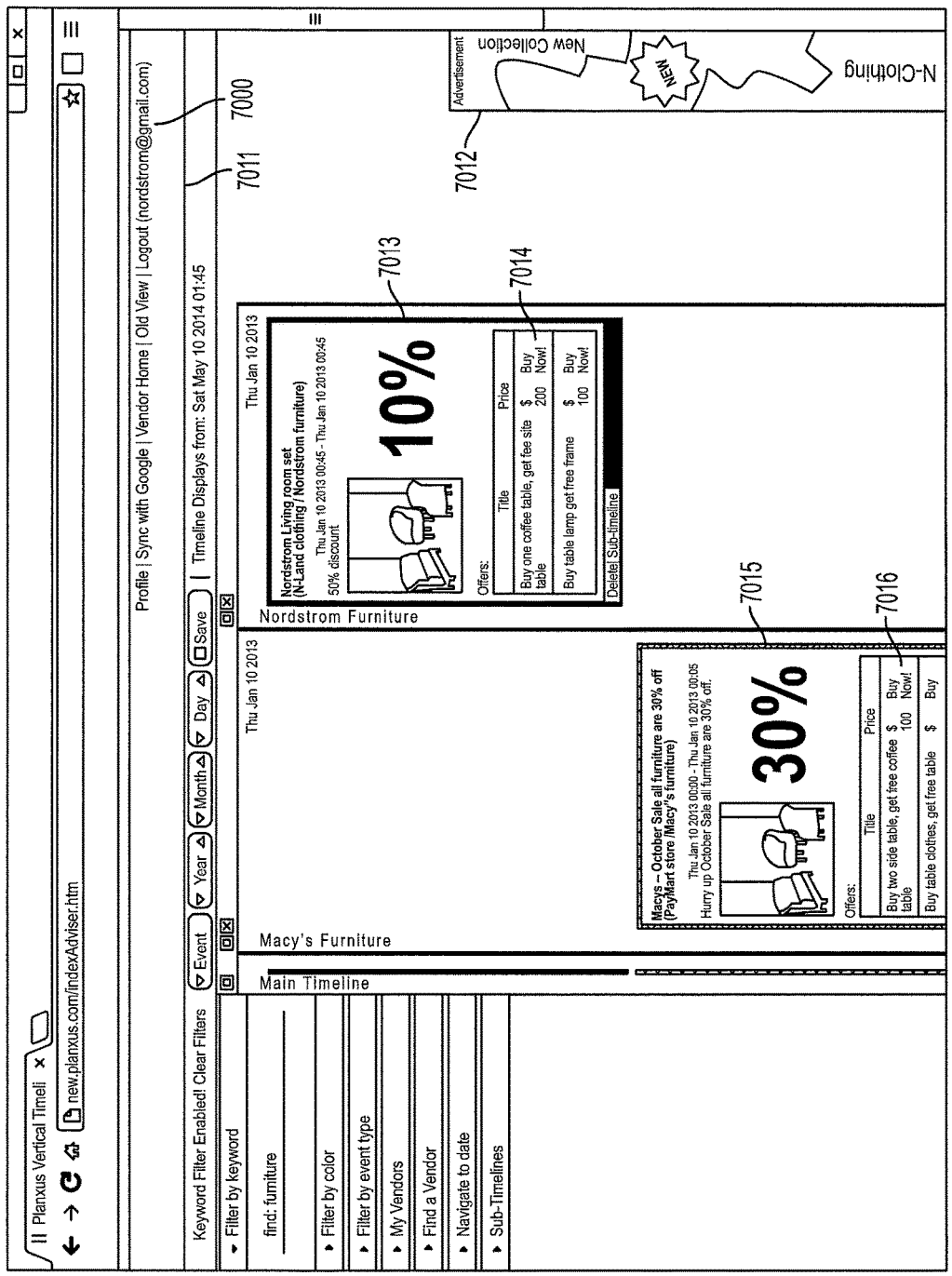
FIG. 14B depicts an exemplary interface used for historical comparison.

Referring to FIG. 14B "Vendor User", "nordstrom@gmail.com", NORDSTROM as user identification 7000, is doing exactly what has been explained in FIG. 14A, the only difference is that "NORDSTROM Furniture" Event 7013, has multiple "Vendor Offer" 7014 with price. Also "MACYS Furniture" Event 7015, has multiple "Vendor Offer" 7016 with price that can be compared by "Vendor User", "NORDSTROM" as a secret shopper. The blinking advertisement, 7012 also shows all the pop-up ads by "NORDSTROM Furniture" and "MACYS Furniture". As it was mentioned before these ads are only rotating on list of "My vendors". Therefore if "NORDSTROM" user only subscribed to "NORDSTROM furniture" and "MACYS furniture" and other competitor, he could compare his competitor's pop-up ads. He could further filter the pop-up ads as it was explained in screen 7390 and only see selective pop-up ads for competitor market analysis.

Figure 14C:
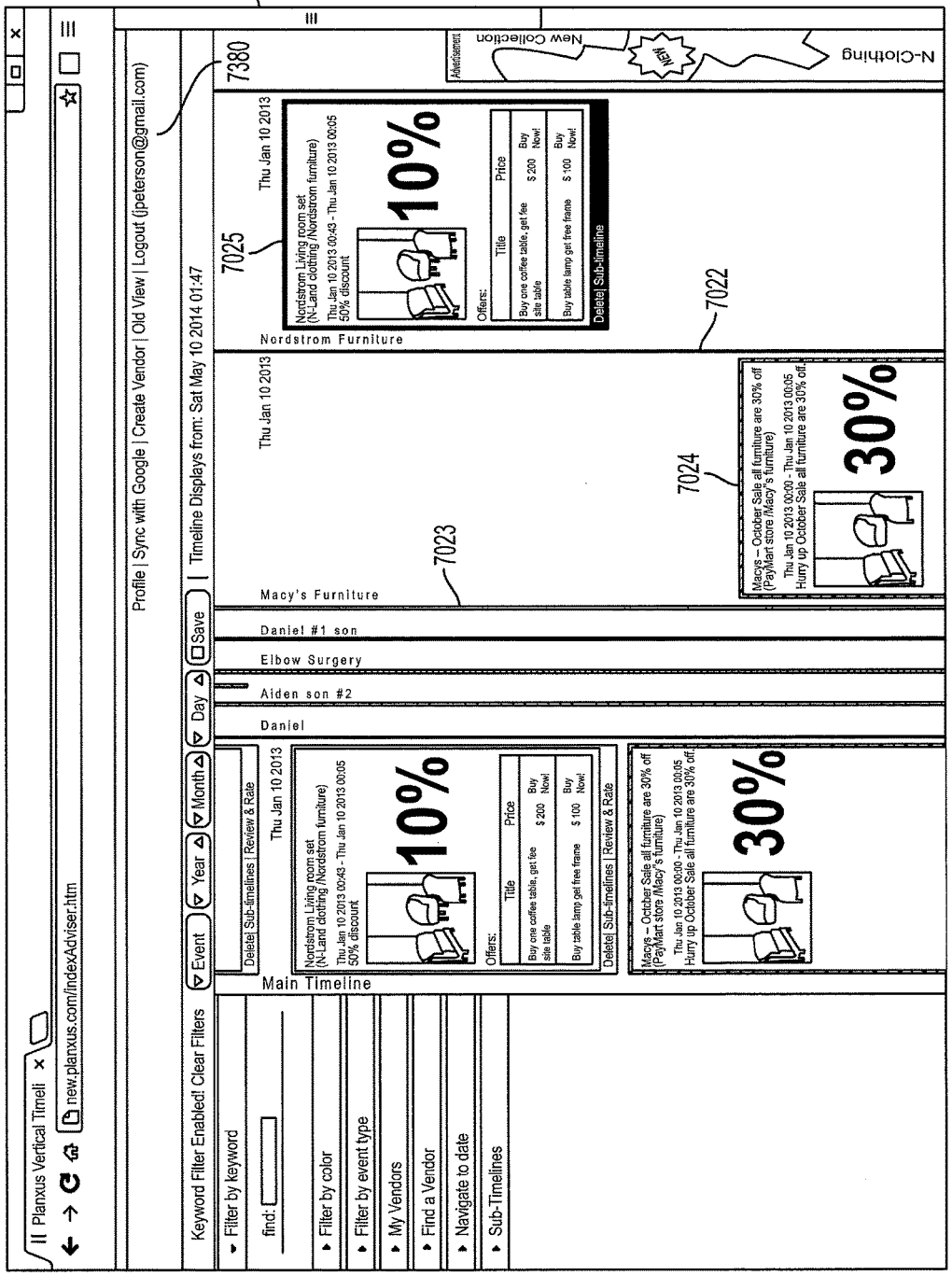
FIG. 14C depicts an exemplary interface used for historical comparison.

Referring to FIG. 14C "Timeline User", "jpeterson@gmailcom" as user identification 7020 has subscribed to "Vendor Timeline", "NORDSTROM furniture" and assigned it to "Sub-Timeline", "NORDSTROM furniture" 7023. He has also subscribed to "Vendor Timeline", "MACYS furniture" and assigned it to "Sub-Timeline", "MACYS furniture", 7022. Now John Peterson could compare two different vendor's Event/Offers/Coupons side by side. He could scroll up and down and on the "Sub-Timeline", "NORDSTROM furniture", 7023 and compare them with event/offers/coupons in "Vendor Timeline", "MACYS furniture" in the past. He could predict the future event/offers/coupons by their historical coupons. If "NORDSTOM" offered 10% furniture discount in January 2013, there is a good chance the same deal will be offered by "NORDSTOM" in January 2014.

Figure 15A:
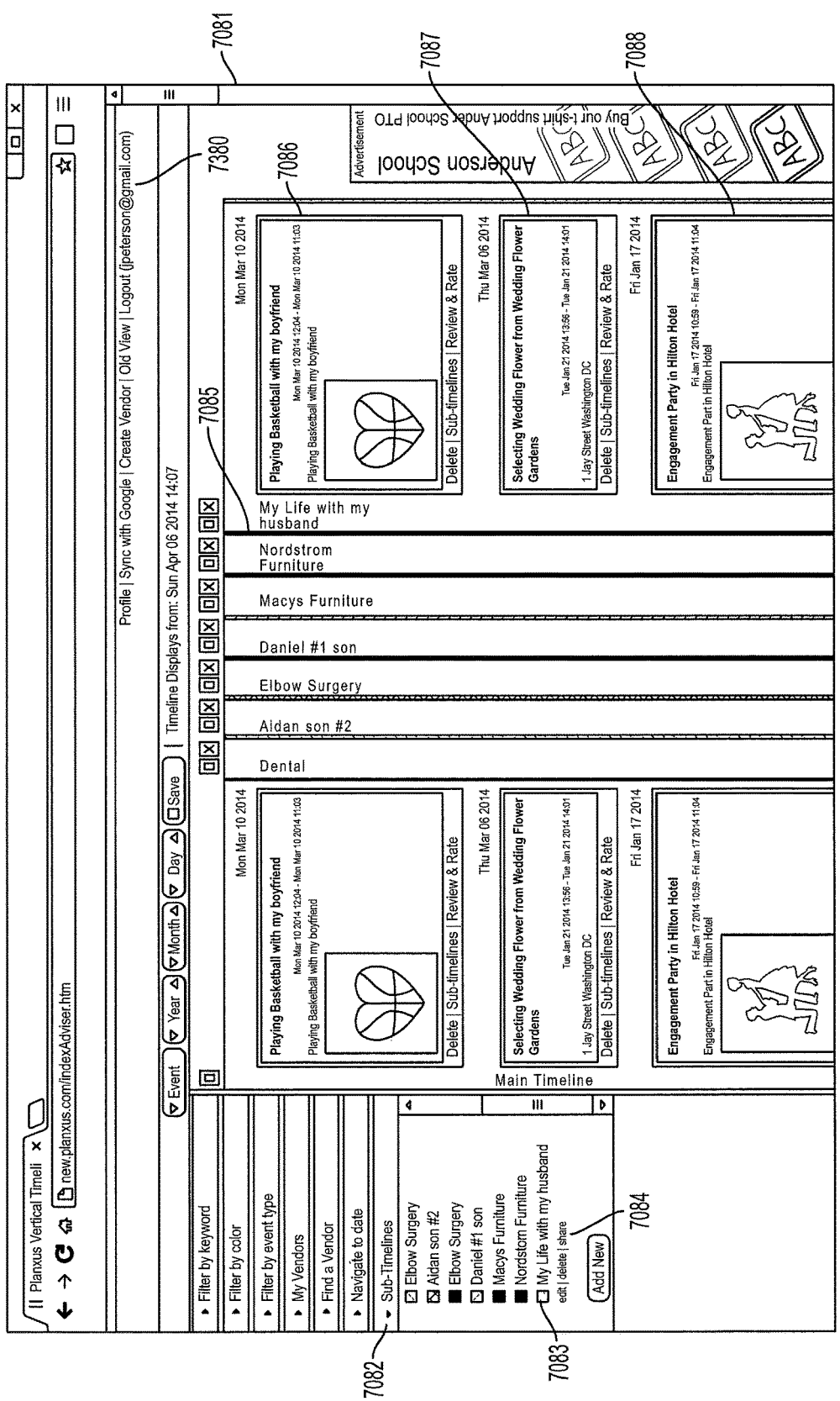
FIG. 15A depicts an exemplary user interface for sharing.

Referring to FIG. 15A, "Timeline User", "jpeterson@gmail.com" as user identification 7380, wants to share portion of his life with a friend. He wants to share the vendors he used for his wedding with his friend. The best way is just to share some events on his wedding "Sub-Timeline" with his friends. He can give his friend permission to re-share, copy, add/delete/edit events the events that belong to him. As it is displayed he has many events in his "Sub-Timeline" and "My Life with my husband", but he doesn't not want to share all his events in his entire "Sub-Timeline". He would like to share some of the events related to vendors he used for example "Selecting Wedding flower" 7087, and "Engagement Party in Hilton Hotel" 7088. He doesn't want to share event "Playing basketball with my boyfriend" 7086. In order to do so, he clicks on left menu "Sub-Timelines", 7082, and then hover over, "Sub-Timeline", "My life with my husband", 7083 and clicks on "Share" button 7084 and the dialog on FIG. 15 B will pop up.

Figure 15B:
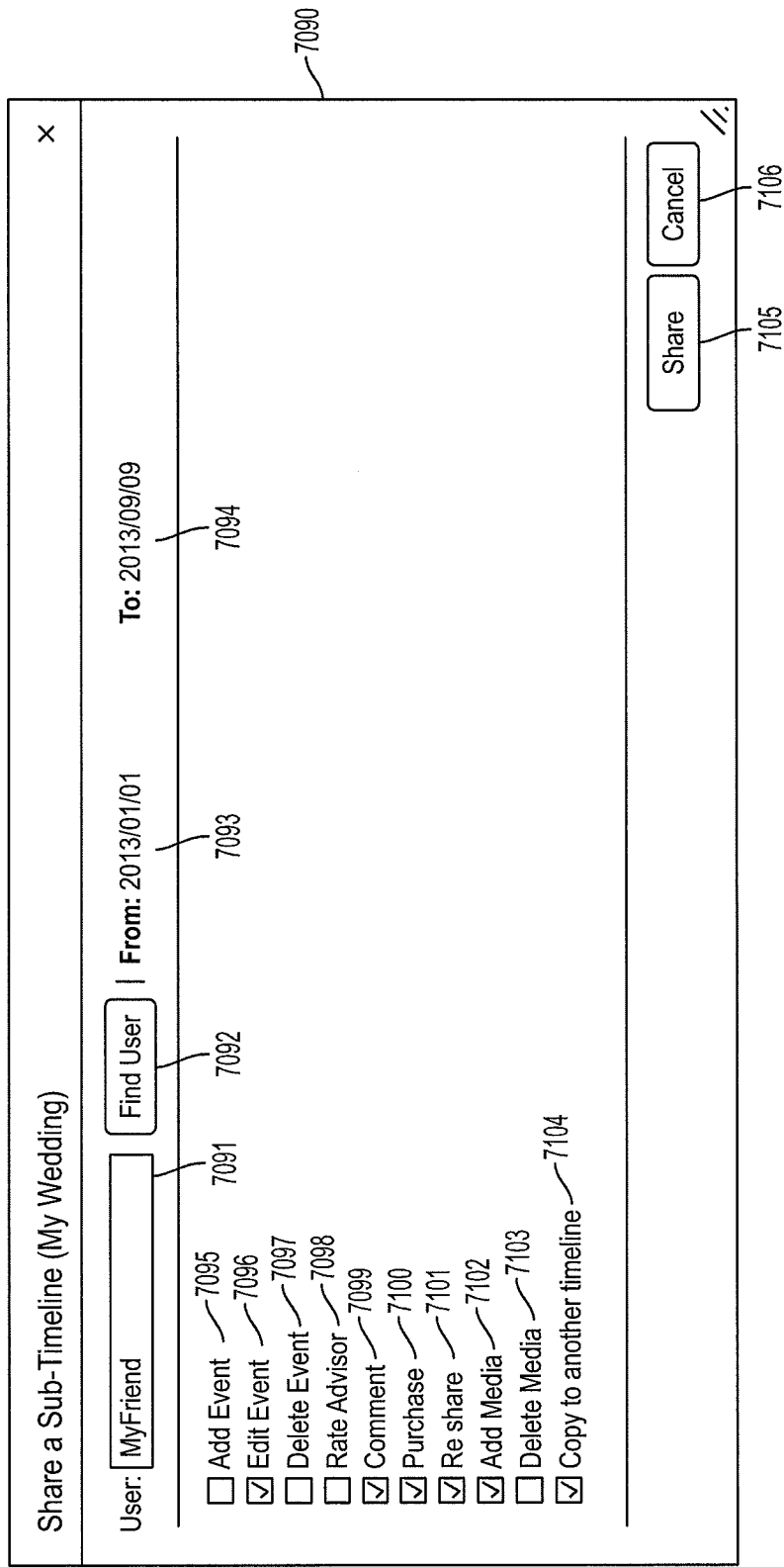
FIG. 15B depicts an exemplary user interface for sharing.
Figure 17A:
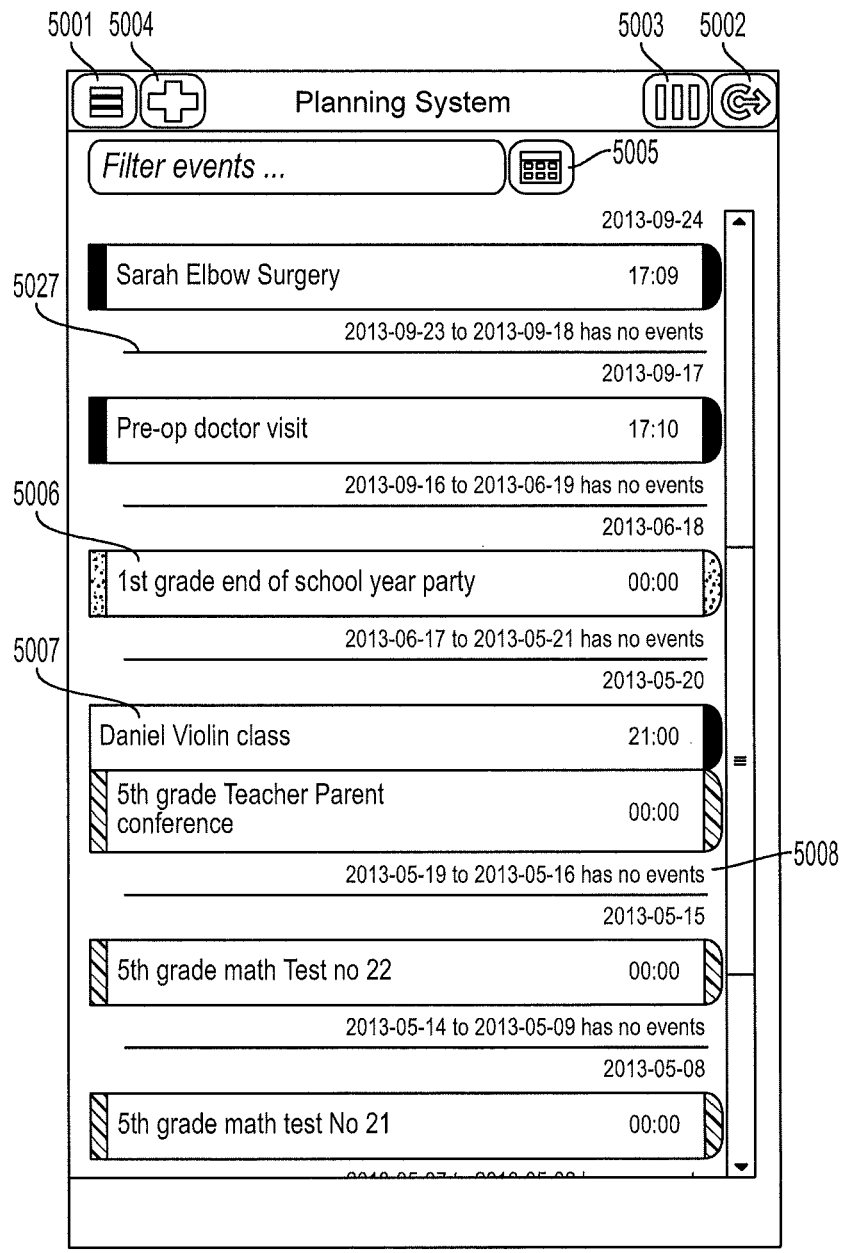
FIG. 17A depicts an exemplary user interface for mobile.

Referring to FIG. 15B, as continuation of FIG. 17A, "Jpeterson@gmail" is trying to share portion of one his "Sub-Timeline" with a friend. In dialog 7090 he selects target "User" 7090 and enters his friend name as "MyFriend". In order to find friend's name he can click on "Find User" button, 7092 and let the planning system find his friend for his by name search. Then select "From" date, 7093, and "To" date, 7094, and then select the permissions that target user need to have to view/modify/own the shared "Sub-Timeline". He can provide permission such as "Add Event" 7095, "Edit Event" 7096, "Delete Event" 7097, "Rate Advisor" 7098, "Comment" 7099, "Purchase" 7100, "Re-share" 7101, "Add Media" 7102, "Delete Media" 7103 and "Copy to another timeline" 7104 to the target user. After choosing appropriate permissions he can click on "Save" button, 7105 and the sharing process initiated. If he clicks on "Cancel" button, 7106, no sharing will be initiated.

Referring to FIG. 15C, after clicking on "Save" button in previous screen, FIG. 15B, he will be redirected to "Select Events To Share" dialog, 7110, in this dialog he clicks on the events that he would like to share with his friend. In this example out of all his events, he just clicked on the check box next to 4 events, "Engagement Party in Hilton Hotel located at . . . " 7111, "Buy Gown from Queen Gown located at . . . " 7112, "Selecting wedding flower . . . " 7113, etc. Finally he clicks on "Share" button, 7114, after pressing this button, sharing process is completed and portion of the selected sub-timeline and checked events will be available to target user, "My Friend". Depending on the type of selected permissions, his friend can re-share, copy, add/delete/edit events the events that belongs to Jpeterson@gmail on his"Sub-timeline", "My life with my husband".

Figure 16A:
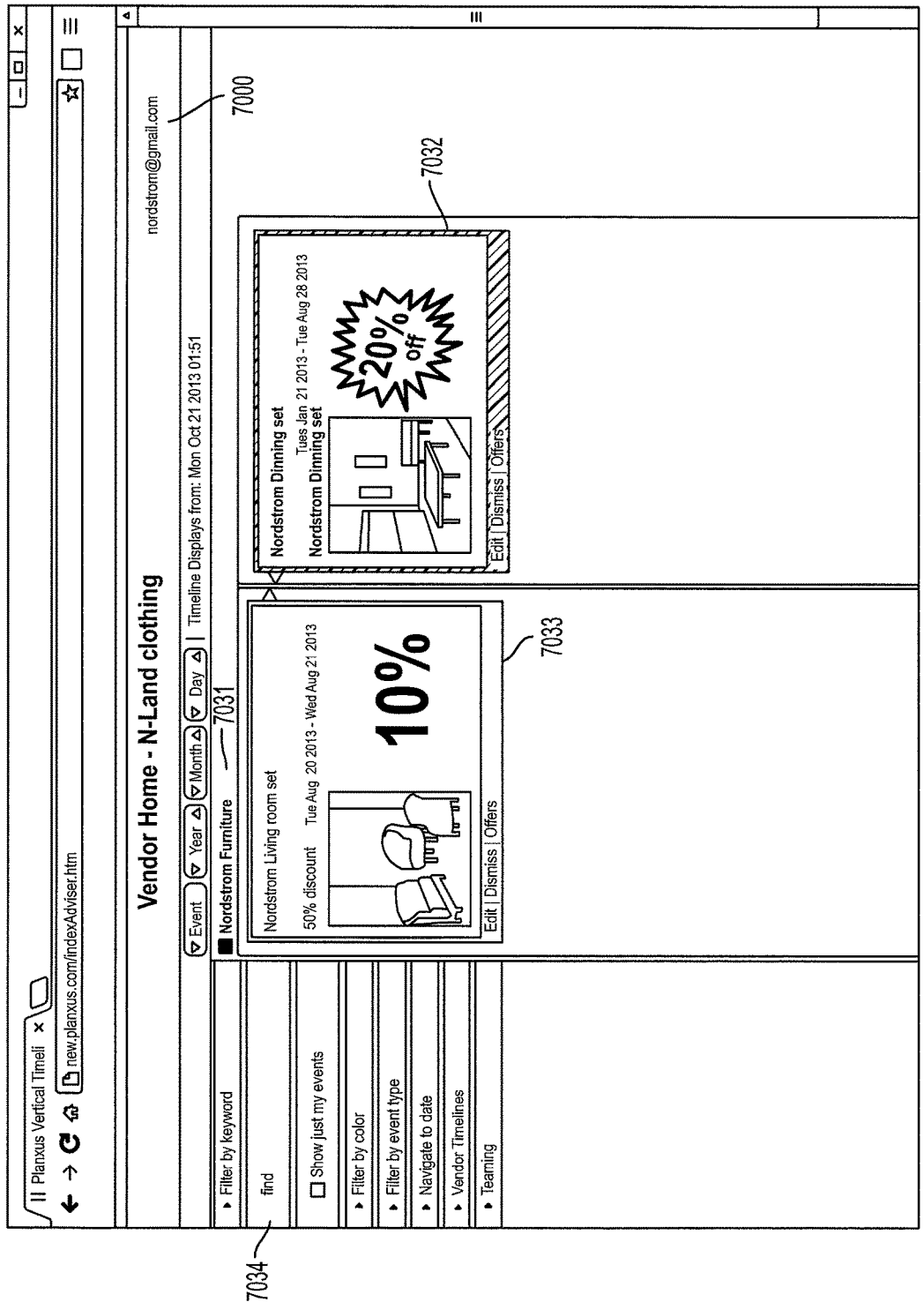
FIG. 16A depicts an exemplary user interface for an offer purchase.

Referring to FIG. 16A, it is displayed that each "Vendor User" can have zero or more events in his/her "Vendor Timeline". Every "Vendor Event" can have zero or many offers associated to it. For example "Vendor User", Nordstrom@gmail.com as user identification 7000, clicks on left menu "Vendor Timelines" and then clicks on his "Vendor-Timeline", "Nordstrom Furniture" 7031. He has two events (7032 and 7033) in this "Vendor Timeline"; also he can search for a desired event by clicking on "Find" button 7034 or directly select desired event on his "Vendor Timeline". In order to add "Vendor Offers", "Vendor User" clicks on hyperlink "Offers" at the bottom of the event 7032.

Figure 16B:
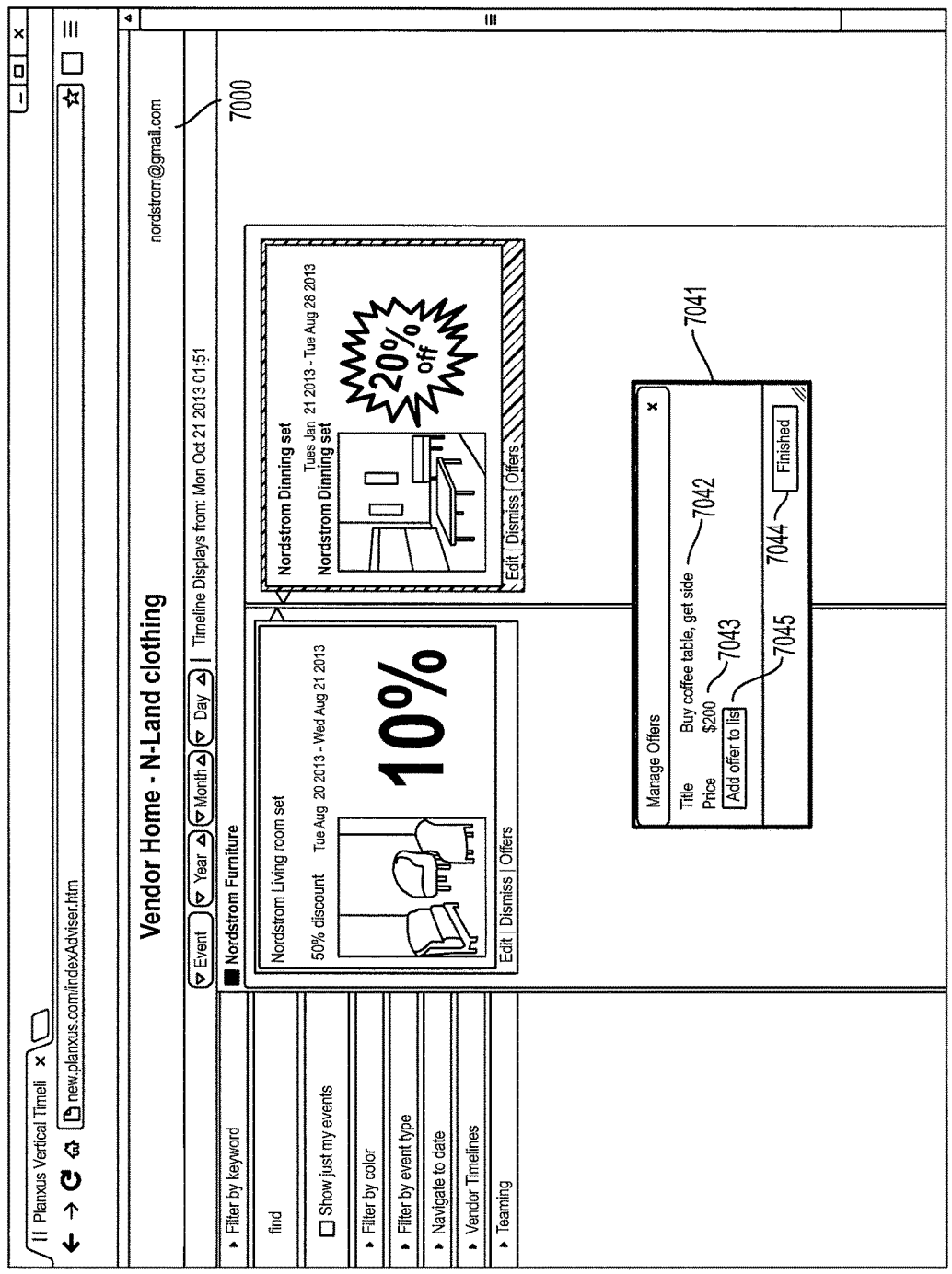
FIG. 16B depicts an exemplary user interface for an offer purchase.

Referring to FIG. 16B, as continuation from FIG. 16 A, "Vendor User", Nordstrom@gmail.com as user identification 7000, Opens "Manage Offers" dialog, 7041, he can enter "Title" of the "Vendor Offer" in 7042 and "Price" of the "Vendor offer" in 7043 and then click on "Add offer to list" button 7045 to add the "Vendor offer" to the offer list, also at any time "Vendor user" can click on "Finish" button 7044 to finish offer-adding-process.

Figure 16C:
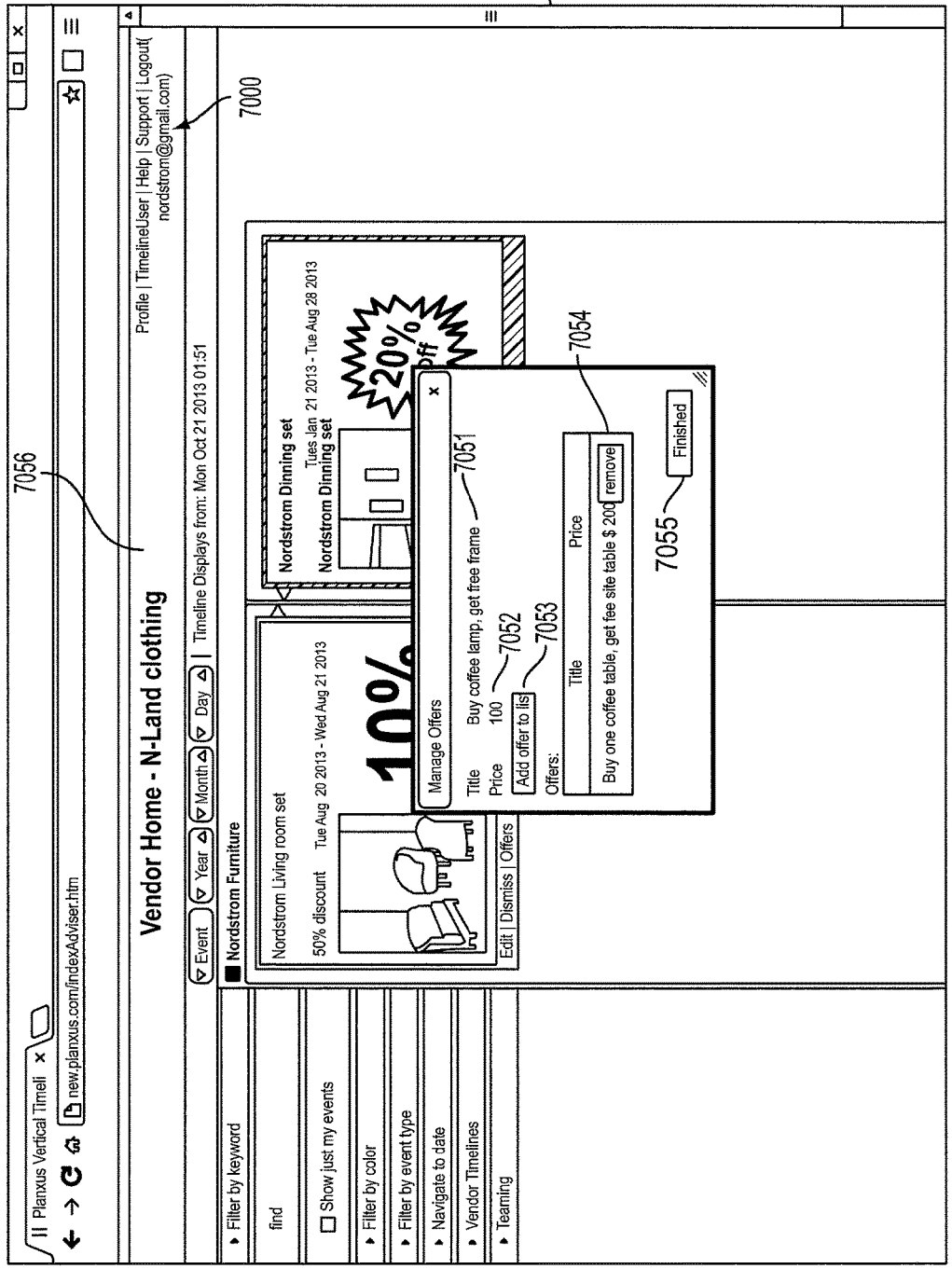
FIG. 16C depicts an exemplary user interface for an offer purchase.

Referring to FIG. 16C, as continuation from FIG. 16 B, "Vendor User", Nordstrom@gmail.com as user identification 7000, can add another "Vendor offer" by entering "Title" of the "Vendor offer" in 7051 and "Price" of the offer in 7052 and click on "Add offer to list" button 7053. As it shown in the 7054 the new "Vendor Offer" is added to the list. At any time "Vendor user" can click on "Finish" button 7055 to finish offer-adding-process.

Figure 16D:
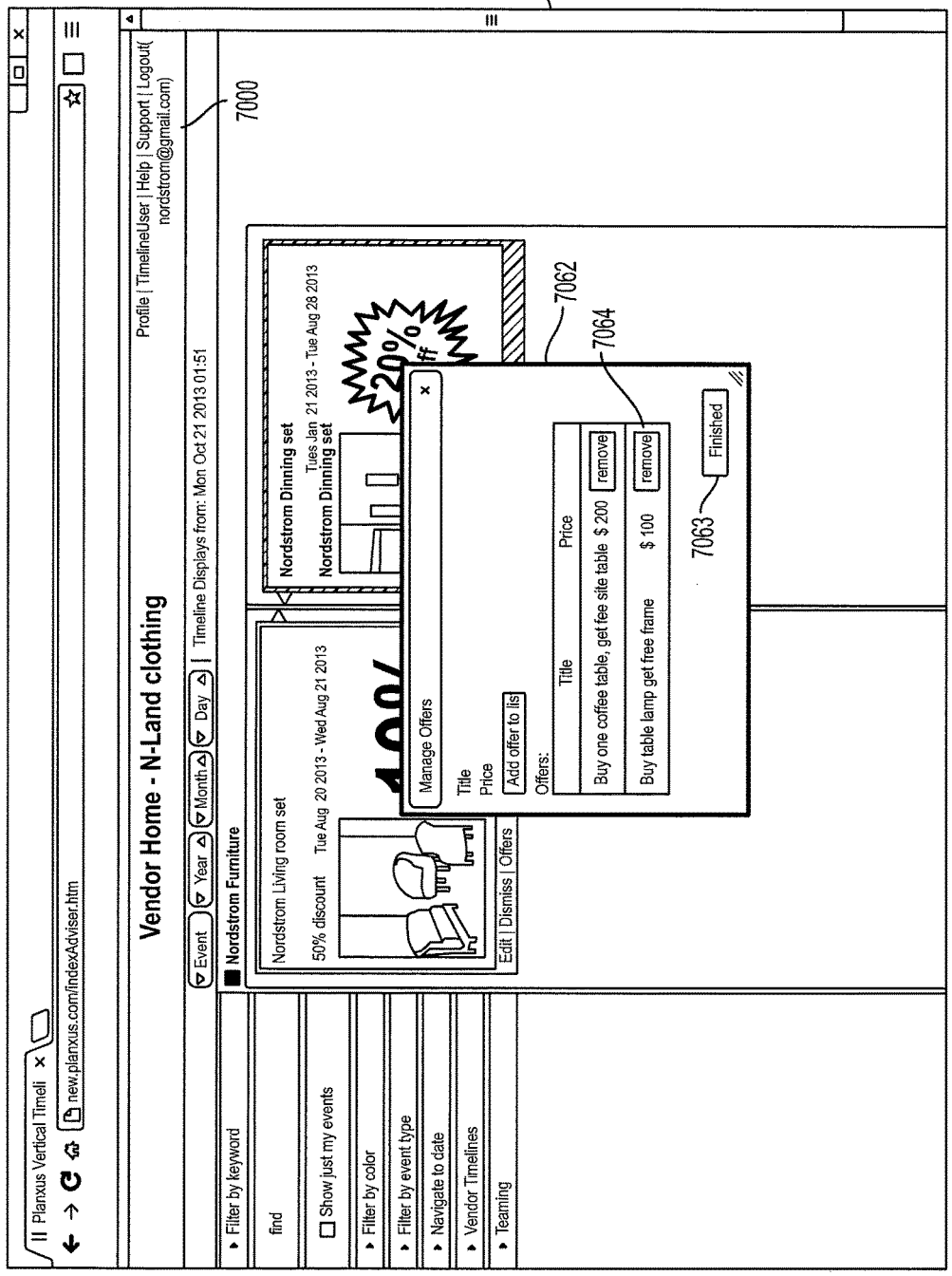
FIG. 16D depicts an exemplary user interface for an offer purchase.

Referring to FIG. 16D, as continuation from FIG. 16 C, "Vendor User", Nordstrom@gmail.com as user identification 7000, optionally can remove a "Vendor offer" using "Manage Offers" Dialog, 7062, for example he clicks on "Remove" button 7064 to remove second "Vendor offer". After adding-offers-process finishes he clicks on "Finished" button 7063, in order to close "Manage offers" dialog 7062 and allow the "Vendor Offer" changes gets applied to the "Vendor Event".

Figure 16E:
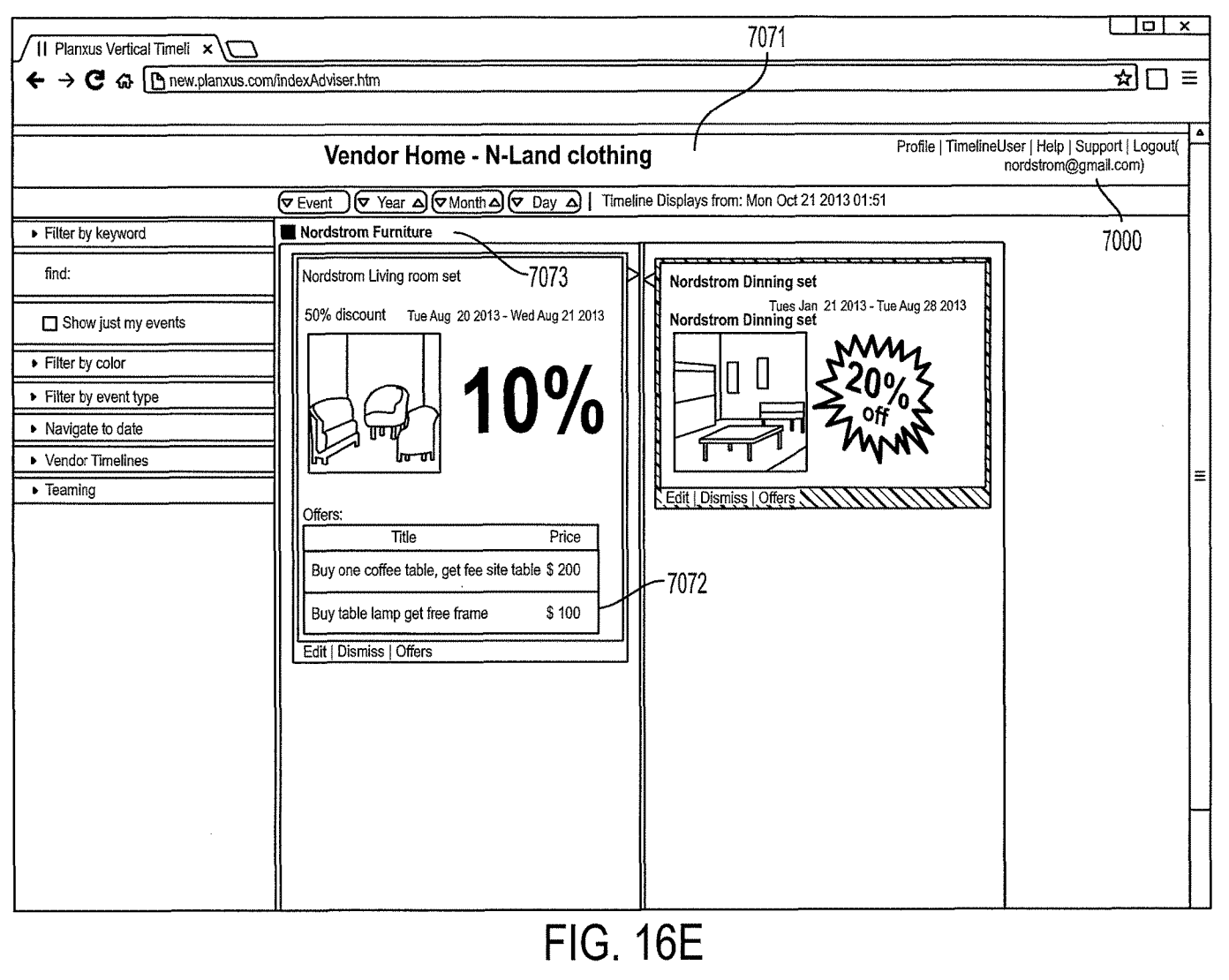

Referring to FIG. 16E, "Vendor User", Nordstrom@gmail.com as user identification 7000, in his "Vendor Timeline", "Nordstrom Furniture" 7073, has updated his first "Vendor Event". He has also added two "Vendor Offer" 7072. Finally "Vendor User", Nordstrom, clicks on "Vendor Timeline" left menu and selects "Vendor Timeline", "Nordstrom Furniture" and clicks on "Publish" button.

Figure 16F:
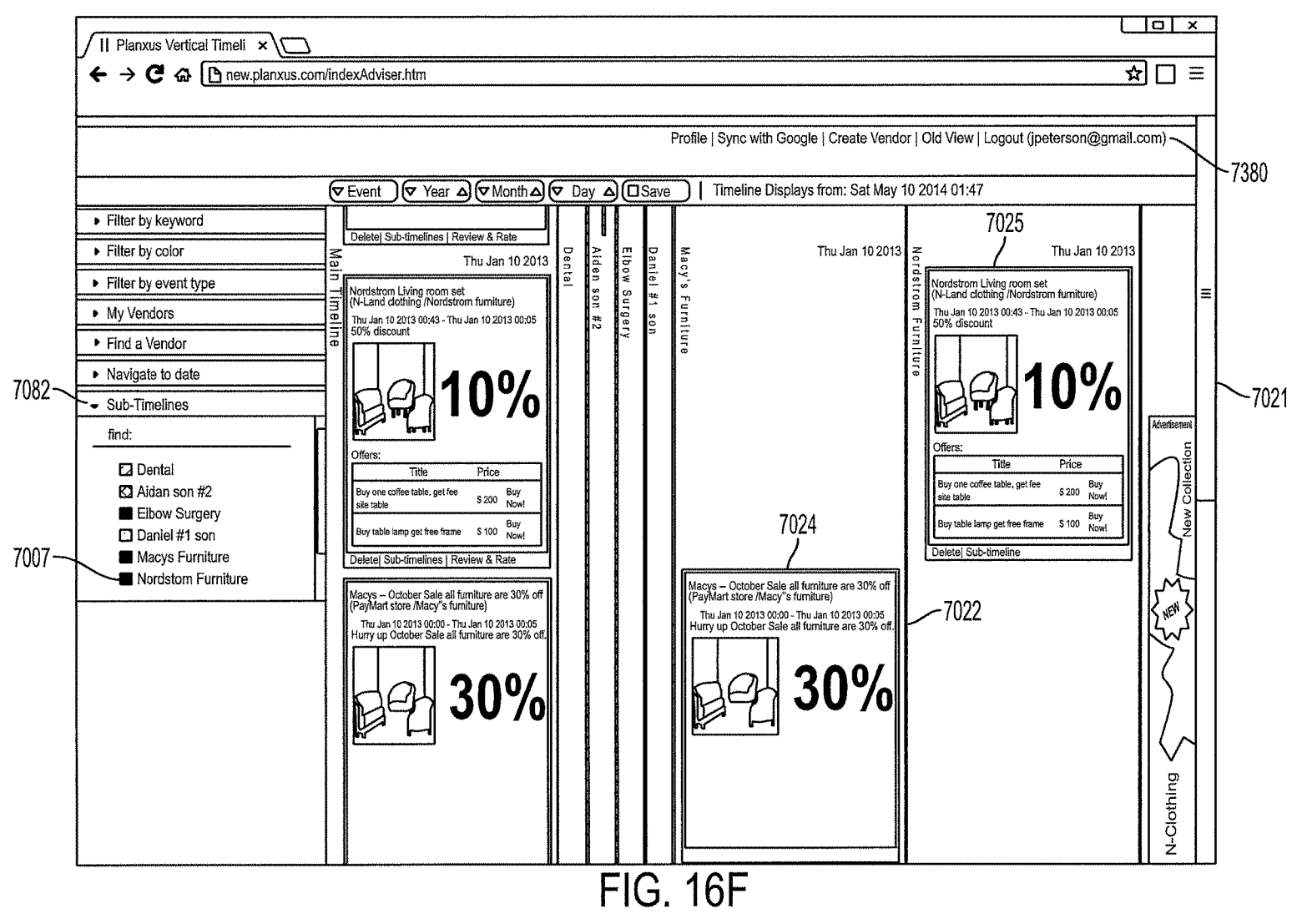

Referring to FIG. 16F, "Timeline User", Jpeterson@gmail.com, John Peterson, and all "Timeline Users" that subscribed to "Vendor Timeline", "NORDSTROM Furniture" will see updated "Vendor event" and "Vendor offer" in their Main Timeline and/or Target Sub-Timeline.

Figure 17B:
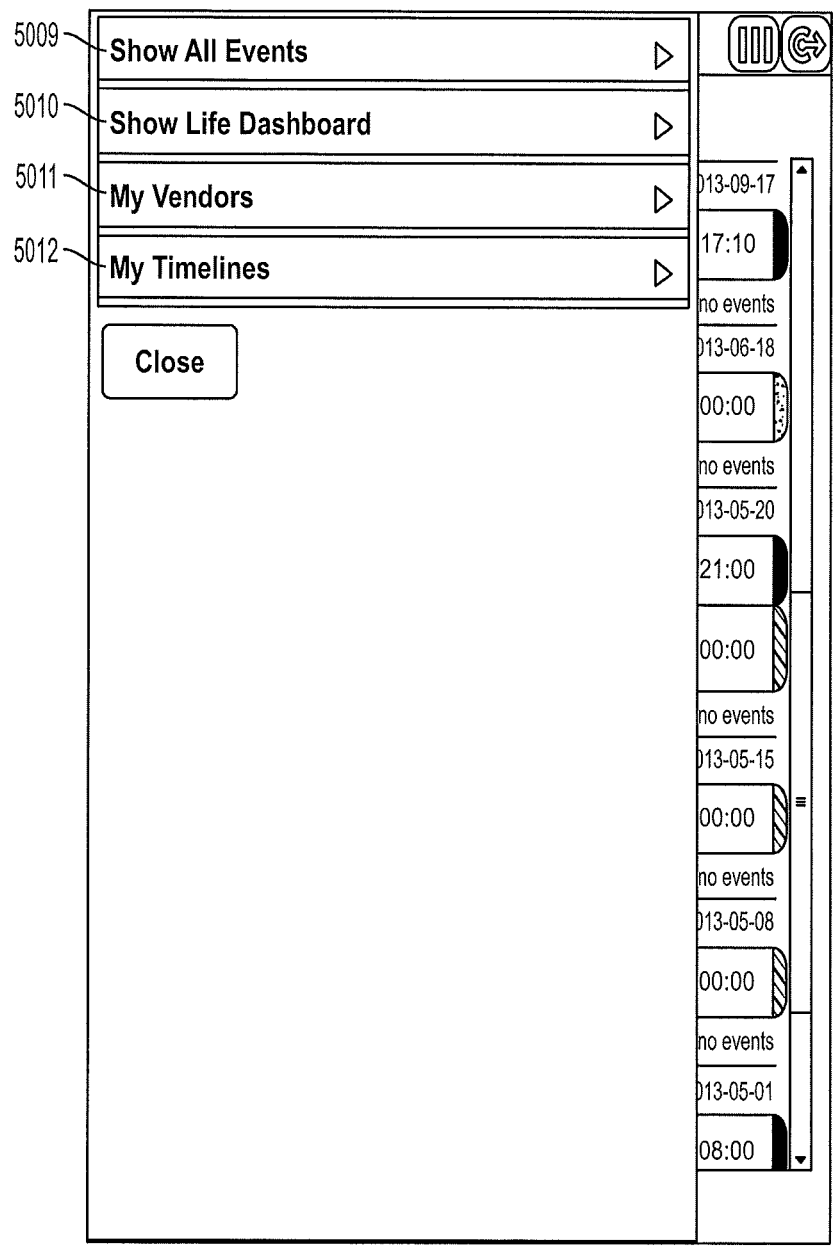
FIG. 17B depicts an exemplary user interface for mobile.

Referring to FIG. 17A "Timeline User", JPeterson@gmail.com, logs in to the Planning System Mobile through a mobile device and he will see the default home screen. "Timeline User", "John Peterson" can create new event by touching "+" button 5004 displayed in FIG. 17G. He can open the traditional calendar view by touching button 5005 that is shown in FIG. 17H. He can open the "Life Dashboard" by touching button 5003 that is shown in FIG. 17J. Moreover John Peterson can touch button 5001 for opening up the side menu and other options as shown in FIG. 17B. He can touch button 5002 to sign-out from the application. In the home screen FIG. 17A "Timeline User" sees latest event sorted by dates in descending order. All days are separated by grey dashed lines 5027. Days that continually have no event collapsed into one line 5008 with "From" and "To" date range labeled them. This allows saving space on small mobile device. "Timeline User" may see two kinds of events in this screen. Events that are coming from subscribed "Vendor User" 5006 or events that are created by the "Timeline User" 5007. These two types of events can be distinguished by looking at the color of the event left border. Events with no colored border on the left side are created by "Timeline User". Events with colored border on the left side are coming from "Vendor Timeline". This color is selected by the "Vendor User" during creation of "Vendor Timeline" depending on the "Event Type". John Peterson could drag his finger up and down and make the screen scroll up and down in order to see all his events in this screen. Double tapping on any event, such as "$5^{th}$ grade math Test no 22", 5040 will expand the event and the detail of that even will be displayed as shown in FIG. 17I. This screen is similar to "Main Timeline" in the Planning System Web in which all events are shown in chronological order.

Referring to FIG. 17B it is a sidebar menu that opens up after "Timeline User" clicks on button 5001 in FIG. 17B. The "Timeline User", John Peterson, will see four (4) options in the left sidebar menu. The first item in the sidebar menu is "Show All Events" 5009 which is a shortcut to home screen to display all events without filter. By touching the arrow 5046 the screen shown in FIG. 17A will be displayed. The second item in the sidebar menu is "Show Life Dashboard" 5010 which is a short cut to FIG. 17J where it shows "Main Timeline" and zero or more "Sub-Timeline" in parallel views like life dashboard. By touching the arrow 5047 the screen shown in FIG. 17J will be displayed. The third item in the sidebar menu is "My Vendors" 5011 and it shows the list of subscribed vendors FIG. 17C. By touching the arrow 5048 the screen shown in FIG. 17C will be displayed. The fourth item in the sidebar menu is "My Timelines" 5012 that shows the list of "Sub-Timeline" created by the "Timeline user". By touching the arrow 5049 the screen shown in FIG. 17D will be displayed. Touching "Close" button 5045 will collapse and close the sidebar menu.

Figure 17C:
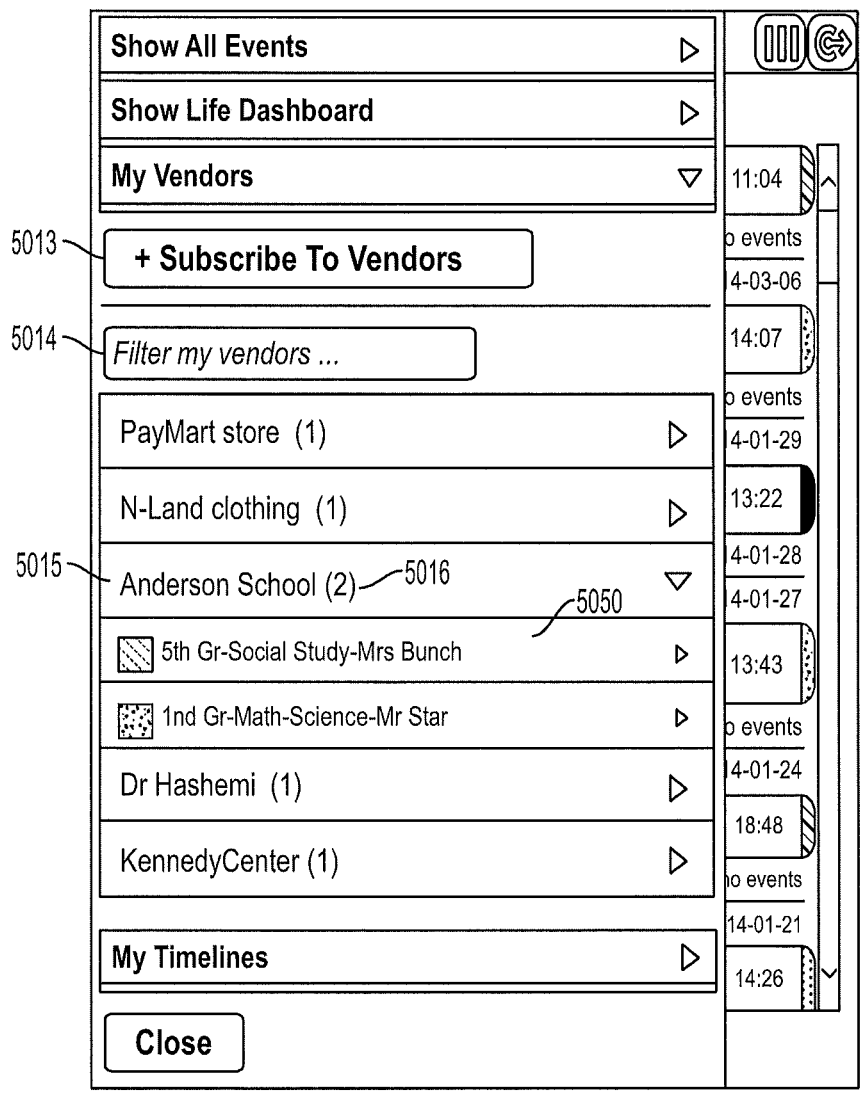
FIG. 17C depicts an exemplary user interface for mobile.
Figure 17C:
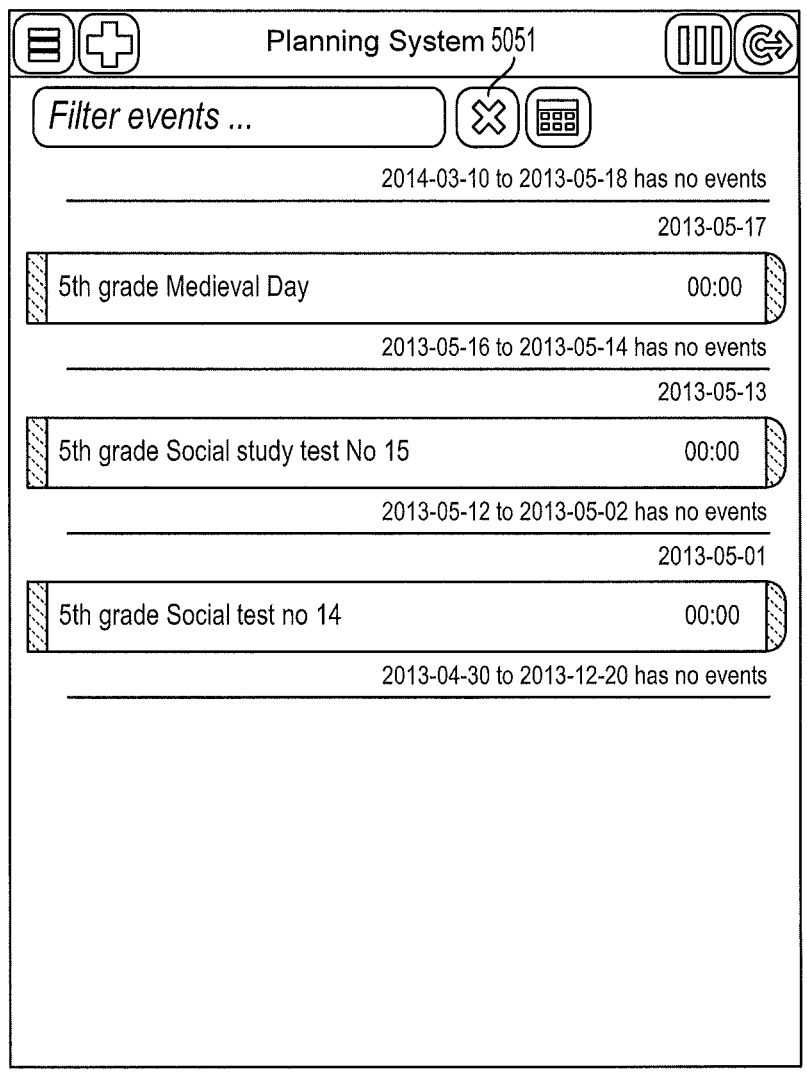

Referring to FIG. 17C it is when "Timeline User" has touched and expanded "My Vendors" on sidebar menu. "Timeline User", John Peterson, will see list of "Vendor Users" that he has subscribed to. "Timeline User" may subscribe to different "Vendor timeline" belonging to different "Vendor Users" or subscribe to different "Vendor Timeline" of the same "Vendor User". If John Peterson subscribed to different "Vendor Timeline" of the same "Vendor User", the hyperlink number 5016 next to the "Vendor User" shows how many of them are subscribed to. For example "Vendor User", "Anderson School" 5015 has 2 timelines for "$5^{th}$ Grade-Social-Study-Mrs Bunch" 5050 and "$1^{st}$ Grade-Math-Science-Mr-Star". The hyperlink "(2)" 5016 shows that John Peterson has subscribed to two (2) "Vendor Timeline" belonging to "Vendor User", "Anderson School". John Peterson is viewing all "Anderson School" "Vendor Timeline" because he touched on hyperlink "(2)" 5016 and expanded the "Anderson School" list of "Vendor Timeline"

If John Peterson clicks on the arrow next to "$5^{th}$ Grade-Social-Study-Mrs Bunch" 5050, all events in FIG. 17A gets filtered and it only shows the event belong to "$5^{th}$ Grade-Social-Study-Mrs Bunch" displayed in FIG. 17CC. "User Timeline", John Peterson can search for a vendor by entering a keyword in field 5014 and only event that have that keyword will be displayed. John Peterson can also subscribe to new Vendor by clicking on button "Subscribe To Vendors" 5013 that open up FIG. 17E.

Referring to FIG. 17CC, "Timeline User", John Peterson has filtered all his events to "$5^{th}$ Grade-Social-Study-Mrs Bunch" 5050. By touching "Button" 5051 the filter gets cleared and FIG. 17A with all unfiltered events will be displayed.

Figure 17D:
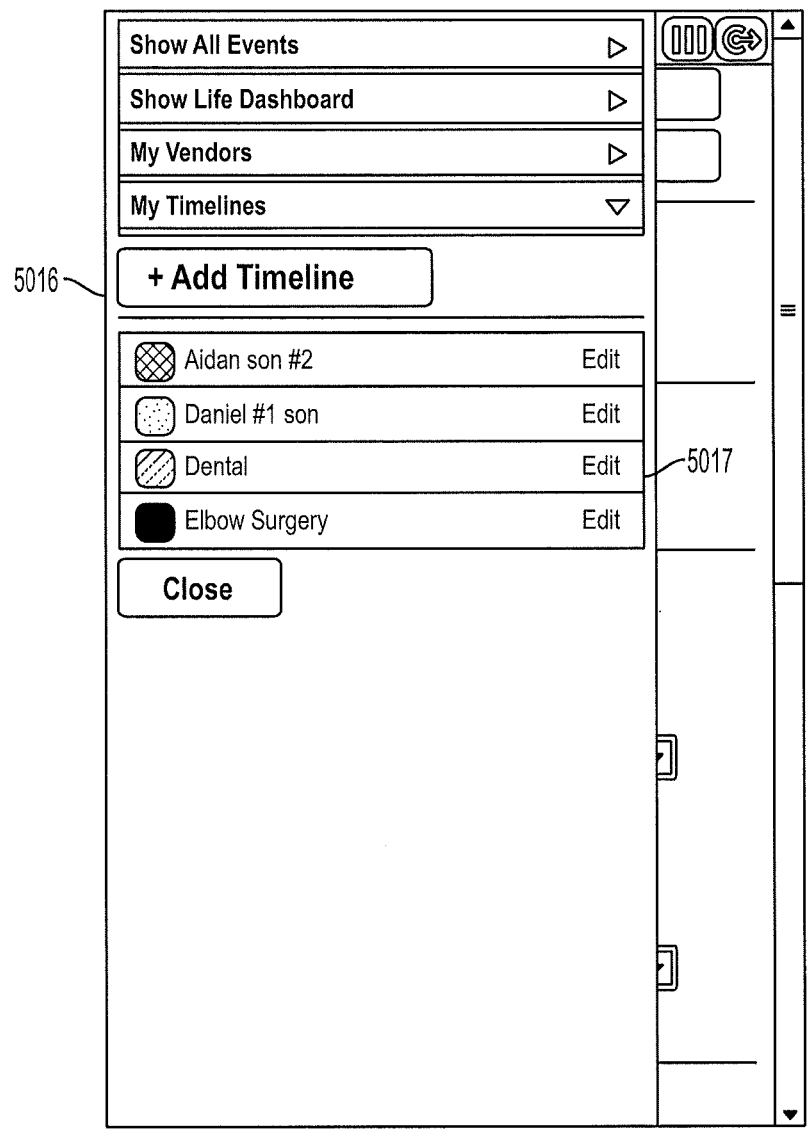
FIG. 17D depicts an exemplary user interface for mobile.

Referring to FIG. 17D "Timeline User", John Peterson has touched "My Timelines" in his side menu bar and he can see list of his own created "Sub Timelines". He has created four (4) "Sub-Timelines", "Aidan Son #2", "Daniel #1 son", "Dental", "Elbow Surgery". John can edit each of these "Sub-Timelines" by touching the "Edit" hyperlink 5017 that will open up FIG. 17F. In FIG. 17 F, John can change title or color of the "Sub-Timeline" he wants to edit.

Figure 17E:
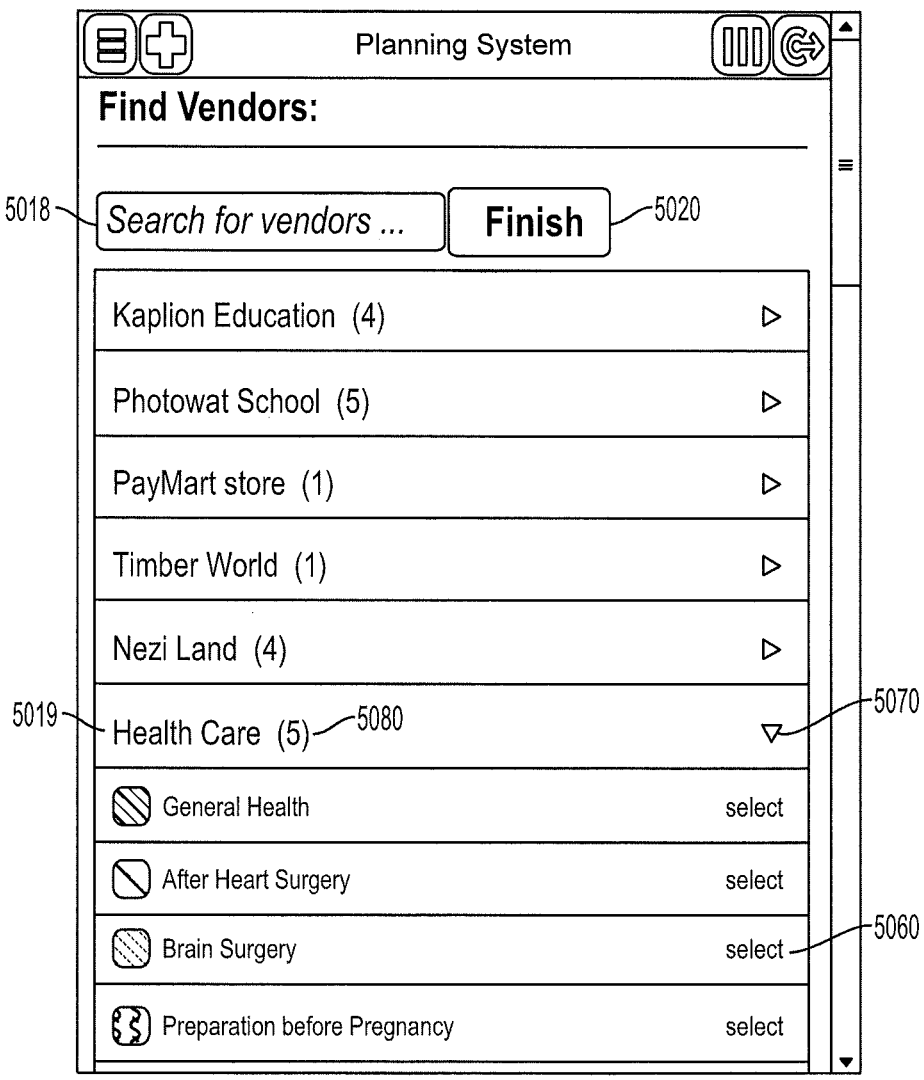
FIG. 17E depicts an exemplary user interface for mobile.

Referring to FIG. 17E "Timeline User", John Peterson is trying to find a vendor and subscribe to it. He can enter a keyword in field 5018 and find the desired vendor. He can expand the vendor name by touching the hyperlink number next to the name 5080 or touching the arrow 5070 and look at list of "Vendor Timeline" that belongs to the selected "Vendor User". In this example John Peterson has expanded "Vendor User", "Health Care" and can see four (4) "Vendor timelines": "General Health", "After Heart Surgery", "Brain Surgery" and "Preparation before Pregnancy". John wants to subscribe to "Brain Surgery" 5060 and touch the "Select" hyperlink 5060 and then touch "Finish" button 5020. This is an example of subscribing to a vendor/advisor such as "Health care" that is not selling any goods or services but provides advice. In this case it is "Health care" related advises.

Figure 17F:
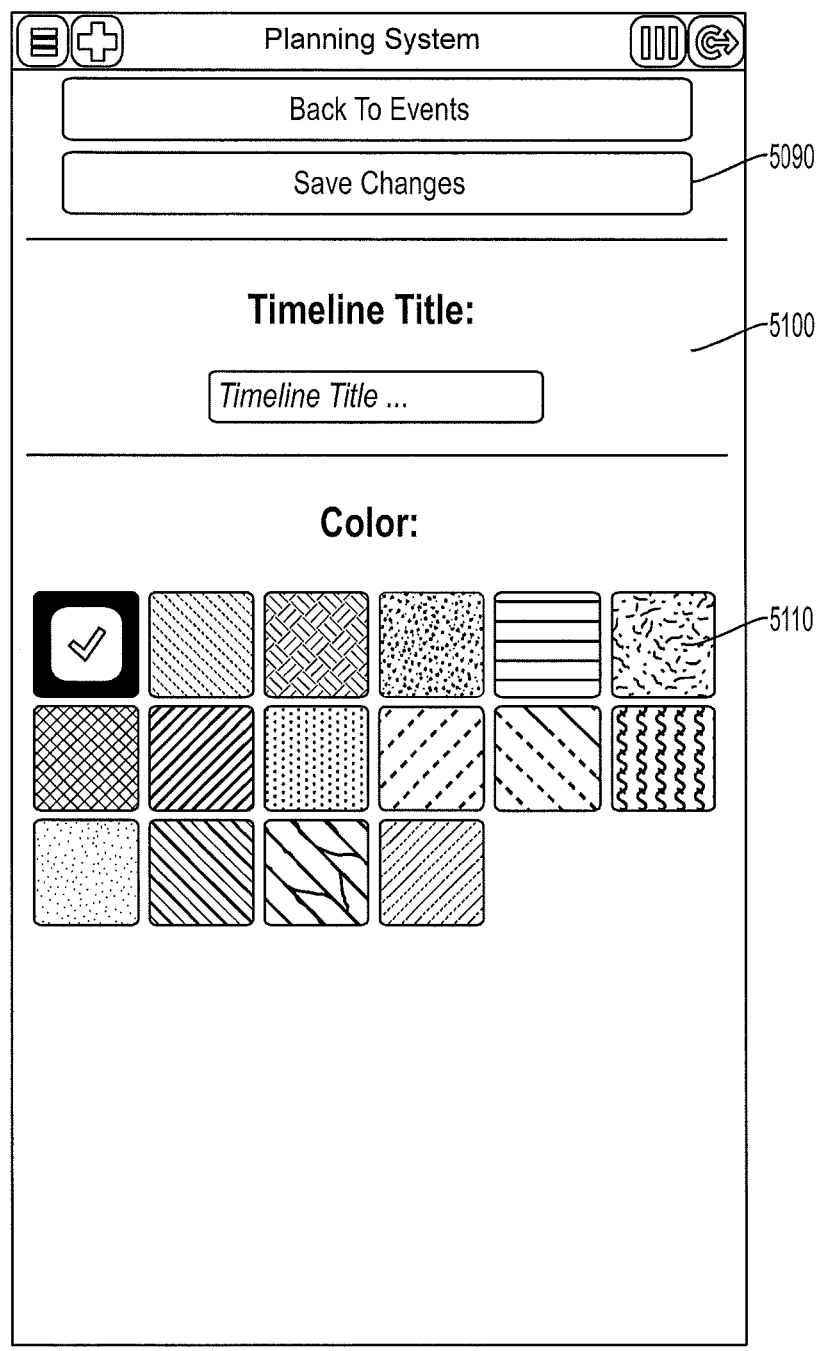
FIG. 17F depicts an exemplary user interface for mobile.

Referring to FIG. 17F as continuation from FIG. 17 D when "Timeline User", John Peterson touched "+Add Timeline" button 5016 in order to create a new "Sub-Timeline". In FIG. 17F he can enter "Sub-Timeline" title in field "Timeline Title" 5100 and select "Sub-Timeline" color by touching on one of the colored square 5110. Finally he can touch "Save Changes" button and a new "Sub-Timeline" gets created.

Figure 17G:
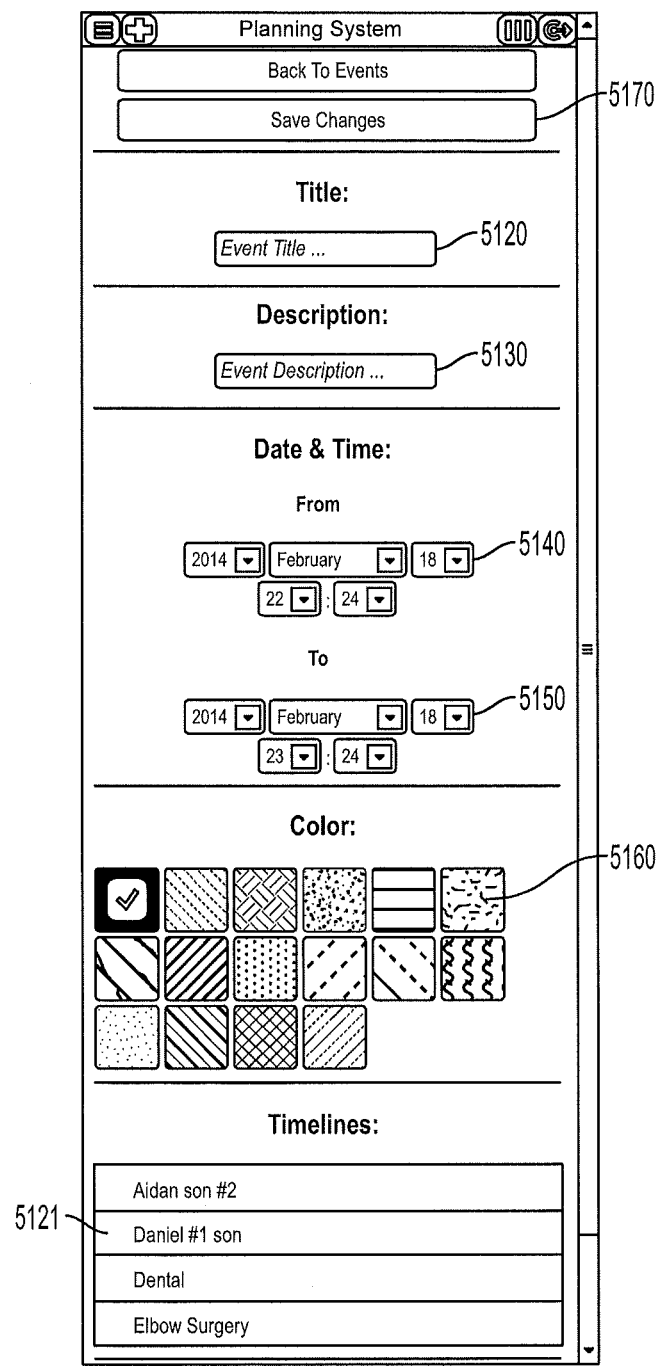
FIG. 17G depicts an exemplary user interface for mobile.
Figure 17H:
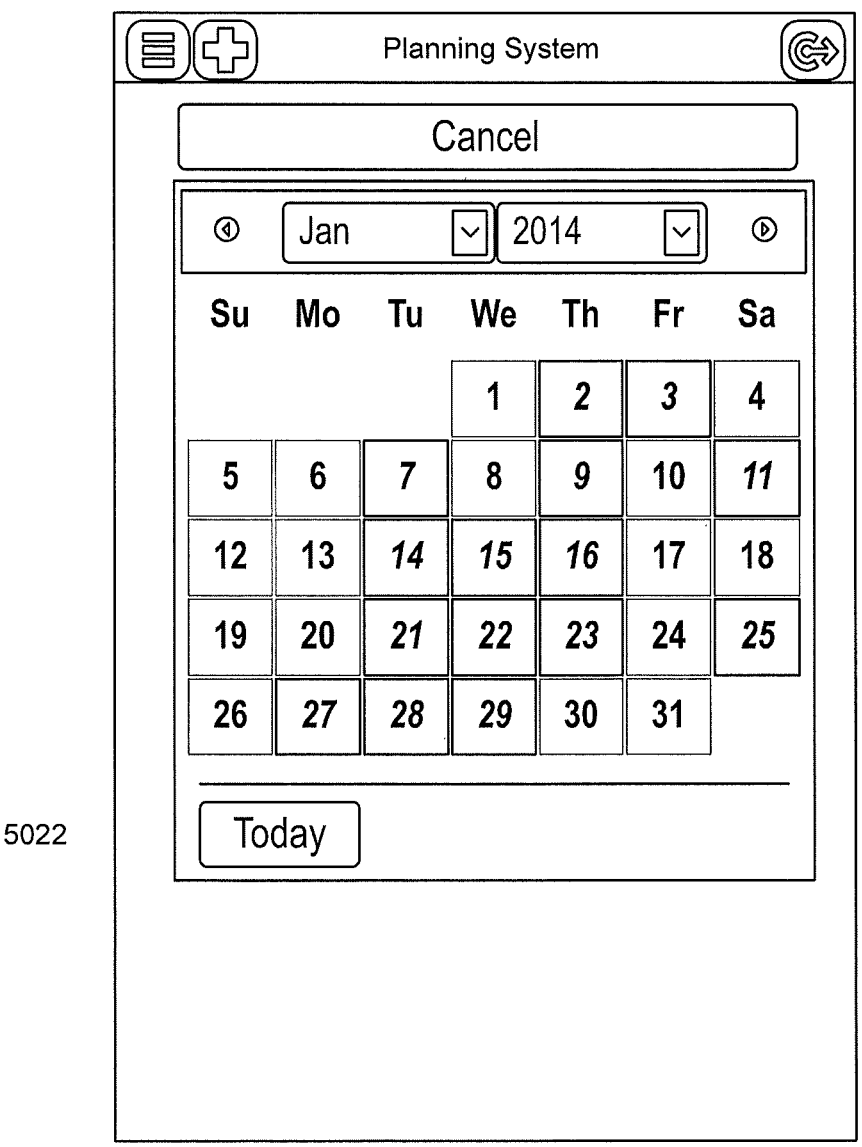
FIG. 17H depicts an exemplary user interface for mobile.
Figure 17I:
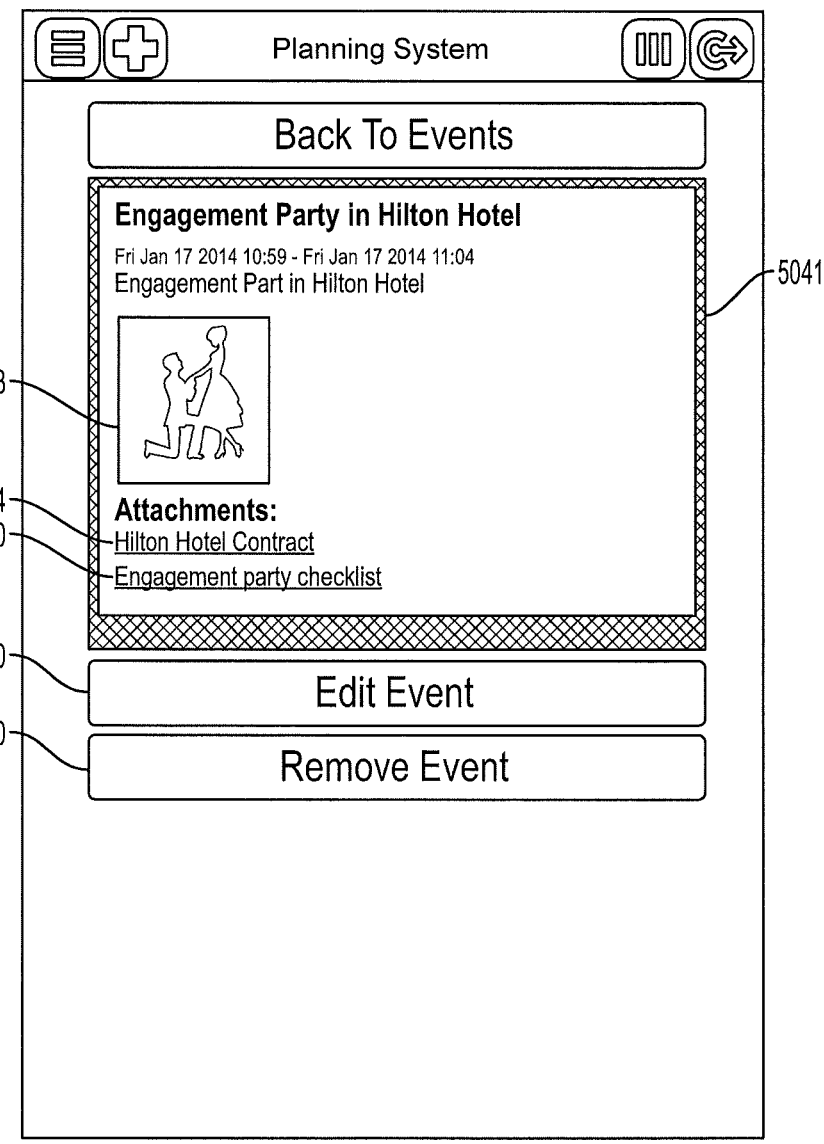
FIG. 17I depicts an exemplary user interface for mobile.
Figure 17J:
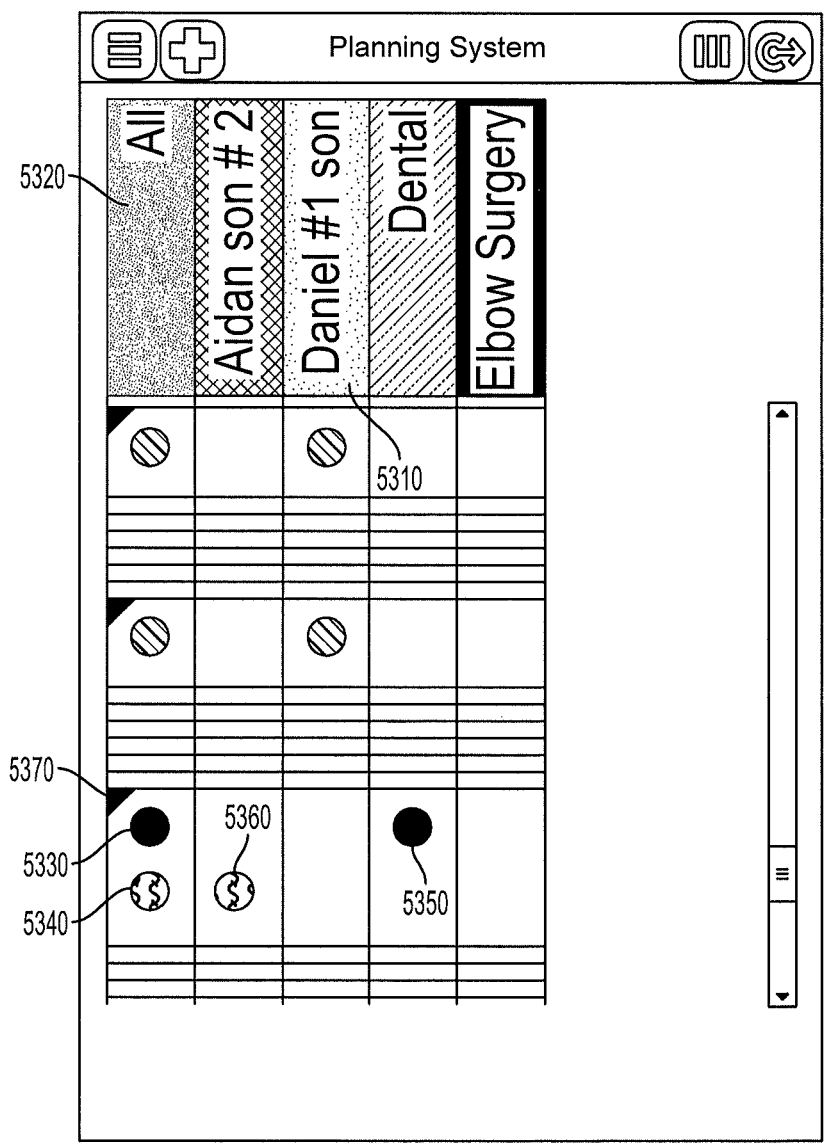
FIG. 17J depicts an exemplary user interface for mobile.

Referring to FIG. 17G as continuation from FIG. 17A when "Timeline User", John Peterson, touched the "+" button 5001 in order to create a new event. In FIG. 17G John Peterson enters the event title in field "Title" 5120, the event description in field "Description" 5130, the duration of the event in Field "Date & Time, From" 5140 and "Date & Time, To" 5150, color by touching one of the colored square 5160. John Peterson can also associate this event to zero or many "Sub-Timeline" under section named "Timelines" 5021. Furthermore an event can be associated to zero or more media files that could be browsed and uploaded along with the event, such as pictures, videos, etc. To do this John Peterson scrolls down and click on media and uploads zero or more media files. This functionally is not displayed in this screen however it is the same as Planning System Web version. Finally John Peterson clicks on "Save Changes" button 5170 and the new event gets created in "Timeline user" timeline and/or "Sub-Timelines".

Referring to FIG. 17H is the continuation of FIG. 17A when "Timeline User", John Peterson, touched the calendar button 5005 in order to see a calendar view of "Main Timeline". In FIG. 17 H. a traditional calendar view is displayed. All days that have events behind the scene are colored green. John Peterson could click on any of the days such as "Jan. 27, 2014" 5022 and see the list of events on that day.

Referring to FIG. 17I is the continuation of FIG. 17A when "Timeline User", John Peterson, touched one of the events such as "Engagement Party in Hilton Hotel" 5041 and the Event detail screen is displayed that allows editing the selected event as well. In FIG. 17I John Peterson scheduled his Engagement Party on "Jan. 17, 2014" starting at 8:00 PM and ending at 11:59 PM. This event has three (3) media files attached to it, a picture 5023, from "Hilton Hotel Contract" 5024 and "Engagement party check list" 5230. John Peterson could click on "Edit Event" button 5210 and edit this event refer to FIG. 17G and add more picture to it. The beauty of the planning system is that all media files such as pictures, documents, videos, etc. related to an event can get uploaded as attachment and be attached to the event for ever. Since the planning system is a Calendar that is also a Social Media, everything will appear in its own bucket in time and space.

Referring to FIG. 17J is the continuation of FIG. 17A when "Timeline User", John Peterson, touched the button 5003. In FIG. 17J shows "Main Timeline" and zero or more "Sub-Timeline" in parallel views like life dashboard. The first timeline is "Main Timeline", the rest of timeline are "Sub-Timelines": "Aidan son #2", "Daniel #1 son" 5310, "Dental" and "Elbow Surgery". John Peterson could move his hand up and down and scroll up and down on his life dashboard. All days are separated with grey lines. All Events are displayed in "Main Timeline", "ALL", 5320. By touching each circle the event detail opens up refer to FIG. 17I. The event 5330 and event 5340 are both scheduled on the same day. They both are between two grey lines separating days. However one belongs to "Sub-Timeline", "Aidan son #2", 5360 and one belongs to "Sub-timeline", "Dental" #2", 5350. In FIG. 17 John Peterson's life is mapped out in front of him and he can see all his events that are conflicting at the day level. However John Peterson would like to see his day view to see if event 5350 and 5340 are conflicting. By clicking on blue triangle "5370" John can see the his day view and see all conflicting events at the hour/minute level as it is displayed in FIG. 17K.

Figure 17K:
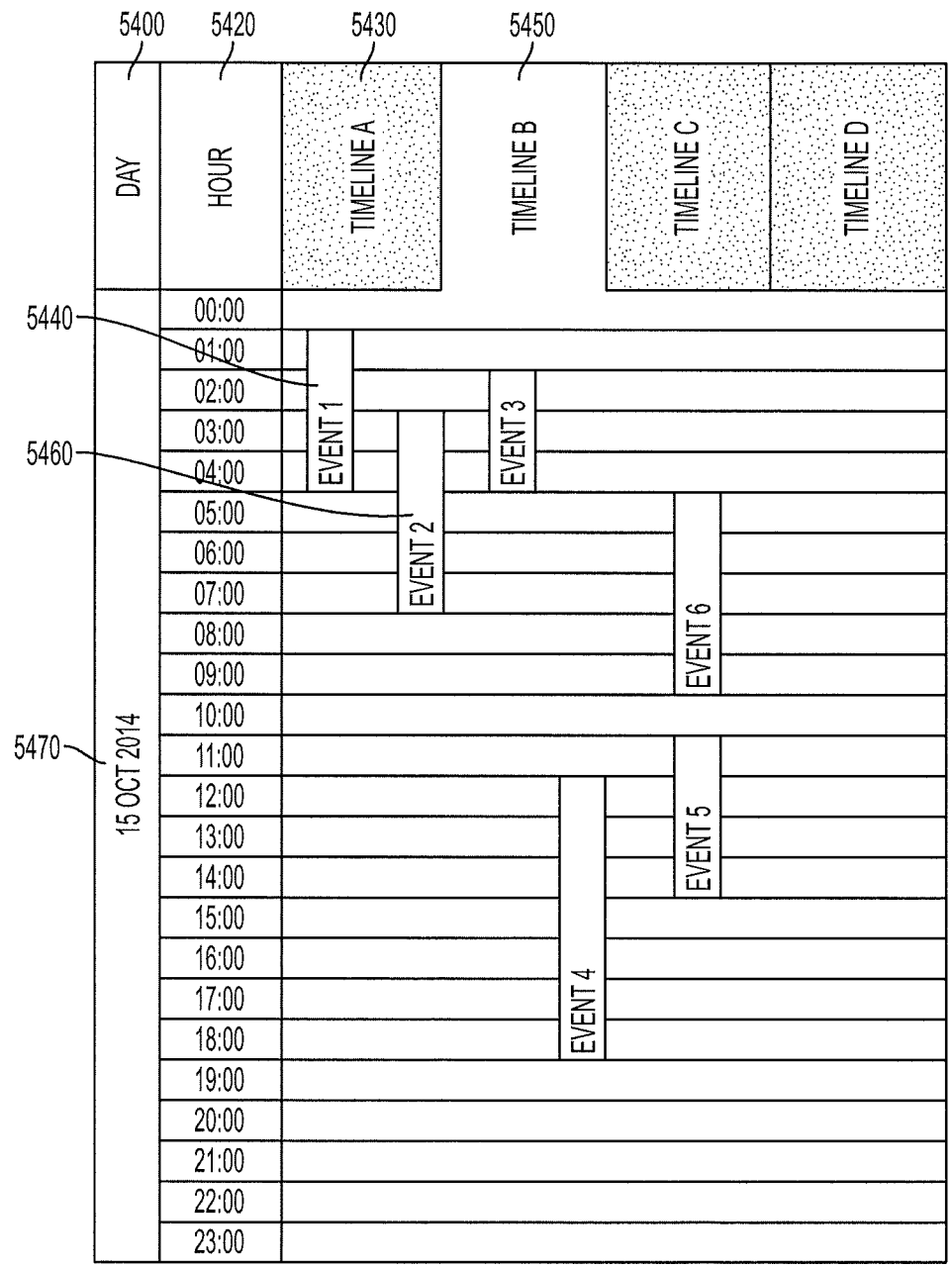
FIG. 17K depicts a user interface showing the timelines in hourly increments.

Referring to FIG. 17K is the continuation of FIG. 17J when "Timeline User" touched the blue triangle button 5370 next to any day in the dashboard. FIG. 17K shows a generic "Day/Hour/Minute view dashboard". There is no "Main Timeline" in this view. There are four "Sub-Timeline", "Timeline A", "Timeline B", "TimeLine C" and "Timeline D". User can touch each "Sub-Timeline" and only view the Day/Hour/Min view of that "Sub_Timeline". In this example, user is looking at all events in "Sub-Timeline", "Timeline B" 5450. User sees the events in different hours 5420 of the day 5400, 5470. As it is shown, all the Sub-Timelines 5430, 5450, . . . that are not hidden by user are displayed in parallel and depending on the number of events that are under each "Sub-Timeline" the width of the "Sub-Timeline" could be increased or decreased. For example under "Sub-Timeline", "Timeline B", the "Event 1" 5440 starts at 1:00 AM and ends at 4:00 AM, the "Event 2", 5460 starts at 3:00 AM and finishes at 7:00 AM. Since "Event 1" and "Event 2" having conflict or overlap, the planning system algorithm opens a new invisible column for conflicting events. However event "Event 5" and "Event 6" don't have any overlap and could stay in the same invisible column. The width of this invisible column is equal to the event strip. "Sub-Timelines" could be hidden and unhidden the same as the Planning System Web. For simplicity it is not shown here.

Figure 17L:
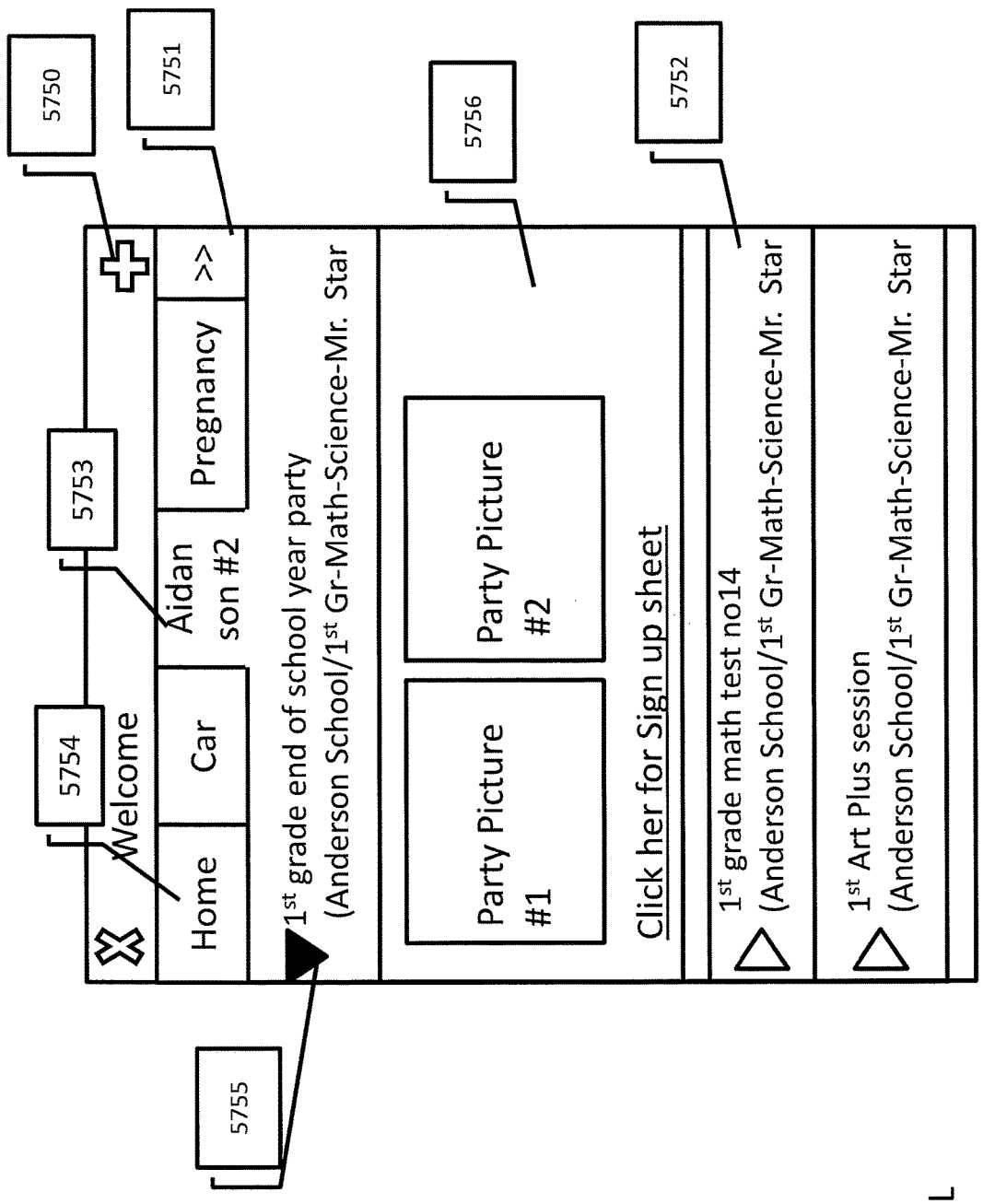
FIG. 17L depicts a user interface on a mobile display with the "Aidan son #2" timeline tab selected for display.

FIG. 17L depicts a screen that shows a different format for the mobile user interface that is in line with FIG. 6. In this screen, the user sees four (4) Sub-Timelines, "Home" 5754, "Car", "Aidan son#2" 5753 and "Pregnancy". If user touches ">>" button 5751, the user can see his/her other Sub-Timelines. Currently, user has touched Aidan son #2 5753 and that is the Sub-Timeline being displayed. In this Sub-Timeline, the user has three (3) events, "$1^{st}$ grade end of school year party" 5756, "$1^{st}$ grade math test no 14", 5752 and "$1^{st}$ Art Plus session". The user has touched triangle 5755 and it expanded the first event "$1^{st}$ grade math test no 14" 5752. In this event, he has two (2) pictures as media uploaded, and if the user touches on "Click here for sign up sheet", a media file opens up that allows the user to enter information into "sign-up sheet for potluck". The white triangle next to other events indicates collapsed mode. If user clicks on button 5750, he can create a new event. During event creation, he could decide on the target Sub-Timeline.

Figure 18:
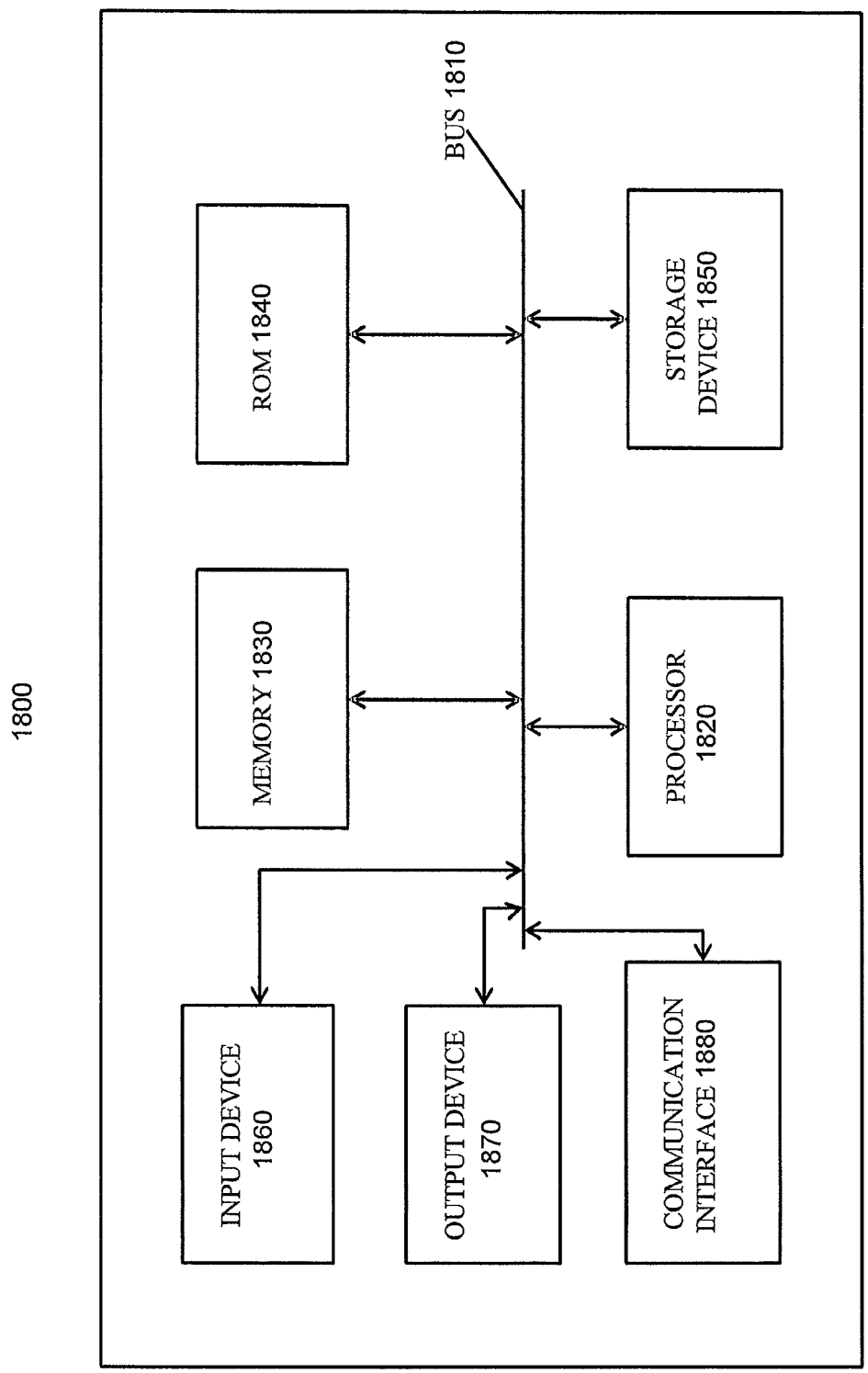
FIG. 18 depicts an exemplary architecture for implementing a computing device in accordance with one or more embodiments.

FIG. 18 depicts an exemplary architecture for implementing a computing device 1800 in accordance with one or more embodiments which may be used to implement any of mobile phones, tablets, devices, or any other computer system or computing device component thereof. It will be appreciated that other devices that can be used with the computing device 1800, such as a client or a server, may be similarly configured. As illustrated in FIG. 18, computing device 1800 may include a bus 1810, a processor 1820, a memory 1830, a read only memory (ROM) 1840, a storage device 1850, an input device 1860, an output device 1870, and a communication interface 1880.

Bus 1810 may include one or more interconnects that permit communication among the components of computing device 1800. Processor 1820 may include any type of processor, microprocessor, or processing logic that may interpret and execute instructions (e.g., a field programmable gate array (FPGA)). Processor 1820 may include a single device (e.g., a single core) and/or a group of devices (e.g., multi-core). Memory 1830 may include a random access memory (RAM) or another type of dynamic storage device that may store information and instructions for execution by processor 1820. Memory 1830 may also be used to store temporary variables or other intermediate information during execution of instructions by processor 1820.

ROM 1840 may include a ROM device and/or another type of static storage device that may store static information and instructions for processor 1820. Storage device 1850 may include a magnetic disk and/or optical disk and its corresponding drive for storing information and/or instructions. Storage device 1850 may include a single storage device or multiple storage devices, such as multiple storage devices operating in parallel. Moreover, storage device 1850 may reside locally on the computing device 1800 and/or may be remote with respect to a server and connected thereto via network and/or another type of connection, such as a dedicated link or channel.

Input device 1860 may include any mechanism or combination of mechanisms that permit an operator to input information to computing device 1800, such as a keyboard, a mouse, a touch sensitive display device, a microphone, a pen-based pointing device, and/or a biometric input device, such as a voice recognition device and/or a finger print scanning device. Output device 1870 may include any mechanism or combination of mechanisms that outputs information to the operator, including a display, a printer, a speaker, etc.

Communication interface 1880 may include any transceiver-like mechanism that enables computing device 1800 to communicate with other devices and/or systems, such as a client, a server, a license manager, a vendor, etc. For example, communication interface 1880 may include one or more interfaces, such as a first interface coupled to a network and/or a second interface coupled to a license manager. Alternatively, communication interface 1880 may include other mechanisms (e.g., a wireless interface) for communicating via a network, such as a wireless network. In one implementation, communication interface 1880 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computing device 1800 may perform certain functions in response to processor 1820 executing software instructions contained in a computer-readable medium, such as memory 1830. In alternative embodiments, hardwired circuitry may be used in place of or in combination with software instructions to implement features consistent with principles of the disclosure. Thus, implementations consistent with principles of the disclosure are not limited to any specific combination of hardware circuitry and software.

Exemplary embodiments may be embodied in many different ways as a software component. For example, it may be a stand-alone software package, a combination of software packages, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application. It may also be embodied as a software package installed on a hardware device.

Figure 19:
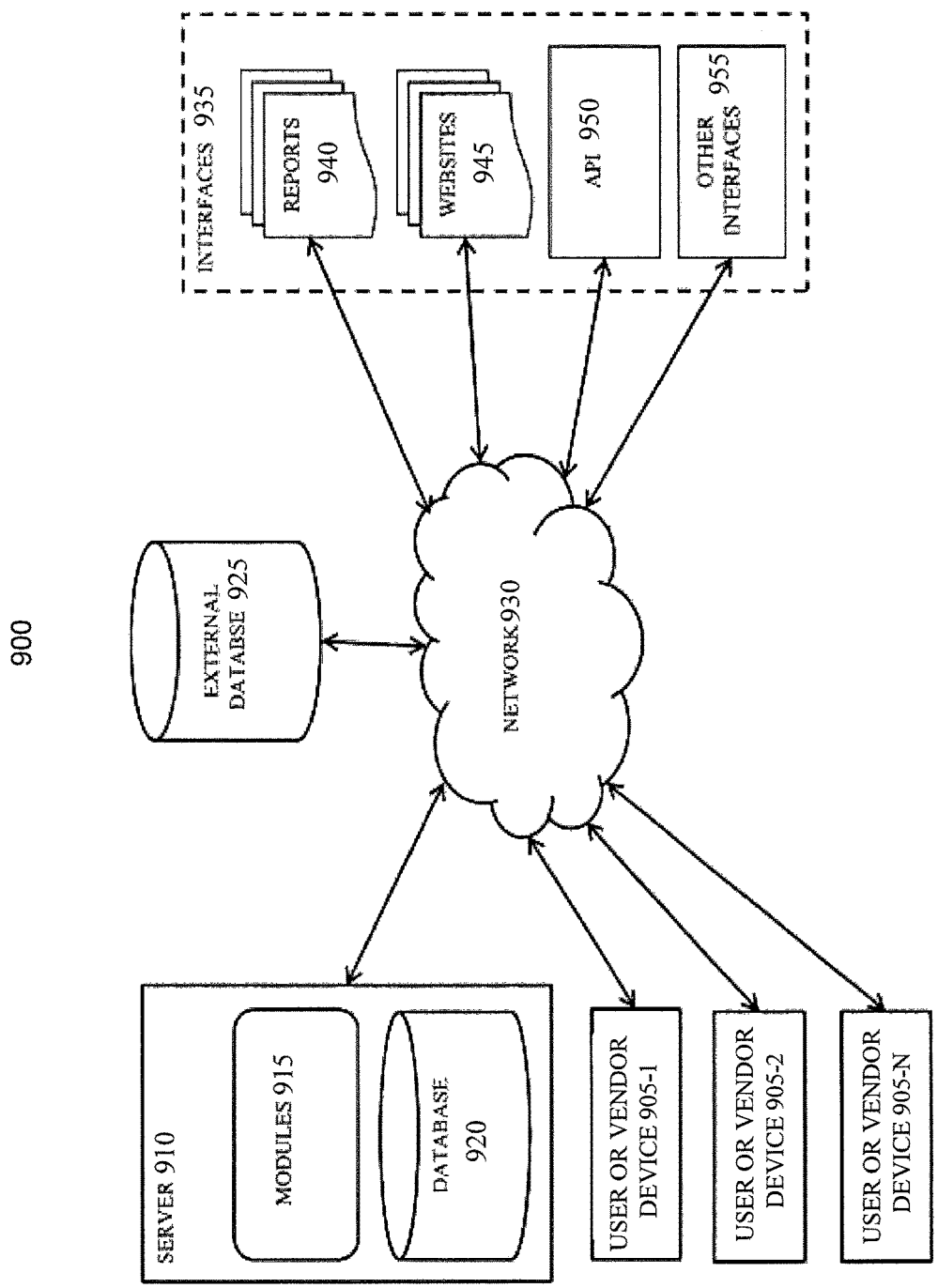
FIG. 19 depicts an exemplary schematic diagram for implementing a computing system in accordance with one or more embodiments.

FIG. 19 depicts a schematic block diagram of an exemplary system in accordance with one or more embodiments. System 900 may include one or more devices 905-1, 905-2, . . . , 905-N, server 910, including one or more modules 915, and database 920, external database 925, network 930, and one or more interfaces 935, including reports 940, websites 945, API 950, and other interfaces 955. The two-way communication between these respective devices is shown by the arrowed lines.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media. Although several embodiments are depicted as being offered through a website, it is to be understood that the interfaces and functional components may be implemented as a mobile application, mobile device optimized web page, web site, or any combination thereof.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of storage media include hard drives, disk drives, solid state drives, and any other tangible storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

The invention claimed is:

1. A system for a user-vendor interface between a user and a vendor, the system comprising:
  a memory; and
  a processor coupled to the memory, the processor being configured to:
    receive input from a team lead vendor for a team timeline for a team;
    create the team timeline for the team;
    display the team timeline for the team;
    receive input from the team lead vendor for starting the team with at least one team member;
    create the team with the at least one team member;
    display the team with the at least one team member;
    receive input from the at least one team member for a team member event;
    create the team member event in the team timeline;
    display the team member event in the team timeline;
    receive input from the team lead vendor to publish the team timeline for access by a timeline user;
    create the published team timeline for access by the timeline user; and display the published team timeline and permit access by the timeline user;
    receive input from the timeline user to subscribe to the published team timeline;
    create the team member event in a timeline for the timeline user;
    display the team member event in a timeline for the timeline user;
    receive input from the team lead vendor to search for the at least one team member;
    receive input from the team lead vendor to send an invitation for the at least one team member;
    create at least one invitation for the at least one team member;
    display the at least one invitation for the at least one team member;
    receive input from a single vendor for a single vendor timeline;
    create the single vendor timeline;
    display the single vendor timeline;
    receive input from the team lead vendor for a team lead vendor event for the team timeline;
    create the team lead vendor event in the team timeline;
    display the team lead vendor event in the team timeline;
    receive input from the at least one team member for accepting the invitation from the team lead vendor to allow the at least one team member to access the team timeline;
    create access to the team timeline for the at least one team member;
    display access to the team timeline for the at least one team member;
    wherein the at least one team member is a vendor;
    receive input from the at least one team member for one or more of adding, deleting and updating the team member event on the team timeline;
    implement the one or more addition, deletion and update to the team member event on the team timeline;
    wherein the published team timeline is republished and the published timeline continues to exist as a historical published team timeline;
    receive user input from the timeline user to at least one of subscribe and unsubscribe to one or more of the team timeline and a single vendor with a single vendor timeline;
    implement the at least one of the subscription and unsubscription to the one or more of the team timeline and the single vendor timeline for the timeline user, wherein the team timelines, when unsubscribed, are retained as historical timelines for use in uniform historical comparisons;
    receive input from the team lead vendor to one or more of delete and change the team member event;
    create the one or more deletion and change to the team member event in the team timeline;
    display the one or more deletion and change to the team member event in the team timeline;
    wherein the team member event comprises one or more of a coupon and advertisement;
    receive input from the timeline user to create the user timeline;
    create the user timeline;
    display the user timeline;
    receive input from the timeline user to browse one or more of the team timeline from one or more of the team lead vendor and the single vendor to subscribe to one or more of the team timeline;
    create a subscription to the one or more of the one or more team vendor timelines and the single vendor timeline for the timeline user, wherein the subscription directs the team member event to one or more of:
      a) a main timeline of the user timeline, and
      b) at least one sub-timeline of the user timeline; and
    display a subscription to the one or more of the one or more team vendor timelines and the single vendor timeline for the timeline user, wherein the subscription directs the team member event to one or more of:
      a) a main timeline of the user timeline, and
      b) at least one sub-timeline of the user timeline;
    wherein each of the user, single vendor and team vendor timelines are updated and an original timeline is maintained as a historical timeline for comparison;
    wherein the team lead vendor includes one or more of a teacher, doctor, company, advisory and vendor;
    the timeline user includes one of a parent, patient, consumer, company, advisor and vendor;
    receive input from at least one timeline user for creating a main timeline;

create the main timeline;
display the main timeline;
receive input from at least one timeline user to create at least one sub-timeline, wherein each of the at least one sub-timeline has a unique category;
create the at least one sub-timeline with the unique category;
display the at least one sub-timeline with the unique category, wherein the at least one sub-timeline is one of: shared with and copied to another timeline user;
receive input from the at least one timeline user to create a timeline user event;
create the timeline user event on the main timeline;
display the timeline user event on the main timeline;
receive input from the at least one timeline user to create the timeline user event in one or more of the at least one sub-timeline;
create the timeline user event in one or more of the at least one sub-timelines;
display the timeline user event in one or more of the at least one sub-timelines;
receive input from at least one of the team lead vendor, the team member, and the single vendor for a seeded timeline event including at least one of a one-time event, a recurring event, and a flexible event;
create the seeded timeline event on one or more of the team timeline and the single vendor timeline;
display the seeded timeline event on one or more of the team timeline and the single vendor timeline;
receive input from one or more of: the team lead vendor, the single vendor and the user timeline for sharing one or more of the team timeline, the single vendor timeline, and the user timeline;
create one or more of: the shared team timeline, the shared single vendor timeline, and the shared user timeline;
display one or more shared team timeline, shared single vendor timeline, and shared user timeline;
wherein a pop-up event is filtered based upon key words by the timeline user;
receive input regarding auto-populating an event;
create the auto-populated event in one or more of the team vendor timeline and the single vendor timeline;
display the auto-populated event in one or more of the team vendor timeline and the single vendor timeline;
receive input from the timeline user to subscribe to one of the team vendor timeline and the single vendor timeline;
create the subscription;
receive input from one or more of the single vendor and the team lead vendor selecting one or more of a category and a sub-category relating to a vendor business;
create the one or more category and sub-category;
display the one or more category and sub-category;
receive input from the ad-creator vendor for creating an advertisement by selecting a media file based on the one or more category and sub-category for a target vendor wherein the target vendor is one or more of the single vendor and the team lead vendor;
create the advertisement for delivery to one or more of the category and sub-category of the target vendor;
display the advertisement for delivery to one or more of the category and sub-category of the target vendor;
said system further comprising:
a virtual middle layer within said system's architecture;
wherein said virtual middle layer converts a first user-vendor interface for said user with a first vendor to be the same as a second user-vendor interface for said user with a second vendor, with display of at least one of main timelines, one of sub-timelines, and one of subscribed-to vendor timelines;
wherein said virtual middle layer produces a 2-way invitation process for said user, so that said user makes partnership with vendors dynamically;
an abstract layer within said system's architecture;
wherein said abstract layer is provided by a planning module between a timeline user and a vendor;
wherein an advisor applies said abstract layer;
an audit module within said system's architecture;
wherein said audit module is led by a team lead vendor, to make the team timeline available for users;
a seeded events module within said system's architecture;
wherein when user provides the initial parameter, vendor with seeded events updates all vendor's relative and dependent events and provides a customized timeline;
an auto-populate module within said system's architecture;
wherein an auto-populate event is created in one or more of team vendor timelines and single vendor timelines;
wherein said vendor has entries auto-populated by an auto-populate functionality;
wherein said auto-populate uses said vendor's advertising e-mails to match registered vendors and said planning module;
wherein an event is created for each e-mail and is placed in said vendor's timeline automatically.

* * * * *